US012626462B2

(12) United States Patent
Kjøll et al.

(10) Patent No.:  US 12,626,462 B2
(45) Date of Patent:      May 12, 2026

(54) GRAPHICS PROCESSORS

(71) Applicant: Arm Limited, Cambridge (GB)

(72) Inventors: Per Kristian Kjøll, Trondheim (NO); Ahmed Mohamad Abdelmonim Salman, Cambridge (GB)

(73) Assignee: Arm Limited, Cambridge (GB)

( * ) Notice: Subject to any disclaimer, the term of this patent is extended or adjusted under 35 U.S.C. 154(b) by 74 days.

(21) Appl. No.: 18/509,679

(22) Filed: Nov. 15, 2023

(65) Prior Publication Data

US 2024/0169669 A1      May 23, 2024

Related U.S. Application Data

(63) Continuation-in-part of application No. 17/989,671, filed on Nov. 17, 2022, now Pat. No. 12,322,023, and (Continued)

(30) Foreign Application Priority Data

Nov. 17, 2022     (GB) ...................................... 2217219
Nov. 17, 2022     (GB) ...................................... 2217223
(Continued)

(51) Int. Cl.
| | |
|---|---|
| *G06T 17/10* | (2006.01) |
| *G06T 1/20* | (2006.01) |
| *G06T 15/00* | (2011.01) |

(52) U.S. Cl.
CPC ................ *G06T 17/10* (2013.01); *G06T 1/20* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 6,092,097 | A | 7/2000 | Suzuoka |
| 6,246,415 | B1 | 6/2001 | Grossman et al. |
| | | (Continued) | |

FOREIGN PATENT DOCUMENTS

WO      2018052592 A1      3/2018

OTHER PUBLICATIONS

Examination Report dated Apr. 1, 2025, GB Patent Application No. GB2217238.1, 4 pages.

(Continued)

*Primary Examiner* — Sultana M Zalalee
(74) *Attorney, Agent, or Firm* — Pearl Cohen Zedek Latzer Baratz LLP

(57) ABSTRACT

A sequence of primitives to be rendered is processed using a first, pre-pass operation to determine "visibility" information for the sequence of primitives, that is then used in a second, main pass operation in which fragments for primitives that were processed during the first, pre-pass operation are subjected to a visibility test that uses the visibility information determined during the first, pre-pass operation, to determine whether a fragment for a primitive should be processed further in the second, main pass operation. When a fragment is, in the second, main pass operation, subjected to and passes a particular form of visibility test so as to be determined as needing to be processed further, a processing order dependency that would be indicated for the fragment in a record indicative of processing order dependencies for a sub-region of the render output to which the fragment relates is not enforced.

20 Claims, 93 Drawing Sheets

Related U.S. Application Data a continuation-in-part of application No. 17/989,548, filed on Nov. 17, 2022, now Pat. No. 12,266,052.

(30) Foreign Application Priority Data

| | | |
|---|---|---|
| Nov. 17, 2022 | (GB) | ..................................... 2217236 |
| Nov. 17, 2022 | (GB) | ..................................... 2217238 |
| Nov. 17, 2022 | (GB) | ..................................... 2217239 |
| Nov. 17, 2022 | (GB) | ..................................... 2217243 |
| Nov. 17, 2022 | (GB) | ..................................... 2217245 |
| Nov. 17, 2022 | (GB) | ..................................... 2217246 |
| Nov. 17, 2022 | (GB) | ..................................... 2217247 |
| Nov. 17, 2022 | (GB) | ..................................... 2217253 |

(56) References Cited

U.S. PATENT DOCUMENTS

| | | | |
|---|---|---|---|
| 6,480,205 | B1 | 11/2002 | Greene et al. |
| 6,535,209 | B1 | 3/2003 | Abdalla et al. |
| 7,023,437 | B1 | 4/2006 | Voorhies et al. |
| 7,375,727 | B1 | 5/2008 | Greene et al. |
| 8,325,184 | B2 | 12/2012 | Jiao et al. |
| 8,698,820 | B2 | 4/2014 | Cox et al. |
| 9,626,795 | B2 | 4/2017 | Sathe |
| 9,767,595 | B2 | 9/2017 | Nystad et al. |
| 10,074,210 | B1 | 9/2018 | Spencer et al. |
| 10,096,147 | B2 | 10/2018 | Goel et al. |
| 11,030,783 | B1 | 6/2021 | Engh-Halstvedt et al. |
| 12,154,224 | B2 | 11/2024 | Achrenius et al. |
| 12,266,052 | B2 | 4/2025 | Øygard et al. |
| 12,322,023 | B2 | 6/2025 | Øygard et al. |
| 2002/0196252 | A1 | 12/2002 | Liao et al. |
| 2007/0257905 | A1 | 11/2007 | French et al. |
| 2014/0168220 | A1 | 6/2014 | Nystad |
| 2014/0218390 | A1 | 8/2014 | Rouet |
| 2014/0267256 | A1 | 9/2014 | Heggelund et al. |
| 2014/0267259 | A1 | 9/2014 | Frascati |
| 2014/0354661 | A1 | 12/2014 | Balci et al. |
| 2015/0002508 | A1 | 1/2015 | Tatarinov |
| 2015/0062154 | A1 | 3/2015 | Ellis et al. |
| 2016/0005140 | A1 | 1/2016 | Engh-Halstvedt et al. |
| 2016/0035128 | A1 | 2/2016 | Zhao |
| 2016/0035129 | A1 | 2/2016 | Bolz et al. |
| 2016/0086299 | A1 | 3/2016 | Sharma |
| 2016/0098856 | A1 | 4/2016 | Broadhurst et al. |
| 2016/0125649 | A1 | 5/2016 | Jeong et al. |
| 2016/0217608 | A1 | 7/2016 | Howson |
| 2016/0322031 | A1 | 11/2016 | Liao et al. |
| 2017/0161940 | A1 | 6/2017 | Liktor et al. |
| 2017/0178386 | A1 | 6/2017 | Redshaw et al. |
| 2017/0263039 | A1 | 9/2017 | Goel |
| 2018/0025463 | A1 | 1/2018 | Kazakov et al. |
| 2018/0082467 | A1 | 3/2018 | Andersson et al. |
| 2018/0082469 | A1 | 3/2018 | Andersson |
| 2018/0197323 | A1 | 7/2018 | Howson et al. |
| 2018/0268604 | A1 | 9/2018 | Story |
| 2018/0349315 | A1 | 12/2018 | Heggelund et al. |
| 2019/0012829 | A1 | 1/2019 | Engh-Halstvedt et al. |
| 2019/0088009 | A1 | 3/2019 | Forey et al. |
| 2019/0206121 | A1 | 7/2019 | Jin |
| 2019/0311535 | A1 | 10/2019 | Lacey |
| 2019/0362533 | A1 | 11/2019 | Fuller |
| 2020/0098165 | A1 | 3/2020 | Gruber |
| 2020/0134894 | A1 | 4/2020 | Uhrenholt |
| 2020/0193703 | A1 | 6/2020 | Favela |
| 2020/0312020 | A1 | 10/2020 | Zhong et al. |
| 2020/0402295 | A1 | 12/2020 | Lentz |
| 2020/0402297 | A1 | 12/2020 | Brigg et al. |
| 2021/0065437 | A1* | 3/2021 | Brkic ................... G06T 15/405 |
| 2021/0110510 | A1 | 4/2021 | Brigg et al. |
| 2021/0407191 | A1 | 12/2021 | Yang et al. |
| 2022/0092801 | A1 | 3/2022 | Achrenius et al. |
| 2022/0207827 | A1 | 6/2022 | Acharya et al. |
| 2022/0237730 | A1 | 7/2022 | Brkic |
| 2022/0366524 | A1* | 11/2022 | Uhrenholt ................ G06T 1/60 |
| 2024/0087078 | A1 | 3/2024 | Ashkar et al. |
| 2024/0104684 | A1 | 3/2024 | Bhiravabhatla |
| 2024/0169639 | A1 | 5/2024 | Oygard et al. |

OTHER PUBLICATIONS

Extended European Search Report dated Jul. 5, 2024, European Patent Application No. 23210210.3, pp. 1-10.

Response to Non-Final Office Action dated Sep. 19, 2024, U.S. Appl. No. 17/989,548, 14 pages.

Response to Non-Final Office Action dated Nov. 14, 2024, U.S. Appl. No. 17/989,671, 16 pages.

Notice of Allowance dated Nov. 22, 2024, U.S. Appl. No. 17/989,548, 25 pages.

Combined Search and Examination Report under Sections 17 and 18(3) dated Jun. 3, 2024, GB Patent Application No. GB 2317492.3, pp. 1-7.

Combined Search and Examination Report under Sections 17 and 18(3) dated May 24, 2023, GB Patent Application No. GB 2217223.3, pp. 1-6.

Combined Search and Examination Report under Sections 17 and 18(3) dated May 30, 2023, GB Patent Application No. GB 2217253.0, pp. 1-6.

Search Report under Section 17 dated May 19, 2023, GB Patent Application No. GB 2217247.2, pp. 1-4.

Combined Search and Examination Report under Sections 17 and 18(3) dated May 19, 2023, GB Patent Application No. GB 2217238.1, pp. 1-7.

Search Report under Section 17 dated Jun. 19, 2023, GB Patent Application No. GB 2217246.4, pp. 1-4.

Øygard, T.K., et al., "Graphics Processors", U.S. Appl. No. 17/989,548, filed Nov. 17, 2022.

Øygard, T.K., et al., "Graphics Processors", U.S. Appl. No. 17/989,671, filed Nov. 17, 2022.

Øygard, T.K., et al., "Graphics Processors", U.S. Appl. No. 18/509,432, filed Nov. 15, 2023.

Øygard, T.K., et al., "Graphics Processors", U.S. Appl. No. 18/509,436, filed Nov. 15, 2023.

Øygard, T.K., et al., "Graphics Processors", U.S. Appl. No. 18/509,439, filed Nov. 15, 2023.

Øygard, T.K., et al., "Graphics Processors", U.S. Appl. No. 18/509,426, filed Nov. 15, 2023.

Ruud, O.M., et al., "Graphics Processors", U.S. Appl. No. 18/509,441, filed Nov. 15, 2023.

Ruud, O.M., et al., "Graphics Processors", U.S. Appl. No. 18/509,448, filed Nov. 15, 2023.

Ruud, O.M., et al., "Graphics Processors", U.S. Appl. No. 18/509,676, filed Nov. 15, 2023.

Ruud, O.M., et al., "Graphics Processors", U.S. Appl. No. 18/509,687, filed Nov. 15, 2023.

PCT International Search Report and Written Opinion, dated Feb. 19, 2024, PCT International Application No. PCT/GB2023/052995, pp. 1-17.

Notice of Allowance dated Jan. 23, 2025, U.S. Appl. No. 17/989,671, 30 pages.

Non-Final Office Action dated Aug. 2, 2024, U.S. Appl. No. 17/989,548, 37 pages.

Non-Final Office Action dated Aug. 14, 2024, U.S. Appl. No. 17/989,671, 37 pages.

Non-final Office Action dated Jul. 21, 2025, U.S. Appl. No. 18/509,432, filed Nov. 15, 2023.

U.S. Appl. No. 19/130,178 filed May 15, 2025.

Notice of Allowance dated Nov. 24, 2025, U.S. Appl. No. 18/509,432, filed Nov. 15, 2023.

Response to Office Action dated Nov. 25, 2025, U.S. Appl. No. 18/509,436, filed Nov. 15, 2023.

Non-final Office Action dated Aug. 8, 2025, U.S. Appl. No. 18/509,426, filed Nov. 15, 2023.

Non-final Office Action dated Aug. 26, 2025, U.S. Appl. No. 18/509,436, filed Nov. 15, 2023.

(56) References Cited

OTHER PUBLICATIONS

Response to Office Action dated Sep. 9, 2025, U.S. Appl. No. 18/509,432, filed Nov. 15, 2023.
Non-final Office Action dated Sep. 24, 2025, U.S. Appl. No. 18/509,439, filed Nov. 15, 2023.
Non-final Office Action dated Oct. 9, 2025, U.S. Appl. No. 18/509,441, filed Nov. 15, 2023.
Response to Office Action dated Nov. 7, 2025, U.S. Appl. No. 18/509,426, filed Nov. 15, 2023.

* cited by examiner

80 — Fragment shader endpoint

81 — Polygon list reader

82 — Primitive classification unit

83 — Prepass decision unit

84 — Vertex shading

85 — Rasterizer

86 — Early depth test/update

80 — Fragment shader endpoint

81 — Polygon list reader

82 — Primitive classification unit

83 — Prepass decision unit

84 — Vertex shading

85 — Rasterizer

136 — Early depth test/update with disambiguation

186 — Early stencil test/update with disambiguation

227 — Shader execution

228 — Late depth test/update with disambiguation

229 — Late stencil test/update with disambiguation

80 — Fragment shader endpoint

81 — Polygon list reader

82 — Primitive classification unit

83 — Prepass decision unit

84 — Vertex shading

85 — Rasterizer

86 — Early depth/stencil test/update

241 — Early HSR ID update

227 — Shader execution (optional)

228 — Late depth/stencil test/update (optional)

242 — Late HSR ID update (optional)

540 — Build primitive culling data structure

720 —
Determine during fallback operation that there
is a further compatible primitive such that
processing could switch back to pre-pass operation 721 —
Check if one or more further conditions are
met to switch back to pre-pass operation 722 —
If one or more further conditions are met, revert to
pre-pass operation; otherwise, continue in
fallback operation 100170 — QuadID
100171 — Next
100172 — Coverage
100173 — Col
100174 — ZS
100175 — ROSID
100176 — TileID
100177 — Col Dep
100178 — ZS Dep
100179 — ROS Dep
1001710 — Retire Entry Table

| Position | (Head) | Tail | TileID | ROSID | ROSIDchange | Active |
|----------|--------|------|--------|-------|-------------|--------|
|          |        |      |        |       |             |        |
|          |        |      |        |       |             |        |
|          |        |      |        |       |             |        |
|          |        |      |        |       |             |        |

100180  100181  100182  100183  100184  100185  100186

GRAPHICS PROCESSORS

BACKGROUND

The technology described herein relates to the processing of computer graphics, and in particular to hidden surface removal in graphics processing.

Many data processing systems include a graphics processor (graphics processing unit (GPU)) as a processing resource that is operable to perform processing tasks for, e.g., applications that are executing on a, e.g., main (e.g. host) processor (CPU) of the data processing system. A graphics processor may thus be caused to perform processing tasks for applications by providing to the graphics processor a stream of commands (instructions) to be executed by the graphics processor. For example, a driver for the graphics processor may prepare a command stream containing commands (instructions) to be performed by the graphics processor, and provide the command stream to the graphics processor, with the graphics processor then performing the commands (the operations indicated by the commands) in the command stream. The graphics processor may further comprise a suitable command stream frontend that acts to parse the driver-generated commands and schedule processing tasks for the various functional units of the graphics processor accordingly.

A graphics processor may thus be provided as a hardware accelerator that is operable to perform graphics processing on demand from a main (e.g. host) processor (CPU). The graphics processor is generally configured for performing graphics processing in a more optimised manner (e.g. compared to using the main (e.g. host) processor (CPU) to perform the processing using general-purpose computations).

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing.

For a given output, e.g. frame to be displayed, to be generated by the graphics processing, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

These processes are typically carried out by testing sets of one, or of more than one, sampling position, and then generating for each set of sampling positions found to include a sampling position that is inside (covered by) the primitive in question (being tested), a discrete graphical entity usually referred to as a "fragment" on which the graphics processing operations (such as rendering) are carried out. Covered sampling positions are thus, in effect, processed as fragments that will be used to render the primitive at the sampling positions in question. The "fragments" are the graphical entities that pass through the rendering process (the rendering pipeline). Each fragment that is generated and processed may, e.g., represent a single sampling position or a set of plural sampling positions, depending upon how the graphics processing system is configured.

A "fragment" is therefore effectively (has associated with it) a set of primitive data as interpolated to a given output space sampling position or points of a primitive. It may also include per-primitive and other state data that is required to shade the primitive at the sampling position (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling positions and the pixels of a display, but more typically there may not be a one-to-one correspondence between sampling positions and display pixels, as downsampling may be carried out on the rendered sample values to generate the output pixel values for displaying the final image. Similarly, where multiple sampling position values, e.g. from different overlapping primitives, at a given location affect each other (e.g. due to transparency and/or blending), the final pixel output will also depend upon plural overlapping sample values at that pixel location.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

Once the primitive lists have been prepared for all the render output regions, each rendering tile is processed, by rasterising and rendering the primitives listed for the region of the render output corresponding to the rendering tile.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive falls into more than one render output region, as will frequently be the case, it is included in a primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

The primitive lists prepared in this way can then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive lists being used accordingly to identify the primitives to be rendered for each rendering tile when generating the desired render output, e.g. to display the frame.

Thus, the command stream for causing a graphics processor to perform tile-based rendering may comprise a first set of commands to cause the graphics processor to prepare the desired primitives lists and a second set of commands to subsequently cause the graphics processor to render the rendering tiles. These rendering commands may be issued in respect of any desired regions of the render output. For example, in some arrangements, a command may be prepared by the driver for the graphics processor relating to a processing job to render a certain region comprising a group of plural rendering tiles. The command stream frontend of the graphics processor may then break the processing job into respective processing tasks for rendering the individual tiles which are then processed accordingly to perform the rendering. Various arrangements are possible in this regard.

One drawback of current graphics processing systems is that because primitives are processed sequentially, and typically not in perfect front-to-back order, a given sampling position (and hence fragment and pixel) may be shaded multiple times as an output is processed, e.g. for display. This occurs when a first received and rendered primitive is subsequently covered by a later primitive, such that the rendered first primitive is not in fact seen at the pixel(s) (and sampling position(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater). In order to improve graphics processing performance (e.g. in terms of speed and/or bandwidth), and energy efficiency, it is therefore desirable to try to avoid rendering any such invisible fragments.

The problem of "overdraw" could be significantly reduced by sending primitives for rendering in front-to-back order. However, other graphics processing requirements, such as the need for coherent access to resources such as textures, and the need to minimise the number of API calls per frame, generally mandate other ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of hidden surface removal techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.). Hidden surface removal thus concerns the process of identifying which of the geometry within a scene will actually be visible in the final render output to try to avoid unnecessarily processing fragments that have no visible effect.

For example, some form of hidden surface removal may be performed before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes, and so on.

These arrangements typically try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) hidden surface removal techniques only take account of fragments that have completed their processing (that have already been rendered) at the time the new, e.g., primitive or fragment (the primitive or fragment being "early" tested) is being tested. This is because the relevant test data (such as the Z-buffer) only contains data from fragments that have already been processed.

Another possibility is to attempt to kill threads corresponding to fragments that are found to be obscured by later fragments in-flight, e.g. using a 'forward pixel kill' operation as described in United States Patent Application Publication No. 2019/0088009 (Arm Limited). This approach generally works well in most cases.

However, such arrangements typically use a fixed-size buffer to store 'cullable' fragments which means that if the buffer is full, culling efficiency may be lost. Further, there is only a limited window in which fragments can be culled. This approach may therefore be less suitable for larger, more complex scenes, as there may be fewer opportunities for fragments to be culled.

The Applicants believe therefore that there remains scope for improved techniques for hidden surface removal in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
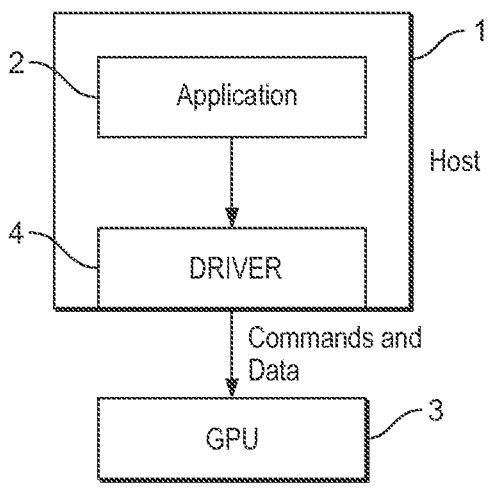
FIG. 1 shows schematically an exemplary graphics processing system.

A first embodiment of the technology described herein comprises a method of operating a graphics processor, the method comprising:

for a sequence of primitives to be rendered for a render output:

performing a main pass operation in which the processing of fragments for at least some of the primitives in the sequence of primitives is controlled based on visibility information for the sequence of primitives, wherein:

controlling the processing of fragments for primitives when performing the main pass operation based on the visibility information for the sequence of primitives, comprises:

as part of the main pass operation, subjecting a fragment for a primitive to a visibility test that uses the visibility information to determine whether the fragment for the primitive should be processed further in the main pass operation, the visibility test being such that when the visibility information indicates that the fragment should be processed further for the render output, the fragment is processed during the main pass operation by rendering the fragment to determine rendered output data for sampling positions associated with the fragment, whereas when the visibility information indicates that the fragment should not be processed further for the render output, some or all of the processing for the fragment during the main pass is omitted;

the method further comprising:

during the main pass operation maintaining for each of plural sub-regions of the render output, each sub-region relating to plural sampling positions of the render output, a record indicative of processing order dependencies between fragments that are to be processed for the sub-region of the render output in the main pass operation; and controlling the processing of fragments to be processed for a sub-region of the render output in the main pass operation based on the record indicative of processing order dependencies between fragments to be processed for the sub-region of the render output;

wherein:

the controlling the processing of fragments to be processed for a sub-region of the render output in the main pass operation based on the record indicative of processing order dependencies between fragments to be processed for the sub-region of the render output comprises:

when a fragment to be processed for a primitive is, in the main pass operation, subjected to and passes a particular form of visibility test so as to be determined as needing to be processed further in the main pass operation, not enforcing a processing order dependency that would be indicated for the fragment in a record indicative of processing order dependencies for a sub-region of the render output to which the fragment relates.

A second embodiment of the technology described herein comprises a graphics processor configured to generate a render output, the graphics processor comprising:

a rasterising circuit that is operable to rasterise primitives into respective sets of one or more fragments; and a rendering circuit that is operable to process the resulting fragments to generate rendered output data;

wherein the graphics processor is configured to:

for a sequence of primitives to be rendered for a render output:

perform a main pass operation in which a visibility testing circuit controls the further processing of fragments for at least some of the primitives in the sequence of primitives based on visibility information for the sequence of primitives, wherein:

the visibility testing circuit is configured to control the further processing of fragments for primitives when performing the main pass operation based on the visibility information for the sequence of primitives, by:

subjecting a fragment for a primitive to a visibility test that uses the visibility information, to determine whether the fragment for the primitive should be processed further in the main pass operation, the visibility test being such that when the visibility information indicates that the fragment should be processed further for the render output, the fragment is processed during the main pass operation by rendering the fragment to determine rendered output data for sampling positions associated with the fragment, whereas when the visibility information indicates that the fragment should not be processed further for the render output, some or all of the processing for the fragment during the main pass is omitted;

the graphics processor further comprising:

a fragment dependency record managing circuit configured to, during the main pass operation, maintain for each of plural sub-regions of the render output, each sub-region relating to plural sampling positions of the render output, a record indicative of processing order dependencies between fragments that are to be processed for the sub-region of the render output in the main pass operation; and a fragment processing control circuit configured to control the processing of fragments to be processed for a sub-region of the render output in the main pass operation based on a record indicative of processing order dependencies between fragments to be processed for the sub-region of the render output;

wherein:

the fragment processing control circuit is configured to control the processing of fragments to be processed for a sub-region of the render output in the main pass operation based on a record indicative of processing order dependencies between fragments to be processed for the sub-region of the render output by:

when a fragment to be processed for a primitive is, in the main pass operation, subjected to and passes a particular form of visibility test so as to be determined as needing to be processed further in the main pass operation, not enforcing a processing order dependency that would be indicated for the fragment in a record indicative of processing order dependencies for a sub-region of the render output to which the fragment relates.

The technology described herein relates generally to hidden surface removal. In particular, the technology described herein enables improved (e.g., and in an embodiment, sample-perfect) hidden surface removal within a sequence of primitives that are to be rendered for a given render output (which sequence of primitives may, e.g., be a sequence of primitives to be rendered for an individual tile in a tile-based rendering system, but could also be any other suitably defined sequence of primitives depending on the desired render output and configuration of the graphics processor in question).

In the technology described herein, when performing a main pass operation that produces the (final) output for a render output, e.g. a set of colour values, e.g. to be written out to a frame buffer for display, the processing of the fragments for primitives for the main pass is controlled based on visibility information for the sequence of primitives. Thus, for any fragments for primitives for which the visibility information indicates that the fragment should be processed further, the fragment (and hence primitive) is processed further in the main pass in order to complete the rendering of the fragments to determine rendered output data for the sampling positions associated with the fragments. On the other hand, for any fragments for primitives for which the visibility information indicates that the fragment does not need to be processed further for the render output, the fragment can be culled on that basis, thus avoiding some or all of the processing by the main pass for that fragment.

To achieve this, in the technology described herein a fragment "visibility" test is performed during the main pass that determines using the visibility information whether or not a fragment should be processed further for the main pass. If the fragment fails the visibility test, the fragment can then be (and is) culled on that basis. In an embodiment the fragment visibility test is therefore performed (in the main pass) after rasterising the primitives into fragments, but before the final rendering (e.g. fragment shading) operations. The actual culling of any fragments that are determined to be invisible based on the visibility information in general however can be done in various suitable and desired ways, and may be done at any suitable point during the main pass, as will be explained further below.

In the technology described herein, as well as controlling the processing of fragments during the main pass based on fragment visibility tests as discussed above, a record is also maintained of fragment processing order dependencies in the main pass for respective sub-regions of the render output, and the processing of fragments (that have, e.g., and in an embodiment, been determined as needing to be processed in the main pass following the fragment visibility test) is further controlled in accordance with the determined processing order dependencies for the fragments.

The Applicants have recognised in this regard that while it is normally desirable to process different fragments concurrently (as far as possible), e.g. for throughput reasons, certain fragment processing operations (such as depth and colour updates) are normally required (e.g. by the graphics API) to be done in a strict primitive order. This then has the effect that fragments from different primitives, e.g. that relate to the same sampling positions, may be required to be processed in a particular order. As a result, fragment processing operation ordering dependencies may arise between different fragments, e.g. from different primitives but for the same sampling position(s). For example, it may be necessary to ensure that fragments update the colour and/or depth buffers in a particular fragment order.

The technology described herein facilitates the managing and enforcing of such ordering dependencies for fragment processing, e.g. to ensure that fragments from different primitives access the depth and/or colour buffers in the desired (and correct) order, in the main pass, by maintaining for respective sub-regions of a render output being generated, appropriate records indicative of fragment processing order dependencies for the sub-region in question (and then uses those processing order dependency records to control the processing of fragments during the main pass).

However, the Applicants have further recognised that particularly in the case where any fragment processing order dependencies are tracked at a resolution of larger sub-regions of a render output (e.g. sub-regions of a render output that correspond to plural sampling positions), it can be the case that the processing order dependency record will indicate a processing order dependency for fragments when the fragments will not in fact overlap when considered at a finer grained resolution, such as at the resolution of individual sampling positions. In this case therefore, the processing order dependency record may indicate a processing order dependency that does not in fact exist.

The Applicants have further recognised, as will be discussed in more detail below, that such "false" processing order dependencies based on the processing order dependency records can be (safely) overridden using, and based on, the visibility tests that are performed in the technology described herein to determine whether fragments should be processed further in the main pass, and in particular in the case where a particular form or forms of fragment visibility test are performed for (and passed by) a fragment. In particular, as will be discussed in more detail below, there may be a form or forms of fragment visibility test that, if passed, guarantees that there will not be an older primitive that passed the visibility test in question to be rendered at a particular sampling position, such that there cannot in fact be any fragment processing order dependency for the fragment (primitive) that passed the particular visibility test at that sampling position, even if the record of fragment processing order dependencies would normally indicate that there is.

Accordingly, the technology described herein further operates (and is configured such that) fragment processing order dependencies indicated by a fragment processing order dependency record can be, and will be, where appropriate, not enforced (other than enforced) based on the particular type of fragment visibility test that a fragment for a primitive has passed (to trigger its continued processing in the main pass).

This will then have the effect of allowing the enforcement of at least some false processing order dependencies indicated by the fragment processing order dependency records to be omitted (avoided), such that the processing of the fragments may be performed more efficiently than if all indicated processing order dependencies were simply enforced.

Furthermore, the Applicants have recognised that using the nature of the fragment visibility test that a fragment has passed to determine whether or not to override processing order dependencies for the fragment provides a relatively effective and efficient mechanism for reducing the number of "false" processing order dependencies that may be enforced, as compared to, for example, other techniques for reducing or avoiding false processing order dependencies, such as tracking any processing order dependencies at a finer grained (e.g. single sampling position) resolution.

As discussed above, in the technology described herein, the processing of fragments for primitives during the main pass operation is controlled based on visibility information for the sequence of primitives. In an embodiment, the visibility information for the sequence of primitives that is used in this regard is generated by performing a first, pre-pass operation (before the second, main pass operation) for and on the sequence of primitives, to thereby determine the visibility information that is then used during the main pass operation to control the processing of fragments for primitives during the main pass operation (as discussed above).

Thus, in an embodiment, the method of the technology described herein comprises:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for the primitives in the sequence of primitives are processed to determine "visibility" information for the sequence of primitives, the visibility information being usable to determine whether or not fragments for a primitive in the sequence of primitives should subsequently be processed further for the render output; and thereafter performing a second, main pass operation in which the further processing of fragments for at least some of the primitives that were processed during the first, pre-pass operation is controlled based on the determined visibility information for the sequence of primitives, wherein:

controlling the further processing of fragments for primitives that were processed during the first, pre-pass operation when performing the second, main pass operation based on the determined visibility information for the sequence of primitives, comprises:

as part of the second, main pass operation, subjecting a fragment for a primitive that was processed during the first, pre-pass operation to a visibility test that uses the visibility information determined during the first, pre-pass operation, to determine whether the fragment for the primitive should be processed further in the second, main pass operation, the visibility test being such that when the visibility information indicates that the fragment should be processed further for the render output, the test is passed and the fragment is processed again during the second, main pass operation by rendering the fragment to determine rendered output data for sampling positions associated with the fragment, whereas when the visibility information indicates that the fragment should not be processed further for the render output the test is not passed and some or all of the processing for the fragment during the second, main pass is omitted.

Correspondingly, in an embodiment, the graphics processor is configured to: for a sequence of primitives to be rendered for a render output:

perform a first, pre-pass operation in which primitives in the sequence of primitives to be rendered are processed by:

the rasterising circuit rasterising the primitives into respective sets of one or more fragments, each fragment associated with a respective set of one or more sampling positions within the render output; and a fragment visibility determining circuit processing, as part of the first, pre-pass operation, fragments for primitives in the sequence of primitives to determine "visibility" information for the sequence of primitives, the visibility information being usable to determine whether or not fragments for a primitive in the sequence of primitives should subsequently be processed further for the render output; and thereafter perform a second, main pass operation in which a visibility testing circuit controls the further processing of fragments for at least some of the primitives that were processed during the first, pre-pass operation based on the determined visibility information for the sequence of primitives, wherein:

the visibility testing circuit is configured to control the further processing of fragments for primitives that were processed during the first, pre-pass operation when performing the second, main pass operation based on the determined visibility information for the sequence of primitives, by:

subjecting a fragment for a primitive that was processed during the first, pre-pass operation to a visibility test that uses the visibility information determined during the first, pre-pass operation, to determine whether the fragment for the primitive should be processed further in the second, main pass operation, the visibility test being such that when the visibility information indicates that the fragment should be processed further for the render output, the test is passed and the fragment is processed again during the second, main pass operation by rendering the fragment to determine rendered output data for sampling positions associated with the fragment, whereas when the visibility information indicates that the fragment should not be processed further for the render output the test is not passed and some or all of the processing for the fragment during the second, main pass is omitted.

Similarly, another embodiment of the technology described herein comprises a method of operating a graphics processor, the method comprising:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for the primitives in the sequence of primitives are processed to determine "visibility" information for the sequence of primitives, the visibility information being usable to determine whether or not fragments for a primitive in the sequence of primitives should subsequently be processed further for the render output; and thereafter performing a second, main pass operation in which the further processing of fragments for at least some of the primitives that were processed during the first, pre-pass operation is controlled based on the determined visibility information for the sequence of primitives, wherein:

controlling the further processing of fragments for primitives that were processed during the first, pre-pass operation when performing the second, main pass operation based on the determined visibility information for the sequence of primitives, comprises:

as part of the second, main pass operation, subjecting a fragment for a primitive that was processed during the first, pre-pass operation to a visibility test that uses the visibility information determined during the first, pre-pass operation, to determine whether the fragment for the primitive should be processed further in the second, main pass operation, the visibility test being such that when the visibility information indicates that the fragment should be processed further for the render output, the test is passed and the fragment is processed again during the second, main pass operation by rendering the fragment to determine rendered output data for sampling positions associated with the fragment, whereas when the visibility information indicates that the fragment should not be processed further for the render output the test is not passed and some or all of the processing for the fragment during the second, main pass is not performed; the method further comprising:

during the second, main pass operation maintaining for each of plural sub-regions of the render output, each sub-region relating to plural sampling positions of the render output, a record indicative of processing order dependencies between fragments that are to be processed for the sub-region of the render output in the second, main pass operation; and controlling the processing of fragments to be processed for a sub-region of the render output in the second, main pass operation based on the record indicative of processing order dependencies between fragments to be processed for the sub-region of the render output;

wherein:

the controlling the processing of fragments to be processed for a sub-region of the render output in the second, main pass operation based on the record indicative of processing order dependencies between fragments to be processed for the sub-region of the render output comprises:

when a fragment to be processed for a primitive is, in the second, main pass operation, subjected to and passes a particular form of visibility test so as to be determined as needing to be processed further in the second, main pass operation, not enforcing a processing order dependency that would be indicated for the fragment in a record indicative of processing order dependencies for a sub-region of the render output to which the fragment relates.

Another embodiment of the technology described herein comprises a graphics processor configured to generate a render output, the graphics processor comprising:

a rasterising circuit that is operable to rasterise primitives into respective sets of one or more fragments; and a rendering circuit that is operable to process the resulting fragments to generate rendered output data;

wherein the graphics processor is configured to:

for a sequence of primitives to be rendered for a render output:

perform a first, pre-pass operation in which primitives in the sequence of primitives to be rendered are processed by:

the rasterising circuit rasterising the primitives into respective sets of one or more fragments, each fragment associated with a respective set of one or more sampling positions within the render output; and a fragment visibility determining circuit processing, as part of the first, pre-pass operation, fragments for primitives in the sequence of primitives to determine "visibility" information for the sequence of primitives, the visibility information being usable to determine whether or not fragments for a primitive in the sequence of primitives should subsequently be processed further for the render output; and thereafter perform a second, main pass operation in which a visibility testing circuit controls the further processing of fragments for at least some of the primitives that were processed during the first, pre-pass operation based on the determined visibility information for the sequence of primitives, wherein:

the visibility testing circuit is configured to control the further processing of fragments for primitives that were processed during the first, pre-pass operation when performing the second, main pass operation based on the determined visibility information for the sequence of primitives, by:

subjecting a fragment for a primitive that was processed during the first, pre-pass operation to a visibility test that uses the visibility information determined during the first, pre-pass operation, to determine whether the fragment for the primitive should be processed further in the second, main pass operation, the visibility test being such that when the visibility information indicates that the fragment should be processed further for the render output, the test is passed and the fragment is processed again during the second, main pass operation by rendering the fragment to determine rendered output data for sampling positions associated with the fragment, whereas when the visibility information indicates that the fragment should not be processed further for the render output the test is not passed and some or all of the processing for the fragment during the second, main pass is not performed; the graphics processor further comprising:

a fragment dependency record managing circuit configured to, during the second, main pass operation, maintain for each of plural sub-regions of the render output, each sub-region relating to plural sampling positions of the render output, a record indicative of processing order dependencies between fragments that are to be processed for the sub-region of the render output in the second, main pass operation; and a fragment processing control circuit configured to control the processing of fragments to be processed for a sub-region of the render output in the second, main pass operation based on a record indicative of processing order dependencies between fragments to be processed for the sub-region of the render output;

wherein:

the fragment processing control circuit is configured to control the processing of fragments to be processed for a sub-region of the render output in the second, main pass operation based on a record indicative of processing order dependencies between fragments to be processed for the sub-region of the render output by:

when a fragment to be processed for a primitive is, in the second, main pass operation, subjected to and passes a particular form of visibility test so as to be determined as needing to be processed further in the second, main pass operation, not enforcing a processing order dependency that would be indicated for the fragment in a record indicative of processing order dependencies for a sub-region of the render output to which the fragment relates.

In these embodiments of the technology described herein, as part of the rendering operations performed for the sequence of primitives, an initial, "pre-pass" operation is performed, such that the graphics processor when rendering a sequence of primitives is effectively configured to render primitives in a sequence of primitives to be rendered in two separate processing passes.

Thus, when a sequence of primitives is issued to the graphics processor for rendering, the graphics processor is caused to initially perform a first, "pre-pass" operation in which the primitives are rasterised into respective sets of fragments and the resulting fragments are then processed to determine "visibility" information for the sequence of primitives. The visibility information generated during the first, pre-pass operation can then be (and is) subsequently used (during a second, "main" pass operation, as will be explained further below) to determine whether or not the fragments for the primitives (and hence the primitives) in the sequence of primitives should be processed further for the render output.

The primitives are however in an embodiment not rendered in full during the first, pre-pass operation and at least some of the actual final rendering operations, e.g. the fragment shading, to determine the rendered output data for the sampling positions associated with the primitives (e.g. to determine the appearance (e.g. colour) that the sampling positions associated with the primitives should have in the final render output), as well as the corresponding writing out of the final render output (e.g. colour) values, are instead deferred to a second, "main" pass in which the primitives are processed again by rasterising the primitives again into their respective sets of fragments and rendering the fragments, e.g., and in an embodiment, by executing a fragment shader, in order to determine rendered output data for the sampling positions associated with the fragments. The second, main pass operation thus produces the final output for the render output, e.g. a set of colour values, and writes this out accordingly, e.g. to a frame buffer for display.

The further processing of the fragments for primitives for the second, main pass is controlled based on the visibility information generated by the first, pre-pass. Thus, for any fragments for primitives for which the visibility information indicates that the fragment should be processed further, the (same) fragment (and hence primitive) is processed further in the second, main pass in order to complete the rendering of the fragments to determine rendered output data for the sampling positions associated with the fragments. On the other hand, for any fragments for primitives for which the visibility information indicates that the fragment does not need to be processed further for the render output, the fragment can be culled on that basis, thus avoiding some or all of the processing by the second, main pass for that fragment.

The effect of performing the "pre-pass" operation is thus that any fragments for primitives for which it can be determined during the pre-pass operation that the fragments do not need to be processed further for the render output can be suitably culled thus avoiding processing (rendering) the fragments in 'full' for the second, main pass.

As discussed above, to achieve this, in the technology described herein a fragment "visibility" test is performed during the second, main pass that determines using the generated visibility information whether or not a fragment should be processed further for the second, main pass. If the fragment fails the visibility test, the fragment can then be (and is) culled on that basis. In an embodiment the fragment visibility test is therefore performed (in the second, main pass) after rasterising the primitives into fragments, but before the final rendering (e.g. fragment shading) operations. The actual culling of any fragments that are determined to be invisible based on the visibility information in general however can be done in various suitable and desired ways, and may be done at any suitable point during the second, main pass, as will be explained further below.

The render output being generated (and which is generated) may comprise any suitable render output that a graphics processor may be used to generate, such as frame for display, a render to texture output, etc. In one embodiment it comprises an image. It may also comprise a "non-graphics" output that may be generated by a graphics processor, such as in the case of so-called compute shading for example, but which is generated in an analogous manner (by generating and processing fragments) (and for which fragment processing dependencies may need to be tracked and enforced).

The render output being generated will comprise an array of sampling positions (i.e. data elements), each sampling position having appropriate render output data associated with it, such as colour value data (e.g. a set of red, green and blue (RGB) values and a transparency (alpha, a) value), a depth (Z) value, etc.

In an embodiment, the graphics processor is configured to and operates to perform tile-based graphics processing. Thus the overall render output being generated will be divided into plural rendering tiles for rendering purposes (is processed on a tile-by-tile basis).

Accordingly the render output (that the sequence of primitives is for) may be the entire render output (e.g. frame) that is being generated, or a respective rendering tile of an overall render output (e.g. frame).

Correspondingly, the sequence of primitives to be rendered for a render output that is being processed may be any suitable and desired sequence of primitives for a render output. Thus it may be the entire sequence of primitives to be rendered for the entire render output, or an appropriate smaller sequence of primitives to be rendered for the render output. For example, in the case of tile-based rendering, the sequence of primitives to be rendered for a render output may be the sequence of primitives to be rendered for a respective tile of the render output (and in one embodiment that is the case). It would also be possible for the sequence of primitives to be rendered for the render output to relate to a smaller set of processing (e.g. processing task) for a given render output, such as a sequence of primitives to be rendered for a respective draw call of a render output. Other arrangements would, of course, be possible.

In the technology described herein, as discussed above, when processing a sequence of primitives to be rendered for a render output, both a first, pre-pass operation and a second, main pass operation may be, and are in an embodiment, performed.

The purpose of the first, pre-pass operation is to generate the desired "visibility" information. The processing that is performed in the first, pre-pass may comprise any suitable and desired processing, e.g. depending on the format of the visibility information. In general, however, the first, pre-pass operation comprises rasterising primitives into respective sets of one or more fragments and then performing one or more fragment processing operations to determine the desired visibility information. The visibility information is typically, and in embodiments, based on the fragment depth values. That is, which fragment will be visible at a particular sampling position will typically be, and is in an embodiment, determined (at least in part) by which fragment is front-most in the scene (i.e. has the closest depth value).

The visibility information may take any suitable and desired form so long as it can be used in the manner of the technology described herein to control rendering of primitives during the second, main pass.

In a first main embodiment, the visibility information comprises a (the) depth buffer.

In this case, the depth buffer will be populated during the pre-pass operation and store, for example, and in an embodiment, a respective depth value for each sampling position of the render output (and this information will be made available to, and used as the visibility information in, the second, main pass). The depth buffer could simply store respective depth values for each sampling position of the render output, or additionally or alternatively (and in an embodiment additionally), a "hierarchical" depth buffer could be generated, e.g., in which appropriate minimum and/or maximum depth values (or depth value ranges), are stored for respective larger patches of the render output.

In this embodiment (and otherwise), the depth buffer is generated, e.g. during the first, pre-pass operation based on the fragment depth values, in particular by depth testing the fragments against a corresponding depth buffer for the sequence of primitives, and updating the depth buffer accordingly (as needed) depending on the result of the depth testing. The actual depth testing can be performed in any suitable and desired manner, e.g. in the manner in which it is normally performed. Typically this involves testing a depth value for the (current) fragment against a corresponding depth value stored for the corresponding sampling position in a depth buffer, and when a fragment passes (survives) the depth testing, updating the depth buffer accordingly.

In another main embodiment, rather than simply using the depth buffer itself as the visibility information, a set of "visible" primitive identifying information (an "HSR ID buffer") that stores, in an embodiment for each sampling position in the render output, a respective primitive identifier indicating by reference to the associated primitive which fragment should be rendered for that sampling position, is used as the visibility information (and in an embodiment generated during the pre-pass operation).

Thus, in an embodiment, the visibility information comprises a set of primitive identifying information storing for respective sampling positions within the render output respective primitive identifiers, where the primitive identifier stored for a respective sampling position indicates the primitive in the sequence of primitives that should subsequently be processed further for the sampling position (and the pre-pass processing in an embodiment comprises populating such a set of primitive identifying information accordingly). The set of primitive identifying information thus in an embodiment contains a plurality of entries corresponding to the sampling positions within the render output and which entries are able to store for the respective sampling positions within the render output a respective primitive identifier indicating which primitive (and hence fragment) (if any) should be further processed for the corresponding sampling position(s).

Subject to the particular requirements of the technology described herein there may in general be any suitable and desired correspondence between the entries in the set of primitive identifying information and the sampling positions within the render output. For example, the set of primitive identifying information should be (and in an embodiment is) able to store a primitive identifier in respect of each sampling position within the render output. That is, the set of primitive identifying information in an embodiment stores for each sampling position within the render output a respective primitive identifier indicating the primitive (if any) (and hence fragment) that should be processed for that sampling position.

Thus, in some embodiments, there may be a direct one-to-one correspondence between the number of entries in the set of primitive identifying information and the number of sampling positions within the render output, such that each sampling position has a corresponding unique entry in the set of primitive identifying information for storing a respective primitive identifier for that sampling position. However, it would also be possible to arrange the set of primitive identifying information in a hierarchical manner, for example, such that the set of primitive identifying information (also) comprises entries corresponding to groups of plural sampling positions within the render output, and in some embodiments this is done. In that case, the set of primitive identifying information may typically contain a greater number of entries than there are sampling positions, e.g., and in an embodiment, such that the set of primitive identifying information contains respective entries for each individual sampling position, but also contains one or more entries that apply to groups of sampling positions, e.g., and in an embodiment, based on a hierarchical division of the render output. In that case, in addition to the entries corresponding to individual sampling positions, there may also be entries corresponding to groups (or "patches") of, e.g., 4, 16, 32, 64, etc., sampling positions. Further, an entry may be provided corresponding to the entire render output. Various arrangements would however be possible in this regard.

The primitive identifiers stored in the set of primitive identifying information in an embodiment uniquely identify primitives within the sequence of primitives. It will be appreciated that an application requiring graphics processing will typically also specify global primitive identifiers and these application-specified primitive identifiers could be used for the purposes of the technology described herein. However, the primitive identifiers specified by an application are typically in the form of relatively larger 32-bit values and storing these may therefore require a larger set of primitive identifying information than is necessary for processing the sequence of primitives. Thus, in embodiments the primitives are re-indexed within the sequence of primitives for the purposes of the technology described herein, and the primitive identifiers that are stored/used for the set of primitive identifying information thus uniquely identify primitives within the sequence of primitives that is being processed (but do not necessarily uniquely identify the primitives globally).

The method may thus in an embodiment comprise a step of re-indexing the primitives within the sequence of primitives. The re-indexing of the primitives is in an embodiment performed as the primitives are obtained for processing (e.g. from a primitive list reader in a tile-based rendering system). This helps reduce the size of the primitive identifiers and hence advantageously reduces the size of the set of primitive identifying information (e.g., and in an embodiment, such that the set of primitive identifying information for a sequence of primitives can be stored locally, e.g. on-chip, and discarded once the processing of the sequence of primitives is complete, without having to write to external memory).

If a sampling position is not covered by any primitives, a default or null value is in an embodiment recorded in the set of primitive identifying information to indicate this. The default or null value can be any suitable value as desired. For example, in an embodiment, the value 'zero' may be used to indicate that there is no primitive coverage at a given sampling position. In that case, the primitives are in an embodiment indexed within the sequence of primitives starting from 'one' (such that the first primitive in the sequence may be identified as primitive 'one', the second primitive identified as primitive 'two', and so on). Various other arrangements would however be possible.

Thus, in embodiments, the set of primitive identifying information stores either a respective primitive identifier or null value for each sampling position within the render output.

In an embodiment the primitive identifiers monotonically change in sequence from a start identifier value, e.g., and in an embodiment, monotonically increase within the sequence of primitives. This has the benefit that it can be ensured that the primitive identifier stored in the set of primitive identifying information represents the first (i.e. 'oldest') primitive in the sequence of primitives that is guaranteed to be visible at that sampling position based on the visibility information generated so far. This may in turn help manage processing of, e.g., fragment processing dependencies, in particular, for fragments that do not update the depth buffer and that cannot be culled against the set of primitive identifying information (such as fragments for (e.g.) transparent primitives that are not processed during the first, pre-pass operation).

Which fragment (and hence primitive) should be processed for a respective sampling position can generally be determined based on depth testing (and, optionally, also on stencil testing), in a similar manner to the first main embodiment. Thus, in the second main embodiment, the depth buffer is in an embodiment updated during the first, pre-pass operation, e.g. as normal. However, rather than using the depth buffer itself as the visibility information for the second, main pass, according to the second main embodiment, the set of primitive identifying information is generated during the first, pre-pass and it is the set of primitive identifying information that is then used as the visibility information for controlling fragment processing for the second, main pass. For example, for any fragments for which it is determined based on the depth testing (and, optionally, stencil testing (if performed)) that the fragment is visible (at least based on the current state of the depth buffer), at the same time as updating the depth buffer, an associated primitive identifier is written to an entry in the set of primitive identifying information corresponding to the sampling position(s) associated with the fragment in question. Thus, when a fragment causes the depth buffer to be updated (such that the fragment will be visible, at least based on the current state of the depth buffer), a corresponding update is made to the set of primitive identifying information.

The set of primitive identifying information as a minimum stores primitive identifiers, but may in general store any other suitable information that may desirably be stored.

In embodiments of the second main embodiment, the depth buffer is also updated during the first, pre-pass and remains available for subsequent use. The depth buffer may be used in various ways. For example, in some embodiments, the second, main pass in an embodiment does not update or test against the depth buffer. However, in the event that the processing needs to "fallback" (as described below), the third, fallback operation will perform depth testing as normal, with the depth buffer being updated and tested against during the third, fallback operation. It is also contemplated however that the depth buffer may also be used during the second, main pass, at least for some primitives. For example, certain primitives may be able to skip the pre-pass processing (since they do not generate any visibility information, e.g., they cannot update the depth buffer, e.g., certain transparent primitives). In that case, it may be possible to process such primitives in the second, main pass however such primitives could not be culled using the set of primitive identifying information. Thus, in that case, it may be desirable to also allow depth testing during the second, main pass to allow fragments for transparent primitives to be culled where possible. Various arrangements would be possible in this regard.

As will be appreciated from the above, in embodiments, the first, pre-pass operation comprises a sequence of operations including, in an embodiment in this order, rasterising primitives into respective sets of fragments for processing, depth testing the fragments using a depth buffer for the sequence of primitives, and updating the depth buffer, if necessary. The first, pre-pass operation in an embodiment further comprises updating the set of primitive identifying information for the sequence of primitives. The set of primitive identifying information is in an embodiment updated (and hence generated) 'on the fly' during the first, pre-pass operation. For example, and in an embodiment, whenever a fragment causes an update to the depth buffer, the primitive identifier associated with fragment is in an embodiment written to the corresponding entry or entries in the set of primitive identifying information.

Thus, at the end of the first, pre-pass, there is in an embodiment generated a depth buffer storing respective depth values for the sampling positions within the render output, and/or a set of primitive identifying information storing respective primitive identifiers identifying the primitives (and hence fragments) that are to be further processed for the sampling positions within the render output.

In an embodiment the visibility information, e.g. set of primitive identifying information, is stored locally to the graphics processor, and in an embodiment the visibility information is not written to external memory. Thus, the visibility information, e.g., is in an embodiment consumed during the second, main pass operation (during a visibility testing step) and then discarded once the processing of the sequence of primitives to which the visibility information relates is complete, e.g., and in an embodiment, without writing the visibility information out to external memory. There may however be some cases where it is desired to write out the visibility information, in which case this may be done.

In some embodiments the processing for a fragment during the first, main pass stops after the depth buffer and/or set of primitive identifying information are updated (if necessary). That is, in some embodiments, the first, pre-pass operation in an embodiment comprises (early) depth testing the fragments, but does not, e.g., execute a fragment shader (or therefore perform late depth testing). In that case, if a primitive requires fragment shading to determine its coverage, the primitive may be treated as being incompatible with the pre-pass (and instead subsequently processed by a third, "fallback" mode of operation, as will be discussed further below). In other embodiments however the fragment processing may continue beyond the depth testing and resulting updating of the depth buffer and set of primitive identifying information (if any). For example, in some embodiments, a (partial) fragment shader could be executed, and the depth buffer and set of primitive identifying information (if any) updated accordingly after the fragment shading, as will be explained further below.

In embodiments the first, pre-pass operation further comprises a step of primitive classification, or checking primitive classification, the purpose of which will be explained in more detail below. This is in an embodiment performed prior to rasterisation but in general may take place at any suitable and desired point during the pre-pass operation.

Subject to the requirements of the technology described herein, the pre-pass operation may otherwise comprise any suitable and desired processing operations.

The first, pre-pass operation thus serves to generate the visibility information. The primitives are however in an embodiment not rendered in full during the first, pre-pass operation and at least some of the actual final rendering operations to determine the final rendered output values (e.g. to determine the appearance (e.g. colour) that the sampling positions associated with the primitives should have in the final render output), as well as the corresponding writing out of the rendered output (e.g. colour) values, are instead in an embodiment deferred to a second, "main" pass operation, in which primitives that were processed during the first, pre-pass are processed again by rasterising the primitives again into their respective sets of fragments and then further processing the fragments as necessary. The further processing of fragments during the second, main pass operation, e.g., and in an embodiment, comprises rendering the fragments, e.g., and in an embodiment, by executing a fragment shader, in order to determine rendered output (e.g. colour) values for the sampling positions. The second, main pass operation thus in an embodiment produces the final output for the rendered tile, e.g. a set of rendered output (e.g. colour) values, and writes this out accordingly, e.g. to a respective output buffer (e.g. a tile buffer), e.g. for providing to a frame buffer for display.

The second, main pass operation may include other rendering stages, such as blending, etc., that may desirably be performed. The second, main pass in an embodiment also comprises a step of primitive classification (checking) to determine whether or not a primitive is compatible with the pre-pass operation, and in an embodiment to trigger switching to a third, fallback operation as necessary, e.g. as explained below.

Subject to the requirements of the technology described herein, the second, main pass operations may otherwise comprise any suitable and desired processing operations.

The second, main pass includes a visibility test that uses the visibility information generated during the first, pre-pass to control processing of primitives (and thus fragments) for the second, main pass. Thus, if a fragment for a primitive fails the visibility test in the second, main pass, the second, main pass may be terminated in respect of that fragment. The nature of the visibility test in general depends on the format of the visibility information. However, in an embodiment the visibility test is performed on a per-fragment basis. Thus, in an embodiment the visibility test is performed after rasterisation. In an embodiment the visibility test is performed prior to the rendering operations that determine the rendered output values for the sampling positions (e.g., and in an embodiment, prior to fragment shading).

Thus, during the second, main pass, primitives that were processed during the first, pre-pass operation are processed again, and rasterised into their respective sets of fragments for further processing. The fragment processing during the second, main pass is then controlled based on the visibility information that was generated during the first, pre-pass operation. Thus, in an embodiment, during the second, main pass, after a primitive has been rasterised into its respective fragments, the fragments are tested against the visibility information to determine whether or not the fragment should be processed further. When such testing determines that the fragment does not need to be (and should not be) processed further, the fragment can then be (and in an embodiment is) 'culled', e.g., and in an embodiment, without processing the fragment further.

The second, main pass operation thus comprises a step of visibility testing that uses the visibility information that was generated during the first, pre-pass operation to determine, in an embodiment on a per-fragment basis, whether or not the fragment should be processed further (i.e. based on whether or not the fragments have visible effects for the final output, as identified from the visibility information). The visibility information generated during the first, pre-pass operation is thus consumed during the second, main pass operation as part of such visibility testing. Accordingly, once the rendering of the sequence of primitives is complete, the visibility information can in an embodiment be discarded (and new visibility information generated for a new sequence of primitives to be processed, as appropriate).

The visibility testing that is performed during the second, main pass using the visibility information derived during the first, pre-pass operation, can in general comprise any suitable and desired test using the visibility information that can be used to determine whether a fragment should be processed further in the second, main pass operation or not.

In general, and in an embodiment, the visibility testing that is performed in the second, main pass comprises comparing a particular, in an embodiment selected, in an embodiment predetermined, property (the value for a particular, in an embodiment selected, in an embodiment predetermined, parameter) associated with/for the fragment (or the primitive that the fragment belongs to), with the visibility information, to determine whether the fragment (primitive) should be processed further in the second, main pass. The property/parameter information (value) for the fragment/primitive that is compared to the visibility information should correspond to, and be appropriate for, the visibility information that is being used, and thus may, for example, and in an embodiment, comprise either a depth value (where the visibility information is a depth buffer), or a primitive identifier (where the visibility information comprises a set of primitive identifiers (as discussed above)).

Thus, in an embodiment, the method of the technology described herein comprises (and the visibility testing circuit is correspondingly configured to), comparing a (parameter) value for a fragment or primitive being tested, to the value (for that parameter) in the visibility information for the sampling position or positions to which the fragment relates.

Thus in the case where the visibility information comprises a depth buffer storing respective depth values for sampling positions in the render output, the visibility testing in an embodiment comprises comparing a depth value associated with the fragment being tested against a depth value stored in a corresponding entry in the depth buffer for the sampling position (or positions) associated with the fragment (that the fragment is being used to render).

Correspondingly, in the case where the visibility information comprises a set of primitive identifying information storing respective primitive identifiers for sampling positions in the render output, the visibility testing in an embodiment comprises comparing a primitive identifier associated with the fragment being tested (i.e. an identifier for the primitive to which the fragment relates) against a primitive identifier stored in a corresponding entry in the set of primitive identifying information for the sampling position (or positions) associated with the fragment (that the fragment is being used to render).

In one embodiment, there is only one form of visibility test that is used in the second, main pass operation, such that all primitives and fragments that fall to undergo a visibility test in the second, main pass operation undergo that same, particular form of visibility test. In this case therefore, there will be only one form of visibility test that can be and is performed in the second, main pass operation.

In this case therefore, in an embodiment only primitives that are suitable for undergoing that particular visibility test to determine whether they should be processed further in the second, main pass operation are subject to the second, main pass operation, with, as will be discussed in more detail below, primitives that are incompatible with undergoing that visibility test in the second, main pass operation (with the particular form of visibility test to be used in the second, main pass operation), not being subjected to the second, main pass operation, but instead being processed in a third, "fall-back" mode of operation.

In this case therefore, any and each primitive that is subjected to a visibility test in the second, main pass operation will undergo the same, particular form of visibility test in the second, main pass operation (such that, in the case where the particular, only form of visibility test that is performed in the second, main pass operation is a form of visibility test that allows fragment processing order dependencies to not be enforced in the second, main pass, (the appropriate) fragment processing order dependencies will not be enforced in the second, main pass for any and all fragments that pass the visibility test in the second, main pass).

As will be discussed further below, in this case, whether a primitive is compatible with the second, main pass operation (and to undergo the single form of visibility test that is performed in the second, main pass) may be determined in any suitable and desired manner. This is in an embodiment determined based on one or more properties or characteristics of the primitives, such as, and in an embodiment, one or more of the primitive type, whether the primitive is transparent or opaque, whether the primitive has (particular) "side effects", etc.

In one such embodiment the determination of whether a primitive should be processed in the second, main pass operation and undergo the single form of visibility test, is based on whether the primitive will be processed during the first, pre-pass operation such that the primitive can in principle update the visibility information (with those primitives that will be (are) processed during the first, pre-pass such that the primitive could in principle have updated the visibility information then being identified and selected as being suitable for undergoing the second, main pass, but primitives that will not be (that are not) processed during the first, pre-pass such that the primitive could in principle have updated the visibility information in an embodiment being identified as being incompatible with the second, main pass operation (and the visibility test), and (in an embodiment) therefore instead being, as will be discussed further below, processed according to a third, fall-back mode of operation instead).

In another embodiment, there are a plurality of available (supported) visibility tests that can be performed in the second, main pass, with the particular form of visibility test that is performed for a given primitive (and fragments for that primitive) in an embodiment then being selected from that set of plural available (supported) visibility tests accordingly, e.g., and in an embodiment, based on a respective property or properties (characteristic or characteristics) of the primitive in question. Thus, in this case, a fragment for a primitive that was processed during the first, pre-pass operation will be subjected, as part of the second, main pass operation, to one of a set of plural available visibility tests (that use the visibility information determined during the first, pre-pass operation), to determine whether the fragment for the primitive should be processed further in the second, main pass operation.

In this case, the particular visibility test that a primitive is to undergo may be determined and selected in any suitable and desired manner. It is in an embodiment determined based on one or more properties or characteristics of the primitives, such as, and in an embodiment, one or more of the primitive type, whether the primitive is transparent or opaque, whether the primitive has (particular) "side effects", etc. The particular visibility test set for a given primitive may also, for example, and in an embodiment, depend upon the nature of the visibility information that the visibility test uses.

In an embodiment the determination of which visibility test a primitive (and the fragments for that primitive) should undergo in the second, main pass operation is based on whether the primitive will be (was) processed during the first, pre-pass operation such that the primitive could in principle have updated the visibility information (with those primitives that will be (were) processed during the first, pre-pass such that the primitive could in principle have updated the visibility information then being identified and selected as being suitable for undergoing one particular, in an embodiment selected, in an embodiment predetermined, visibility test in the second, main pass, but primitives that will not be (that were not) processed during the first, pre-pass such that the primitive could in principle have updated the visibility information in an embodiment being identified as being incompatible with that particular visibility test, and therefore instead being selected as to undergo a different visibility test that is not (that is other than) the particular visibility test (or to be processed according to a third, fall-back mode of operation instead)).

In this case, the, e.g. two, different visibility tests that are used could differ from each other in any suitable and desired manner. In an embodiment, the visibility test that is used for primitives that will be (were) processed during the first, pre-pass such that the primitive could in principle have updated the visibility information comprises an EQUALS test (this will be discussed further below), with the visibility test used for primitives that will not be (that were not) processed during the first, pre-pass such that the primitive could in principle have updated the visibility information being something other than an EQUALS test (not being an EQUALS test), such as being a GREATER THAN test. Other arrangements would, of course, be possible.

Thus in this embodiment, there will be at least two different visibility tests that a fragment/primitive could be subjected to in the second, main pass and the visibility test that is performed in the second, main pass, for a given fragment will be one of the set of plural available (supported) visibility tests.

In an embodiment the arrangement is such that any given primitive (and fragments for that primitive) will be subjected to a particular one of the available visibility tests (i.e. such that all fragments for a particular primitive will be subject to the same type (form) of visibility test), but different primitives (and thus fragments from different primitives) may be subject to different types (forms) of visibility test.

Thus there may be some primitives and fragments that are subjected to a first form of visibility test, with other primitives (and fragments) being subjected to a different (form of) visibility test (and so on, where there are, for example, more than two available visibility tests that can be performed).

Thus, when performing the fragment visibility test for a fragment during the second, main pass using the generated visibility information, a fragment will be subjected for that purpose to a particular, in an embodiment selected, in an embodiment predetermined, one of the possible fragment visibility tests that can be performed.

As discussed above, in an embodiment, the visibility test or tests that may be performed involve appropriately comparing a value of a property/parameter for the fragment/primitive being considered to the determined visibility information.

In an embodiment, the different visibility tests (where present) correspond to, and are defined by, the particular comparison test (test function) that is used (by the condition that must be met for a fragment (and primitive) to pass the comparison test (such that the fragment should be processed further)).

Thus, in an embodiment, there are a plurality of different comparison conditions (test functions) that can be used to determine whether a fragment (and primitive) passes the (comparison) visibility test, with the comparison condition (test function) then being different for each different visibility test that can be performed. For example, and in an embodiment, and in an embodiment, when a comparison test is performed, the different conditions that can be set for passing the test are in an embodiment at least two of: equal to; greater than or equal to; greater than; less than or equal to; or less than.

Thus, for example, and in an embodiment, a given primitive (and correspondingly fragments from that primitive) may be denoted as undergoing, for example, an EQUALS test or a GREATER THAN test, thereby denoting which of the available visibility tests the particular primitive (and fragments from that primitive) should undergo.

For example, in the case of a depth buffer, the depth value for a fragment will be compared to the depth value in the depth buffer to determine whether the fragment should be processed further, and the depth test function may be set for example, to an EQUALS, or to a GREATER THAN, etc., depth test function as required, e.g., and in an embodiment, in dependence upon a property or properties (e.g. the type) of primitive in question.

Thus, in the case where the visibility information that is used for the visibility testing in the main pass operation comprises a depth buffer (such that the main pass operation then performs a visibility test against the depth buffer), in an embodiment one of the visibility tests that can be performed (and in an embodiment the only visibility test that is performed in the case where there is only a single visibility test that can be performed in the main pass) comprises a (modified) depth test with the depth test function comprising an "EQUALS TO" function, and with writes to the depth buffer being disabled. Thus in an embodiment, where using a depth buffer as the visibility information, the only or at least one of the visibility tests that is used comprises an EQUALS depth test.

It should be noted here that in this case, the depth test that is used in the second, main pass, will be set to this "EQUALS" depth test, irrespective of the depth test originally or initially specified for the primitive in question (which originally specified depth test may, for example, e.g., and in an embodiment, still be used during the pre-pass operation when performing depth testing for the primitive during the pre-pass operation).

Most in an embodiment in this case, a (and any) primitive that is processed during the first, pre-pass operation such that the primitive could in principle have updated the visibility information (the depth buffer) is selected and set to undergo such an EQUALS depth test in the main pass operation as its visibility test.

Thus, in this case during the second, main pass, the depth buffer will be used to determine whether the current fragment has an appropriate (e.g. the correct) depth value, and if so, that fragment is processed further (e.g. shaded) accordingly. On the other hand, if the current fragment's depth value does not match (equal) the current depth value in the depth buffer, the fragment can be (and is) discarded.

This fragment visibility test using the depth buffer is in an embodiment therefore performed for the main pass operation after the step of rasterising the primitives into sets of fragments but before the fragments are rendered to determine the appearance that associated sampling positions should have (e.g., and in an embodiment, before the fragment shader).

The depth buffer is however in an embodiment not updated during the second, main pass but is instead populated entirely during the first, pre-pass.

The Applicants have further appreciated however that two or more fragments at the same sampling position may have identical depth values and a further mechanism may therefore be required to disambiguate such primitives during the second, main pass. In such cases it is generally known in advance which of the two or more fragments having identical depth values should be rendered (for example and in an embodiment based on whether the depth compare function is strictly monotonic (less than or greater than), or monotonic (less than or equal to or greater than or equal to)) and so this is in an embodiment tracked, e.g. in suitable "disambiguation" state information for the primitives, e.g., by suitably annotating the primitives, or setting a suitable flag, during the pre-pass operation, to control which fragment is processed further for the respective sampling position, with the depth test used for the visibility test in the main pass operation then also being dependent on the "disambiguation" information. Additionally or alternatively, a different form of depth test could be set to be used for the visibility test in the main pass operation for such primitives, and/or the primitives could simply be indicated and treated as being incompatible with the second, main pass operation.

In the case where the visibility information comprises a set of primitive identifying information that indicates for respective sampling positions the primitive in the sequence of primitives that should subsequently be processed further for the sampling position using an appropriate primitive identifier, then in an embodiment for primitives that were processed during the first, pre-pass operation, and which could in principle have updated the set of primitive identifying information (e.g. primitives that are capable of generating visibility information during the first, pre-pass operation), the visibility testing in the second, main pass comprises an EQUALS test, such that when the current fragment's primitive identifier matches the corresponding primitive identifier within the set of primitive identifying information, it is determined on this basis that the fragment should be further processed for the sampling position in question. On the other hand, if the fragment could have updated the set of primitive identifying information, but its primitive identifier does not match the corresponding primitive identifier within the set of primitive identifying information (i.e. the fragment fails the EQUALS test), this means the fragment can be culled accordingly. Thus, at least for primitives that are processed during the first, pre-pass and that could potentially update the set of primitive identifying information (even if they do not), the step of visibility testing in an embodiment comprises testing whether the current fragment's primitive identifier matches the corresponding primitive identifier within the set of primitive identifying information, and when the current fragment's primitive identifier does not match the corresponding primitive identifier within the set of primitive identifying information, the fragment is culled on that basis.

This may be particularly appropriate for, e.g., opaque primitives. For example, as will be explained further below, the set of primitive identifying information is in an embodiment updated based on depth testing the primitives. An opaque primitive will therefore update the set of primitive identifying information during the first, pre-pass operation if it survives the depth testing. For such primitives, the testing against the set of primitive identifying information during the second, main pass should therefore, and in an embodiment does, check whether primitive identifiers match (i.e. EQUALS testing) to determine whether or not the associated fragments can be culled.

In an embodiment, the set of primitive identifying information is only populated based on depth testing of opaque primitives (as opaque primitives that are not occluded will always need to be rendered). For example, there may be transparent primitives that also write to the depth buffer. In that case, however, any opaque primitives underlying the transparent primitive will still need to be rendered. Thus, in one embodiment transparent primitives that can also write to the depth buffer are treated as 'incompatible' primitives, and trigger a third, fallback operation described below.

On the other hand there may be other types of primitives that may be encountered for which different visibility testing may be appropriate. Thus, depending on the type of primitive, a different visibility test (test function) may be selected. An example of where this might be the case would be for primitives that could not have updated the set of primitive identifying information during the first, pre-pass (e.g. which may be the case for certain transparent primitives that do not update the depth buffer, and so also cannot update the set of primitive identifying information, or other primitives that do not generate any visibility information, and which primitives may in embodiments skip the first, pre-pass operation and instead be processed only in the second, main pass operation). In that case, since the primitives can never update the set of primitive identifying information, the EQUALS test would always fail. This could therefore lead to the primitives being incorrectly culled if the EQUALS test were used for such primitives. These primitives could therefore be, and in some embodiments are, treated as being incompatible with the pre-pass operation and are instead subsequently processed in a third, "fallback" mode of operation, as will be described further below. However, in some cases it may be beneficial to be able to continue to process such primitives using the two stage pre-pass and main pass operation according to the technology described herein, and in embodiments this is done by using a different visibility test (function) for such primitives during the second, main pass. In particular, as will be explained further below, the fragment visibility testing may in such cases use a GREATER THAN test, which then allows at least some such primitives to be processed during the second, main pass (at least when the primitive identifiers monotonically increase within the sequence of primitives), without necessarily requiring the graphics processor to switch to a third, fallback mode of operation to handle such primitives.

Thus, if a primitive is potentially able to update the set of primitive identifying information during the first, pre-pass, the primitive is in an embodiment set to use an EQUALS test during the second, main pass in order to cull fragments whose primitive identifier does not match the corresponding entry in the set of primitive identifying information. On the other hand, if a primitive is not potentially able to update the set of primitive identifying information during the first pre-pass (e.g. either because the primitive is not able to update the set of primitive identifying information during the first, pre-pass and/or the primitive is only to be processed during the second, main pass), the primitive is in an embodiment set accordingly to use a different visibility test function (e.g., and in an embodiment, a GREATER THAN test) for fragments for such a primitive during the second, main pass operation.

Various other arrangements would be possible in this regard.

Corresponding considerations, and different visibility tests (test functions) can be used, as appropriate, where other forms of visibility information are used.

The outcome of the visibility testing for a fragment, however it is performed, determines whether or not the fragment needs to be processed further in the second, main pass for the sampling position in question.

Thus, when a fragment passes the visibility testing that is performed using the visibility information (such that the visibility testing indicates that the fragment should be further processed), the fragment is accordingly further processed to determine the corresponding rendered output value (s) for the sampling position(s) associated with the fragment (e.g. to determine the appearance the sampling position(s) should have in the render output). In that case, the fragment is in an embodiment rendered, e.g., and in an embodiment, by executing a fragment shader, to determine a corresponding rendered output (e.g. colour) value for the sampling position(s) associated with the fragment.

On the other hand, when a fragment fails the visibility testing that is performed using the visibility information (such that the visibility testing indicates that the fragment should not be further processed) the fragment can then be (and in an embodiment is) culled on this basis, i.e. such that some or all further processing of the fragment is avoided. For example, the fragment is in an embodiment culled at this point, in an embodiment without performing any further processing for the fragment. For this reason the visibility testing is in an embodiment performed at the start of the second, main pass, e.g., and in an embodiment, immediately after rasterisation, to minimise unnecessary processing for fragments that (will) fail the visibility test. In general however the visibility testing can be performed at any suitable point during the second, main pass, as desired and various arrangements would be possible in this regard.

(The benefit of this approach therefore is that because the whole sequence of primitives (e.g. for a tile) is processed up-front by the first, pre-pass to determine the visibility information, the visibility information reflects the full "visibility" for primitives (and fragments) in the sequence of primitives being processed. In other words, the pre-pass operation of the technology described herein can allow the graphics processor to determine complete visibility information for a sequence of primitives (e.g. tile) as a whole during the initial pre-pass. This is turn facilitates more optimised hidden surface removal, e.g., and in an embodiment, such that any and all occluded fragments for primitives in the sequence of primitives can be culled during the second, main pass. The technology described herein can therefore allow improved, e.g., and in an embodiment, sample-perfect, hidden surface removal.)

In some embodiments, the second, main pass operation does not need to (and does not) perform any further depth testing as this information is all provided in the visibility information.

It is however also contemplated that depth testing may in some embodiments still be performed for the second, main pass operation, and at least in some cases this may be beneficial. For example, this may be beneficial for handling certain types of (e.g. transparent) primitives that may be processed only during the second, main pass operation. In that case, it may be desired to still be able to depth test such fragments during the second, main pass operation, although in an embodiment the second, main pass operation does not update the depth buffer.

For instance, if a primitive cannot write to the depth buffer (e.g. writes to the depth buffer are disabled), which may be the case for certain types of transparent primitive, for example, the primitive could in that case (and in some embodiments is) treated as being incompatible with the two stage pre-pass and main pass operations according to the technology described herein, and is instead in an embodiment subsequently processed by a third, "fallback" mode of operation, as will be described further below. However, it may still be possible to process such primitives in the manner described above, and in some embodiments this is therefore done. Because such primitives do not (and cannot) generate visibility information, there is no need to process the primitive in the first, pre-pass, and so in an embodiment such primitives that cannot generate visibility information skip the first, pre-pass operation and are instead processed only during the second, main pass operation.

In such case, as alluded above, it may be appropriate to use a different fragment visibility test function when processing such primitives in the second, main pass (since they would necessarily fail the EQUALS test and may therefore be incorrectly culled on that basis). Thus, in embodiments, for any primitives that cannot generate visibility information during the first, pre-pass, but are still to be processed in the second, main pass (and in an embodiment that are therefore only processed in the second, main pass), the fragment visibility testing comprises determining whether the primitive identifier associated with the fragment is greater than the primitive identifier stored in the corresponding entry in the set of primitive identifying information (at least in the case where the primitive identifiers monotonically increase within the sequence of primitives). For example, in that case, if a fragment is associated with a primitive having a larger primitive identifier than the corresponding identifier stored in the set of primitive identifying information for the corresponding sampling position, the graphics processor can safely render the transparent fragment as the fragment identified in the set of primitive identifying information will already have been processed.

In that case, however, it is not known during the second, main pass whether a fragment for the primitive lies in front or behind the fragment for the primitive that is identified in the set of primitive identifying information. Thus, for fragments for which the fragment visibility test function is set to be a GREATER THAN test function, a fragment passing the GREATER THAN visibility test could either be in front or behind the fragment that is identified in the set of primitive identifying information for the sampling position(s) in question. Thus, for primitives (fragments) for which the fragment visibility test function is set to GREATER THAN, it may be desired to also perform depth testing during the main pass (but in an embodiment without updating the depth buffer), to allow such fragments to be culled based on their depth values. Thus, in embodiments, for fragments for which the fragment visibility test function is set to be a GREATER THAN test function, depth testing is also performed during the second, main pass. This depth testing is in an embodiment performed subsequent to the fragment visibility testing.

On the other hand, if such fragments fail the GREATER THAN visibility test, this means the (primitive sequence) position of the associated primitive in the sequence of primitives is before the position of the primitive that is identified to be rendered in the set of primitive identifying information (and so the primitive can, e.g., be culled on that basis). (This may be used, e.g., where a transparent primitive does not update the depth buffer. (In the case of a transparent primitive that does update the depth buffer, a fallback operation (as discussed below) may be used.))

Various other arrangements would be possible in this regard.

As discussed above, the Applicants have recognised that it may not be appropriate, or possible, to process each and every primitive in a sequence of primitives in the manner described above by rendering the primitives in two separate passes, e.g. as there may be some primitives that cannot safely be processed in two separate steps (such that they are incompatible with the pre-pass operation of the technology described herein).

There are various examples of why this might be the case but in general this may be because the properties of the primitive (as specified by the application) mean that the processing that is performed during the first, pre-pass operation might potentially introduce some side effect which means that if the primitive were then processed again during the second, main pass, this could introduce artefacts into the final render output. Examples might be where the primitives are transparent, wherein certain types of stencilling are required, or generally where a primitive needs to read from a buffer to determine its final render output coverage. A further example might be where a fragment shader needs to be run in order to determine the coverage associated with the primitive. In that case, if fragment shading is not enabled during the first, pre-pass operation, the pre-pass could erroneously decide that the primitive could be culled. Various other examples would be possible in this respect, e.g. depending on the specific processing that is performed during the respective processing passes.

Thus, there may be various different types of primitives that may be encountered when processing a sequence of primitives (e.g. for a tile) and in order to meet the various API requirements the graphics processor should be, and in an embodiment is, able to handle all different types of primitive accordingly, without introducing artefacts.

To address this, and allow the technology described herein to be effectively used for all different types of primitives that may be defined for a render output, a "fallback" operation is in an embodiment provided such that, when the graphics processor is performing the pre-pass operation on a sequence of primitives, if a primitive is encountered during the pre-pass operation that is determined to be incompatible with being processed in this way (e.g. since it cannot be ensured that the primitive can be processed in two separate passes without potentially introducing artefacts), the pre-pass operation is stopped at least in respect of that primitive, and the incompatible primitive is instead subsequently processed (i.e. rasterised and (if necessary) rendered) with the graphics processor operating in a third, "fallback" mode of operation. In this case the pre-pass operation may stopped only for the incompatible primitive, or the pre-pass operation may be stopped for all following primitives in the sequence (such that the pre-pass operation is effectively stopped at the primitive that was determined to be incompatible and then not performed for the following primitives in the sequence), as will be explained further below.

By providing this third, fallback operation, this then ensures that any primitives that cannot (safely) be rendered in two separate passes can still be efficiently and automatically handled by the graphics processor without risking introducing any errors or artefacts into the final render output. For instance, the third fallback operation is in an embodiment configured to be able to process (render) primitives in a 'fail-safe' manner, e.g. by rasterising and rendering (as necessary) the primitives to determine corresponding rendered output values in a single rendering operation, e.g. in the normal manner for a rasterisation-based rendering system.

Thus, in embodiments, the method further comprises determining that a primitive in the sequence of primitives being processed during the first, pre-pass operation is incompatible with being processed by the first, pre-pass operation; stopping (not performing) some or all of the first, pre-pass operation in respect of that primitive; and subsequently processing the primitive that was determined to be incompatible with the first, pre-pass operation in a third (different), fallback operation.

In an embodiment it is determined for each primitive that is to be processed during the first, pre-pass operation whether or not the primitive is compatible with being processed by the first, pre-pass operation. To facilitate this, a primitive classification step may be performed that determines based on one or more properties of a primitive whether or not the primitive is compatible with being processed by the first, pre-pass operation. Thus, in embodiments, the method further comprises (and the system is configured to perform) a step of classifying primitives in the sequence of primitives as being compatible or not with being processed by the first, pre-pass operation. As will be explained further below, there are various conditions that can mean that a primitive is incompatible with being processed in the manner of the technology described herein, and the step of classification generally involves checking whether one or more such conditions are met.

This primitive classification (the checking of such condition(s)) could be performed at run-time, e.g. as part of the rendering operation, e.g., and in an embodiment, as part of the first, pre-pass operation. However, in general, it will be known in advance (e.g. at compile time) whether or not any such condition(s) are met by a primitive that would mean that the primitive is incompatible with the pre-pass operations of the technology described herein. Thus, in some embodiments, the overall primitive classification of a primitive as being compatible or not with being processed in two stages according to the pre-pass and main pass operations of the technology described herein is performed in advance, e.g. by a driver for the graphics processor, with the result of such primitive classification then being compiled into a single indicator, e.g. a flag, that indicates whether or not the primitive is compatible with the pre-pass operation and which flag is provided to the graphics processor for the purposes of identifying whether or not the primitives are compatible with being processed in two stages according to the pre-pass and main pass operations of the technology described herein. In that case, a step of primitive classification checking may be performed during the first, pre-pass operation that comprises using the indicator to determine whether or not the primitive is compatible with the pre-pass operation. Various arrangements would be possible in this regard.

In general, and as will be discussed further below, a primitive may be determined to be incompatible with being processed by the first, pre-pass operation based on a suitable primitive classification (indicator) that can be set based on one or more properties of the primitive in question. For example, if a primitive requires a fragment shader to be executed in order to determine its fragment coverage, it may not be possible to process this primitive in the pre-pass if the pre-pass does not run a fragment shader. Another example would be when a transparent primitive is encountered as this may not update the visibility information and so could be incorrectly culled if processed in two stages according to the pre-pass operations of the technology described herein. Such primitives may therefore instead be processed in the third, fallback operation to ensure the rendering of the primitive can continue appropriately even when the pre-pass cannot be performed. Various other examples of incompatible primitives may exist depending on the configuration of the graphics processor (and the pre- and main passes) as will be explained further below.

In an embodiment, therefore, when processing a sequence of primitives, it is checked for each primitive to be processed whether or not the primitive is compatible with being processed by the first, pre-pass operation. If the primitive is not compatible with being processed in this way, some or all of the first, pre-pass operation is then omitted in respect of that primitive. The primitive classification check may generally be performed as part of the pre-pass operation such that when a primitive is determined to be incompatible, the pre-pass operation is in an embodiment immediately stopped in respect of that primitive. In an embodiment, the primitive classification check is performed at the start of the pre-pass operation (e.g., and in an embodiment, before the rasterisation stage) so that the substantial pre-pass fragment processing, e.g. the processing to generate the visibility information, is not started if the primitive is incompatible with being processed in this way. However, in general the primitive classification check could be performed at any suitable point during the first, pre-pass operation, as desired.

Thus, when performing the pre-pass operation, so long as the primitives in the sequence are compatible with the pre-pass operation, the primitives are processed by the pre-pass operation to determine the desired fragment visibility information. That is, so long as the current primitive is compatible with the pre-pass operation, it is processed by the pre-pass operation, and so on, until the processing reaches the end of the sequence of primitives. The primitives are in an embodiment then processed again by the second, main pass operation with the processing of the primitives being controlled accordingly based on the determined visibility information.

On the other hand, if a primitive in the sequence of primitives being processed is determined to be incompatible with the pre-pass operation, the pre-pass operation is then not performed for that primitive, and the primitive is instead subsequently processed by the fallback operation, as will be explained further below.

The stopping of the pre-pass operation for a primitive in response to determining that the primitive is incompatible with the pre-pass operation can be performed in any suitable and desired manner. In an embodiment the pre-pass operation is stopped for the entire sequence of primitives.

For example, when an incompatible primitive is encountered during the pre-pass, the pre-pass processing operation for the sequence of primitives may be terminated at that point, e.g., and in an embodiment, with any suitable and desired pre-pass state (e.g. including the depth buffer and optionally also the set of primitive identifying information generated so far) being written out accordingly. In some cases the identity and/or position of the incompatible primitive that triggered terminating the pre-pass may also be written out at this stage (but generally this may not be necessary as the primitives are in an embodiment classified (as compatible or not) and can be identified as such during the second, main pass by performing a corresponding step of primitive classification checking as was performed in the first, pre-pass).

Thus, stopping the pre-pass for a primitive may in some embodiments comprise terminating the pre-pass operation for the primitive, and in an embodiment for the sequence of primitives, immediately at that point. Other arrangements would however be possible. For example, in an alternative embodiment, when the pre-pass processing operation for a primitive within the sequence of primitives is stopped, the processing of the sequence of primitives could continue, but with all outputs disabled, such that the first, pre-pass operation continues to the end of the sequence of primitives but without generating any further (visibility) information. This approach may be relatively easier to manage since it avoids having to stop processing and store out intermediate pre-pass state midway through a sequence of primitives. Various other arrangements for stopping the pre-pass are contemplated.

After the pre-pass operation has been stopped, the processing may continue in any suitable manner. In embodiments, however, when the pre-pass operation is stopped in respect of a primitive (an incompatible primitive) mid-way through a sequence the primitives, the second, main pass operation is then performed for the sequence of primitives, e.g., and in an embodiment, from the start, such that primitives that have been successfully processed by the first, pre-pass operation are then processed again by the second, main pass operation.

Thus, in embodiments, when an incompatible primitive is encountered, such that the first, pre-pass operation is stopped in respect of that primitive, a second, main pass is then performed to process the primitives in the sequence of primitives up to the position of the incompatible primitive. That is, when an incompatible primitive is encountered, such that the first, pre-pass operation is stopped in respect of that primitive, the processing of the sequence of primitives is in an embodiment then re-started from the beginning of the sequence to perform the second, main pass operation in respect of the sub-sequence of primitives that have been processed so far by the first, pre-pass operation.

The (same) primitives that were processed up to the position in the sequence of the incompatible primitive are thus processed again by the second, main pass operation, with the rendering of the primitives being controlled accordingly based on the visibility information determined during the first, pre-pass operation. When the second, main pass operation reaches the position in the sequence of the incompatible primitive, the processing in an embodiment then switches into the third, "fallback" mode of operation to process the incompatible primitive. In the fallback mode of operation the primitive is in an embodiment processed, e.g. according to a normal rendering operation, without any attempt to generate or use the "visibility" information of the technology described herein. Thus, when operating in the fallback mode of operation, primitives are in an embodiment processed in a 'fail-safe' manner, e.g., and in an embodiment, in which primitives rasterised and rendered (as necessary) in a single rendering operation, e.g. in the normal manner for rasterisation-based rendering.

The switching from the main pass into the fallback mode can be controlled in various different ways but in embodiments this is controlled by having the second, main pass also check the primitive classification to determine whether the primitives are incompatible with the pre-pass operation. That is, in embodiments, the primitive classification is used both in the pre-pass to determine whether the pre-pass should be stopped (such that a main pass is initiated) and also in the main pass to determine when the processing in the main pass has reached the incompatible primitive, at which point the graphics processor switches to the fallback mode in order to render the primitive in a 'fail-safe' manner. The primitive classification check in the second, main pass is in an embodiment performed in the same manner as the primitive classification check in the first, pre-pass. For instance, in an embodiment, the primitives are pre-classified, and the primitive classification check in both passes involves checking a suitable indicator, e.g. flag. However, this need not be the case. For instance, it is also contemplated above that the primitive classification could be performed on-the-fly during the first, pre-pass operation, in which case a result of the primitive classification could be stored for use in the primitive classification check for the second, main pass. It would also be possible to repeat the primitive classification, e.g. on-the-fly, during the second, main pass operation, to thereby "classify" the primitives for the second, main pass operation. Various other arrangements would be possible in this regard.

Thus, in embodiments, when it is determined whilst performing the first, pre-pass operation that a primitive in the sequence of primitives is incompatible with being processed by the first, pre-pass operation such that (some or all of) the first, pre-pass operation is stopped in respect of that primitive, the method comprises: re-processing the primitives in the sequence of primitives up to the primitive in the sequence of primitives immediately before (preceding) the primitive that was determined to be incompatible with the first, pre-pass operation by the second, main pass operation in order to complete the processing of those primitives; and when the second, main pass operation reaches the primitive in the sequence of primitives that was determined to be incompatible with the first, pre-pass operation, switching the graphics processor into a third, fallback mode of operation and processing that primitive in the fallback mode of operation.

In embodiments, once the rendering circuit switches to the third, fallback mode of operation, the processing continues in this state until the end of the (current) sequence of primitives. That is, once a first incompatible primitive is encountered within a sequence of primitives, the pre-pass operation is terminated in respect of the sequence of primitives including the incompatible primitive, and any remaining (following) primitives in the sequence are all processed in the third, fallback mode of operation. Thus, in embodiments, after switching the graphics processing into the third, fallback mode of operation, the method comprises continuing to process the remaining primitives in the sequence of primitives in the fallback mode of operation, until all of the primitives in the current sequence of primitives have been processed.

Once the sequence of primitives has been processed in full, a new sequence of primitives (which may, e.g. be a sequence of primitives to be rendered for a new tile, but could also, e.g., be a new draw call for the current tile, or other suitable new sequence of primitives) may be issued for rendering, and the processing of the new sequence of primitives can start in the pre-pass operation. Thus, in embodiments, after a (the current) sequence of primitives has been processed, the method comprises performing a (new) pre-pass operation for a new (different) sequence of primitives. In an embodiment the performing of the pre-pass operation for the new sequence of primitives is initiated in response to a command to render the new sequence of primitives (e.g. in the same manner described above). For example, in embodiments, the graphics processor may subsequently receive a command to render another sequence of primitives (e.g. another tile), and in response to the command to render the another sequence of primitives (e.g. tile), the method may comprise obtaining the sequence of primitives to be processed and then initiating a pre-pass operation to process primitives for the another sequence of primitives (e.g. tile). Various other arrangements would however be contemplated in this regard and at least some of the processing for different sequences of primitives may be interleaved or performed in parallel.

It is also contemplated however that after an incompatible primitive has been processed in the third, fallback mode of operation, the graphics processor may attempt to revert to the pre-pass operation when another (e.g. the next) compatible primitive is encountered. To facilitate this, the graphics processor (e.g., and in an embodiment, including a primitive list reading circuit thereof, in the case where the primitives to be rendered are identified from respective primitive list(s)) may be operable to re-start the processing of a sequence of primitives from an arbitrary position in the sequence (such that the processing can effectively fast forward through the sequence of primitives). Various arrangements are contemplated in this regard.

By allowing the graphics processor to fallback to processing primitives in the third, fallback mode, e.g. in a single pass, e.g. in the normal manner for a rasterisation-based rendering system, when an incompatible primitive is encountered, the graphics processor is thus able to identify and handle exceptional cases where a primitive is incompatible with being processed using the pre-pass operation of the technology described herein whilst still continuing rendering the primitives appropriately. This may then lose some hidden surface removal efficiency, but is beneficial in ensuring a safer and fully complaint hardware implementation.

It will be appreciated in this regard that which primitives are incompatible with being processed using the pre-pass operation of the technology described herein may depend on the configuration of the graphics processor, and in particular the configuration of the pre-pass operation, as alluded to above. For example, where it is necessary to execute a fragment shader to determine the coverage associated with a primitive, in some cases it may be appropriate to simply flag the primitive as incompatible, e.g. if the pre-pass does not execute a fragment shader at all. However, it would also be possible to configure the pre-pass to run at least a partial fragment shader in order to expose the pre-pass to enough information to generate the desired set of primitive identifying information, whilst in an embodiment still avoiding shading the fragments in full and writing out the corresponding (colour) values. Thus, in general, the pre-pass may be more or less complex as desired and accordingly may or may not be able to handle various different types of primitives.

Thus, depending on the configuration of the pre-pass operations, it may be possible to handle some side effects in the pre-pass and whether or not a given primitive is incompatible with the pre-pass will accordingly depend on exactly how the pre-pass is configured. There are various options in this regard to determine whether or not a given primitive is incompatible with the pre-pass. In general however it will be known in advance (e.g. at compile time) whether the properties of a primitive mean that the primitive should not be processed for the pre-pass operation and the graphics processor can therefore determine primitives as being incompatible with the pre-pass based on one or more properties of the primitives as desired and flag these primitives accordingly, as described above.

In an embodiment, an indication of the visibility test that a primitive is to undergo is provided for a (and each) primitive, as appropriate. For example, and in an embodiment, a (and each) primitive may be, and is in an embodiment, associated with suitable state information (such as a primitive data word (PDW)) to indicate what type of visibility test (test function) should be performed against the visibility information for the primitive's associated fragments during the second, main pass operation.

This visibility test indication may, for example, and in an embodiment, at least in the case where there are plural different visibility tests that primitives can be set to undergo in the second, main pass, indicate which one of the available visibility tests a primitive is to undergo in the second, main pass. Most in an embodiment the visibility test indication can also indicate that a primitive is not to undergo any visibility test using the visibility information in the second, main pass. Thus, in the case where there is only a single visibility test that can be performed in the second, main pass, the visibility test indication may simply indicate whether a primitive is to undergo that test or not. Where there are plural possible visibility tests that a primitive could undergo in the second, main pass, the visibility test indication can in an embodiment indicate which one of the visibility tests a primitive is to undergo (or that a primitive is not to undergo any visibility test at all). For example it may be indicated whether a primitive is NO_TEST, EQUALS or GREATER THAN.

Thus, it is in an embodiment determined (selected) for each primitive that is to be processed during the first, pre-pass operation what visibility test (if any) the primitive should undergo. To facilitate this, a primitive visibility test classification (selection) may be performed that determines (selects) based on one or more properties of a primitive which visibility test (if any) the primitive should undergo. Thus, in embodiments, the method further comprises (and the system is configured to perform) a step of selecting and setting the visibility tests that primitives in the sequence of primitives should undergo. As explained above, there are various conditions that mean that a primitive should undergo a particular visibility test, and the step of classification (selection) generally involves checking whether one or more such conditions are met.

The visibility test classification (selection) and annotation for the primitives can be performed in any suitable and desired manner and at any suitable and desired stage of the graphics processing. Thus, for example, and in an embodiment, it may be determined during the first, pre-pass operation, and/or during the second, main pass operation (or at least duplicated between the first, pre-pass operation and the second, main pass operation). For example, the primitive visibility test classification (selection) (the checking of such condition(s)) could be performed at run-time, e.g. as part of the rendering operation, e.g., and in an embodiment, as part of the first, pre-pass operation, and/or as part of the second, main pass operation.

In an embodiment, the visibility test classification (selection) that sets the visibility test for a primitive is performed after the pre-pass and before the main pass. In the case where a primitive classification is also performed before the prepass, in an embodiment that classification does not determine the visibility test to be used in the main pass (but, e.g., and in an embodiment, simply sets all primitives to, e.g., no_test), with the visibility test then being set in a second classification that is performed after the pre pass and before the main pass.

It may also be determinable in advance (e.g. at compile time) whether or not any such condition(s) are met by a primitive that would mean that the primitive should undergo a particular visibility test. Thus, in some embodiments, the primitive visibility test classification (selection) is performed in advance, e.g. by a driver for the graphics processor, e.g. with the result of such primitive visibility test classification then being compiled into a single indicator, e.g. a flag, that indicates the visibility test for the primitive and which flag is provided to the graphics processor for the purposes of identifying the visibility test to use for the primitive. In that case, a step of primitive visibility test classification checking may be performed during the second, main pass operation that comprises using the indicator to determine the visibility test to use for a primitive. Various arrangements would be possible in this regard.

In an embodiment, the graphics processor receives primitives that are annotated accordingly, and the graphics processor (hardware) is configured to check, and performs a step of checking, the visibility test classification (e.g. flag) for each primitive that it receives for processing, to determine the visibility test that should be applied to and used for a primitive during the second, main pass.

The primitive visibility test classification (selection) could be performed separately to a primitive classification operation that determines whether a primitive is compatible with being processed by the first, pre-pass operation (as discussed above), but in an embodiment is performed as part of (together with) any (the appropriate) primitive classification operation that determines whether a primitive is compatible with being processed by the first, pre-pass operation.

In the technology described herein in addition to determining the primitive visibility information and using that primitive visibility information to control the processing of fragments for primitives during the second, main pass operation, records indicative of processing order dependencies between fragments that are to be processed are maintained during the second, main pass operation for each of plural sub-regions of the render output. These records should be, and are in an embodiment, at least indicative of processing order dependencies between fragments that have passed the appropriate fragment visibility test (and so have been determined as needing to be processed further for the second, main pass).

Such records indicative of processing order dependencies between fragments are maintained for each of plural sub-regions of the render output being generated, with each sub-region relating to plural sampling positions of the render output being generated.

In an embodiment, the records indicative of processing order dependencies are maintained (individually) for sub-regions of the render output that are larger than the respective regions of the render output for which individual visibility information entries are generated and maintained (i.e. the processing order dependencies are tracked at a coarser resolution of the render output than the visibility information). Thus, for example, and in an embodiment, a respective set of visibility information (e.g. primitive identifier) is maintained for each sampling position of the render output being generated individually, whereas processing order dependency records are maintained for sub-regions each comprising plural sampling positions of the render output being generated (i.e. such that a (and each) given processing order dependency is indicated for a sub-region comprising plural sampling positions of the render output being generated).

In the case of tile-based graphics processing, the records indicative of processing order dependencies between fragments will accordingly be maintained for each of plural sub-regions of a (respective) tile of a render output being generated.

Each sub-region of a render output (e.g. of a tile) (for which a record is maintained) should, and in an embodiment does correspond to a different (respective) sub-region (area) of the render output. In an embodiment, each sub-region corresponds (relates) to a respective (different) set of sampling positions of the render output.

The sub-regions for which respective dependency records are maintained are in an embodiment all the same size and shape and are in an embodiment rectangular, and in an embodiment square.

Each sub-region in an embodiment corresponds to an array of contiguous sampling positions. In embodiments, each sub-region has a size of 2×2, 4×4, 8×8, or 16×16 sampling positions.

The records indicative of processing order dependencies between fragments that are to be processed for sub-regions of the render output can take any suitable and desired form, and provide and comprise any suitable and desired information that is indicative of and that can be used to determine and enforce any processing order dependencies between fragments that are to be processed for respective sub-regions of a render output in the second, main pass operation.

The records could, for example, be, and in an embodiment are, in the form of appropriate lists (e.g. queues) of fragments to be processed, with each list (e.g. queue) for example, and in an embodiment, listing (queueing) fragments in an order in which they are to be processed, such that the processing order dependencies may be enforced at least by processing the fragments in the list (e.g. queue) in the order that they appear in the list (e.g. queue).

It would be possible for the dependency records for the render output sub-regions to be indicative of all the fragments that are generated for the sub-regions by the rasteriser in the second, main pass. However, in an embodiment, the records are indicative of (and have included in them) only those fragments that are actually to be subjected to fragment processing (fragment shading). Thus, for example, and in an embodiment, any fragments that are culled due to failing (not passing) the visibility test before they fall to be rendered (fragment shaded) are in an embodiment not included in the sub-region records. Thus, in an embodiment, the sub-region dependency records are indicative of fragments that survive the visibility testing (either pass their visibility test or do not undergo a visibility test), and/or that have been determined as actually needing to be rendered (fragment shaded) in the second, main pass.

In an embodiment a (and each) record indicative of processing order dependencies between fragments that are to be processed for a sub-region of a render output is in the form of a list indicative of fragments that are to be processed for the sub-region of the render output for generating the render output, with each entry in the list representing a group of one or more fragments, and having associated with it:

information indicating which part of the sub-region the one or more fragments that the entry represents apply to; and information indicating whether one or more processing operations are eligible to be performed for the one or more fragments that the entry represents.

In this case, the processing of fragments to be processed for a sub-region is in an embodiment then controlled based on the information in the list indicative of fragments that are to be processed for the sub-region indicating which part of the sub-region fragments that entries in the list represent apply to and the information indicating whether one or more processing operations are eligible to be performed for fragments that entries in the list represent.

Correspondingly in an embodiment, the fragment dependency list managing circuit is configured to:

maintain for each of plural sub-regions of a render output being generated, each sub-region relating to plural sampling positions of the render output being generated, a list indicative of fragments that are to be processed for the sub-region for generating the render output, each entry in the list representing a group of one or more fragments;

wherein each entry in the list for a sub-region has associated with it:

information indicating which part of the sub-region the one or more fragments that the entry represents apply to; and information indicating whether one or more processing operations are eligible to be performed for the one or more fragments that the entry represents;

and the fragment dependency list managing circuit and the control circuit are configured to control the processing of fragments to be processed for a sub-region based on the information in a list indicative of fragments that are to be processed for the sub-region indicating which part of the sub-region fragments that entries in the list represent apply to and the information indicating whether one or more processing operations are eligible to be performed for fragments that entries in the list represent.

The sub-region dependency lists are (in an embodiment) indicative of fragments that are to be processed for the sub-region of the tile in question. They could in this regard identify and list the actual fragments themselves.

In an embodiment, in the case where the graphics processor and graphics processing system is configured to perform fragment processing operations by executing appropriate fragment shader programs for fragments to be processed, such that fragments will be processed by generating (spawning) respective execution threads for processing respective fragments, with the execution threads then executing the desired fragment shader programs to perform the desired fragment processing for the fragments that they correspond to, the sub-region lists and the respective sub-region list entries identify and indicate groups (sets) of one or more respective execution threads (which will accordingly correspond to groups of one or more corresponding fragments) to be executed for the sub-region in question. Thus in this case, the sub-region lists will indicate and be indicative of the fragments to be processed for the sub-region, by listing (and including) the corresponding execution threads that are to be executed (processed) for the sub-region for processing (performing the fragment processing (shading) for) the fragments for the sub-region.

Thus, in an embodiment, the preparation of the sub-region dependency lists is performed using and in response to appropriate execution threads being generated for fragments. Correspondingly, the entries in the sub-region lists in an embodiment identify and list respective sets of one or more execution threads (corresponding to one or more fragments) that are to be processed (executed) for the sub-region in question.

The sub-region that a fragment is to be processed for (and thus should be listed/recorded for) can be determined in any suitable and desired manner. This is in an embodiment determined based on (and using) the position of the fragment (of the set of sampling position(s) that the fragment corresponds to).

This determination may, e.g., be done as part of the rasterisation process (by the rasteriser). Thus the rasteriser and rasterisation process may determine which sub-region a fragment falls within as part of the rasterization operation (in an embodiment as it generates the fragment).

In an embodiment, the determination of the sub-region that a fragment is to be processed for (and that it should be listed for), and the corresponding managing and maintaining of the sub-region fragment lists/record, is performed after fragments have been generated by the rasteriser, and most in an embodiment as and when corresponding execution threads and execution thread groups are generated (created) for processing fragments (and in an embodiment for performing fragment shading for fragments) (as discussed above).

In an embodiment a record (a list) of sub-region dependency records (e.g. lists) that currently exist is maintained, e.g., and in an embodiment, indexed by corresponding positions within the render output that the records (lists) relate to.

In an embodiment, there is an appropriate sub-region list/record managing circuit, in an embodiment in the form of a fragment dependency manager circuit/process, that is operable to and configured to maintain the sub-region dependency lists/records.

It would be possible to add fragments/execution threads to the sub-region records/lists one-by-one (singly), e.g. as they (or the corresponding execution threads) are generated, or groups of plural fragments/threads could be added at a time, if desired.

In an embodiment, the addition of fragments to a sub-region fragment dependency record/fragment list is performed for respective groups of plural fragments at a time, for example for respective 2×2 "quads" of fragments (and correspondingly for respective execution thread quads corresponding to such groups of plural fragments). In this case therefore, the fragment "group" ("quad") position (the thread quad position) is in an embodiment considered and used to determine which sub-region the corresponding fragment group (thread group) is to be processed for.

Thus, in an embodiment, groups of plural fragments are added to the sub-tile dependency records/lists at a time (i.e. a (and in an embodiment each) (new) entry in a sub-region fragment dependency list corresponds to a group of plural fragments (a group of corresponding execution threads)).

It would be possible to add to, and include in, the sub-region records/lists, only those fragments/threads that may have processing (order) dependencies. Thus, for example, where it can be determined that the processing operations for a fragment/thread will not lead to any risk of a fragment processing order dependency, that fragment/thread may not need to be added to any of the sub-region records/lists.

In an embodiment, (at least) each and every fragment (execution thread) that is to undergo rendering in the second, main pass is added to a (the appropriate) sub-region dependency list/record.

The dependency list/record for a sub-region should and in an embodiment does, include one or more, and in an embodiment plural, "entries", with each entry (in an embodiment) representing a group of one or more fragments (of one or more execution threads) to be processed for the sub-region in question.

An (and each) entry in a record/list (maintained for a sub-region) may represent a single fragment/thread to be processed for the sub-region, or an (and in an embodiment each) entry in a record/list may be able to represent a group of plural fragments/execution threads to be processed for the sub-region.

For example, each record/list entry could represent a 2×2 group (quad) of fragments/threads.

Correspondingly, in an embodiment, it is possible to change the group of fragments/threads that an existing entry relates to, for example, and in an embodiment, to add newer fragments/threads to the entry. This would then allow later fragments/threads to be "merged" into existing entries (where it is appropriate and desirable to do that).

The lists indicative of fragments to be processed for a sub-region can take any suitable and desired form. In an embodiment a (and each) list (maintained for a sub-region) is a linked list, with each entry in the list linked to (at least one) other entry in the list. The lists may be singly-linked lists or doubly-linked lists, for example.

As discussed above, in an embodiment, each entry in a dependency list for a sub-region has associated with it (comprises) information indicating which part of the sub-region the group of one or more fragments/execution threads represented by the entry applies to (covers). As will be discussed further below, this information may be, and is in an embodiment, used for identifying entries representing overlapping fragments, and which may therefore have fragment processing operation dependencies which should be enforced.

The information indicating which part of the tile sub-region a group of fragments/threads represented by an entry applies to can take any suitable and desired form. It in an embodiment indicates, and/or can be used to determine, the sampling positions of the tile sub-region that the group of fragment(s) applies to (covers). In one embodiment the fragment group coverage is indicated for respective 2×2 sampling position quads within the sub-region in question (i.e. at a resolution of individual (VRS (variable rate shading) fine) fragment positions). In another embodiment the fragment group coverage is indicated for respective 2×2 (VRS fine) fragment quads within the sub-region in question (i.e. at a resolution of (VRS fine) fragment quad positions). Other arrangements would, of course, be possible.

In an embodiment, the information indicating which part of a sub-region the group of fragments/threads represented by a list entry applies to comprises a coverage mask for the list entry.

In the embodiments, in addition to information indicating which part of the sub-region the one or more fragments represented by an entry in the sub-region fragment dependency list apply to, each entry in a sub-region fragment dependency list also has associated with it information indicating whether one or more processing operations are eligible to be performed for the one or more fragments/execution threads that the entry represents.

The one or more processing operations for which "eligibility" information is provided for a list entry may comprise any suitable and desired fragment processing operations. Such "eligibility" information could be provided for all of fragment processing operations that the one or more fragments/threads of the entry are to undergo, or for only some but not all (a subset) of the overall set of fragment processing operations that the fragment(s)/thread(s) that the entry represents are to undergo.

In an embodiment, the processing "eligibility" information is provided (at least) for a fragment processing operation or operations for which an ordering dependency could exist, such as, and in an embodiment, for fragment processing operations that (include) accessing data storage, and in an embodiment that include writing to and/or reading from storage (storing data and/or reading stored data). Most in an embodiment, processing "eligibility" information is provided for fragment processing operations for which an ordering dependency could exist, but not for other fragment processing operations for which there will not be (and should not be) any ordering dependency.

In an embodiment, the one or more fragment processing operations for which eligibility information is provided relate to determining and/or updating a colour value and/or a depth value for a sampling position of positions. In an embodiment, the one or more fragment processing operations for which eligibility information is provided comprise operations that access (that require access to) the colour and/or depth buffers when rendering a fragment.

Thus in an embodiment, the fragment processing operation(s) for which eligibility information is provided (at least) comprise one or more of, and in an embodiment both of: operations that write a colour value for a sampling position when rendering (colour buffer writes/updates); and operations that write a depth value for a sampling position when rendering (depth buffer writes/updates).

In an embodiment, (additional) eligibility information is (separately) provided for fragment processing operation(s) that (only) read (determine) a colour value for a sampling position when rendering (colour buffer reads). (In comparison, in an embodiment the eligibility information which is provided for depth (z) processing applies to both read and write operations (such that no separate eligibility information is provided for depth buffer read operations).)

The fragment processing operation eligibility information can take any suitable and desired form. In an embodiment it is in the form of an indicator, such as, and in an embodiment, a flag or flags, associated with the list entry, that can be set to indicate whether the processing operation(s) are eligible to be performed (or not).

It would be possible to provide a single "eligibility" indication for all the operations for a group of fragments that a list entry relates to (and for which eligibility information is to be provided).

However, in an embodiment, plural eligibility indications can be, and are in an embodiment, provided, with each "eligibility" indication in that case relating to a different set of one or more fragment processing operations. Thus, in an embodiment, a (and in an embodiment each) entry in a fragment dependency list for a sub-region has associated with it a plurality of fragment processing operation eligibility indications (e.g. flags), each indicating whether a respective (and in an embodiment different) set of one or more fragment processing operations is eligible to be performed for the group of one or more fragments that the list entry relates to.

In an embodiment, a (first) indication is provided for indicating whether operations that access (use) the colour buffer (that perform colour shading) (that relate to determining or updating a colour value for a sampling position or positions) are eligible to be performed, and another (separate) (second) indication is provided for indicating whether operations that access (use) the depth buffer (that perform depth processing) (that relate to determining or updating a depth value for a sampling position or positions) are eligible to be performed.

In an embodiment, separate eligibility indications are provided for colour buffer writes and for colour buffer reads. Thus, in an embodiment, another (separate) (third) indication is provided for indicating whether operations that (only) read the colour buffer (that relate to determining a colour value for a sampling position or positions) (without also writing to the colour buffer) are eligible to be performed.

In an embodiment, as well as having eligibility information (indications) relating to a processing operation or operations as discussed above, each entry in a sub-region fragment dependency list also has associated with it information indicating whether the entry applies to (should be considered for) the particular processing operation or operations for which eligibility information is provided (and so should, for example, and in an embodiment, be considered (or not) when setting the eligibility information for list entries for the processing operation in question).

This fragment processing operation "should be considered for" (is applicable to) information can again take any suitable and desired form. In an embodiment it is in the form of one or more "should be considered for" indications, such as, and in an embodiment, a flag or flags, associated with the list entry, that can be set appropriately to indicate whether the list entry should be considered for the operation or operations that the indication in question relates to or not.

The processing operation or operations for which such "should be considered for" information is provided for a list entry may comprise any suitable and desired fragment processing operations, for example, and in an embodiment, as discussed above in respect of the "eligibility" information. Thus it may, for example, and in an embodiment, relate to processing operations that access data storage, and in particular that access (and in an embodiment that write to) the colour and/or depth buffers.

It would be possible to provide a single "should be considered for" indication applicable to (and used for) all the processing operations for which eligibility information is to be provided. However, in an embodiment, plural "should be considered for" indications can be, and are in an embodiment, provided, with each "should be considered for" indication in that case relating to a different set of one or more fragment processing operations for which a respective "eligibility" indication is provided.

Thus, in an embodiment, a separate "should be considered for" information (indication) is provided for (at least some of) the same processing operation or operations for which separate "eligibility" information is provided. Thus, in an embodiment, for one or more (or all) of the processing operation or operations for which an "eligibility" indication is provided for a sub-region fragment list entry, a corresponding "should be considered for" indication is provided.

Thus, for example, and in an embodiment, a sub-region fragment list entry will have associated with it both an "eligible to be performed" indication (e.g. flag) and a corresponding "should be considered for" indication (e.g. flag), for one or more respective (different) fragment processing operations, and most in an embodiment at least for operations that access (and in an embodiment that write to) the colour buffer and, separately, for operations that access (and in an embodiment that write to) the depth buffer.

The "should be considered for" information (indications) for a given fragment processing operation(s) is in an embodiment set for a list entry when the entry is added to the list, and in an embodiment in dependence upon whether the particular processing operation or operations is to be performed for the group of fragments/threads (list entry), or not.

The processing operation "should be considered for" information (indications) is in an embodiment (at least) used to determine whether a list entry should be taken into account when setting the corresponding eligibility information for list entries (i.e. is in an embodiment used when updating the eligibility information for entries in the tile sub-region fragment lists).

In an embodiment, each list entry (also) has associated with it an appropriate indication, such as, and in an embodiment, a flag, that can be set to indicate when the list entry can be deleted (can be removed from the list).

As well as the coverage information, eligibility information and "should be considered for" information, a list entry for a group of one or more fragments/execution threads can contain any other suitable and desired information, e.g. relating to the group of one or more fragments/threads that the list entry relates to.

In an embodiment, each list entry at least also includes an identification of the group of fragments/execution threads that the list entry relates to (an identifier for the group of fragments/threads that the list entry relates to).

In an embodiment, further information (metadata), e.g., and in an embodiment, to facilitate the handling and using of the sub-region fragment dependency lists, is also maintained and stored for (and in association with) the sub-region fragment dependency lists. This list information (metadata) can comprise any suitable and desired data in this regard.

As discussed above, this list information (metadata) in an embodiment at least comprises, for a (and each) list, an indication of the position of the sub-region of the render output that the list relates to, in an embodiment such that an appropriate position derived from the position of a fragment or group of fragments can then be used to identify the sub-region list that the group of fragments should be added to (included in).

In an embodiment, a tail pointer is associated with (maintained for, and in an embodiment stored for) a (and each) sub-region fragment list, indicating (pointing to) the tail (end) of the list. In an embodiment each list also has an associated head pointer, indicating (pointing to) the head (start) of the list. The head pointer may be stored explicitly for a list, e.g. together with the tail pointer, or the next entry pointer of the newest (the tail) entry in a list could be used to store the head pointer for the list, for example. These pointers can then be, and are in an embodiment, used to identify the heads and tails of the respective lists, for example when using and/or updating the lists.

Other information could also be stored on a per-list basis, if desired.

In one embodiment, a (and each) sub-region fragment dependency list also has associated with it an indication (e.g. a flag) for indicating whether the list needs processing (e.g., and in an embodiment, scanning) to determine whether it needs updating. This indication can be, and is in an embodiment, set whenever a sub-region fragment list potentially needs updating, for example because an entry has been added to or removed from the list, or the state of an existing entry in the list has changed. This can then be, and is in an embodiment, used to trigger the appropriate updating of the sub-region fragment lists, as and when required.

In an embodiment, an appropriate record of the sub-region dependency lists is maintained, which record in an embodiment has associated with it, and stores for each sub-region fragment list, the appropriate list information (metadata), in an embodiment indexed (and identifiable) by the position of the sub-region within the tile that the list relates to.

In an embodiment a record (a list) of sub-region fragment dependency lists that are currently needing to be processed (scanned) to determine whether they need updating is maintained.

The fragment processing operation eligibility information for the fragment dependency list entries may be set to indicate that processing operations are eligible (or not) to be performed as desired, and based on any suitable and desired criteria. In an embodiment, the eligibility information is set (or not) in respect of a given group of fragments/execution threads (list entry) and processing operation or operations, to account for, and based on, and most in an embodiment so as to enforce, ordering dependencies for processing operations between groups of fragments represented by different list entries (in the same sub-region fragment list).

Accordingly, in an embodiment, the eligibility information for an entry in a list for a sub-region is set based on, and in dependence on, the other (current) entries in the sub-region fragment dependency list in question. Most in an embodiment, the eligibility information for an entry in a list for a sub-region is set based on whether the group of fragments/threads that the entry relates to has any processing ordering dependencies in respect of other entries in the sub-region fragment list in question, with the eligibility information being appropriately set depending on whether the group of fragments/threads for the entry does have an ordering dependency with another entry in the (same) list for the fragment processing operation or operations in question or not.

In this regard, the dependency is in an embodiment whether the relevant processing operation or operations must be performed for another entry in the list before it or they can be performed for the entry in question (i.e. whether there is a processing order dependency that needs to be enforced).

It can be determined whether an entry in a fragment list for a tile sub-region has a dependency on any other entry in the list such that the order of processing for the entries needs to be enforced, and the entry processing eligibility information set accordingly, in any suitable and desired manner.

In an embodiment, it is determined whether an entry in a fragment dependency list for a sub-region has a dependency on any other entry in the list, such that the entries need to perform their (relevant) processing in a particular order, and the entry processing eligibility information is set accordingly, based on one or more of, and in an embodiment plural of, and in an embodiment all of:

the part of the sub-region that the group of fragments/execution threads for the list entry applies to (covers) (the "coverage" information for the entry);

the processing operation or operations that the group of fragments/threads for the entry are indicated as applying to (the "should be considered for" information for the entry); and the position in the desired (primitive) processing order of the primitive that the fragments/threads that the entry relates to are for.

Most in an embodiment, it is determined whether an entry in a fragment list for a sub-region has a dependency on any other entry in the list, and the entry processing eligibility information set accordingly, based on one or more of, and in an embodiment plural of (e.g. all of), the above factors, both for the entry for which the eligibility processing information is being set, and for one or more other entries that are already in the list for the sub-region in question (and most in an embodiment for any earlier entries that are already in the list for the tile sub-region in question).

Thus, for example, and in an embodiment, it is determined whether an entry in a fragment dependency list for a sub-region has a dependency on any other entry in the list such that the entry processing eligibility information needs to be set to indicate that a processing operation or operations should not be (currently) performed for the entry in question, by considering (and in an embodiment comparing) the parts of the sub-region that the list entries relate to (e.g., and in an embodiment, to see if there is any overlap between the entries), and/or the processing operation or operations that the list entries are indicated as applying to (e.g., and in an embodiment, to see if entries apply to the same processing operation(s) (for which a dependency may need to be enforced)), and/or the relative positions in the desired (primitive) processing order of the primitives that the groups of fragments/execution threads for the list entries relate to (e.g., and in an embodiment, to determine which entry should perform the (relevant) processing operation(s) first). In an embodiment all of these factors are considered for the determination.

In this regard, the parts of the tile sub-region that the list entries relate to can be, and are in an embodiment, determined from the (coverage) information indicating which part of the sub-region the one or more fragments/threads represented by the respective entries apply to.

The processing operation(s) that the fragments/threads that the entries relate to apply to can be, and is in an embodiment, determined from the fragment processing operation "should be considered for" indications for the list entries (as discussed above).

The relative positions in the primitive processing order of the groups of fragments/threads for the list entries could be determined from information to that effect that is provided for (e.g. in) the list entries. However, in an embodiment, this is determined from the relative positions of the entries in question in the sub-region list in question. In particular, in the case where new entries are always added at one end, such as the tail, of the sub-region fragment list, then it can be determined from the relative positions of the entries in question in the list in question, which entry is the older entry (relates to a primitive that should be processed earlier in the desired primitive processing order) and vice-versa, such that the order in which the entries should undergo the processing operation(s) in question can be determined from the (relative) positions of the entries in the lists.

In an embodiment the eligibility information for a sub-region fragment list entry is set when the entry is first added to the list, but then the eligibility information for list entries can be, and is in an embodiment, updated, e.g. periodically, for example, and in an embodiment, as the fragments for entries in the list undergo fragment processing.

The maintaining and updating of the sub-region fragment dependency lists can be performed in any suitable and desired manner.

In an embodiment, there is an appropriate sub-region fragment dependency list "management" process/circuit (a fragment dependency manager) that maintains and controls the lists (and which is in an embodiment part of the thread/thread group (warp) manager of the graphics processor, that controls, inter alia, the execution of execution threads for performing fragment processing in the graphics processor).

It would be possible in this regard for the sub-region fragment dependency lists to be updated as and when relevant events that trigger an update to the lists occur. However, in an embodiment, the maintenance and updating of the lists is performed more as a "background" operation, e.g., and in an embodiment, as a background scanning-type operation.

Other arrangements for maintaining the sub-region fragment dependency lists would, of course, be possible.

In the technology described herein, as well as controlling the processing of fragments based on the visibility test in the second, main pass, the processing of fragments in the second, main pass is also controlled based on and using the render output sub-region fragment processing order dependency records. In particular, in the second, main pass, the processing of fragments falling within a render output sub-region is (also) controlled based on the record indicative of fragment processing order dependencies for that sub-region.

The processing of fragments in the second, main pass can be controlled based on and using the render output sub-region fragment processing order dependency records in any suitable and desired manner. This may be, and is in an embodiment, dependent upon the form and nature of the render output sub-region processing order dependency records. For example, where the records indicate, e.g. comprise appropriate queues indicating, the order in which fragments should be processed for a render output sub-region, the processing of fragments for a render output sub-region is in an embodiment controlled and configured so as to process fragments for the render output sub-region in the order that they are indicated in the fragment processing order dependency record (e.g. queue). Other arrangements would, of course, be possible.

In the case where the fragment processing order dependency records comprise lists for which the list entries indicate which part of the sub-region the fragments for the entries apply to, and information indicating whether one or more processing operations are eligible to be performed for fragments represented by entries in the list, then in the second, main pass, the processing of fragments falling within a render output sub-region will be controlled based on the information in the list entries for the sub-region indicating which part of the sub-region the fragments for the entries apply to and the information indicating whether one or more processing operations are eligible to be performed for fragments represented by entries in the list (and, in an embodiment, are not yet completed).

Most in an embodiment, the processing of fragments falling within a sub-region is controlled based on the "coverage" and "eligibility" information in the list entries, by using the "coverage" information (at least in part) to set the "eligibility" information for the list entries (as discussed above), and then using the "eligibility" information for the list entries to permit (allow) or prevent the respective processing operation(s) to be performed for the fragment groups for respective list entries.

Correspondingly, the fragment dependency list managing circuit and the control circuit are in an embodiment configured to control the processing of fragments to be processed for a sub-region of a render output based on the information in a list indicative of fragments that are to be processed for the sub-region indicating which part of the sub-region fragments that entries in the list represent apply to and the information indicating whether one or more processing operations are eligible to be performed for fragments that entries in the list represent by the fragment dependency manager using the information in the list entries for the sub-region indicating which part of the sub-region the groups of fragments for respective list entries apply to, to set the eligibility information for the list entries, and the control circuit using the eligibility information indicating whether one or more processing operations are eligible to be performed for fragments represented by entries in the list, to permit (allow) (or prevent) the respective processing operation(s) to which the eligibility information relates to be performed for the group of fragments for a list entry.

The controlling of the processing of fragments falling within a sub-region is in an embodiment performed such that the (relevant) processing of a fragment will only be performed when the corresponding fragment processing order dependency record indicates that the (relevant) processing is permitted to be performed for the fragment in question (and, correspondingly, in an embodiment, unless and until the fragment processing order dependency record for a sub-region indicates that a fragment can undergo (the relevant) processing for the sub-region, the (relevant) processing for the fragment will not be, and will be prevented from being, performed for the fragment in question).

It would be possible in this regard to prevent any and all desired processing operations from being performed for fragments based on the fragment processing order dependency records, or that could be done, as discussed above, in respect of a particular, e.g. selected, processing operation or operations only.

In the case where the fragment processing order dependency records comprise lists for which the list entries indicate which part of the sub-region the fragments for the entries apply to, and information indicating whether one or more processing operations are eligible to be performed for fragments represented by entries in the list, then in an embodiment, the controlling of the processing of fragments falling within a sub-region is performed such that a processing operation (for which eligibility information is provided) will only be performed for a group of fragments corresponding to a list entry when the corresponding eligibility information indicates that that processing operation is eligible to be performed for the group of fragments (for the list entry) in question.

Thus, in an embodiment, unless and until the eligibility indication for a list entry indicates that the processing operation(s) to which the eligibility indication relates is eligible to be performed for the group of fragments to which the list entry relates, the processing operation(s) in question will not be, and will be prevented from being, performed for the group of fragments to which the list entry relates.

It would be possible in this regard to prevent any and all desired processing operations from being performed for fragments represented by a list entry unless and until all the eligibility information for the list entry indicates that all the processing operations for which eligibility information is provided are eligible to be performed (i.e. such that any indication for a list entry of an operation not being eligible to be performed will prevent all other operations (at least for which eligibility information is provided) from being performed). In one embodiment, that is the case.

However, in an embodiment, where there are plural eligibility indications provided (each in respect of a different set of one or more processing operations), then in an embodiment the controlling of the processing of the fragments is performed for the respective sets of one or more processing operations separately, based on the corresponding eligibility information. This will then allow at least some processing to be performed for a group of fragments where the group of fragments is eligible for that processing, even if the group of fragments may not be eligible for other processing yet.

For example, where separate eligibility indications are provided for operations that access the colour buffer (colour shading) and operations that access the depth buffer (depth processing), then in an embodiment the performing of operations that access the colour buffer is controlled based on the eligibility indication(s) for "colour buffer" operations, but the performing of operations that access the depth buffer is controlled (separately) based on the eligibility indication for "depth buffer" operations.

In embodiments where separate eligibility indications are provided for colour buffer writes and for operations that only read colour, then in an embodiment the performing of colour write and read operations is controlled based on the respective colour operation eligibility indication.

The permitting or preventing of processing operations for fragments based on the fragment processing order dependency records, such as the eligibility information in the list entries, for the sub-regions can be performed in any suitable and desired manner.

It should be noted here that when the dependency record, e.g. eligibility indication for a list entry, indicates that a processing operation(s) is eligible to be performed for a fragment (e.g. for the group of fragments to which the list entry relates), that need not, and does not necessarily, trigger the immediate performing of the relevant processing operation(s) for the fragment or group of fragments in question (although it can be used as a trigger for that). Rather, it is in an embodiment used to permit the relevant processing operation(s) to be performed for the fragment (e.g. group of fragments for the list entry) in question as and when the processing operation(s) in question fall to be performed for the fragment or group of fragments in question in the normal manner.

Correspondingly, when the dependency record, e.g. eligibility indication for a list entry, indicates that a processing operation(s) is not eligible to be performed for a fragment (e.g. for the group of fragments to which the list entry relates), then that indication should be, and is in an embodiment, used to prevent the relevant processing operation(s) being performed for the fragment (e.g. group of fragments for the list entry) in question as and when (and even when) the processing operation(s) in question fall to be performed for the fragment or group of fragments in question in the normal manner.

In one embodiment, fragments are issued for processing in the order that they are generated by the rasteriser (and thus in the order that the rasteriser receives primitives for rendering), but with the relevant fragment processing order dependency record then being checked for respective fragments as and when those fragments fall to undergo a processing operation(s) for which a processing order dependency could apply, with the relevant fragment processing then either being permitted to proceed, or the fragment processing being stalled appropriately, based on whether the particular processing operation is indicated as being eligible to be performed for the fragment(s) in question or not based on the applicable fragment processing order dependency record.

Thus, in one embodiment, fragments are issued for processing in the order that they are generated by the rasteriser (and thus in the order that the rasteriser receives primitives for rendering), but with the relevant list entries then being checked for respective fragments as and when those fragments fall to undergo a processing operation(s) for which eligibility information is included in the sub-region fragment list entries, with the relevant fragment processing then either being permitted to proceed, or the fragment processing being stalled appropriately, based on whether the particular processing operation is eligible to be performed for the fragment(s) in question or not.

Thus, in an embodiment, where fragments are processed by issuing respective execution threads that will perform fragment shading operations for the fragments, respective execution threads may be issued for fragments as they are issued by the rasteriser and fall to be processed, but then the fragment shading execution (fragment shader execution) will be appropriately stalled unless and until the fragment(s) (execution thread(s)) in question is or are indicated as being eligible to perform the relevant processing operation(s).

This may be and is particularly applicable in the case where the fragment processing order dependency records, e.g. sub-region lists, list, as discussed above, sets of execution threads corresponding to fragments to be processed. In this case, the eligibility information for the entries corresponding to execution threads to be/being executed can be, and is in an embodiment, used to control the execution of the execution threads in question (to thereby perform the desired fragment processing for the corresponding fragments).

Thus, for example, and in an embodiment, an execution thread may be issued for a fragment, with that execution thread beginning execution of a shader program to perform the desired fragment processing, but when the shader program is to perform, for example, an operation for which an eligibility indication is provided, such as a write to the colour buffer, the shader program execution will be controlled based on, and in accordance with, the relevant eligibility indication for the fragment in question (for the list entry in question), either to continue the shader program execution to perform the operation (e.g. colour writing), or stall the shader program execution for the fragment(s) in question until they are eligible to perform the operation (e.g. colour writing).

This operation may be achieved in any suitable and desired manner.

In an embodiment, execution threads, and in an embodiment groups of plural execution threads to be processed together (warps), that are created for performing the desired fragment processing for fragments to be rendered have associated with them appropriate dependency state indications for respective processing operations, e.g., and in an embodiment, corresponding to the processing operation eligibility indications that are stored for the sub-region list entries, with the corresponding dependency state indications for the threads (e.g., and in an embodiment, for the thread groups (warps)), being set (in an embodiment) when the threads/warps are created, based on the fragment processing order dependency records, e.g. the state of the processing operation eligibility indications for the list entry, for the fragment/threads in question, and then being updated as and when the corresponding processing order dependency permissions, e.g. eligibility indications in the list entries, change.

Thus, for example, for a list entry that is indicated as not being eligible to perform colour write operations, the corresponding execution threads (e.g., and in an embodiment, the corresponding thread group (warp) for that entry) will have a colour write dependency indication set to indicate that the threads in question (the thread group (warp) in question) has a colour write dependency and so is not currently eligible to perform colour write operations.

Then, when a processing operation for which dependency, e.g. eligibility, information is provided is to be performed for an execution thread, the corresponding dependency state for the execution thread (e.g., and in an embodiment, for the thread group (warp) that the execution thread belongs to) may be, and is in an embodiment, checked to determine whether the execution thread can be permitted to proceed with the operation in question.

In an embodiment, in particular where the dependency state is set and indicated for thread group (warps) as a whole, the dependency state can, and in an embodiment does, include a dependency count, which in an embodiment indicates how many sub-groups of threads, e.g. thread quads, within the overall thread group (warp) have the relevant processing operation dependency, which dependency count can be set and updated accordingly as respective sub-sets of threads (e.g. thread quads) within an overall thread group (warp) become eligible for performing the processing operation in question. Thus, for example, and in an embodiment, a thread group (warp) will be permitted to proceed with the processing operation in question when its dependency count for that processing operation is zero, but not permitted to proceed with the processing operation in question when its dependency count is greater than zero.

Thus in an embodiment, the dependency state that is provided for threads/thread groups (warps) may comprise an indicator that the thread/thread group (warp) has the dependency in question, and/or a dependency count for the processing operation in question.

Other arrangements would, of course, be possible.

To facilitate this operation, in an embodiment particular, and in an embodiment selected, shader program instructions, relating to operations for which dependency permissions, e.g. eligibility indications, are provided (such as operations that access (e.g. read and/or update) the colour or depth buffer), are indicated as being guarded by a dependency (the compiler may insert such indications when compiling the shader program), such that when such a "dependency guarded" instruction is encountered, that triggers the appropriate checking of the dependency state information for the execution thread in question, with the instruction execution then either being allowed to proceed or being stalled before execution of the dependency guarded instruction, as appropriate. A "guarded" flag could be provided on the instruction preceding the instruction that performs the processing operation, for example. A "guarded" flag on a preceding instruction may be used to trigger checking of the eligibility indication for processing operation for a next instruction before fetching and decoding the next instruction (so as to avoid fetching and decoding instructions which are not yet eligible to be performed).

Thus in an embodiment, processing operation dependency indications, e.g. the eligibility indications for list entries, are used to set corresponding thread, and in an embodiment thread group (warp), dependency state indications for threads (thread groups) corresponding to fragments, e.g. list entries, which thread dependency state indications are then used to control (and in particular to permit or prevent) the execution of particular shader program instructions by the execution threads. The thread/thread group dependency state indications are accordingly in an embodiment set based on, and in accordance with, the fragment processing order dependency records, e.g. the processing operation eligibility indications for the list entries.

In an embodiment, there is an appropriate thread group scheduler that is operable to schedule execution threads and thread groups for execution, and that operates to check the relevant dependency state information for threads to determine when threads can be released for and sent for execution. This thread group scheduler in an embodiment also sets the threads/thread group dependency state indications and updates them (in particular to clear them when there is no longer a dependency), e.g., and in an embodiment, in response to appropriate signals from the fragment dependency list managing circuit indicative of the dependency state for the threads/thread group in question.

Other arrangements would, of course, be possible.

In an embodiment, a pool of execution threads awaiting processing can be, and is in an embodiment maintained, with execution threads being added to the pool when they are created, and when their relevant processing needs to be stalled, and released appropriately from the pool for processing based on their processing operation dependency state. In this case, the thread group scheduler in an embodiment schedules threads from the pool for execution, and can check the relevant thread/thread group processing operation dependency state of threads/thread groups in the pool, to determine when threads in the pool can be released and sent for execution.

Other arrangements would, of course, be possible.

In alternative embodiments, where it is possible to issue fragments/execution threads for processing for smaller "units" of processing, then in an embodiment fragments are issued for the appropriate sequences of processing based on the relevant processing order dependency information, e.g. eligibility information. Thus, for example, a fragment may be issued to undergo processing, and undergo processing, that does not access the colour or depth buffers (and that can be performed in any order in relation to colour and depth buffer accesses), but when the fragment is to undergo operations that include colour or depth processing, the relevant processing order dependency, e.g. eligibility, information for the fragment will be checked to determine when and if the fragment can be issued for that processing.

Thus, in this case, respective different execution threads will be issued for performing subsets of the fragment processing operations to be performed for fragments, based on, and in accordance with, the fragment processing order dependency, e.g. eligibility, information for the fragments (rather than stalling the execution of already existing execution threads based on the fragment processing order dependency, e.g. eligibility, information for fragments).

Other arrangements would, of course, be possible.

In the technology described herein, a fragment processing order dependency that would be indicated by a sub-region fragment processing order dependency record (e.g. list) is not enforced in the case where the fragment that the processing order dependency would apply to has passed a particular, in an embodiment selected, in an embodiment predetermined, form of visibility test in the second, main pass. Thus, a fragment processing order dependency may be, and is in an embodiment, not enforced for fragments that undergo and pass a particular, in an embodiment selected, in an embodiment predetermined, form of visibility test (that uses the visibility information from the first, pre-pass) in the second, main pass.

As discussed above, the applicants have recognised in this regard that there can be some forms of visibility test that may be performed in the second, main pass, that if passed by a fragment guarantees that there will not be any earlier fragments that undergo that same visibility test that should generate output data for the respective sampling position or positions in the render output. Thus, in this case, even if the fragment processing order dependency determination would normally indicate that there should be a processing order dependency applied between such fragments, that processing order dependency can be safely not enforced for the fragment in question.

Thus, when a fragment to be processed for a primitive is, in the second, main pass operation, subjected to and passes a particular visibility test so as to be determined as needing to be processed further in the second, main pass operation, a processing order dependency that would be indicated for the fragment in the record indicative of processing order dependencies for a sub-region of the render output to which the fragment relates may be, and is in an embodiment, not enforced.

Correspondingly, in the case where a fragment does not undergo the particular visibility test in the second, main pass operation, then any processing order dependencies that would be indicated for the fragment in a record indicative of processing order dependencies for a sub-region of the render output to which the fragment relates should be, and are in an embodiment, enforced (should not be, and in an embodiment are not, ignored), such that any and all processing order dependencies indicated for the fragment in the record should be, and are in an embodiment, appropriately applied to, and enforced for the fragment (for example, and in an embodiment, in one of the manners discussed above).

The particular form of visibility test that allows a processing order dependency that would be indicated for a fragment in a processing order dependency record to not be enforced can be any suitable and desired visibility test (which if passed by a fragment should guarantee (and can be considered to guarantee) that there will not be any earlier fragments that undergo that same visibility test that should generate output data for the respective sampling position or positions in the render output). Thus this may, for example, and in an embodiment, depend upon the nature of the visibility information that is generated during the first, pre-pass, and how that may be used to perform a visibility test in the second, main pass.

In an embodiment, the particular form of visibility test that permits a processing order dependency to not be enforced is an EQUALS test, i.e. where, as discussed above, a (parameter) value for a fragment is compared to a corresponding (parameter) value in the visibility information generated in the first, pre-pass operation, with the fragment passing the visibility test in the second, main pass when (and only when) the value for the fragment is equal to (matches) the corresponding value in the visibility information that the fragment is being tested against.

Thus in an embodiment, the technology described herein comprises when a fragment to be processed for a primitive is, in the second, main pass operation subjected to and passes an EQUALS visibility test that is performed in the second, main pass operation using the visibility information determined in the first, pre-pass operation (i.e. a visibility test for which the (only) condition for passing the test is that the value of the (particular) parameter being tested for the fragment is equal to (matches) the value of that (particular) parameter in the appropriate entry in the visibility information determined in the first, pre-pass operation), not enforcing a processing order dependency that would (otherwise) be indicated for the fragment in a record indicative of processing order dependencies for a sub-region of the render output to which the fragment relates.

This may be particularly the case where the visibility information (parameter) comprises primitive identifiers (as discussed above), as it can then be known that if the identifier for a primitive (fragment) to be processed in the second, pre-pass matches (equals) the primitive identifier in the visibility information for the sampling position or positions in question, that primitive (fragment) will be the only (opaque) primitive that will apply to the particular sampling position or positions.

Thus, in an embodiment, the fragment visibility information comprises a set of primitive identifying information storing respective primitive identifiers identifying the particular (opaque) primitive to be processed for respective sampling positions, and the particular visibility test that is performed in the second, main pass operation that permits processing order dependencies to not be enforced comprises comparing the primitive identifier for a fragment to be processed to the corresponding primitive identifier in the visibility information, with the visibility test being passed (only) in the case where the primitive identifiers are equal to each other (match).

An EQUALS test may also be applicable for other forms of visibility information, such as where the visibility information comprises respective depth values for sampling positions of the render output. In this case, at least for appropriate (opaque) primitives, it may be the case that a fragment that matches (equals) the depth value stored in the visibility information (and, e.g., passes any other form of depth value disambiguation condition) will be guaranteed to be the only (opaque) fragment that applies to the sampling position or positions in question.

As discussed above, in the case of a depth test, the particular visibility test may also check appropriate disambiguation information (state) associated with a primitive to determine if a primitive passes the test or not. Thus in an embodiment, the particular visibility test comprises both testing the visibility information (e.g., and in an embodiment, using an EQUALS test) and testing (checking) further state information, such as, and in an embodiment, disambiguation information for the primitive/fragment in question.

Other forms of visibility test could be set to be and selected as the particular form of visibility test that if passed allows processing order dependencies for fragments to not be enforced in the second, main pass, if desired, e.g., and in an embodiment, in dependence upon the particular form and nature of the visibility information that is generated in the first, pre-pass, and how that information is or could be used to determine whether a fragment should be processed further in the second, main pass.

As discussed above, it could be, and in one embodiment is, the case that only one form of visibility test can be and is performed in the second, main pass operation, with that sole form of visibility test comprising the particular form of visibility test that if passed allows a processing order dependency for a fragment to not be enforced. In this case therefore, all fragments that undergo a visibility test in the second, main pass operation will be subjected to the particular visibility test, and accordingly for any fragment that is subject to that particular visibility test and passes it, a processing order dependency indicated for the fragment can then be (and is in an embodiment) not enforced.

In this case, when a fragment to be processed for a primitive is, in the second, main pass operation not (is other than) subjected to a visibility test using the visibility information determined in the first, pre-pass operation (to determine whether the fragment needs to be processed further in the second, main pass operation), then any processing order dependencies indicated for the fragment in a record indicative of processing order dependencies for a sub-region of the render output to which the fragment relates should not be (should other than be) ignored, and accordingly should be, and are in an embodiment, (appropriately) enforced.

In other embodiments, as discussed above, there may be, and in an embodiment are, plural (a set of plural) available visibility tests that use the visibility information from the first, pre-pass that fragments can be subjected to in the second, main pass, so as to determine whether a fragment needs to be processed further in the second, main pass operation.

For example, as discussed above, in some embodiments primitives (and thus their fragments) may be subjected to either an EQUALS test or to a different test (that is not an EQUALS test), such as a GREATER THAN test, in the second, main pass, depending upon particular characteristics of the primitives. In this case therefore, for example, and in an embodiment, primitives and fragments that undergo an EQUALS test are in an embodiment able to trigger the not enforcing of processing order dependencies for such fragments in the second, main pass, but fragments that undergo a visibility test that is not (that is other than) an EQUALS test (such as, and in an embodiment, a GREATER THAN test) are in an embodiment determined as being unable to ignore any processing order dependencies indicated for the fragments (i.e. such that any processing order dependencies for such fragments should be, and are in an embodiment, enforced).

Thus, in an embodiment, there is a plurality of available (supported) visibility tests that can be performed in the second, main pass, and, as part of the second, main pass operation, a fragment for a primitive that was processed during the first, pre-pass operation is subjected to one of the set of plural available visibility tests that use the visibility information determined during the first, pre-pass operation, to determine whether the fragment for the primitive should be processed further in the second, main pass operation, and the controlling of the processing of fragments to be processed for a sub-region of the render output in the second, main pass operation based on the records indicative of processing order dependencies between fragments to be processed for sub-regions of the render output during the second, main pass operation comprises: when a fragment to be processed for a primitive is, in the second, main pass operation, subjected to and passes a particular one of the set of plural available visibility tests so as to be determined as needing to be processed further in the second, main pass operation, not enforcing a processing order dependency that would be indicated for the fragment in a record indicative of processing order dependencies for a sub-region of the render output to which the fragment relates.

Correspondingly, in this embodiment, when a fragment to be processed for a primitive is, in the second, main pass operation subjected to and passes a different one of the set of plural available visibility tests (a one of the set of plural visibility tests that is not (that is other than) the particular one of the set of plural visibility tests) so as to be determined as needing to be processed further in the second main pass operation, enforcing (and not ignoring) any processing order dependencies indicated for the fragment in a record indicative of processing order dependencies for a sub-region of the render output to which the fragment relates.

It will be appreciated from the above that in embodiments of the technology described herein at least, there may be fragments for which a processing order dependency is not enforced in the second, main pass operation (i.e. those fragments that pass the particular form of visibility test, such as an EQUALS test, in the second, main pass operation), and other fragments for which (any and all) processing order dependencies are enforced (should not be, and are not, ignored), for example either because the fragment has undergone a visibility test that is not the particular visibility test in the second, main pass operation, or the fragment has not undergone any visibility test using the visibility information derived during the first, pre-pass operation in the second, main pass operation.

In the case where a fragment passes the particular visibility test in the second, main pass, such that a processing order dependency indicated for the fragment is not enforced, then it would be possible in this regard for any and all processing order dependencies for the fragment indicated in a processing order dependency record to not be enforced (and in one embodiment that is the case). Thus in this case, any and all processing order dependencies that would be indicated for the fragment in a record indicative of processing order dependencies for a sub-region of the render output to which the fragment relates may be, and are in an embodiment, not enforced.

In an embodiment, particularly in the case where there are plural different processing order dependencies that can be tracked (e.g. each in respect of a different set of one or more fragment processing operations, e.g., and in an embodiment, as discussed above), then in an embodiment the not enforcing of a processing order dependency for a fragment that passes the particular visibility test is performed for some but not all of the respective sets of one or more processing operations for which (separate) processing order dependencies can be tracked and enforced.

In other words, one or more (e.g. a single one) of (plural) processing order dependencies that could be indicated for a fragment in a record indicative of processing order dependencies for a sub-region of the render output to which the fragment relates will not be enforced, but one or more other processing order dependencies that could be indicated for the fragment in a record indicative of processing order dependencies for a sub-region of the render output to which the fragment relates will not be ignored (will still be enforced) (if applicable to the fragment in question).

Thus in an embodiment only some but not all of the processing order dependencies that could be indicated for a fragment in a record indicative of processing order dependencies for a sub-region of the render output to which a fragment relates will not be enforced when a fragment passes the particular visibility test.

For example, where separate dependency (eligibility) indications are provided for operations that access the colour buffer (colour shading) and for operations that access the depth buffer (depth processing), then in an embodiment any processing order dependencies that would be indicated for operations that access the colour buffer are not enforced when a fragment passes the particular visibility test in the second, main pass, but, in an embodiment, any processing order dependencies that would be indicated for operations that access the depth buffer are still enforced (are not (are other than) ignored).

Thus, in an embodiment, the processing order dependency that is not enforced in the second, main pass when a fragment passes the particular visibility test is a processing order dependency for accessing the colour buffer (colour shading).

The not enforcing (the other than enforcing) of a processing order dependency or dependencies for a fragment during the second, main pass can be achieved in any suitable and desired manner.

For example, and in one embodiment, where the processing order dependency record comprises a list or queue indicative of the order in which fragments should be processed, in the case where the relevant fragment processing order dependency is not to be enforced for a fragment, the fragment can be and is in an embodiment, (allowed to be) processed out of order (for the dependency in question) (i.e. any ordering requirement for the dependency in question indicated by the fragment processing order dependency record is in an embodiment not enforced (is ignored)).

For example, and in one embodiment, fragments can be, and are in an embodiment, automatically processed (or at least added to a set (e.g. pool) of fragments ready and eligible to be processed) as and when they are ready, without performing any form of fragment processing order dependency check for those fragments (that passed the necessary particular visibility test) (for the dependency in question). In this case therefore, a fragment that passes the particular visibility test will simply be sent for the appropriate fragment processing (have the appropriate fragment processing triggered) without the fragment undergoing any form of processing order dependency record check for the processing operation in question.

In an embodiment, fragments that pass the particular visibility test still undergo an appropriate processing order dependency check, using the processing order dependency record(s) (as would any other fragment that did not undergo the particular visibility test), but the processing order dependency check is configured and caused to ignore the (appropriate) processing order dependency (if and when indicated for a fragment by a fragment processing order dependency record) for fragments that pass the particular visibility test.

Thus, in one embodiment, the fragment processing order dependencies (records) are generated in the normal manner (and thus should, and in an embodiment do, indicate all processing order dependencies that would apply to a fragment), but when a processing order dependency is to be not be enforced for a fragment, that processing order dependency (if indicated for the fragment in a processing order dependency record) is ignored (is not acted upon and applied to the fragment in question).

Thus, for example, and in an embodiment, when a processing order dependency record falls to be checked for a fragment that passed the particular visibility test (to determine if the fragment can be processed or has to wait for another fragment or fragments to undergo the relevant processing operation first), that dependency check is in an embodiment (automatically) treated as being passed, irrespective of what the fragment processing order dependency record actually indicates.

Thus in one embodiment, the not enforcing of a processing order dependency indicated for a fragment in a record indicative of processing order dependencies for a sub-region of the render output to which the fragment relates in the second, main pass operation when a fragment is subjected to and passes a particular visibility test so as to be determined as needing to be processed further in the second, main pass operation, comprises ignoring a processing order dependency indicated for the fragment in the record indicative of processing order dependencies for a sub-region of the render output to which the fragment relates.

In another embodiment, the not enforcing (the other than enforcing) of a fragment processing order dependency that would exist for a fragment is achieved by setting the appropriate sub-region processing order dependency record or records to indicate that the processing order dependency in question does not exist for (apply to) the fragment in question (to indicate that the fragment in question does not have that processing order dependency). In other words, the processing order dependency record for a sub-region will, if necessary, be modified for fragments that pass the particular visibility test to indicate that those fragments do not have (other than have) the processing order dependency in question.

Thus, for example, and in an embodiment, where the sub-region fragment processing order dependency records comprise lists that indicate, inter alia, for respective list entries representing groups of one or more fragments, processing operation eligibility information (indications), indicating whether a particular processing operation or operations are eligible to be performed for a fragment or group of fragments that the record entry relates to, that eligibility information will be, for a fragment that passes the particular visibility test, set to indicate that the fragment is eligible to perform the processing operation in question.

Thus in one embodiment, the not enforcing of a processing order dependency indicated for a fragment in a record indicative of processing order dependencies for a sub-region of the render output to which the fragment relates in the second, main pass operation when a fragment is subjected to and passes a particular visibility test so as to be determined as needing to be processed further in the second, main pass operation, comprises setting the record indicative of processing order dependencies for the sub-region of the render output to which the fragment relates to indicate that the fragment does not have the processing order dependency in question (that is not to be enforced).

In this case, when the relevant sub-region fragment processing order dependency record, and in particular the eligibility information in that record for performing the particular processing operation, is then checked, it will show that the fragment in question is eligible to perform the processing operation in question.

Thus, in an embodiment, the eligibility information that is set for an entry in a processing order dependency record (list) should be, and is in an embodiment, set based on the particular form of visibility test that the fragment is to undergo in the second, main pass operation.

Correspondingly, the setting of the eligibility information for an entry in a processing order dependency record (list) is in an embodiment based on (and takes account of) the particular form of visibility test that the fragment or group of fragments for the entry in question is to undergo in the second, main pass operation (in addition to the other factor or factors discussed above that may be and are in an embodiment used when setting the eligibility information for an entry in a processing order dependency record (list)).

It would be possible in this regard to set the eligibility information for a fragment based on the particular form of visibility test that the fragment or group of fragments is to undergo in the second, main pass operation, either before or after the fragment has actually undergone the visibility test in the second, main pass operation, e.g., and in an embodiment, in dependence upon when the appropriate fragment processing order dependency record (list) is to be generated. For example, in particular in the case where the fragment processing order dependency records (lists) are generated before fragments undergo the relevant visibility test, then the eligibility information can be and should be, and is in an embodiment, accordingly set based on whether the fragment is to undergo the particular visibility test or not.

Thus, in an embodiment, the processing operation eligibility information (indications), indicating whether a particular processing operation or operations are eligible to be performed for a fragment or group of fragments that a processing order dependency record entry relates to, will be, for a fragment or group of fragments that will undergo the particular visibility test, set to indicate that the fragment or group of fragments (the entry) is eligible to perform the processing operation in question.

The fact that a fragment processing order dependency does not need to be (should not be) enforced for a fragment can be indicated and triggered (caused to happen) in any suitable and desired manner. For example, where, as discussed above, an indication that the visibility test that the primitive is to undergo is provided for a (and each) primitive, then the possibility to not enforce a fragment processing order dependency could be, and in one embodiment is, based on and identified from, the indication of the visibility test that a primitive is to undergo.

In an embodiment, an indication of whether a fragment processing order dependency should not be enforced (a "not-enforce" indication) is provided for, and set for, a (and each) primitive, as appropriate. For example, and in an embodiment, the primitives may be associated with suitable state information, such as a "not enforce" flag, that can be set to indicate whether a fragment processing order dependency should be enforced for a primitive (for the primitive's associated fragments) during the second, main pass operation, or not.

A single such "not enforce" processing order dependency indication could be provided and used for all potential processing order dependencies that a fragment could be subjected to, or it could be (and in an embodiment is) configured to apply to only some but not all of the fragment order processing dependencies, such as applying to a single type of processing order dependency only (such as colour buffer updates). Equally, a primitive could have associated with it more than one "not enforce" processing order dependency indication, e.g. each corresponding to a different processing operation for which a processing order dependency is tracked (and potentially) enforced.

Thus, it is in an embodiment determined for a (and in an embodiment for each) primitive that is to be processed during the first, pre-pass operation, whether the enforcing of any processing order dependencies for the primitive can be omitted, with the relevant "not enforce" processing order dependency indication or indications (e.g. flag or flags) for the primitive then being set accordingly.

To facilitate this, a primitive "not enforce" processing order dependency classification may be, and is in an embodiment, performed, that determines, in an embodiment based, as discussed above, on one or more properties of a primitive, whether any processing order dependencies for the primitive do not need to be enforced. Thus, in embodiments, the method further comprises (and the system is configured to perform) a step of determining, and in an embodiment setting an indication of, whether a primitive should have (all) its processing order dependencies enforced or not. As explained above, there are various conditions that mean that a processing order dependency need not be enforced for a primitive, and the step of classification in an embodiment checks whether one or more such conditions are met.

Thus, it is in an embodiment determined for a (and in an embodiment for each) primitive that is to be processed during the first, pre-pass operation whether there are any fragment processing order dependencies that do not need to be enforced for the primitive. To facilitate this, a primitive not-enforce classification may be performed that determines based on one or more properties of a primitive whether there are any fragment processing order dependencies that do not need to be enforced for the primitive.

The "not-enforce" classification and annotation for the primitives can be performed in any suitable and desired manner and at any suitable and desired stage of the graphics processing. Thus, for example, and in an embodiment, it may be determined during the first, pre-pass operation, and/or during the second, main pass operation (or at least duplicated between the first, pre-pass operation and the second, main pass operation). For example, the primitive "not enforce" classification (the checking of such condition (s)) could be performed at run-time, e.g. as part of the rendering operation, e.g., and in an embodiment, as part of the first, pre-pass operation, and/or as part of the second, main pass operation.

In an embodiment, the "not enforce" classification (selection) that sets the "not enforce" status for a primitive is performed after the pre-pass and before the main pass. In the case where a primitive classification is also performed before the pre-pass, in an embodiment that classification does not determine the not enforce status for a primitive for the main pass, with the not enforce status then being set in a second classification that is performed after the pre pass and before the main pass.

It may also be determinable in advance (e.g. at compile time) whether or not any such condition(s) are met by a primitive that would mean that a processing order dependency does not need to be enforced for the primitive. Thus, in some embodiments, the primitive not-enforce classification is performed in advance, e.g. by a driver for the graphics processor, e.g. with the result of such primitive "not enforce" classification then being compiled into an indicator, e.g. a flag, that indicates whether a processing order dependency should not be enforced for a primitive, and which indicator (flag) is provided to the graphics processor for the purposes of identifying whether a processing order dependency should not be enforced for a primitive or not. In that case, a step of primitive "not enforce" classification checking may be performed during the second, main pass operation that comprises using the indicator to determine whether a processing order dependency should not be enforced for a primitive. Various arrangements would be possible in this regard.

In an embodiment, the graphics processor receives primitives that are annotated accordingly, and the graphics processor (hardware) is configured to check, and performs a step of checking, the not enforce classification (e.g. flag) for each primitive that it receives for processing, to determine whether a processing order dependency should not be enforced for a primitive (should not be applied to and used for a primitive) during the second, main pass.

The primitive "not enforce" classification could be performed separately to the primitive classification operation that determines whether a primitive is compatible with being processed by the first, pre-pass operation (as discussed above), but in an embodiment is performed as part of (together with) the primitive classification operation that determines whether a primitive is compatible with being processed by the first, pre-pass operation.

In an embodiment, (even) in the case where a fragment passes the particular form of visibility test, such that a processing order dependency or dependencies for the fragment will not be enforced in the second, main pass operation, the fragment is still in an embodiment (appropriately) added to the relevant record or records indicative of processing order dependencies for those sub-regions of the render output to which the fragment relates (e.g., and in an embodiment, is added as a relevant entry (or to an existing entry) in the sub-region fragment processing order dependency lists), and is, correspondingly, and in an embodiment, still used to set and for controlling, for example, and in an embodiment, processing order dependencies for other fragments or groups of fragments.

The Applicants have recognised in this regard that even if a given processing order dependency or dependencies can be ignored for a particular fragment (and primitive) in the second, main pass, it may still be the case that that particular fragment (and primitive) will impose a dependency that needs to be enforced on another fragment or fragments (primitive or primitives), for example that follow the fragment that passes the particular fragment visibility test. Thus fragments that pass the particular visibility test are in an embodiment still added to (and included in) the fragment processing order dependency records appropriately, so that any effect that they may have on the processing of other primitives and fragments can be appropriately tracked and enforced.

In this case, when adding a fragment that has passed the particular visibility test to a fragment processing order dependency record, that should be done in an appropriate manner with, the entry for the "passing" fragment being set in the record appropriately. For example, as discussed above it may be noted in the record that the fragment itself does not have a (or any) particular processing order dependency that needs to be enforced, but, e.g., and in an embodiment, it will be noted (indicated) that the fragment should still be considered for a particular processing order dependency or dependencies for other fragments for the sub-region in question.

A fragment should otherwise be added to a fragment processing order dependency record in the second, main pass operation appropriately, e.g., and in an embodiment, based on any processing that the primitive and fragment has undergone in the first, pre-pass operation. Thus, for example, a fragment that undergoes a depth test in the pre-pass operation can be, and is in an embodiment, noted in the main pass as already having completed the depth test (and depth updates), such that they can be noted in any fragment processing order dependency record in the main pass as having already completed the depth tests (and updates), such that no depth dependencies should be and are noted for such fragments in the second, main pass.

Various arrangements would be possible in this regard.

It should also be noted here that the operation in accordance with the technology described herein and the present embodiments applies to the enforcing (or not) of particular fragment processing order dependencies, e.g., and in an embodiment, for particular fragment processing operations. There may be other dependencies relating to fragments that may mean that the processing of fragments should be stalled, and those processing dependencies should be, and are in an embodiment, still appropriately enforced, irrespective of the form of visibility test (if any) that a fragment may undergo in the second, main pass operation.

For example, it may be the case that processing of fragments is begun before physical memory for storing the results of that processing is allocated, such that there will be a point in the fragment processing that cannot be gone beyond until the actual physical memory for storing the results of the fragment processing has been allocated. In this case, if the physical memory has not been allocated yet, then the fragment processing should be, and in an embodiment is, stalled at the appropriate point until the physical memory has been allocated. Any such memory allocation dependencies should be, and are in an embodiment, still enforced and applied when processing the fragments, irrespective of what form of visibility test a fragment may undergo (and pass).

The Applicants have further recognised that there may be situations in which the operation in the manner of the technology described herein is undesirable. Thus, in an embodiment, the operation in the manner of the technology described herein can be, and in an embodiment is, selectively enabled and/or disabled. This may be done, for example, for respective render outputs and/or for respective sequences of primitives within a given render output. In the case where the operation in the manner of the technology described herein is disabled, then all fragment processing order dependencies should be, and are in an embodiment, enforced and applied, irrespective of the form of visibility test that a fragment may undergo.

The selective disabling of the operation in the manner of the technology described herein can be achieved in any suitable and desired manner. For example, and in one embodiment, the primitive classification operation could be configured to not flag any primitives as undergoing the particular visibility test and/or as being able to ignore a particular fragment processing order dependency in the case where that operation is to be disabled. Additionally or alternatively, the operation of the dependency checking could be, and in an embodiment is, configured so as to be unable to ignore (so as to not ignore) any indicated dependencies in a fragment processing order dependency record, irrespective of whether the appropriate visibility test and/or "can ignore" dependency indication (flag) is set for a primitive.

In one embodiment, the operation in the manner of the technology described herein is disabled in the case where there is a pre-frame shader to be executed that is to undergo something other than the particular visibility test (e.g. the EQUALS test) that indicates that processing order dependencies do not need to be enforced. (A pre-frame shader may, for example, be run in certain conditions prior to rendering the application-specified geometry, for example to pre-load the depth, stencil and/or colour buffers with data.) In this case, primitives and fragments that perform the particular (e.g. EQUALS) visibility test will have a dependency on any pre-frame shader that does not perform the particular (e.g. EQUALS) visibility test, and so their processing order dependencies with respect to the pre-frame shader cannot and should not be ignored (should be enforced). In this case, the primitives may, for example, not be flagged as performing a visibility test that allows processing order dependencies to (potentially) not be enforced.

In an embodiment, an indicator (a flag) can be set to disable the operation in the manner of the technology described herein. In this case, in an embodiment of this operation, primitives can still be flagged as being able to ignore fragment processing order dependencies, but the dependency checking operation is configured so as to be not allowed to ignore any dependencies indicated by a fragment processing order dependency record.

As discussed above, in the technology described herein, the enforcing of a processing order dependency can be omitted in the second, main pass, in the case where a fragment undergoes and passes a particular visibility test so as to be determined to be processed further in the second, main pass.

However, such not enforcing of a processing order dependency is in an embodiment not applied in the other modes of operation that are possible in the technology described herein, such as, and in an embodiment, in the pre-pass operation and/or any fall-back operation (as discussed above). Most in an embodiment, fragment processing order dependencies are tracked and enforced, as appropriate, in the normal manner for the graphics processor and graphics processing system in question in respect of both the pre-pass operation and any fall-back operation, irrespective of the particular form of visibility test that a fragment may be set to undergo and may undergo in the second, main pass operation.

Thus, in embodiments, it is only in the second, main pass operation (if performed for a primitive and fragment) that a processing order dependency may not be enforced based on the particular visibility test that a fragment undergoes in the main pass operation. Correspondingly, in an embodiment, fragment processing order dependencies are tracked and enforced (appropriately) in the pre-pass operation and in any fall-back operation, as appropriate (and in this case, any and all fragment processing order dependencies that are identified should be and are in an embodiment tracked and enforced in the appropriate manner, irrespective of what form of visibility test a fragment may be set to undergo in the second, main pass operation, and irrespective of whether a fragment undergoes the particular form of visibility test in the second, main pass operation).

In an embodiment, depth processing order dependencies are tracked and enforced in the pre pass operation, at least in (and in an embodiment only in) the case where fragment shading is done to determine the final visibility, but colour updates and/or colour read dependencies are not tracked (or enforced) in the pre pass operation (at least in the case where, as is in an embodiment the case, the prepass is not allowed to, and does not, update the colour buffer). In an embodiment if no fragment shading is performed in the pre-pass, no fragment dependencies are tracked (or enforced) in the pre pass at all.

In the case of the fallback operation, in an embodiment both colour and depth processing dependencies are appropriately tracked and enforced.w Embodiments of the technology described herein relate to tile-based rendering. Thus, in embodiments the graphics processor is configured to perform tile-based rendering. The graphics processor may therefore have any suitable and desired processing stages and/or elements that a graphics processor may have when performing tile-based rendering.

When processing a render output in such tile-based rendering systems, an initial tiling operation is performed in order to sort the geometry, which is defined in terms of a set of primitives to be processed for the render output, relative to the rendering tiles into which the render output is subdivided for rendering. The result of this tiling operation is to generate a set of primitive lists indicative of the distribution of the primitives relative to the tiles that can be used to identify which primitives are to be rendered for which tiles. The actual rendering of the tiles is then performed in a subsequent rendering operation, with the tiles in an embodiment being rendered separately, e.g. one after another.

The operation of the technology described herein is in an embodiment performed as part of the tile rendering operations performed in response to the graphics processor receiving a command to render a tile. That is, the "pre-pass" operation is in an embodiment performed within a rendering tile. The sequence of primitives that are processed in the manner described above therefore in an embodiment correspond to a sequence of primitives to be rendered for a respective rendering tile (e.g. as identified using one or more primitive lists associated with that tile that have been generated during the tiling operations).

In an embodiment the rendering of primitives in the manner of the technology described herein, including the pre-pass operation, can be (and in an embodiment is) initiated automatically as part of the rendering operations that are performed in response to the graphics processor receiving and processing a command to render a tile. The rendering of primitives in the manner of the technology described herein, including the pre-pass operation, is therefore in an embodiment performed under full control of the graphics processor (e.g. rather than having a software application configured to render the entire scene twice).

That is, when (e.g., and in an embodiment, whenever) a new sequence of primitives for a tile is issued for rendering, in response to a command to render a tile, the graphics processor is in an embodiment configured to automatically initiate a "pre-pass" operation for processing the primitives. Further, this can be (and in an embodiment is) done entirely within the rendering stage of a tile-based rendering system, and so after the initial geometry processing to generate the tile-lists has been completed. This approach can provide various benefits.

For example, in a tile-based rendering system, a command processing circuit (command stream frontend) of the graphics processor will typically receive a stream of commands to control the operation of the graphics processor. In particular, when performing tile-based rendering, the stream of commands will in an embodiment include a first set of commands to cause the graphics processor to perform the initial geometry processing (tiling) to sort the primitives into respective primitive lists and a second set of commands to cause the graphics processor to subsequently render the tiles accordingly using the primitive lists. A respective rendering command may thus be, and in an embodiment is, provided in respect of each of the tiles into which the render output is sub-divided, wherein when such command is processed, the graphics processor is caused (by processing further commands) to identify the primitives to be rendered for the tile in question and then render the primitives in turn.

The commands are in an embodiment generated by a, e.g., main (e.g. host) processor (e.g. a CPU) that requires the graphics processing to be performed. In particular, the command streams (commands) may be generated by a driver for the graphics processor. The rendering command that triggers the pre-pass operation of the technology described herein may thus comprise a command that has been generated by the driver. In embodiments the driver-generated commands are further processed by the command processing circuit (command stream frontend) of the graphics processor to schedule processing work for the graphics processor. Thus, the command processing circuit (command stream frontend) of the graphics processor may also generate based on the driver-generated commands further 'commands' (tasks) for the graphics processor. The rendering command that that triggers the pre-pass operation of the technology described herein could thus also comprise a command that is generated by the command processing circuit (command stream frontend) of the graphics processor. Various arrangements would be possible in this regard.

By configuring the graphics processor to automatically perform such a pre-pass operation as part of the rendering operations that are performed in response to a command to render a tile, the processing can be more efficiently managed in hardware, as the control of the pre-pass is performed entirely by the graphics processor, e.g., and in an embodiment, without user specification. This therefore reduces the burden on the application programmer as the graphics processor (hardware) is configured to automatically perform the pre-pass operation to achieve hidden surface removal for whatever sequence of primitives are drawn for the scene, as part of the standard rendering operations performed in response to a command to render a tile.

Subject to the requirements of the technology described herein, the graphics processor can otherwise be configured in any suitable manner as desired.

The graphics processor of the technology described herein in an embodiment comprises a geometry processing (tiling) circuit and a rendering circuit.

The geometry processing (tiling) circuit is configured to generate primitive lists. The sorting of the primitives relative to the tiles can be done in any suitable manner, e.g. in the normal way for generating primitive lists. The primitive lists may be prepared for any suitable regions of the render output. Thus, there may or may not be a one-to-one correspondence between the primitive lists and the actual rendering tiles.

Once all of the geometry has been processed, the primitive lists are in an embodiment then written out, e.g. to external (e.g. main) memory.

The primitive lists are then used during a subsequent rendering state in order to perform the actual rendering of the individual tiles. The rendering circuit of the graphics processor thus in an embodiment comprises a primitive list reading circuit that is configured to, when a tile is issued for rendering, identify using the respective primitive list or lists applying to the tile in question a sequence of primitives that should be processed for the tile.

The primitive list reading circuit is thus in an embodiment configured to obtain the primitive lists, e.g. from memory, identify a sequence of primitives that should be processed for the tile and issue the identified primitives for rendering. This may be done in any suitable and desired manner, e.g. depending on the format of the primitive lists. For example, where the primitive lists apply to hierarchically arranged regions of the render output (such that there is not necessarily a one-to-one correspondence between primitive lists and tiles to be rendered and such that a given tile may be associated with multiple primitive lists) the step of identifying the sequence of primitives may comprise processing multiple primitive lists and merging primitives from the multiple primitive lists into the desired rendering order.

These operations are in an embodiment performed in response to a command to render a tile. The identified primitives are then issued accordingly into a rendering pipeline for further processing, as will be explained further below. In some embodiments however the sequences of primitives may be identified in advance (and, e.g., pre-fetched) of the graphics processor executing the rendering command that triggers the pre-pass operation. Various arrangements would be possible in this regard.

The technology described herein relates particularly to the rendering operations that are performed on the primitives that are identified to be processed. The rendering is in an embodiment performed in a pipelined manner as a series of processing stages. Subject to the requirements of the technology described herein the rendering pipeline may in general comprise any suitable and desired processing stages that a graphics processing (rendering) pipeline may contain.

In particular the rendering according to the technology described herein uses a rasterisation-based approach.

The rendering circuit (pipeline) of the graphics processor of the technology described herein thus generally includes a rasteriser for processing primitives into respective sets of fragments and a renderer that is configured to process (render) the resulting fragments to determine the appearance (e.g. colour) that corresponding sampling positions should have in the final render output.

The rasteriser (rasteriser circuit) can be configured to operate in any suitable and desired manner, for example as in known rasterising arrangements. It should operate to generate graphics fragments for processing in dependence upon which sampling positions (or which sets of sampling positions) of an array of sampling positions covering the area of the render output, a given primitive, etc., received by the rasteriser covers (at least in part).

The rasteriser in an embodiment generates a graphics fragment for each sampling position covered by, and/or for each set of plural sampling positions (e.g., sampling mask) found to include a sampling position that is covered by, the (and each) primitive being rasterised (and that is not otherwise culled from processing for another reason, such as by the primitive failing an early depth test).

Correspondingly, each fragment generated by the rasteriser may represent (have associated with it) a single sampling position, or plural sampling positions, as desired. In an embodiment, each fragment represents a set of plural, in an embodiment a set of four (and in an embodiment a 2×2 array of), sampling positions.

Each fragment that is generated by the rasteriser for a primitive will represent and be used to render one or more sampling positions of the set of sampling position(s) that the fragment corresponds to that the primitive in question has been determined to cover. As it can be the case that a primitive may not cover all the sampling positions that a fragment corresponds to, each fragment in an embodiment has associated with it, e.g. by the rasteriser, suitable "coverage" information, such as a coverage mask, indicating which of the sampling positions that the fragment corresponds to, are actually covered by the primitive that the fragment is for (the sampling positions that the primitive in question should be rendered for).

The renderer (fragment processing circuit) of the graphics processor should be operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc. In embodiments the renderer comprises a fragment shader (a shader pipeline) (i.e. a programmable processing circuit that is operable to and that can be programmed to carry out fragment shading programs on fragments in order to render them).

The renderer (fragment processing circuit) will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile (e.g. colour) buffer (as will be the case in a tile-based graphics processing system).

The technology described herein may generally find application in any suitable graphics processing system. The technology described herein relates particularly to tile-based rendering systems.

The technology described herein can be used for all forms of output that a graphics processing pipeline may be used to generate, such as frames for display, render-to-texture outputs, etc.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that graphics processors may also generally be used for processing other, e.g. non-graphics, data and that the technology described herein may therefore also be applied to other contexts as well.

FIG. 1 shows an exemplary graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments, the appropriate commands and data for performing the processing tasks required by the application 2 are provided to the graphics processor 3 in the form of one or more command streams, that each include sequences of commands (instructions) to cause the graphics processor to perform desired processing tasks.

The overall preparation of the command streams is performed by the driver 4 on the host processor 1 and the command streams may, for example, be stored in appropriate command stream buffers, from where they can then be read by the graphics processor 3 for execution. Each command stream will typically contain commands (instructions) to set parameters for graphics processor tasks, as well as commands (instructions) to execute a task, etc.

Figure 2:
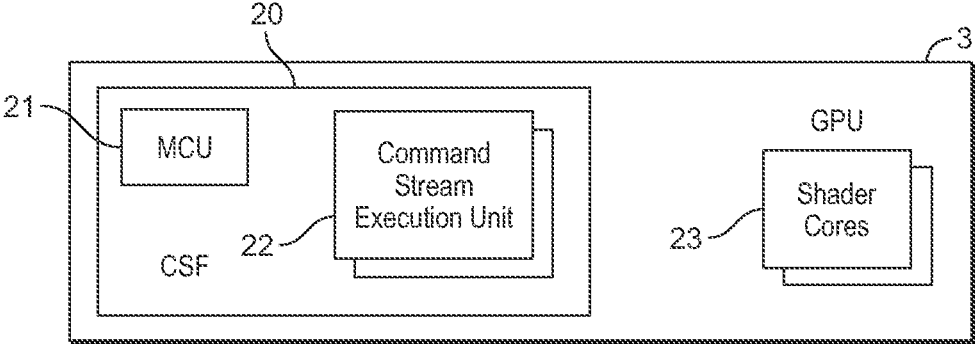
FIG. 2 shows schematically a graphics processor that can be operated in the manner of the technology described herein.

In order to facilitate this operation, the graphics processor 3 includes, as shown in FIG. 2, a command stream frontend 20 that includes a command stream supervisor (controller) 21 (in the form of a microcontroller) that is operable to schedule and issue commands from the command streams to respective command stream execution units 22. The command stream execution units 22 then execute the commands in the respective command streams to trigger the processing execution units 23 of the graphics processor (which in the present example are shown as comprising a plurality of shader cores, although other arrangements would, of course, be possible) to perform the desired processing tasks.

The present embodiments relate particularly to graphics processing systems that use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

In a tile-based rendering system, it is accordingly usually desirable to be able to identify and know those primitives that are actually present in a given sub-region (e.g. tile), so as to, e.g., avoid unnecessarily rendering primitives that are not actually present in a tile. In order to facilitate this, it is known to prepare for respective sub-regions of the render output (which sub-regions may correspond to respective tiles, but could also, e.g., correspond to a group of tiles) a list of the primitives to be rendered for that sub-region (e.g. that will appear in the sub-region). Such a "primitive list" (which can also be referred to as a "tile-list") identifies (e.g. by reference to a primitive indicator) the primitives to be rendered for the sub-region in question (and hence can be used to identify the primitives to be rendered for the respective tile or tiles corresponding to the sub-region in question).

The process of sorting the primitives according to the regions of the render output is commonly referred to as "binning" and is usually carried out by determining (at a desired level of accuracy) the primitives that intersect (i.e. that will appear (at least in part) within) the region in question, and then preparing a list of those primitives for future use by the graphics processing system. (It should be noted here that where a primitive falls into more than one region (as will frequently be the case), it is included in the primitive list for each region that it falls within.)

Figure 3:
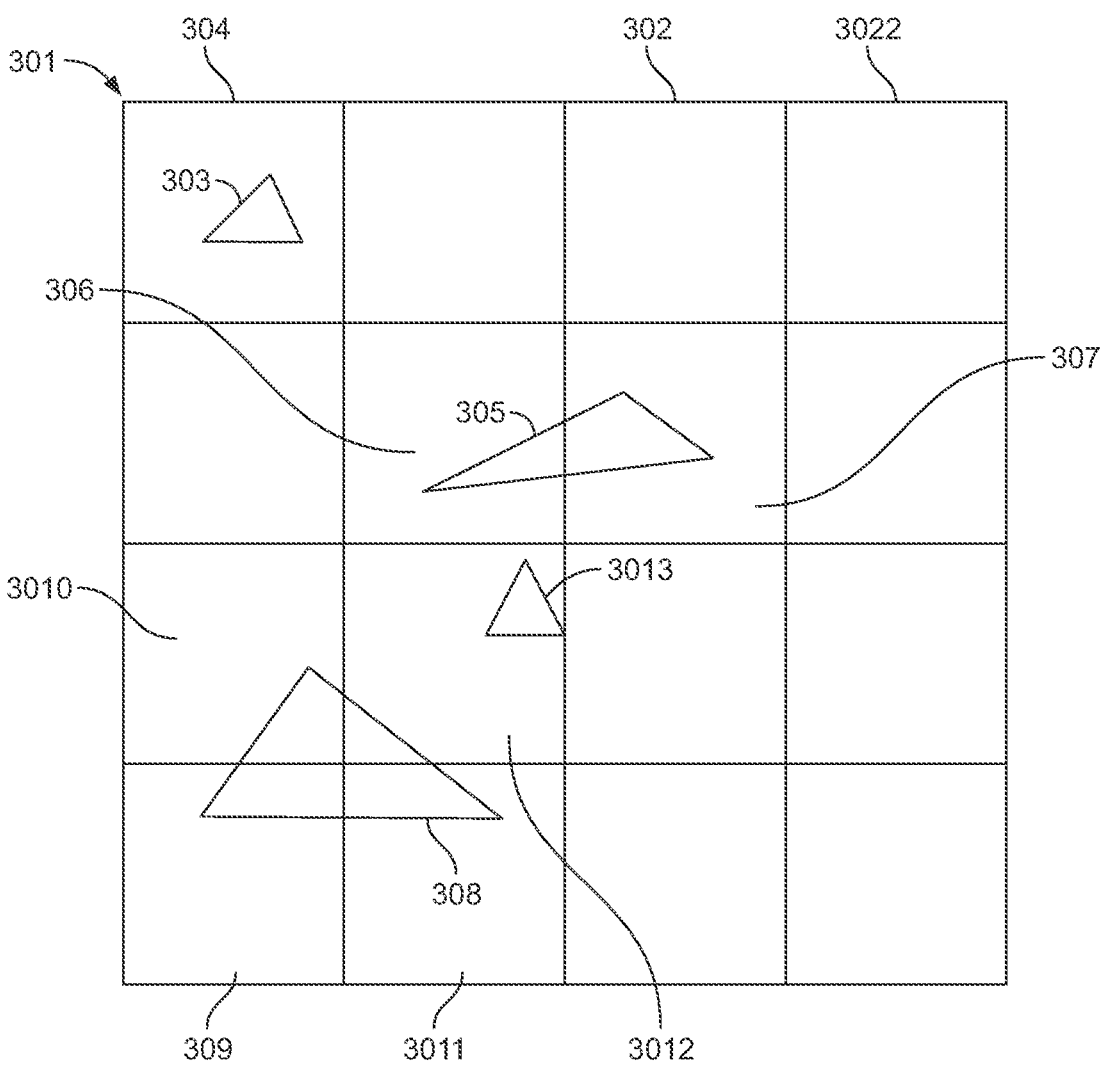
FIG. 3 illustrates an exemplary tile-based rendering operation.

FIG. 3 illustrates an "exact" binning process, where it is determined exactly which tiles a given primitive will appear at least in part in, and the primitive then included in the primitive lists for those tiles only. As shown in FIG. 3, the scene 301 to be displayed is divided into sixteen regularly sized sub-regions or tiles 302. It is then determined for each primitive in the scene, which tile or tiles the primitive actually appears (falls) within. The primitive is added to the primitive list for each tile that it is found to fall within. Thus, taking the example shown in FIG. 3, the primitive 303 is added to the primitive list for tile 304, the primitive 305 is included in the primitive list for tiles 306 and 307, the primitive 308 is included in the primitive lists for tiles 309, 3010, 3011 and 3012, and the primitive 3013 is included in the primitive list for tile 3012. (It should be noted here that FIG. 3 shows only a few tiles and primitives for clarity purposes. As will be appreciated by those skilled in the art, in an actual graphics processing operation, there will typically be many more primitives and tiles.)

It is also known however to prepare primitive lists with a lower precision than is achieved with exact binning. This can be useful to, e.g., simplify the preparation of the primitive lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part). Thus, it will be appreciated that the process of determining the primitives that should be listed (rendered) for any given region described above (the "binning" process) can be carried out at varying levels of precision, for example depending on efficiency optimisations for different parts of the tiling and rendering processes.

Once lists of primitives to be rendered (primitive lists) have been prepared for each sub-region (tile) in this way, the (primitive) lists are stored for use, e.g., to allow the system to identify which primitives need to be considered (and rendered) for the respective rendering tiles.

The advantage of such tile-based rendering is that primitives that do not appear in a given tile do not have to be processed for that tile, and therefore can be ignored when the tile is processed. This can allow the overall amount of graphics processing necessary for a given scene to be reduced.

Figure 4:
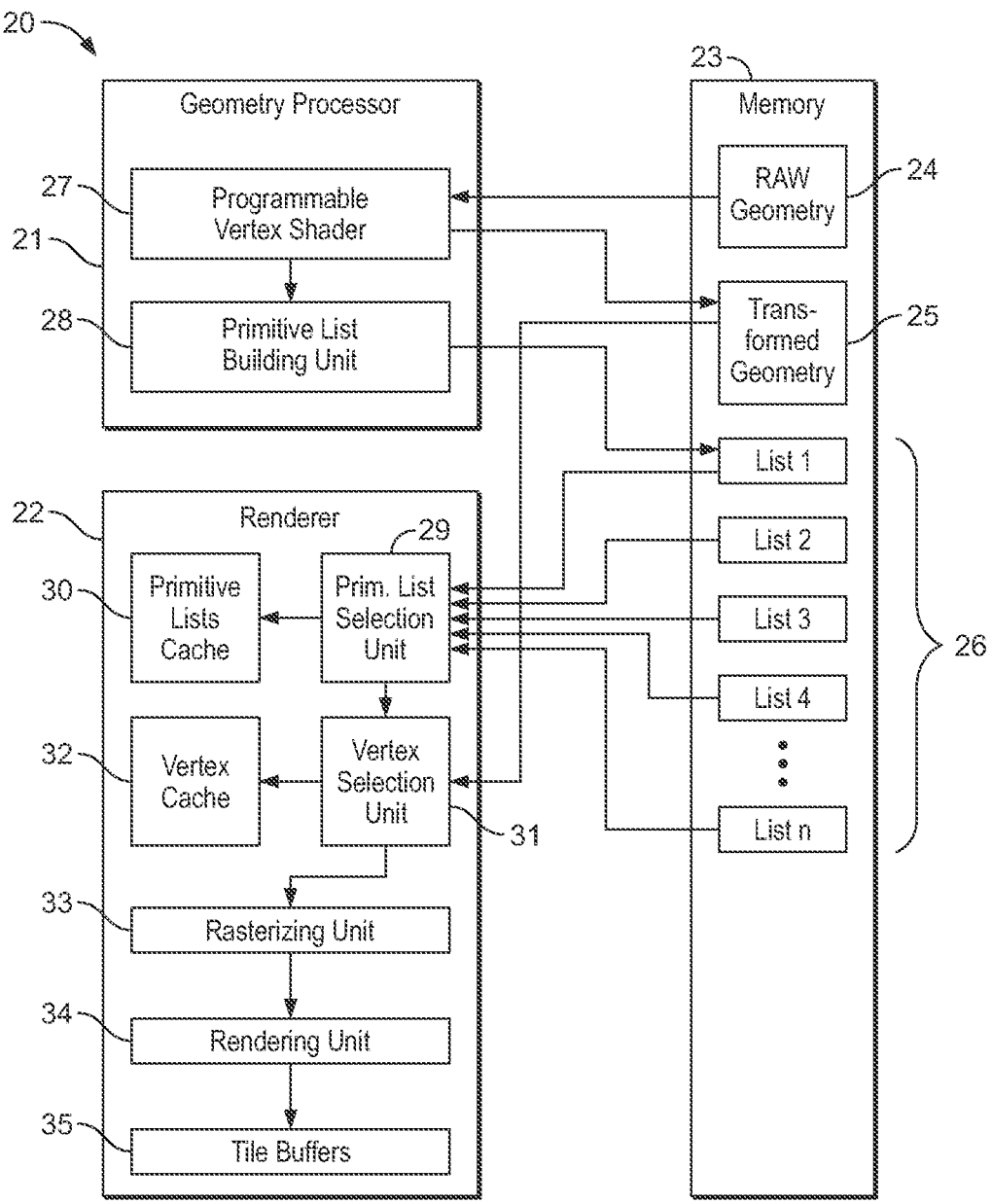
FIG. 4 and FIG. 5 schematically illustrate the operation of a traditional tile-based graphics processing system.

FIG. 4 shows schematically a graphics processor 420 that is configured to perform such tile-based rendering. The graphics processor 420 includes a geometry processor 421, and a renderer 422, both of which can access a memory 423. The memory 423 may be "on-chip" with the geometry processor 421 and renderer 422, or may be an external memory that can be accessed by the geometry processor 421 and renderer 422.

The memory 423 stores, among other things, and as shown in FIG. 4, a set of raw geometry data 424 (which is, for example, provided by the graphics processor driver or an API running on a host system (microprocessor) of the graphics processor 420), a set of transformed geometry data 425 (which is the result of various transformation and processing operations carried out on the raw geometry 424), and a set of primitive lists 426. The transformed geometry data 425 comprises, for example, transformed vertices (vertex data), etc.

The geometry processor 421 comprises, among other things, a programmable vertex shader 427, and a primitive list building unit 428. The programmable vertex shader 427 takes as it's input the raw geometry data 424 stored in the memory 423, and processes that data to provide transformed geometry data 425 (which it then stores in the memory 423) comprising the geometry data in a form that is ready for two-dimensional ('2D') placement in the frame to be displayed. The programmable vertex shader 427 and the processes it carries out can take any suitable form and be any suitable and desired such processes.

The primitive list building unit 428 carries out the tiling and primitive list preparation processes of allocating the primitives (or draw calls of primitives) to the primitive lists which are then used by the renderer 422 to identify the primitives (draw calls) that should be rendered for each sub-region of the scene to be rendered (and includes suitable circuitry for doing this). To do this, the primitive list building unit 428 takes as its input the transformed and processed vertex data from the programmable vertex shader 427 (i.e. the positions of the graphics object in the scene), builds primitive lists using that data, and stores those lists as the primitive lists 426 in the memory 423.

The renderer 422 includes a primitive list selection unit 429, a primitive list cache 430, a vertex selection unit 431, a vertex data cache 432, a rasterising unit 433, a rendering unit 434, and tile buffers 435.

The rasterising unit 433, rendering unit 434, tile buffers 435 operate, in this embodiment, in the same manner as such units normally operate in graphics processing systems. Thus the rasterising unit 433 takes as its input a primitive and its vertices, rasterises the primitive to fragments, and provides those fragments to the rendering unit 434. The rendering unit 434 then performs a number of rendering processes, such as texture mapping, blending, shading, etc., on the fragments, and generates rendered fragment data which it stores in the tile buffers 435 for providing to a frame buffer for display.

The primitive list selection unit 429 of the renderer 422 determines which primitive (or, e.g., which draw call, where primitives are batched together into draw calls), is to be rendered next. It does this by considering the primitive lists 426 stored in the memory 423, and selecting from one of those lists the next graphics object (e.g. primitive, or draw call) to be rendered.

The primitive list selection unit 429 provides the primitive that it has selected for rendering next to the vertex selection unit 431. In response to this, the vertex selection unit 431 obtains the relevant vertex data for the primitive in question, and then provides the primitive (i.e. its transformed vertex data) to the rasterising unit 433 for processing. The obtaining of the vertex data can be done in various ways as desired. For example, in some embodiments, the vertex selection unit 431 retrieves the appropriate transformed vertex data for the primitive in question from the transformed geometry data 425 stored in the memory 423. In that case, the transformed vertex data may be generated up-front by the programmable vertex shader 427 of the geometry processor 421 and then stored appropriately for subsequent use by the renderer 422. In other embodiments however the vertex selection unit 431 may itself trigger vertex shading. That is, in embodiments, as will be described further below, the renderer 422 may also comprise a programmable vertex shader (not shown in FIG. 4) that is operable to take as it's input the raw geometry data 424 stored in the memory 423, and processes that data to provide transformed geometry data, as desired. That is, in some embodiments, some or all of the vertex shading may be performed by the renderer 422. Various arrangements are contemplated in this regard.

The vertex selection unit 431 can cache vertex data that it has retrieved from the memory 423 in the vertex data cache 32, if desired. The primitive list selection unit 429 can also place one or more primitive lists in the primitive list cache 430. For example, the primitive list cache 30 and the vertex data cache 32 may comprise local memory provided on the renderer 422 that can be more rapidly accessed by processing units of the renderer (and in particular the primitive list selection unit 429 and vertex selection unit 431, respectively) than the main memory 423.

Figure 5:
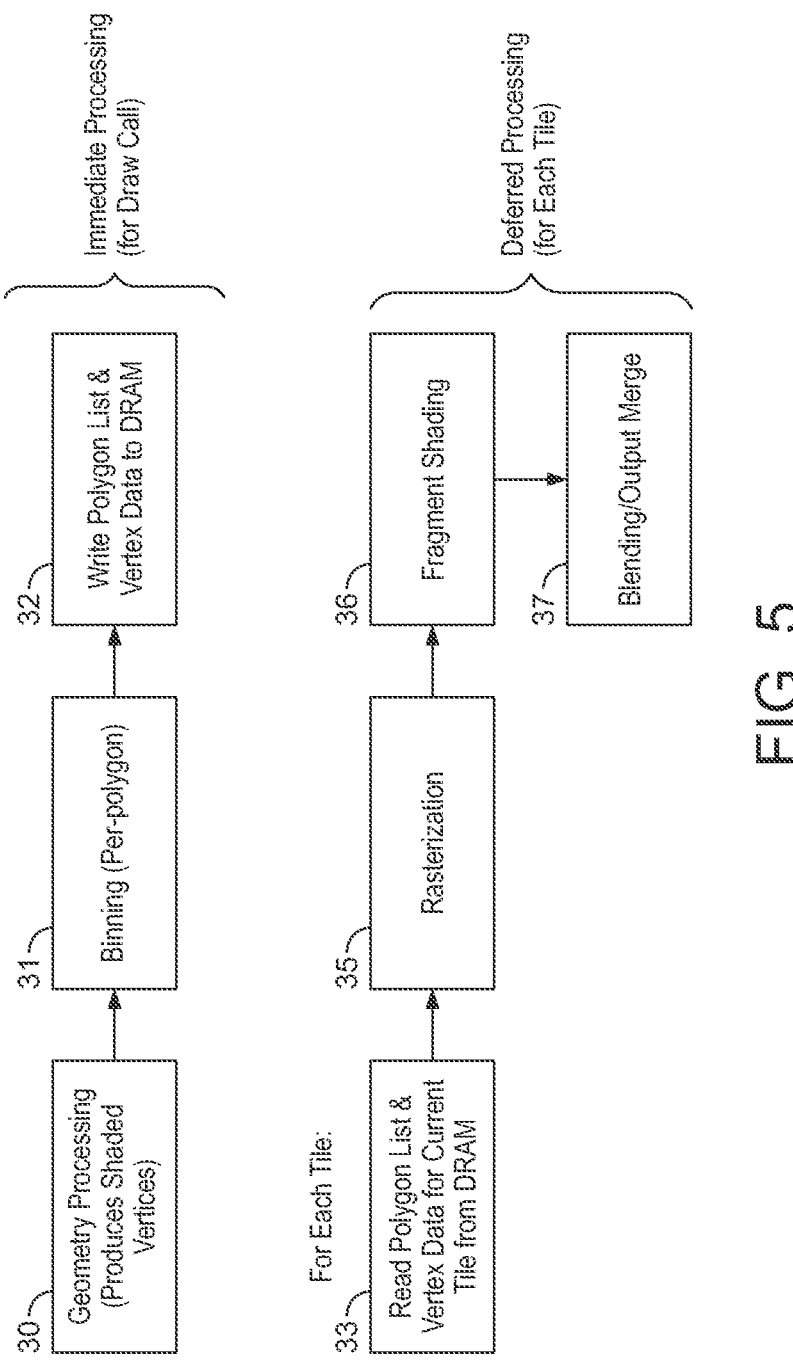

In the tile-based rendering scheme described above, a first processing stage (that is performed by the geometry processor 421) thus acts to process, e.g. sort, all of the geometry for the render output, to generate a set of primitive lists identifying which primitives should be rendered for which regions of the render output. The rendering of the individual tiles is then performed in a second processing stage (in the renderer 422). Thus, for each rendering tile, it is determined from the respective tile list(s) which primitives should be processed for that tile, and the associated transformed geometry data for those primitives is obtained, and subjected to further graphics processing to generate the desired, final rendered output data. As shown in FIG. 5, the rendering is performed using a tile buffer 435 that resides locally to the renderer 422, e.g. in on-chip memory. Thus, the rendering of a given tile is performed locally to the graphics processor. Once the rendering for the tile has complete, the rendered data is then written out to the memory 423, e.g. into a frame buffer, e.g. for display. The overall processing flow in a tile-based rendering scheme is shown, for example, in FIG. 5.

As shown in FIG. 5, in the first ("immediate") processing stage, all of the geometry-related processing for the primitives is performed (step 530), to produce a set of shaded vertices for the primitives, and a tiling operation (step 531) is then performed for the primitives to generate the primitive lists, which are then written back to the external memory, together with the shaded vertex data (step 532). This data is then used in a second ("deferred") processing stage during which the render output is generated by rasterising/rendering the polygons using their associated geometry. Thus, as shown in FIG. 5, the second processing stage involves reading in the primitive list and vertex data for the current tile (step 533), and then performing the desired rendering operations to determine the desired rendered output data.

The second processing (rendering) stage thus uses the primitive lists generated by the first processing stage to identify which primitives should be rendered for which tiles, and the individual tiles are then rendered (separately), e.g. one-after-another. Thus, when rendering a tile, the vertex data for the primitives to be rendered for that tile is obtained (which may involve obtaining the transformed geometry 425 from memory 423 but may also involve re-shading the raw vertex data 424, and various arrangements are possible in this regard for performing some or all of the geometry processing during the second processing stage). The shaded vertices for the primitives indicated to be processed for the tile are then rasterised into respective sets of fragments (step 535), and fragment shading operations are performed on the resulting fragments (step 536). Finally, the shaded fragments are subject to a blending operation (step 537), and any other such operations (such as downsampling, etc.) and the blended fragment values are then written into a suitable frame buffer, e.g. for display.

The present embodiments relate particularly to the rendering operations performed by the second ("deferred") processing stage within a tile-based rendering system. It will be appreciated that the rendering operations are triggered by the graphics processor receiving and processing a command to render a tile. For example, as described above in relation to FIG. 1 and FIG. 2, the graphics processor 3 is controlled to perform graphics processing work for an application 2 executing on a host processor 1 by a driver 4 for the graphics processor 3 preparing a command stream including commands to cause the graphics processing to perform the desired graphics processing work.

The commands prepared by the driver 4 are thus processed by the command stream frontend 20 accordingly to schedule processing work for the graphics processor's functional units. This is illustrated, for example, in FIG. 6.

Figure 6:
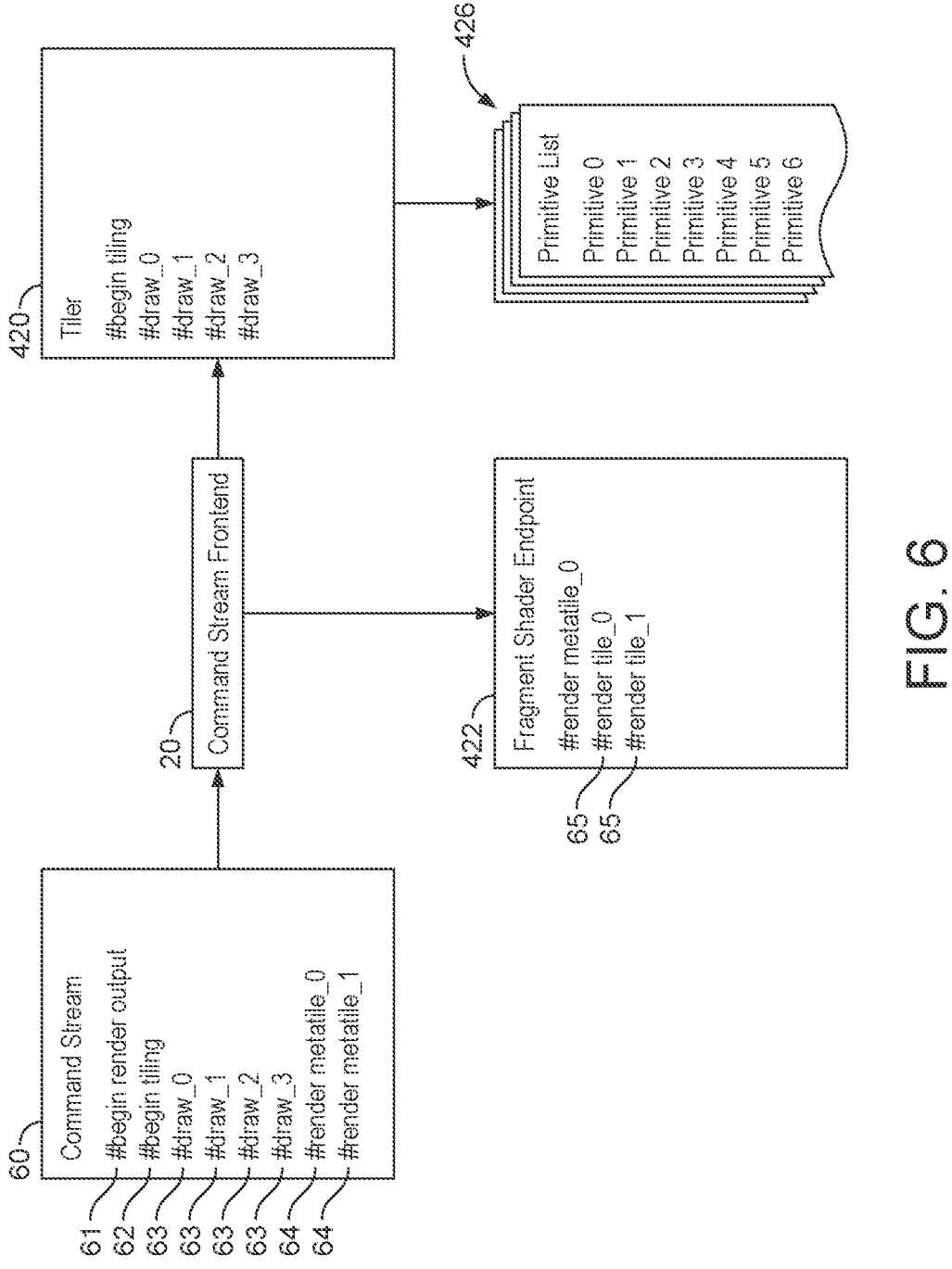
FIG. 6 schematically illustrates a command stream for causing a graphics processor to perform tile-based rendering.

FIG. 6 shows schematically an example command stream 60 for causing a graphics processor to perform tile-based rendering in the manner described above. The command stream thus starts with a suitable "begin render output" command 61 that initialises the graphics processor for the current render output (e.g. scene). This is then followed in the command stream 60 by a "begin tiling" command 62 that when executed causes the graphics processor to perform the up-front geometry processing (e.g. tiling) operations for the render output. This is then followed by a sequence of respective draw commands 63 defining the geometry for the render output that is to be processed. These draw commands are thus processed by the command stream frontend 20 to trigger the geometry processor 420 to perform the required vertex shading and primitive list building operations described above.

The result of this processing is therefore to generate a set of primitive lists which each include a respective list of primitive commands corresponding to the primitives that it has been determined should be rendered for the region(s) of the render output for which the primitive list has been prepared for. As described above, once all of the geometry has been processed and the respective primitives lists generated, the initial geometry processing operation is then complete.

The commands 62, 63 relating to the initial geometry processing operations are accordingly then followed by respective commands 64 to trigger the subsequent rendering operations. In the example shown in FIG. 6 the commands prepared by the driver 4 include commands 64 to render larger area regions ("metatiles") of the render output including groups of rendering tiles (i.e. the regions into which the render output is subdivided for rendering purposes). These metatile commands 64 are then passed to the graphics processor fragment shader endpoint that splits the metatile commands into respective processing tasks for the respective rendering tiles 65. The fragment shader endpoint then controls the scheduling and issuing of tasks 65 (e.g. for rendering tiles) to the renderer 422 for rendering. The processing of a metatile command by the command stream frontend 20 thus triggers the scheduling of one or more tile rendering tasks by the fragment shader endpoint. The fragment shader endpoint will then issue the tile rendering tasks to the renderer 422 in turn, which will trigger a sequence of processing (rendering) operations to be performed for the tile, as will be described further below.

Various other arrangements would however be possible in this regard. For example, rather than the driver 4 preparing commands relating to larger processing jobs ("metatiles") that are then split into smaller processing task (tiles) by the fragment shader endpoint, the command stream that is provided by the driver 4 to the command stream frontend 20 may itself include commands to render individual rendering tiles, such that the fragment shader endpoint schedules such tasks accordingly, but does not divide the overall processing job (metatile) into separate tiles for rendering purposes. In that case, the rendering operations (for a tile) may be triggered directly by the commands that are prepared by the driver 4.

It will also be appreciated that FIG. 6 shows a simplified command stream for illustrative purposes and that a typical graphics processing command stream may include many more commands and different types of commands to those shown in FIG. 6. Various arrangements would be possible in this regard.

In any event, in response to the graphics processor command stream frontend 20 encountering an appropriate rendering command (whether that be a command to render a metatile that launches a plurality of tile rendering tasks, or a command to render a tile as such), this ultimately triggers the rendering of a tile, in which the renderer 422 is caused to perform a desired sequence of processing operations in order to render the tile. The rendering command therefore triggers the renderer 422 to automatically perform a certain sequence of processing operations to generate the desired rendered output data for the tile in question. In particular, in response to such command, the renderer 422 may be (and ultimately is) caused to obtain via the primitive list selection unit 429 the primitive list or lists for the tile in question to identify the primitives to be rendered, obtain the relevant vertex data for the primitives, and then rasterise and render the primitives accordingly, e.g. as described above.

In the present embodiments however, rather than the rendering command triggering a rendering operation in which primitives are rasterised and then rendered in full (as necessary) in a single rendering pass, e.g., as in the second processing stage depicted in FIG. 5, a novel "pre-pass" operation is introduced into the processing operations that are automatically performed in response to the rendering command, such that the rendering of primitives for a (and each) tile is effectively divided into two separate processing passes (although in some cases there may be more than two processing passes, in particular when a third, "fallback" operation is triggered during the rendering of a tile, as will be explained further below). In the present embodiments, the fragment shader endpoint when scheduling the rendering of a tile is accordingly configured to split the rendering of a tile into two processing passes, such that the same tile is effectively issued for rendering twice, but with the graphics processor configured to perform different sequences of processing operations for the respective, different processing passes.

In particular, and as will be explained further below, when rendering a sequence of primitives for a tile (which sequence of primitives may be the entire sequence of primitives for the tile, or may be a draw call for the tile, for example), the processing of primitives in the sequence of primitives is performed in two passes whereby a first, "pre-pass" operation is initially performed to process the primitives to determine a set of "visibility" information for the sequence of primitives, and which first, pre-pass operation is followed by a subsequent, "main" pass operation that processes at least some of the primitives that were processed by the corresponding first, pre-pass operation again to complete their rendering and produce the final rendered output data (e.g. to determine the appearance (e.g. colour) that the respective sampling positions covered by the primitives should have in the final render output). Thus, for a given tile to be rendered, the fragment shader endpoint will schedule respective tasks for the renderer 422 to perform a first, "pre-pass" operation and to then perform a corresponding "main" pass operation.

According to the present embodiments, the first, pre-pass operation therefore does not produce any rendered output data, but instead serves only to determine a set of "visibility" information for the sequence of primitive. As will be explained further below, the "visibility" information can take various suitable forms but generally reflects whether or not a given fragment for a primitive in the sequence of primitives is visible (and hence whether or not the fragment should be processed further for the render output). The visibility information determined by the first, pre-pass operation can thus be (and is) subsequently used during the corresponding second, main pass operation in order to control the processing of fragments during the second, main pass, e.g., and in particular, to cull any fragments for which it can be determined from the visibility information that the fragments have no visible effects, and therefore do not need to be processed further. This then has various benefits in terms of providing improved, e.g. sample-perfect, hidden surface removal as will be explained further below. In particular, because the first, pre-pass operation is operable to process the sequence of primitives up-front to determine the "visibility" information for the entire sequence of primitives, this then means that when the same sequence of primitives is processed again during the second, main pass operation, the processing of the primitives in the second, main pass operation can be controlled accordingly based on the determined "visibility" information such that at each sampling position, only the primitive (or primitives) that need to be processed further for that sampling position are processed further.

Figure 7:
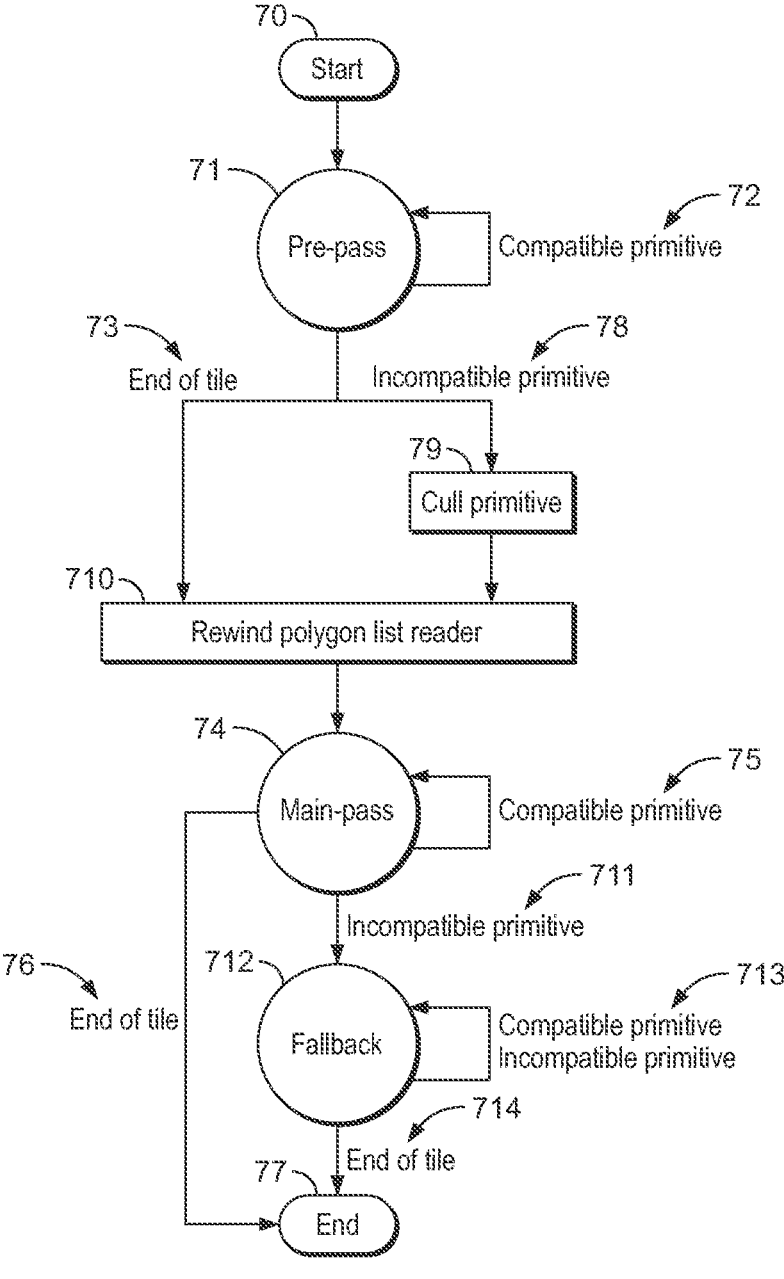
FIG. 7 schematically illustrates a rendering operation according to an embodiment in which a novel "pre-pass" operation is introduced such that primitives are effectively rendered in two processing passes.

FIG. 7 is a state diagram illustrating the rendering operation that is performed for an individual rendering tile according to an embodiment of the technology described herein. As mentioned above, the rendering operation is triggered by the graphics processor encountering an appropriate command to render the tile and the fragment shader endpoint scheduling the corresponding rendering passes in response to such command. The rendering operation is then performed automatically, and under hardware control, with the graphics processor transitioning between different respective "states" (wherein the graphics processor is configured in a respective state to perform a respective corresponding processing operation) according to the state diagram shown in FIG. 7, as will be explained further below.

Thus, in response to a suitable such command (step 70—start), the graphics processor in the present embodiment is caused to automatically perform the rendering operation shown in FIG. 7, in particular by the fragment shader endpoint scheduling an appropriate task to perform the first, pre-pass operation for the tile in question. The graphics processor at this point is therefore configured in the "pre-pass" state. The rendering operation accordingly starts by processing primitives that are identified to be rendered for the tile by the first, pre-pass operation in order to generate the desired "visibility" information for the sequence of primitives (tile) (step 71). The first, pre-pass operation may generally comprise any suitable sequence of processing operations, depending on the desired format of the "visibility" information. Various different examples of how the first, pre-pass operation may be configured will be described below but FIG. 8 illustrates the processing operations (the graphics processing pipeline) according to the first, pre-pass operation in a first example in which the determined visibility information comprises a depth buffer for the sequence of primitives (tile).

Figure 8:
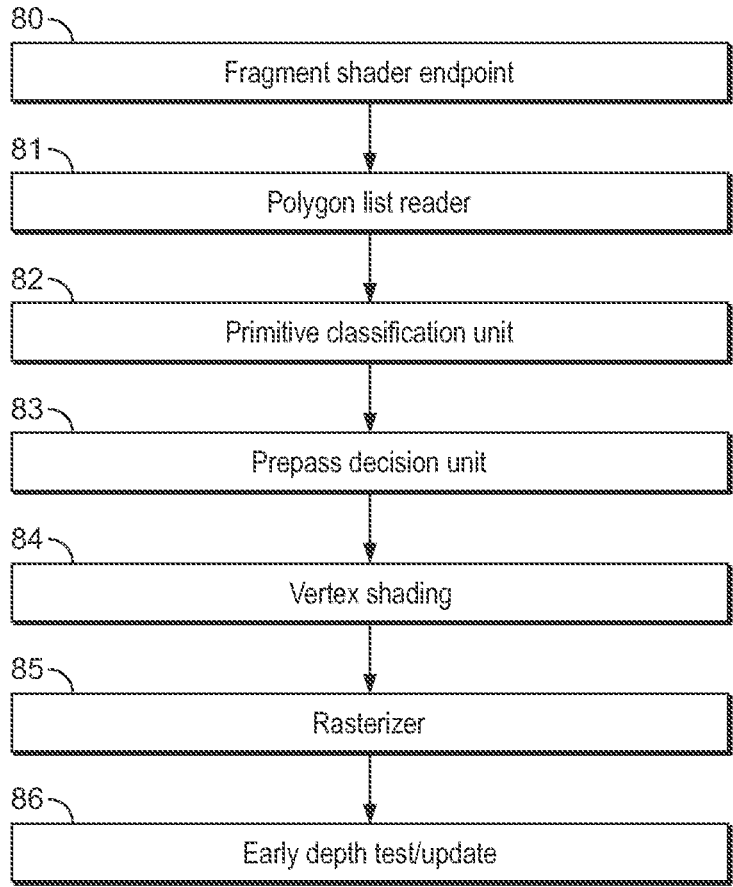
FIG. 8 shows schematically a sequence of processing operations for a pre-pass operation according to a first example.

In the first example as shown in FIG. 8, the first, pre-pass operation thus comprises a pipelined sequence of processing operations including: a fragment shader endpoint 80 that schedules the rendering work that the graphics processing pipeline needs to perform in order to render a tile; a primitive list reader (polygon list reader 81) that reads the appropriate primitive list(s) for the tile to identify the primitives that are to be rendered for the tile; a primitive classification unit 82; a pre-pass decision unit 83; a vertex processing (e.g. shading) stage 84 that obtains (and shades, if necessary) the relevant vertex data for the primitives to be rendered for the tile; a rasteriser 85 that rasterises primitives into respective fragments corresponding to sampling positions within the render output; and an (early) depth test/update stage 86 that performs fragment depth testing and updates the depth buffer accordingly.

Accordingly, when the fragment shader endpoint 80 issues a tile for rendering, the primitive list reader (polygon list reader 81) issues primitives in the sequence of primitives in turn to the graphics processor for processing by the first, pre-pass operation. The primitive are then processed by the processing stages shown in FIG. 8 accordingly in order to determine the desired "visibility" information. In this first example, the "visibility" information comprises the depth buffer. Thus, the primitives are processed up to and including the (early) depth test/update stage 86 but in this example are not processed further (such that there is no fragment shading, for example, during the first, pre-pass operation). In this first example, once the depth buffer has been updated (if necessary), the pre-pass processing of a primitive stops at that point, and the next primitive in the sequence is processed accordingly.

So long as the primitives in the sequence of primitives being processed are compatible with being processed by the first, pre-pass operation (which can be (and is) determined by the primitive classification unit 82, as will be explained in further detail below), the first, pre-pass operation works through the primitives in the sequence of primitives (step 72), processing the primitives accordingly to update the depth buffer for the sequence of primitives, until the first, pre-pass operation reaches the end of the sequence (the end of the tile) (step 73) (or until the first, pre-pass operation is otherwise stopped).

Once the first, pre-pass operation has finished (or is stopped), and the depth buffer (visibility information) for the sequence of primitives determined, at that point, the second, main pass operation should be initiated (step 74). The graphics processor should thus be (and is) switched at this point into a "main pass" state. As mentioned above, the second, main pass operation is performed to process again at least some primitives that were processed by the first, pre-pass operation (step 71) in order to generate the final, desired rendered output data. Thus, at the end of the first, pre-pass operation, the primitive list reader (polygon list reader 81) is in an embodiment "re-wound" to the start of the sequence of primitives (step 710) ready for the corresponding second, main pass. The fragment shader endpoint 80 then issues a corresponding task for the second, main pass operation to be performed. Thus, in response to the respective task for the second, main pass operation, the graphics processor is caused to transition into the "main pass" state, and the sequence of primitives is then reissued, from the start, for processing by the second, main pass operation. The second, main pass operation thus works through the primitives in the sequence of primitives (again) accordingly to produce the desired rendered output data, e.g. by rasterising the primitives again into their respective fragments, and then completing the rendering of the fragments. However, when performing the second, main pass, the graphics processor uses the visibility information generated by the first, pre-pass operation to cull fragments when it is possible to do. For example, as will be explained further below, after rasterising a primitive into its respective fragments, the second, main pass then performs a fragment visibility test using the visibility information to determine whether or not the fragments need to be processed further. Any fragments that fail the fragment visibility test can therefore be culled accordingly, such that further processing of those fragments is avoided.

Figure 9:
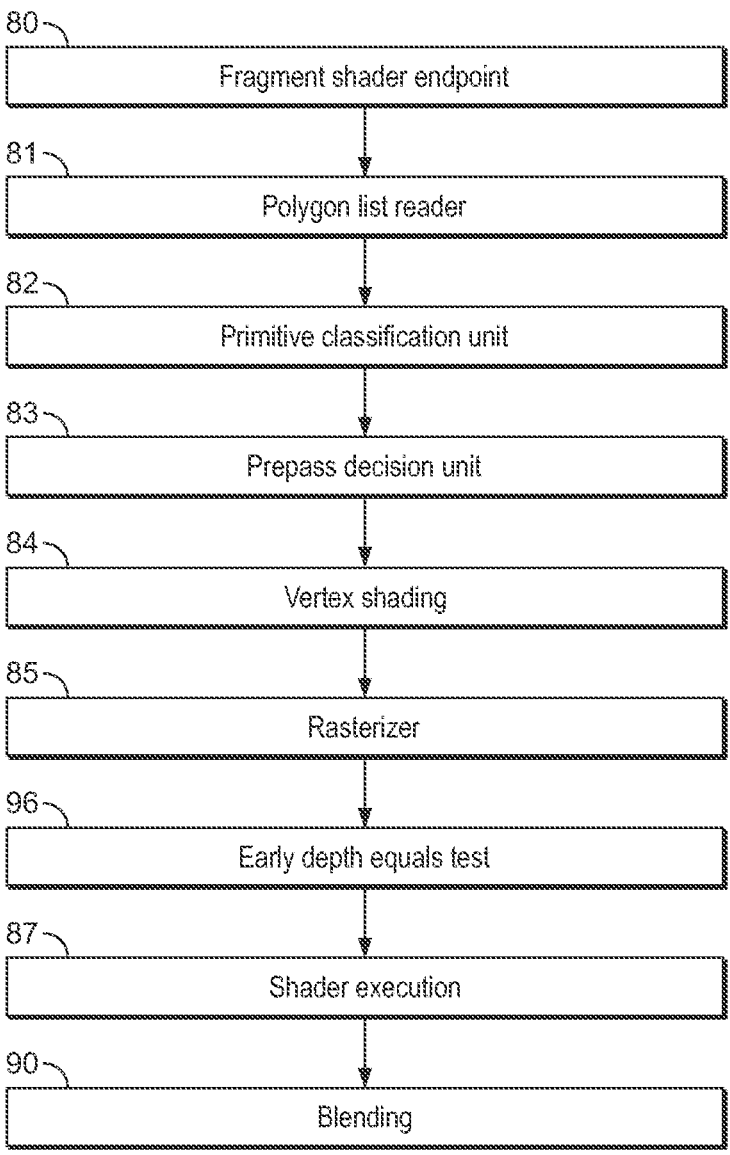
FIG. 9 shows schematically a sequence of processing operations for a corresponding main pass operation to be performed after the pre-pass operation shown in FIG. 8.

FIG. 9 illustrates the corresponding processing operations performed according to the second, main pass operation in this first example. As shown in FIG. 9, the second, main pass operation comprises a pipelined sequence of processing operations including, in common with the first, pre-pass operation: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output.

The second, main pass operation also performs depth testing of the fragments. However, depth buffer writes are disabled for the depth testing that is performed during the second, main pass operation such that the second, main pass operation does not update the depth buffer. Instead, as shown in FIG. 9, in this example, the depth test function is modified for the depth testing in the second, main pass operation such that the depth testing comprises an 'equals' test. The early depth equals test 96 accordingly tests whether or not the depth value for the fragment being tested matches the depth value stored in the depth buffer for the corresponding sampling position. Thus, if the fragment has the same depth value as that stored in the depth buffer, the fragment survives the early depth equals test 96, and is therefore further processed by executing a fragment shader 87, and then performing blending 90, etc., to generate the final rendered output data. On the other hand, if the fragment's depth value does not match the depth value stored in the depth buffer, such that the fragment fails the early depth equals test 96, the fragment can be (and is culled) at this point during the second, main pass, with the fragment shading 87, etc., being avoided. In this way, the fragment processing during the second, main pass operation can be controlled based on the depth buffer generated during the first, pre-pass operation such that rendered output data is only produced for fragments that are actually visible.

The result of the second, main pass operation is thus to produce the desired, final rendered output data for the tile. This can then be written out accordingly from the tile buffer, e.g. to a frame buffer, e.g. for display.

Again, so long as the primitives are compatible with being processed in this way, the primitives in the sequence of primitives are processed in turn by the second, main pass (step 75) until all of the primitives in the sequence have been processed (e.g. the end of the tile is reached) (step 76), at which point the rendering of the tile is completed (step 77—end).

That is, so long as the primitives are compatible with being processed in the two-stage manner described above, the primitives are processed in this way, such that the same primitive is subject to both the first, pre-pass operation and to the second, main pass operation. However, there are certain types of primitives that have one or more properties that mean that they cannot be safely processed in this manner. There are various reasons why this might be the case, as will be discussed further below, but generally this will be because dividing the processing into two separate passes may introduce artefacts to the final rendered output data.

As shown in FIG. 7, the graphics processor is in the present embodiment also therefore operable in a third, "fallback" operation. The third, fallback operation can be (and is) triggered by the first, pre-pass operation encountering an 'incompatible' primitive, i.e. a primitive for which it has been determined that the primitive cannot safely be processed using the pre-pass operation. In that case, to ensure continued safe processing of the sequence of primitives, the graphics processor may switch to a third, fallback operation in which primitives are processed in a 'fail-safe' manner. This is particularly important as the rendering in the technology described herein is performed under hardware control, and the graphics processor should therefore be (and in the present embodiment is) capable of 'safely' handling all different types of primitives that an application may specify to be rendered, i.e. without potentially introducing artefacts. The switching to the third, fallback operation in the present embodiments may be (and is) triggered and controlled by the pre-pass decision unit 83 based on the output from the primitive classification unit 82, as will now be explained further.

For instance, as mentioned above, the first, pre-pass operation shown in FIG. 8 (and the second, main pass operation shown in FIG. 9) includes a primitive classification unit 82 and pre-pass decision unit 83. The primitive classification unit 82 is able to identify whether the current primitive is compatible or not with the pre-pass operation. The pre-pass decision unit 83 is then able to determine how the processing should proceed. For example, in the case that the primitive classification unit 82 identifies that a primitive is incompatible with being processed by the first, pre-pass operation (step 78 in FIG. 7), the pre-pass decision unit 83 causes the first, pre-pass operation to be stopped at that point (and the incompatible primitive is culled for the first, pre-pass operation—step 79—such that it can subsequently be processed instead by the third, fallback operation).

When the first, pre-pass operation is stopped due to an incompatible primitive, at this point, the primitive list reader (polygon list reader 81) is again "re-wound" to the start of the sequence of primitives (step 710), and the second, main pass operation is then performed to complete the rendering operation for primitives in the sequence of primitives up to the primitive immediately before the incompatible primitive (step 74). That is, rather than immediately aborting the pre-pass operation to perform the third, fallback operation, the graphics processor is first switched to the second, main pass operation to complete the rendering of the primitives that have been processed so far by the first, pre-pass operation. When the second, main pass operation reaches the incompatible primitive, the primitive classification unit 82 in the second, main pass operation will accordingly identify again that the primitive is incompatible (step 711), and the pre-pass decision unit 83 will accordingly cause the second, main pass operation to be stopped at that point. The graphics processor is then switched to the third, fallback operation to process the incompatible primitive (step 712) (and in this example the graphics processor then continues processing primitives by the third, fallback operation until the end of the tile (step 714)).

Figure 10:
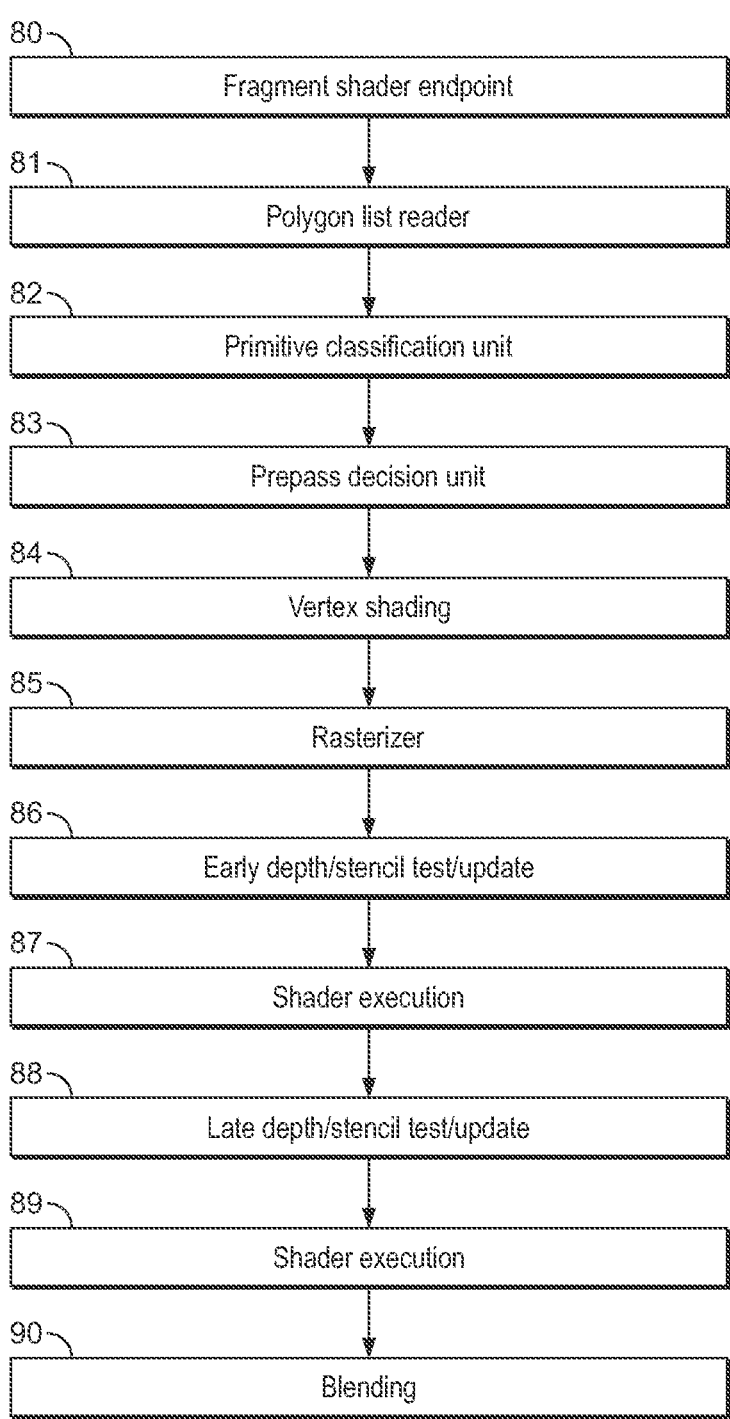
FIG. 10 shows schematically a sequence of processing operations for a fallback operation in which primitives are processed in a fail-safe manner.

FIG. 10 illustrates the processing operations according to the third, fallback operation in the first example. In the example shown in FIG. 10, the third, fallback operation thus comprises a pipelined sequence of processing operations including: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output. In the third, fallback operation, after rasterisation, the fragments are then subject to an early depth (and optionally (early) stencil) test/update 86, e.g. as in the first, pre-pass operation, but the processing then continues by executing a fragment shader 87 for any fragments that survive the early depth test/update 86, performing a late depth (stencil) test/update 88, and then executing a final fragment shader 89, and performing blending 90, etc., for any remaining fragments to generate the desired rendered output data. Note that in FIG. 10 the early depth test/update 86 and late depth test/update 88 also perform corresponding (early/late) stencil test/updates. That is, in this example, stencilling is disabled during the first, pre-pass and second, main pass operations but is active in the third, fallback operation.

Accordingly, as shown in FIG. 10, the third, fallback operation processes primitives in 'full' in a single rendering pass, e.g., similarly to the normal rendering operations within a traditional tile-based rendering system (e.g. as shown in FIG. 5). The third, fallback operation thus allows primitives to be processed in a 'fail-safe' manner. This then ensures that the sequence of primitives can continue to be processed to generate the desired rendered output data even if there are some primitives that cannot be processed in this way. This is beneficial in ensuring an improved, safer hardware implementation that is able to handle all different types of primitives (and primitive properties) that may be encountered, e.g. by falling back if necessary to processing in such 'fail-safe' manner (at the cost of hidden surface removal efficiency). In the example shown in FIG. 7, the remaining primitives in the sequence of primitives are then all processed by the third, fallback operation (step 713) until all of the primitives for the tile have been processed. (It is also contemplated however that in some embodiments the graphics processor may attempt to switch back from the third, fallback operation to the first, pre-pass operation within a sequence of primitives for a tile when it is possible to do so. This will be explained further below in relation to FIG. 73.)

At that point, once of the primitives to be rendered for the tile have been processed accordingly to generate the final rendered output data (with some of the primitives, i.e. the primitives that were before the incompatible primitive in the sequence of primitives having been processed by the pre/main pass operations, and others of the primitives, i.e. the incompatible primitive, and any following primitives in the sequence of primitives, processed by the third, fallback operation) (step 714) and the rendering of the sequence of primitives (for the tile) is completed (step 77—end).

Once the rendering of the sequence of primitives (e.g. for the current tile) is completed (step 77—end), assuming there are further sequences of primitive (tiles) to be rendered, the fragment shader endpoint 80 can then (and does) schedule the next sequence of primitives for rendering accordingly. For example, the fragment shader endpoint 80 at this point may issue respective processing tasks for rendering the next tile that is to be rendered (although the next sequence of primitives to be rendered could also, e.g., be another draw call for the current tile).

The next sequence of primitives to be rendered is then processed in the same manner described above in relation to FIG. 7, e.g. by initiating a new pre-pass operation and then subsequently controlling the state of the graphics processor as necessary to render the primitives. In this respect, it will be appreciated that even in the event that a tile does contain an incompatible primitive, such that the graphics processor has to revert to the third, fallback operation for that tile, this may only affect that tile, and the rendering operation for the next tile can re-start with a new pre-pass operation. Thus, hidden surface removal efficiency is only temporarily lost in the event that an incompatible primitive is encountered, and the improved hidden surface removal can be resumed for the next tile. Of course if the or another incompatible primitive is encountered during the rendering of that tile, the third, fallback operation will again be triggered in the same way, but at least for tiles that do not contain any incompatible primitives, and for those tiles it is possible therefore to achieve sample-perfect hidden surface removal using the novel pre-pass operation of the present embodiment.

The "in-tile" pre-pass operation of the present embodiment can therefore provide significant improvement in hidden surface removal, and can thus improve the overall graphics processing operation.

Figure 11:
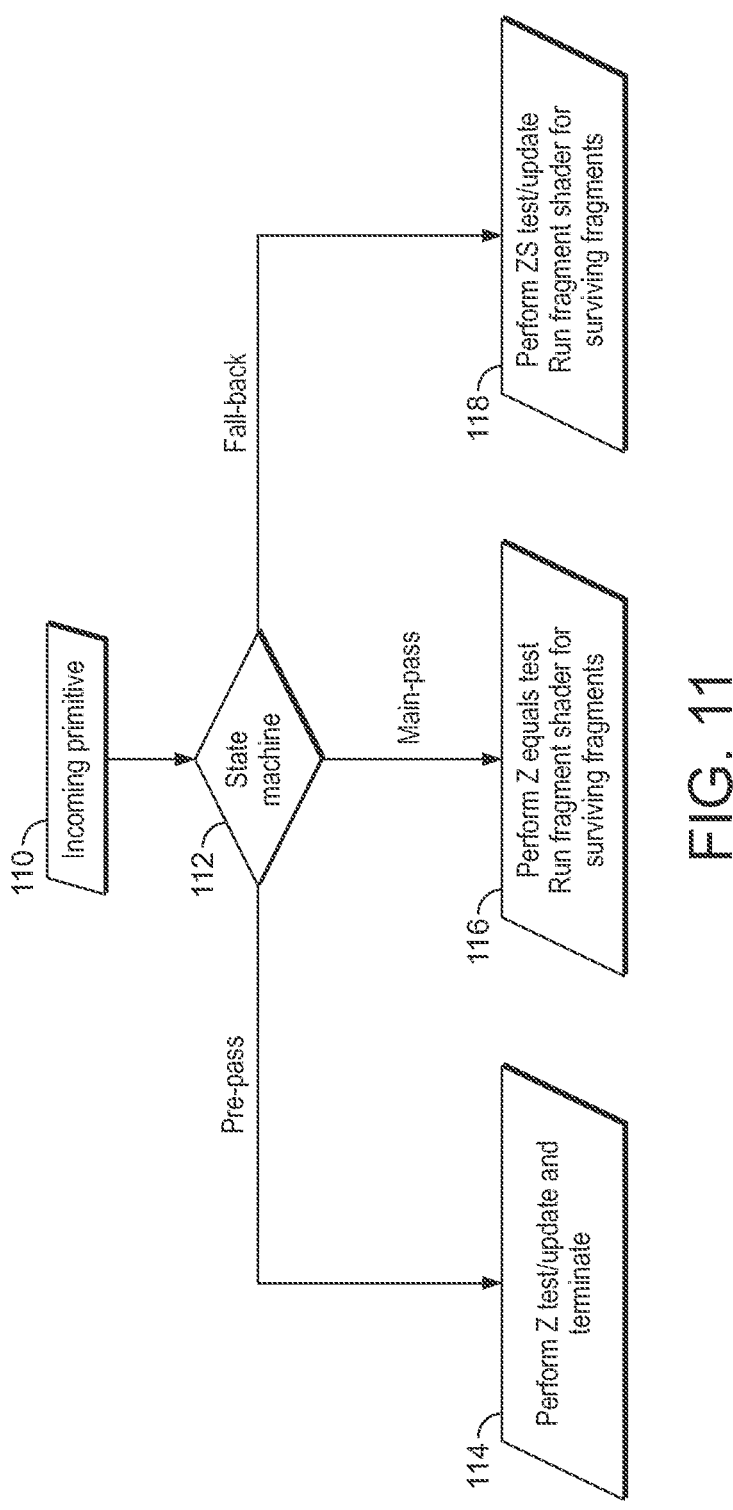
FIG. 11 shows schematically a state machine for a graphics processor operating according to the first example

It will be appreciated from the description above that the first, pre-pass, second, main pass and third, fallback operations described above are in an embodiment performed using the same graphics processing pipeline but with different stages enabled/disabled appropriately. Thus, the fragment shader endpoint 80 may be configured to issue the same sequence of primitives rendering multiple times, but with the processing operations that are performed for each pass effectively being modulated according to the state of the graphics processor, with different processing stages 'active' for the different configurations of the graphics processor. The fragment shader endpoint 80 can thus indicate to the graphics processing pipeline which type of task is being performed and the graphics processing pipeline can then be configured (or re-configured) accordingly to perform the desired processing operation. This is illustrated, for example, in FIG. 11. FIG. 11 thus illustrates a state machine 112 showing, for an incoming primitive 110 to be processed, how the primitive 110 is processed differently according to the different possible states of the graphics processor in this first example.

For example, when the graphics processor is performing the first, pre-pass operation (i.e. the graphics processor is configured in the pre-pass state 114), the primitive is accordingly processed in the manner described above with the graphics processing pipeline configured as shown in FIG. 8, with (only) those processing stages 'active', such that the primitive is processed by the graphics processing pipeline up to and including the depth testing/updating of the depth buffer, but the processing of the primitive finishes at that point, without performing further processing. Correspondingly, when the graphics processor is performing the second, main pass operation (i.e. the graphics processor is configured in the main pass state 116), the (same) primitive is processed again but with the graphics processing pipeline configured as shown in FIG. 9, in the main pass stage, with a different set of processing stages 'active'. Thus, during the second, main pass operation, as described above, the (same) primitive may be processed again up to the depth testing, but the depth testing is now modified to perform an equals test, and the fragment shader and blending stages are additionally active such that a fragment shader is then executed, and blending is performed, for fragments that survive the depth equals test, to thereby produce the final rendered output data.

On the other hand, in the third, fallback operation (state 118), the primitive is processed with the graphics processing pipeline configured as shown in FIG. 10. In this case, the primitive undergoes depth (and optionally stencil) testing with any fragments that survive the early/late depth testing being shaded accordingly, e.g. in the normal manner for depth (stencil) testing. For example, in the fallback state, all of the graphics processing pipeline stages may be 'active' such primitives are processed in full in a single processing pass.

Example 1—Primitive Classification

As mentioned above, the determination as to whether or not a primitive is compatible with being processed by the pre-pass operation (and hence the possible triggering of the third, fallback operation, when needed) is performed based on a primitive "classification". In general, there are various reasons why a primitive may not be compatible with being processed by the pre-pass operation, depending on exactly how the pre-pass operation is configured. The primitive classification can thus be performed by checking various conditions associated with the primitive (or properties of the primitive) to determine whether the primitive is or is not compatible with the pre-pass operation.

Figure 12:
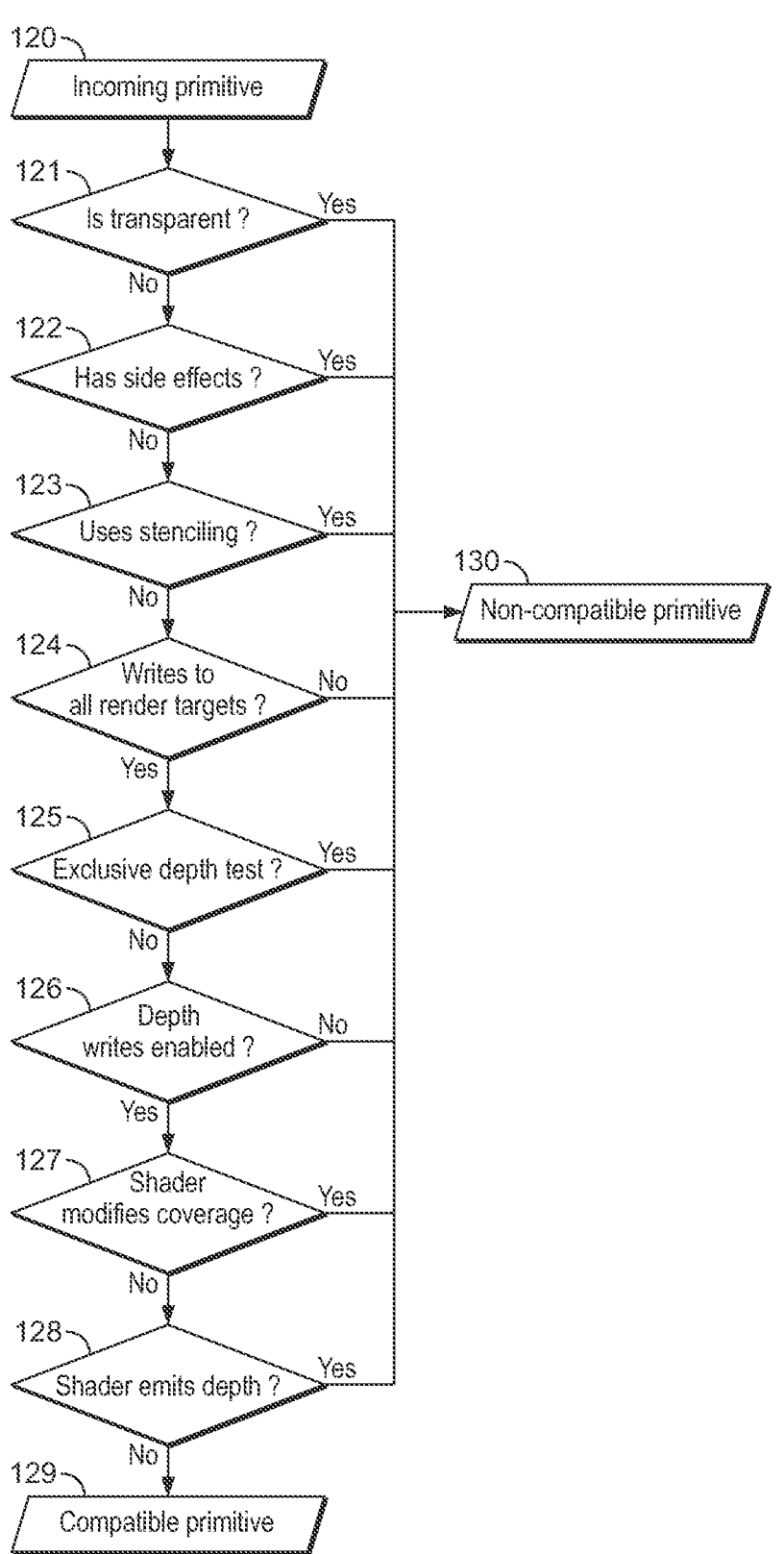
FIG. 12 illustrates a primitive classification process according to the first example.

FIG. 12 shows an example primitive classification process for the first example described above in which the pre-pass operation is configured as shown in FIG. 8 and the corresponding main pass operation is configured as shown in FIG. 9. In this example, as mentioned above, the pre-pass operation populates a depth buffer, and the second, main pass operation then performs 'equals' depth testing against the depth buffer, with only primitives that survive the equals depth testing being further processed by the second, main pass operation.

In this example, for an incoming primitive 120 to be classified, the conditions that are checked to determine whether a primitive is (potentially) incompatible with the pre-pass operation in this example include the following conditions;

1) The primitive is transparent (step 121)—since transparent primitives will typically not update the depth buffer and so would be incorrectly culled by the depth equals test during the main pass shown in FIG. 9;

2) The primitive has side effects (step 122)—since any primitives with side effects should generally only be processed once;

3) The primitives uses stencilling (step 123);

4) The primitive doesn't write to all render targets (step 124);

5) The primitive uses an exclusive depth test during the first, pre-pass operation (such as a 'greater than' test rather than a 'greater than or equals' depth test) (step 125);

6) The primitive does not write depth (step 126);

7) A fragment shader is required to determine the primitive coverage (in other words the fragment shader potentially modifies the coverage) (step 127); or 8) A fragment shader is required to determine the depth value (in other words the fragment shader emits a depth value) (step 128).

As shown in FIG. 12, the primitive classification process in this first example thus comprises checking each of the conditions listed above in order to determine whether or not the primitive is compatible, and only if none of the conditions are satisfied is the primitive identified as being compatible with the pre-pass (step 129). That is, in this example, with the pre-pass operation configured as described above, if any of the above conditions are satisfied, the primitive is identified as being incompatible with the pre-pass (step 130), and is handled accordingly (i.e. by causing the graphics processor to switch to the third, fallback operation to process that primitive).

The result of the primitive classification process is therefore to identify whether or not primitives are compatible with being processed by the first, pre-pass operation. The primitive classification result can therefore be provided to the pre-pass decision unit 83 to control the state of the graphics processor according to the state machine shown in FIG. 7 and thus control depending on which state the graphics processor is currently in how the primitive should be processed (as shown in FIG. 11). It will be appreciated that this primitive classification may generally be performed on a primitive-by-primitive basis or for larger units of geometry, e.g. on a draw call basis, depending on how the system is configured. For instance, the properties identified above will typically vary only on a draw call basis, such that classification can be (and in embodiments is) performed for draw calls of primitives. Other arrangements would however be possible.

The primitive classification process shown in FIG. 12 may be performed during the first, pre-pass operation by the primitive classification unit 82 with the result of the primitive classification then being used accordingly by the pre-pass decision unit 83 to determine how the processing should continue (i.e. whether the pre-pass operations should continue or whether the pre-pass should be terminated, and the primitive instead subsequently processed by the fallback operation).

However, it will be appreciated that at least some of the primitive properties that are being considered during the primitive classification in FIG. 12 will typically be known in advance, such that some or all of the primitive classification process that is shown in FIG. 12 may correspondingly also be performed in advance, e.g. by the driver 4 for the graphics processor 3 when preparing the corresponding command stream for the graphics processor 3. In that case, the driver may annotate the primitives (or draw calls) within the command stream accordingly with a suitable flag (e.g. an associated bit) to indicate to the graphics processor whether or not the primitive is compatible with the pre-pass operation. The flag can then be provided to the graphics processor and checked accordingly by the primitive classification unit 82 with the result of the primitive classification checking then being used by the pre-pass decision unit 83 to determine whether (and how) the processing should continue. For example, if an 'incompatible' flag is present (i.e. the relevant bit is set, or not set, depending on design), the primitive classification unit 82 can identify this, and the pre-pass decision unit 83 can then trigger the third, fallback operation appropriately. Typically, however, at least some of the primitive classification is performed at run-time, during the respective first, pre-pass and/or second, main pass operations, particularly for the more complex classifications that will be described in the examples that follow later.

It will be appreciated that the primitive classification process shown in FIG. 12 is based on the particular configuration of the pre-pass operation in the first example described above, wherein the pre-pass includes the specific processing operations shown in FIG. 8 but does not, e.g., perform stencilling, or execute a fragment shader, such that any primitives that require stencilling, or that require a fragment shader to be executed, are treated as incompatible. Thus, it should be understood, that depending on the particular configuration of the pre-pass operation, there may be (and generally will be) different sets of conditions that mean that a primitive may or may not be compatible with being processed by that pre-pass operation. That is, the pre-pass operation according to embodiments of the technology described herein may be more or less complex as desired and may therefore be able to handle various different types of primitives without having to revert to the third, fallback operation. Various arrangements are contemplated in this regard and a number of examples will now be contemplated to illustrate alternative pre-pass configurations that can handle further types of primitives (or further primitive properties).

Example 2—Exclusive Depth Test Disambiguation

For instance, in the primitive classification process shown in FIG. 12 relating to the first example, a primitive is considered to be incompatible with the pre-pass operation if the primitive depth testing uses an exclusive depth test (step 125). This is because if an exclusive depth test is specified for a primitive, because the depth testing that is performed during the second, main pass operation is modified to use depth equals' test (for all primitives, regardless of the depth test function used during the first, pre-pass operation, e.g. as specified by the application), if there are two primitives that write the same depth value, the second, main pass may not be able to replicate the correct rendering behaviour.

In particular, when two primitives write the same depth value, but the depth test function used in the first, pre-pass operation for the later primitive is an exclusive test (i.e. is strictly 'less than' or 'greater than', rather than 'less than or equal', 'greater than or equal', or 'equals'), the correct behaviour as specified by the API requirements is for the later primitive to be culled. That is, if the depth buffer is updated by the earlier primitive to record that depth value, the later primitive with the same depth value should fail the exclusive depth test, e.g. since it's depth value would be equal to the depth value stored in the depth buffer, and not strictly greater (or lesser) than the stored depth value. However, because for the purposes of the present embodiments the depth test in the second, main pass operation is modified to comprise a depth 'equals' test for all primitives, in this situation, the later primitive writing the same depth value would also incorrectly survive the depth 'equals' test.

In some embodiments, therefore, any primitives that the application specifies should use an exclusive depth test function during the first, pre-pass operation are therefore simply treated as being incompatible with the pre-pass operation, and are instead caused to be processed by the third, fallback operation. This is the case, for example, in FIG. 12, as shown above. This can work well to ensure continued safe processing of the primitives for the render output in such situations.

In other embodiments, however, according to a second example, the pre-pass and corresponding main pass operations can be configured to handle such primitives by providing a suitable depth test disambiguation mechanism that allows two primitives that write the same depth value to be disambiguated to thereby ensure the correct rendering behaviour. For example, as mentioned above, when there are two primitives that write the same depth value, the correct rendering behaviour for the later primitive when the later primitive uses an exclusive depth test function in the first, pre-pass operation is for the later primitive to be culled. (Whereas, if the later primitive uses an inclusive depth test function, it should survive.)

The solution to this in the second example is to store in the depth buffer a suitable 'tracking' bit that can be set/cleared appropriately during the first, pre-pass operation and/or during the second, main pass operation in order to ensure the correct rendering behaviour. This depth test disambiguation mechanism is illustrated, for example, in FIG. 13 and FIG. 14. In these examples it is assumed that the depth compare function is either a 'greater than' (exclusive) or 'greater than or equals' (inclusive) test. However, a similar approach could also be used for 'lesser than' (exclusive) or 'lesser than or equals' (inclusive) tests.

Figure 13:
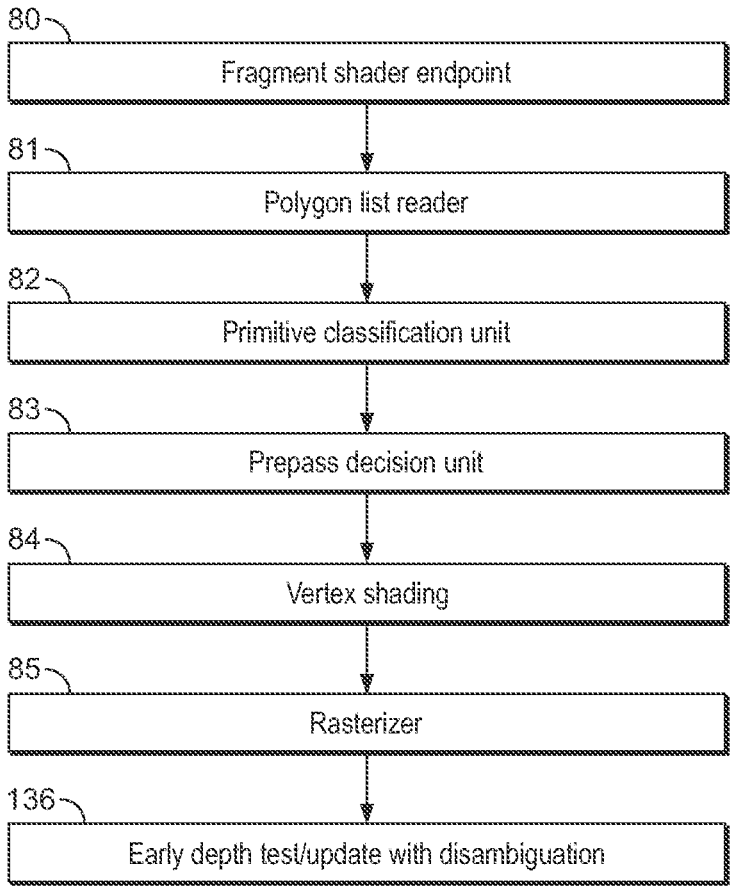
FIG. 13 shows schematically a sequence of processing operations for a pre-pass operation according to a second example including a depth test disambiguation mechanism.

FIG. 13 illustrates the processing operations (the graphics processing pipeline) according to the first, pre-pass operation according to this second example. The processing operations are the same as described above in relation to FIG. 8 except the depth testing/updating stage 136 is modified to include a further disambiguation mechanism that sets the 'tracking' bit appropriately to ensure the desired rendering behaviour during the subsequent second, main pass operation. The disambiguation mechanism during the first, pre-pass is illustrated in FIG. 14.

Figure 14:
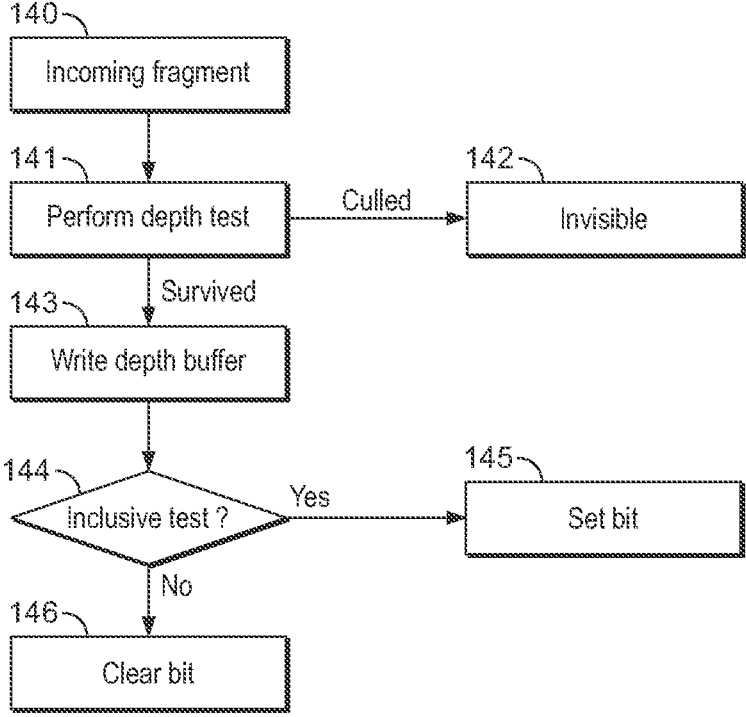
FIG. 14 shows schematically an example of a depth test disambiguation mechanism that may be performed in the pre-pass operation according to the second example.

As shown in FIG. 14, for an incoming fragment 140 to the depth testing/updating stage 136, depth testing is performed for the fragment (step 141). The fragment depth testing is performed in the normal manner for (early) depth testing. For instance, the primitive that generated the fragment will be associated a certain depth test function that has been specified for the primitive (e.g. by the application). The fragment's depth value is then tested against the corresponding entry in the depth buffer according to the specified depth test function. If the fragment fails the depth testing, the fragment is determined to be invisible, and so is culled on that basis (without updating the depth buffer) (step 142). On the other hand, if the fragment survives the depth testing, the depth buffer is updated accordingly (step 143) to record the depth value of the fragment.

In the event that a fragment causes an update to the depth buffer (step 143), it is then further checked whether the specified depth test function for the fragment that caused the depth buffer updated was an inclusive test function (step 144). If the depth test function is inclusive (step 144—yes), the extra 'tracking' bit in the depth buffer associated with the sampling position in question is set accordingly (step 145). Otherwise, if the depth test function is exclusive (step 144—no), the 'tracking' bit is not set (or is cleared if it has previously been set) (step 146).

Thus, during the first, pre-pass operation, if a fragment survives the original depth (or stencil) test, the corresponding 'tracking' bit associated with the sampling position is then set/cleared accordingly depending on whether or not the original depth test function was inclusive or exclusive.

For example, in an embodiment, if a fragment survives the original depth (or stencil) test, and the original depth test function for the fragment is inclusive, the 'tracking' bit is in an embodiment set to a first value (e.g. to '1') at this point. On the other hand, if a fragment survives the depth (or stencil) test, and the original depth test function for the fragment is exclusive, the 'tracking' bit is in an embodiment cleared (to '0', or generally set to a second value).

The processing of primitives continues in this way and the resulting content of the depth buffer at the end of the first, pre-pass operation is then stored appropriately for use by the subsequent, second, main pass. Thus, the status of the extra per-sample 'tracking' bit is carried through to the second, main pass with the depth buffer. The 'tracking' bit can thus be used during the depth testing in the second, main pass to ensure the correct rendering behaviour. The use of this 'tracking' bit during the second, main pass operation is illustrated, for example, in FIG. 15 and FIG. 16.

Figure 15:
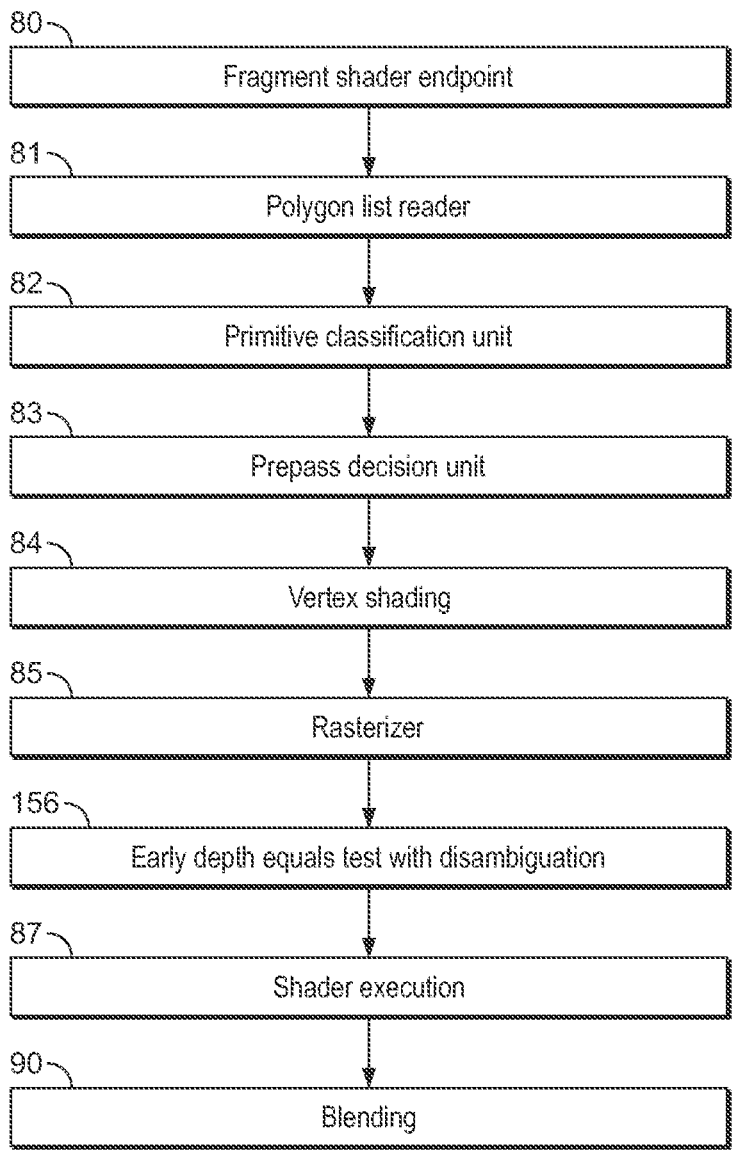
FIG. 15 shows schematically a sequence of processing operations for a corresponding main pass operation to be performed after the pre-pass operation shown in FIG. 13 according to the second example.

FIG. 15 illustrates the processing operations (the graphics processing pipeline) according to the second, main pass operation in this example. The processing operations are the same as described above in relation to FIG. 9 except the depth equals test 156 is modified to include a further disambiguation process that checks the status of the extra bit appropriately to ensure the desired rendering behaviour. The disambiguation process during the second, main pass is illustrated in FIG. 16.

Figure 16:
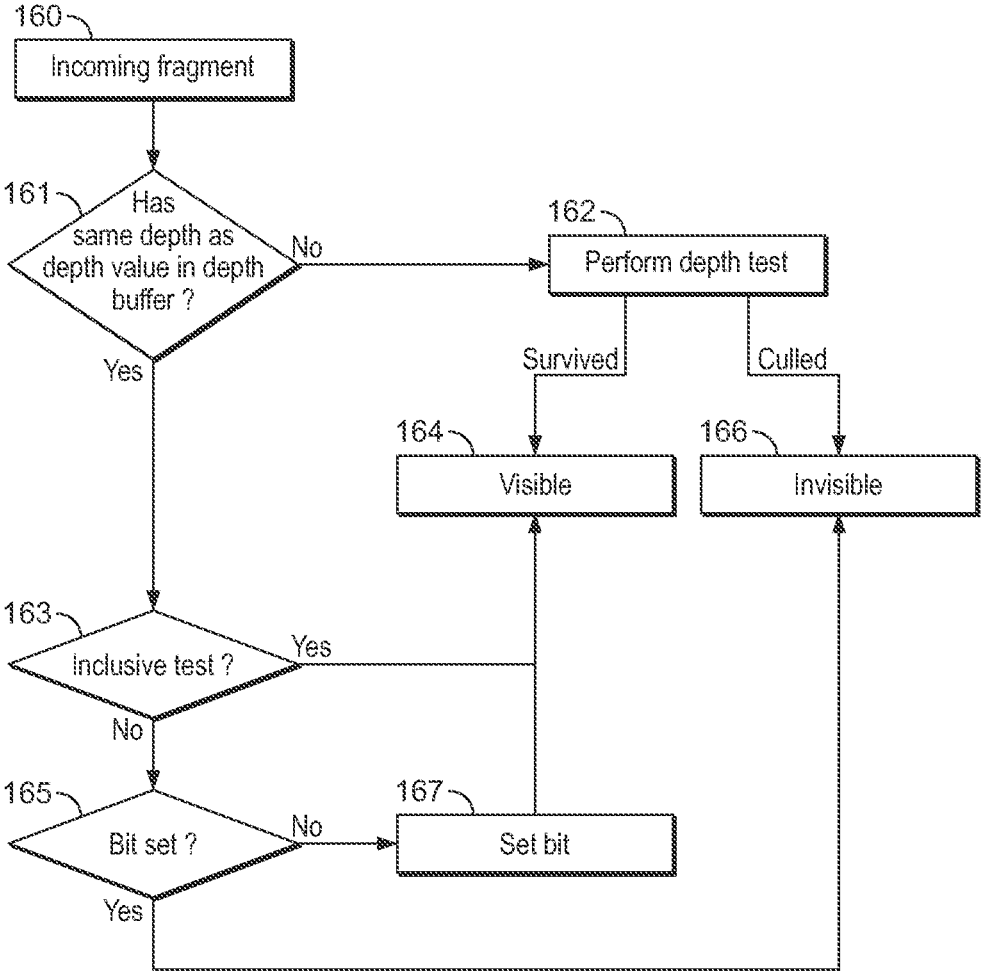
FIG. 16 shows the corresponding depth test disambiguation mechanism in the second, main pass operation according to the second example

FIG. 16 thus shows the processing flow that is performed during the second, main pass operation for fragments incoming to the depth equals test 156 stage in FIG. 9. For an incoming fragment 160 to the depth equals test 156, it is thus checked whether the fragment 160 has the same depth value as the corresponding depth value recorded in the depth buffer (step 161). If the depth values do not match (step 161—no), further depth testing may then be performed (step 162), and depending on the outcome of the depth testing, the fragment may either survive the depth testing (such that it is determined to be visible—step 164), or may be culled at this point (such that it is determined to be invisible—step 166) (note that in this example, when using the depth 'equals' test, any primitives that do not match the depth value stored in the depth buffer (step 161—no) may already be culled on that basis, such that the further depth testing (at step 162) may not be necessary in this example).

On the other hand, if the depth values do match, such that the fragment 160 survives the depth equals test (step 161—yes), it is then checked whether the original specified depth test function for the associated primitive (and hence for the fragment) was an inclusive test (step 163). If the original depth test function was inclusive (step 163—yes), the fragment 160 should be rendered, and the fragment 160 is therefore determined to be visible (step 164). However, if the original depth test function was exclusive (step 163—no), the correct rendering behaviour is that only the first fragment at that depth value should survive. It is therefore checked whether or not the 'tracking' bit in the depth buffer associated with the sampling position in question has been set (step 165).

If the 'tracking' bit has not been set (step 165—yes), this means that the fragment 160 is the first fragment having that depth value, and the fragment 160 should therefore survive (and so the fragment is determined to be visible—step 164). At this point, the 'tracking' bit is set (step 167). This then means that if another later primitive is processed that has the same depth value (step 161—yes), and for which an inclusive test was used (step 163—yes), the 'tracking' bit will have been set at this point, i.e. by a previous primitive having the same depth value. Thus, when the later primitive is processed, it will now be determined at this step that the 'tracking' bit is set (step 165—yes), which will cause the later fragment to be (correctly) culled (step 166).

Accordingly, if the fragment survives the depth equals test during the second, main pass operation, the behaviour is then determined based on the original depth test function for the fragments and the state of the 'tracking' bit is then set as follows;

(i) If the fragment's original depth test function was inclusive and the 'tracking' bit is set, the fragment is passed, and is processed further to generate the desired rendered output data;

(ii) If the fragment's original depth test function was inclusive and the 'tracking' bit is not set, the fragment can be (and in an embodiment is) culled (note that this state should not be possible as the 'disambiguation' bit should always be in the first state if the original depth test function was inclusive);

(iii) If the fragment's original depth test function was exclusive and the 'tracking' bit is set, the fragment can be (and in an embodiment is) culled; and (iv) If the fragment's original depth test function was exclusive and the 'tracking' bit is not set, the fragment is passed, and is processed further to generate the desired rendered output data, and the 'tracking' bit is set at this point.

The effect of all this is therefore that the extra 'tracking' bit essentially tracks for fragments for primitives for which the original depth test function was exclusive whether or not the fragment for the primitive was the fragment that caused the depth buffer update, and hence whether or not the fragment should be processed further. In particular, because the 'tracking' bit is set (to the first state) as a result of condition (iv) being met, this ensures that any later arriving fragments that write the same depth value but for which the original depth test function was exclusive will be correctly culled (based on the 'tracking' bit being set).

In this way, the extra 'tracking' bit in the depth buffer can be used to ensure the correct rendering behaviour is maintained, even when the depth testing in the second, main pass is modified to use a depth equals test, such that the original depth test function is not used during the second, main pass. By providing such mechanism for disambiguating primitives that write the same depth value based on the type of depth test function, this means that such primitives can be safely handled by the pre-pass operation.

For instance, consider an example in which three primitives P0, P1, P2 all write the same depth value, and in which each primitive may have either an inclusive or an exclusive depth compare function. The following table then shows the operation according to each of the eight possible cases. It can be seen that in all cases the desired rendering behaviour is achieved (i.e. the final visible primitive is the correct primitive based on the application-specified depth compare functions).

TABLE 1

| Depth Test Disambiguation Examples | | | | | | | | | |
|---|---|---|---|---|---|---|---|---|---|
| Depth Compare Functions | | | Pre-Pass Results | | | | Main Pass Results | | Final visible |
| P0 | P1 | P2 | P0 | P1 | P2 | Bit | P0 | P1 | P2 | primitive |
| Excl. | Excl. | Excl. | Pass Z, clear bit | Fail Z | Fail Z | 0 | Pass Z. Pass bit test. Set bit. Survive | Pass Z. Fail bit test. Cull | Pass Z. Fail bit test. Cull | P0 |
| Excl. | Excl. | Incl. | Pass Z, clear bit | Fail Z | Pass Z test, set bit | 1 | Pass Z. Fail bit test. Cull | Pass Z. Fail bit test. Cull | Pass Z. Pass bit test. Survive | P2 |
| Excl. | Incl. | Excl. | Pass Z, clear bit | Pass Z, set bit | Fail Z | 1 | Pass Z. Fail bit test. Cull | Pass Z. Pass bit test. Survive | Pass Z. Fail bit test. Cull | P1 |
| Excl. | Incl. | Incl. | Pass Z, clear bit | Pass Z, set bit | Pass Z, set bit | 1 | Pass Z. Fail bit test. Cull | Pass Z. Pass bit test. Survive | Pass Z. Pass bit test. Survive | P2 |
| Incl. | Excl. | Excl. | Pass Z, set bit | Fail Z | Fail Z | 1 | Pass Z. Pass bit test. Survive | Pass Z. Fail bit test. Cull | Pass Z. Fail bit test. Cull | P0 |
| Incl. | Excl. | Incl. | Pass Z, set bit | Fail Z | Pass Z, set bit | 1 | Pass Z. Pass bit test. Survive | Pass Z. Fail bit test. Cull | Pass Z. Pass bit test. Survive | P2 |
| Incl. | Incl. | Excl. | Pass Z, set bit | Pass Z, set bit | Fail Z | 1 | Pass Z. Pass bit test. Survive | Pass Z. Pass bit test. Survive | Pass Z. Fail bit test. Cull | P1 |
| Incl. | Incl. | Incl. | Pass Z, set bit | Pass Z, set bit | Pass Z, set bit | 1 | Pass Z. Pass bit test. Survive | Pass Z. Pass bit test. Survive | Pass Z. Pass bit test. Survive | P2 |

It should be noted that the disambiguation mechanism described above assumes that the depth test function is monotonic, i.e. that the polarity of the depth test function does not change between primitives (or between the front/back faces of a primitive) within a sequence of primitives, e.g., such that the depth test function does not change from a 'greater than' (or 'greater than or equal to') test to a 'less than' (or 'less than or equal to') test, or vice versa, and also that the depth test function does not change to 'always' write to the depth buffer. In those cases, the correct rendering behaviour becomes more complex such that it may not be possible to track the correct behaviour using a single 'tracking' bit and more complex tracking mechanisms may therefore need to be used. Otherwise, such cases can be handled using the fallback operation, which is the case in this example.

Figure 17:
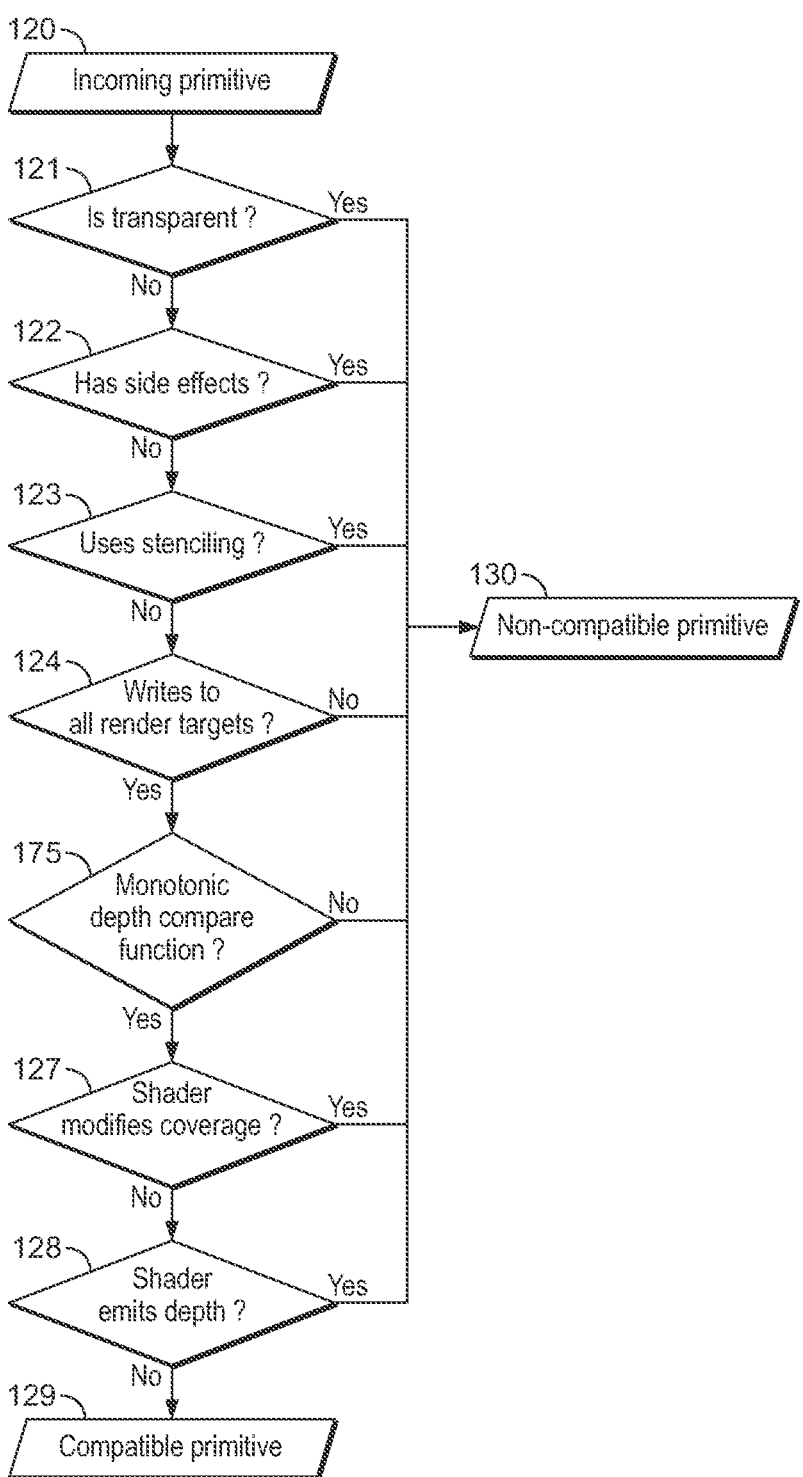
FIG. 17 illustrates a primitive classification process according to the second example in which primitives having an exclusive depth test function are no longer treated as being incompatible with the "pre-pass" operation.

Thus, the primitive classification process for this example is shown in FIG. 17, and as shown, the primitive classification generally checks the same conditions as the example shown in FIG. 12, except rather than checking whether the primitive has an exclusive depth test function (step 125 in FIG. 12), it is instead checked whether the primitive has a monotonic depth compare function (at step 175). In this example, the third, fallback operation may therefore (and will) be triggered accordingly when it is determined that the depth test function changes polarity within a sequence of primitives. Note that it is also no longer required for this example to check that depth writes are enabled as the limitation that the depth compare function must be monotonic eliminates this requirement as well.

Example 3—Stencilling

The description so far focusses mainly on determining visibility information based on depth testing fragments for primitives during the first, pre-pass operation, and then using the depth buffer determined by the first, pre-pass operation to control the subsequent rendering of primitives during the second, main pass operation. For instance, in the first and second examples presented above, stencilling is not performed either in the first, pre-pass operations or the corresponding second, main pass operations. Thus, for these examples, stencilling is effectively disabled, and any primitives that require stencilling are therefore instead treated as incompatible primitives during the primitive classification process, as shown in FIG. 12. In the examples described so far, any primitives requiring stencilling are therefore processed subsequently by the third, fallback operation (for which both depth and stencil test/updates are performed, as shown in FIG. 10).

However, it will be appreciated stencilling may in some cases (and in some embodiments is) handled in a similar manner as the depth testing described above. For example, certain types of stencil testing can be performed during the first, pre-pass operation in a corresponding manner as the depth testing described above in order to populate a stencil buffer, e.g., and in particular, so long as the front and back compare operations are monotonic (have the same polarity). The stencil buffer can then be used to control fragment processing during the second, main pass by performing a suitable stencil 'equals' test. Again, if two primitives write the same stencil value, a suitable disambiguation mechanism may be required in the situation that an exclusive stencil test function is being used. The stencil equals testing disambiguation mechanism is in an embodiment performed in the same manner described above in relation to the depth equals testing disambiguation mechanism, but now using an additional per-sample 'tracking' bit associated with the stencil buffer.

Figure 18:
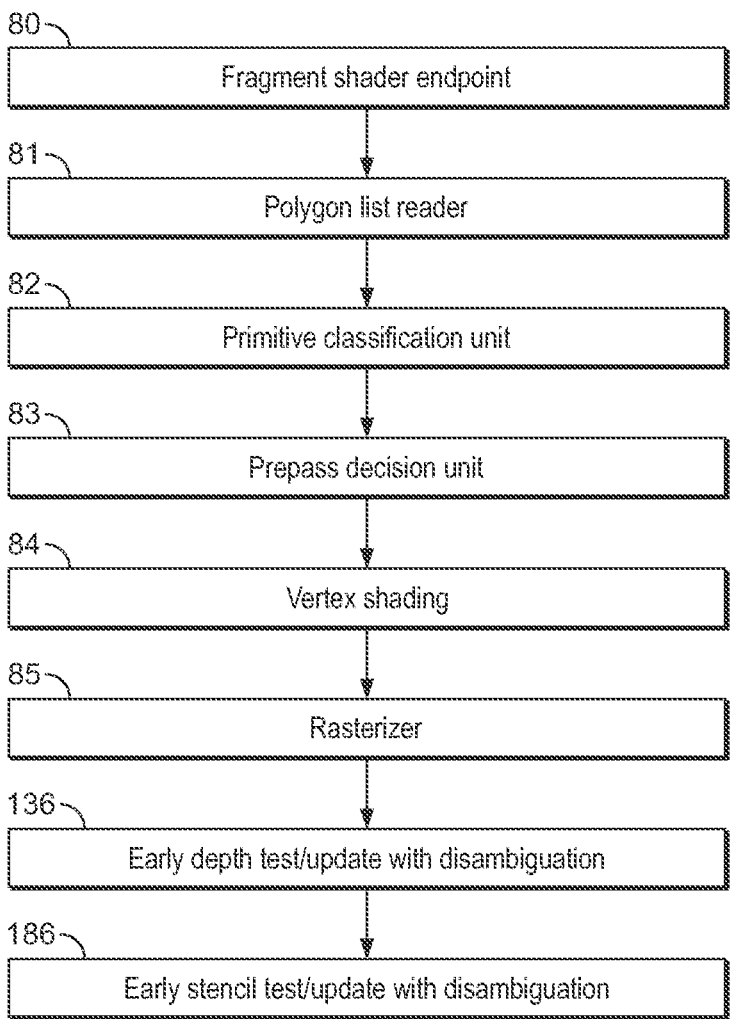
FIG. 18 shows schematically a sequence of processing operations for a pre-pass operation according to a third example in which stencil testing/updating is performed.

FIG. 18 illustrates the processing operations (the graphics processing pipeline) according to the first, pre-pass operation in a further example in which stencilling is enabled. The processing operations are otherwise the same as described above in relation to FIG. 8 and FIG. 13 except that there is an additional step of early stencil test/update with disambiguation 186 performed after the depth test/update 136. The per-sample 'tracking' bit that is stored in the stencil buffer can thus be set/cleared accordingly during the first, pre-pass operation in the same manner described above in relation to FIG. 14, but based on the stencil test rather than the depth test (at step 141). The corresponding disambiguation process for stencilling during the second, main pass operation is thus illustrated in FIG. 19 and basically mirrors the disambiguation process for depth testing described above in relation to FIG. 16.

Figure 19:
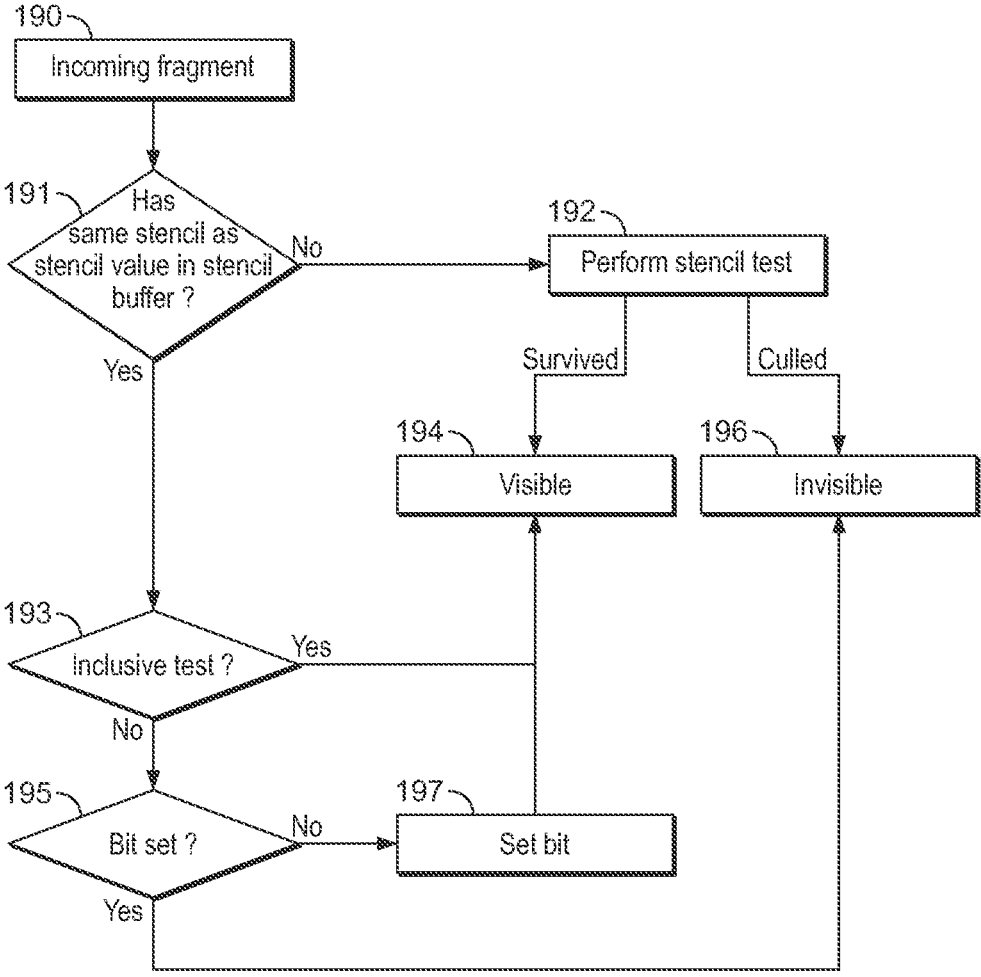
FIG. 19 shows schematically a stencil test disambiguation mechanism that may be performed during the second, main pass operation according to the third example.

Thus, as shown in FIG. 19, for an incoming fragment 190 to the stencil test 186, it is thus checked whether the fragment 190 has the stencil value as the corresponding stencil value recorded in the stencil buffer (step 191). If the stencil values do not match (step 191—no), further stencil testing may then be performed (if necessary/desired) (step 192), and depending on the outcome of the stencil testing, the fragment may either survive the stencil testing (such that it is determined to be visible—step 194), or may be culled at this point (such that it is determined to be invisible—step 196). If the stencil values do match, such that the fragment 190 survives the stencil equals test (step 191—yes), it is then checked whether the original specified stencil test function for the associated primitive (and hence for the fragment) was an inclusive test (step 193). If the original stencil test function was inclusive (step 193—yes), the fragment 190 should be rendered, and the fragment 190 is therefore determined to be visible (step 194). However, if the original stencil test function was exclusive (step 193—no), the correct rendering behaviour is that only the first fragment at that stencil value should survive. At this point, it is therefore checked whether or not the 'tracking' bit in the stencil buffer associated with the sampling position in question has been set (step 195). If the 'tracking' bit has not been set (step 195—yes), this means that the fragment 190 is the first fragment having that stencil value, and the fragment 190 should therefore survive (and so the fragment is determined to be visible—step 194). At this point, the 'tracking' bit is set (step 197). This means that if another later primitive is processed that has the same stencil value (step 191—yes), and for which an inclusive test was used (step 193—yes), the 'tracking' bit will have been set at this point, i.e. by a previous primitive having the same stencil value. Thus, it will be determined at this point that the 'tracking' bit is set (step 195—yes), which will cause the later fragment to be (correctly) culled (step 196).

Figure 20:
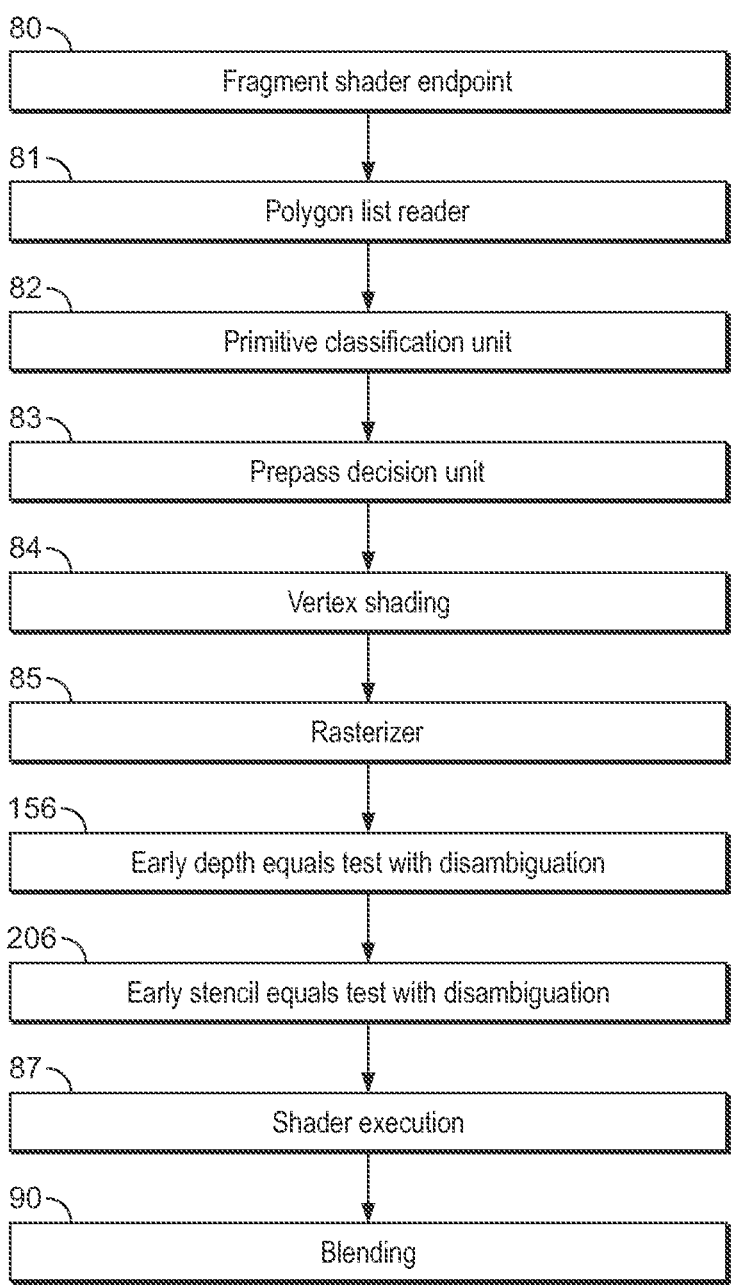
FIG. 20 shows the sequence of processing operations for corresponding main pass operation to be performed after the pre-pass operation shown in FIG. 18 according to the third example.

FIG. 20 illustrates the corresponding processing operations (the graphics processing pipeline) according to the second, main pass operation in this further example in which stencilling is enabled. This is the same as the processing pipeline illustrated in FIG. 15 except that an additional early stencil equals test with disambiguation stage 206 is included after the early depth equals test with disambiguation stage 156.

Figure 21:
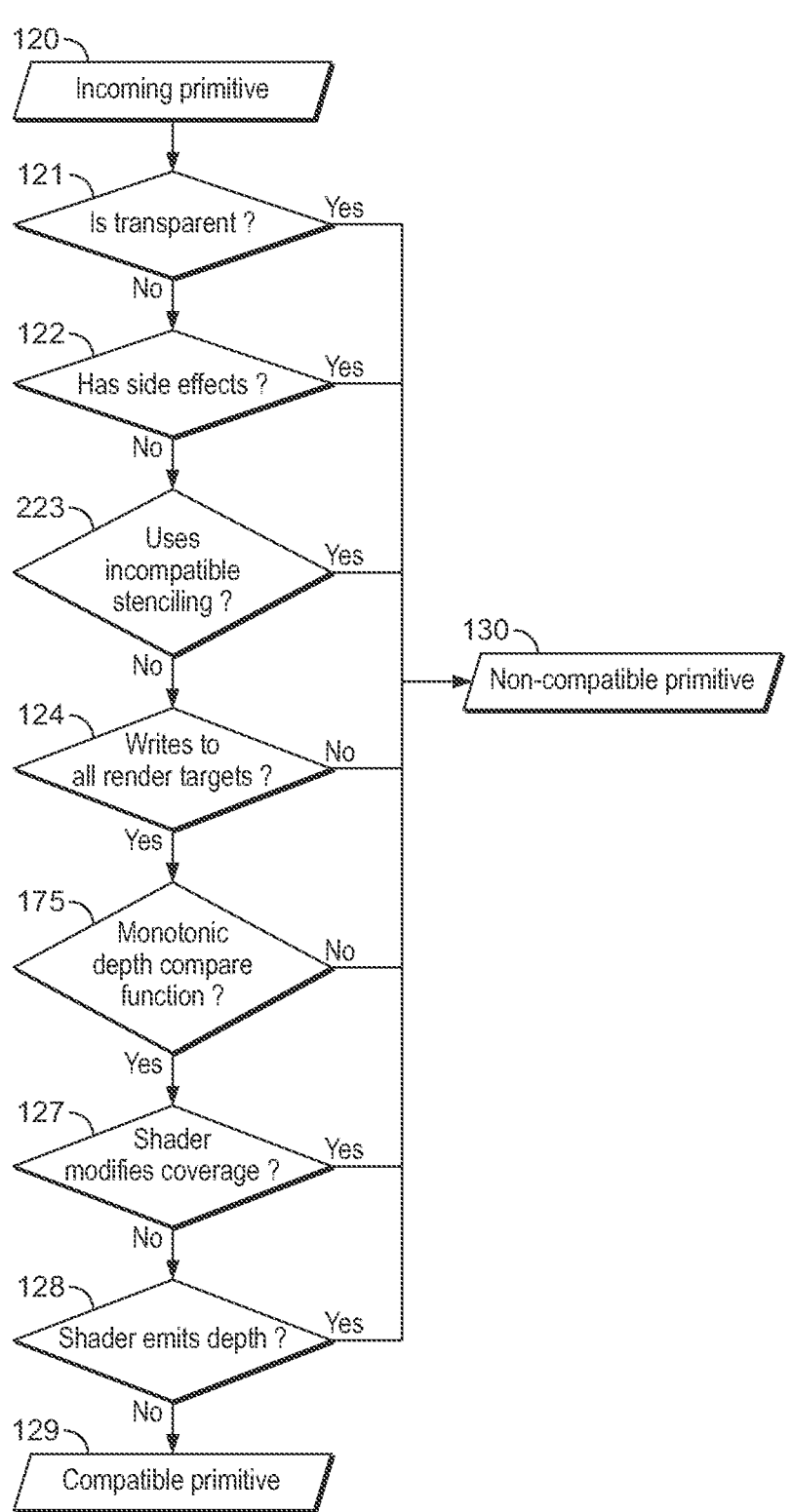
FIG. 21 illustrates a primitive classification process according to the third example in which primitives having certain types of stencilling can be made compatible with the "pre-pass" operation.

The effect of this is that at least some types of stencilling can now be handled by the pre-pass operation. FIG. 21 thus shows a corresponding primitive classification process for this example. In particular, as shown in FIG. 21, the primitive classification is generally the same as described above except now it is only certain types of incompatible stencilling that are considered incompatible with the pre-pass operation (at step 223). That is, there may be some types of stencilling that are still incompatible with the pre-pass operation. There are various conditions that may mean that stencilling is still incompatible with the pre-pass operation and these can generally be determined in advance, e.g. based on the properties of the stencil testing. For example, this may be the case where the front and back stencil test functions have different polarities. In that case, the primitives are therefore still treated as being incompatible, such that they should instead be handled using the third, fallback operation, as described above.

Example 4—Shader Modifies Coverage

In the examples described above, the first, pre-pass operation does not execute a fragment shader. This means that any primitives that require a fragment shader to be executed in order to fully determine the coverage and/or depth values for the primitive must be treated as incompatible, and this is shown accordingly in FIG. 12. That is, as shown in FIG. 12, primitives are determined to be incompatible with the pre-pass operation when the primitive has either of the properties shader modifies coverage (step 127) or shader emits depth (step 128). However, it may be desirable to execute at least a partial fragment shader during the first, pre-pass operation in order to expose the pre-pass to enough information to be able to handle such primitives, and in further examples this is therefore done.

For instance, as explained above, the purpose of the first, pre-pass operation is to determined "visibility" information for the sequence of primitives, which "visibility" information is then usable to control the fragment processing during the second, main pass operation, e.g., and in an embodiment, to cull fragments during the second, main pass operation for which it can be determined based on the visibility information that the fragments have no visible effect for the render output. The "visibility" information is in an embodiment generated based on depth (and optionally stencil) testing the fragments.

The application requiring the graphics processing may however specify various different types of primitives in which fragment shading is required in order to determine the final fragment coverage and/or depth values. Accordingly, for such primitives, it may be desirable to execute a first ("pre-pass") fragment shader routine during the first, pre-pass operation in order to determine the desired "visibility" information (otherwise, the primitive may have to be treated as being 'incompatible' with the pre-pass operation, e.g. and instead processed by a third, fallback operation, as in the examples described so far). An example of this is illustrated in FIG. 22 which shows the configuration of the first, pre-pass operation according to a fourth example in which the first, pre-pass operation is also operable to execute a respective (partial) fragment shader.

Figure 22:
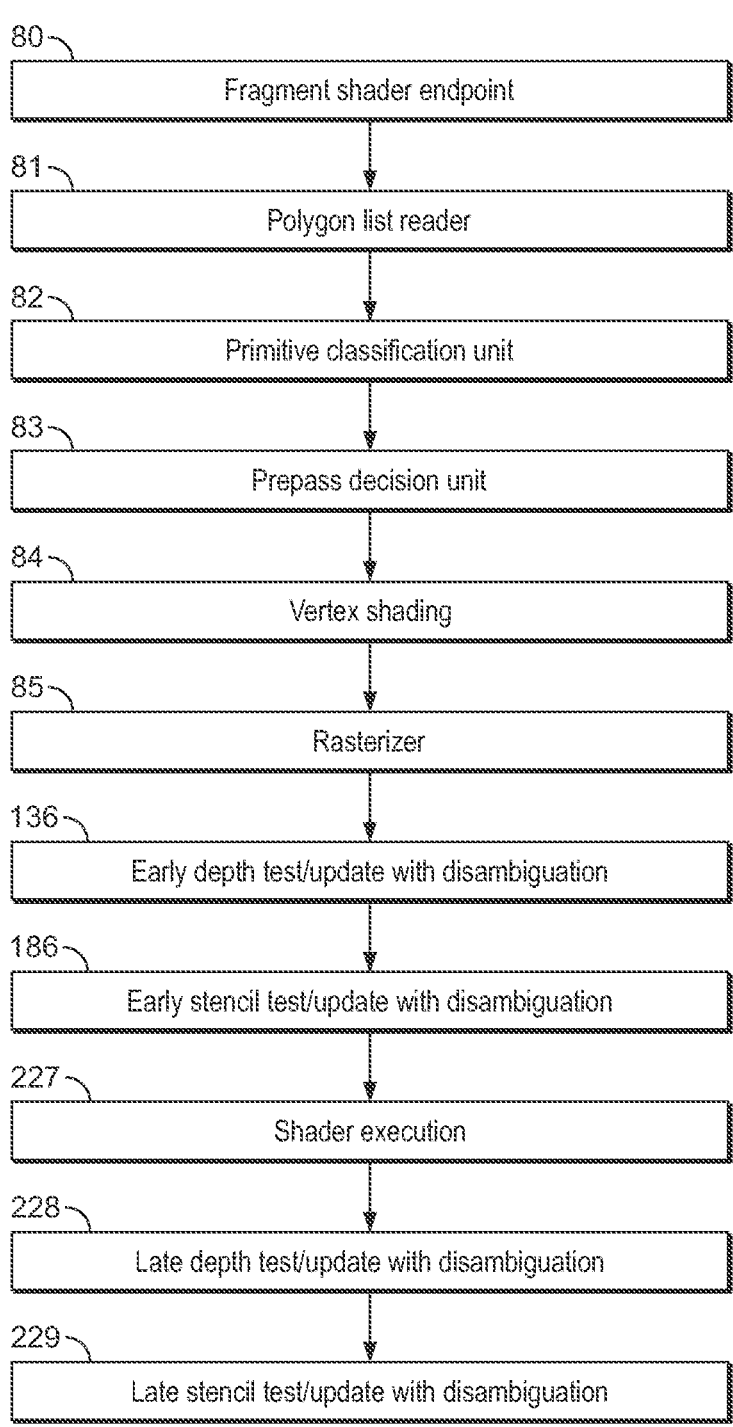
FIG. 22 shows schematically a sequence of processing operations for a pre-pass operation according to a fourth example in which a fragment shader is executed during the first, pre-pass operation.

FIG. 22 thus illustrates the processing operations (the graphics processing pipeline) according to the first, pre-pass operation according to a fourth example in which the visibility information comprises the depth/stencil buffer (such that the initial processing is in common with the example shown in FIG. 18) but in which after the (early) depth/stencil testing is performed, the first, pre-pass operation is further operable to execute a fragment shader 227 at least for primitives that require a fragment shader to be executed to determine the final coverage. The fragment shader 227 can then be executed accordingly to determine the final coverage which can then be used accordingly to perform late depth testing/update 228 and late stencil testing/update 229. The late depth/stencil testing/update can be performed in the normal manner but in an embodiment also include suitable disambiguation mechanisms for ensuring the correct rendering behaviour for primitives that use an exclusive depth/stencil test function in the situation that there are two primitives that write the same depth/stencil value, e.g. as described above in relation to the second and third examples.

The fragment shader is thus operable to execute a first fragment shader routine during the first, pre-pass operation. For example, this is in an embodiment a partial version of the full fragment shader that is executed during the second, main pass operation. For example, the first fragment shader routine may execute up to a certain 'discard' instruction with the fragment shader routine being executed accordingly just far enough to generate the desired visibility information, but not producing the final rendered output data (which is still deferred to the second, main pass operation which in an embodiment then runs the full fragment shader, when required to complete the rendering to produce the final rendered output data). Various arrangements are contemplated for determining how far and whether a fragment shader should be executed during the first, pre-pass operation, e.g. depending on the desired shader state (including potential shader side effects) that may desirably be obtained during the respective processing passes.

Figure 23:
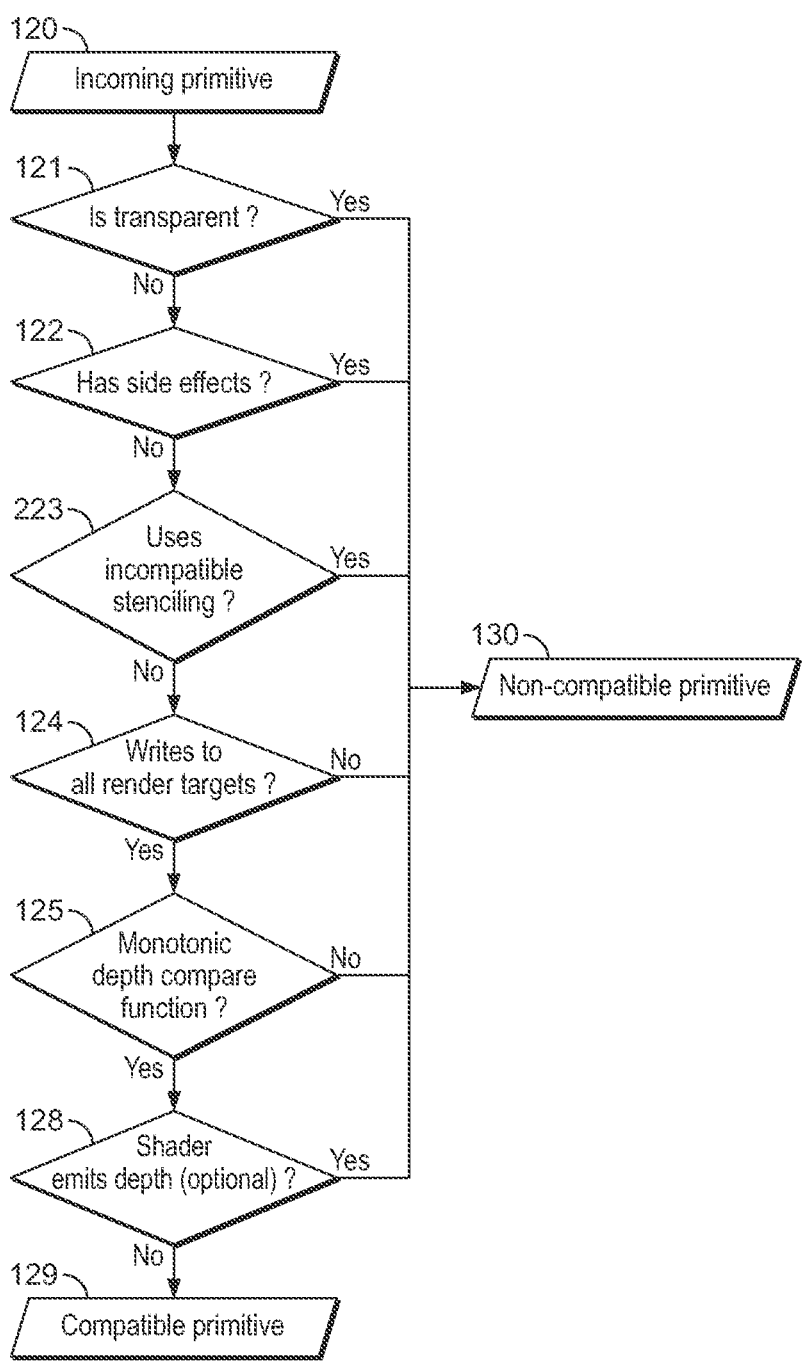
FIG. 23 illustrates a primitive classification process according to the fourth example.

The classification process in this fourth example is therefore correspondingly modified as shown in FIG. 23 such that primitives for which the shader modifies coverage are no longer treated as being incompatible with the pre-pass operation. The classification process is thus generally similar to that described above and shown in FIG. 17, except that the shader modifies coverage condition no longer needs to be checked.

In the specific example that is shown in FIG. 23 the condition shader emits depth is still considered incompatible (since in this example the fragment shader does not write depth). However, it would of course also be possible to allow the shader that is executed in the pre-pass operation to write depth, in which case shader emits depth primitives would also no longer be determined to be incompatible. That is, the fragment shader that is executed in the pre-pass operation may be executed up to and including the discard point to determine whether the shader modifies coverage and may also be executed up to and including the point where late depth is determined. In general, the fragment shader that is executed in the pre-pass operation may therefore be executed up to any suitable and desired point in order to expose the first, pre-pass operation to enough state to determine the full visibility information, whatever that involves. Various arrangements are contemplated in this regard for how far the fragment shader that is executed in the first, pre-pass may be executed.

Example 5—"HSR ID" Buffer

The examples described so far all relate to a first main embodiment in which the depth buffer (and optionally also the stencil buffer) generated during the first, pre-pass operation is used as the "visibility" information for controlling fragment processing during the second, main pass operation. Various other examples are however contemplated and the "visibility" information that is generated during the first, pre-pass operation that is then used to control the processing during the second, main pass operation may in general take any suitable and desired form.

For example, in a second main embodiment for generating the "visibility" information, rather than using the depth (stencil) buffer itself as the "visibility" information that is used to control the further processing of primitives during the second, main pass operation, the first, pre-pass operation generates "visibility" information in the form of a dedicated set of per-sample primitive identifying information that stores for respective sampling positions within the render output a respective primitive identifier indicating which primitive should be further processed for the sampling position in question (which primitive identifiers will also be referred to herein as hidden surface removal identifiers ("HSR IDs"), with the set of per-sample primitive identifying information correspondingly being referred to as a "HSR ID buffer").

The HSR ID buffer may generally take any suitable and desired form but may generally match the size and form of the depth buffer in that it is capable of storing a respective HSR ID for each sampling position within the render output in a similar fashion to how the depth buffer stores a respective depth value for each sampling position within the render output. The HSR ID buffer can thus be (and is in this example) populated during the first, pre-pass operation to record the desired visibility information for the respective sampling positions of the render output. The result of this is thus that the HSR ID buffer at the end of the first, pre-pass operation stores a respective set of HSR IDs indicating which primitives should be processed further for which sampling positions within the render output.

Figure 24:
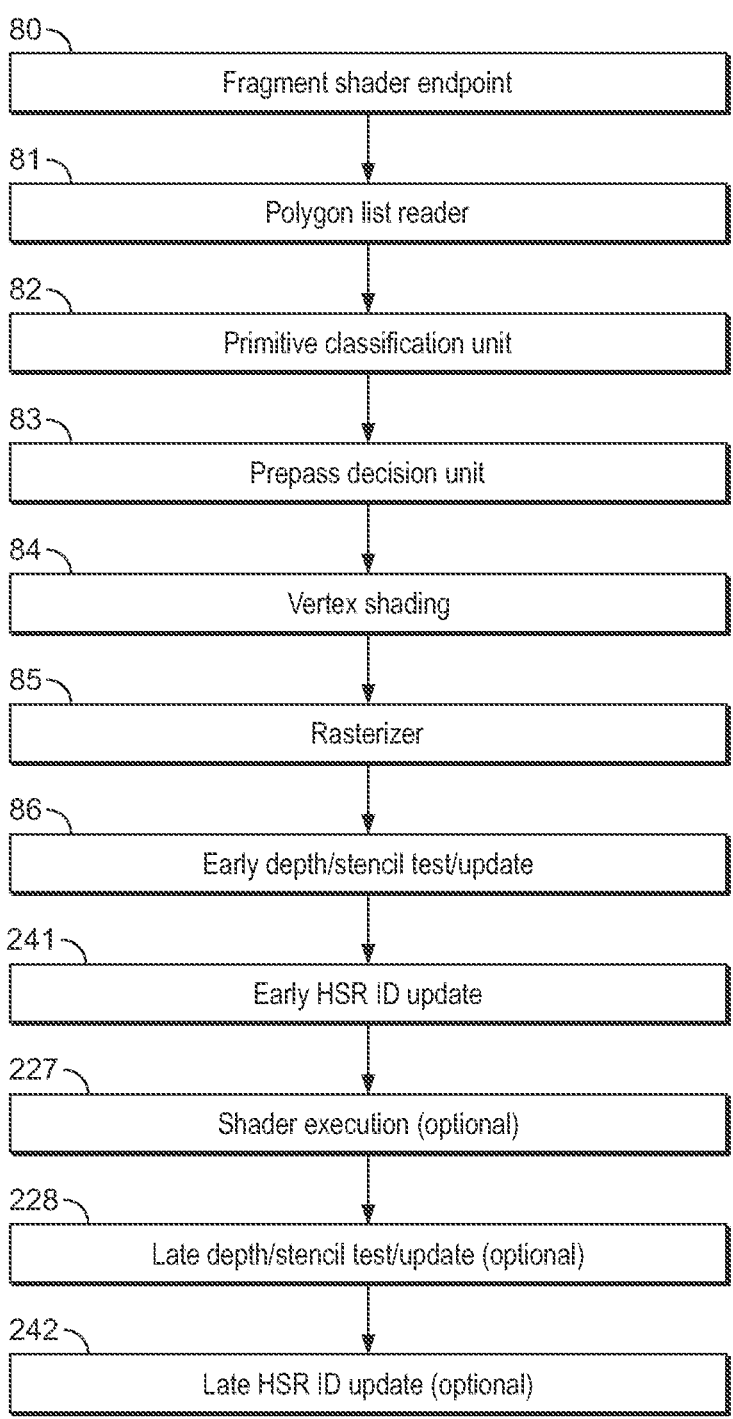
FIG. 24 shows schematically a sequence of processing operations for a pre-pass operation according to an example according to an embodiment in which visibility information is generated in the form of a set of per-sample primitive identifying information (which will be referred to hereinafter as a "HSR ID" buffer)

FIG. 24 shows a sequence of processing operations for a pre-pass operation according to an example according to an embodiment in which visibility information is generated in the form of such HSR ID buffer. In this example, the first, pre-pass operation thus comprises a pipelined sequence of processing operations including: a fragment shader endpoint 80 that schedules the rendering work that the graphics processing pipeline needs to perform in order to render a tile; a primitive list reader (polygon list reader 81) that reads the appropriate primitive list(s) for the tile to identify the primitives that are to be rendered for the tile; a primitive classification unit 82; a pre-pass decision unit 83; a vertex processing (shading) stage 84 that obtains (and shades, if necessary) the relevant vertex data for the primitives to be rendered for the tile; a rasteriser 85 that rasterises primitives into respective fragments corresponding to sampling positions within the render output; and an (early) depth test/update stage 86 that performs fragment depth testing and updates the depth buffer accordingly.

So far, the processing pipeline is therefore similar to that described above in relation to the earlier examples. In this example, however, after the (early) depth/stencil test/update 86, a further HSR ID update 241 is performed that updates the HSR ID buffer as needed in response to the (early) depth/stencil test/update 86. In the example shown in FIG. 24 the first, pre-pass operation may optionally also execute a fragment shader 227 and perform late depth/stencil test/update 228 as described above in relation to FIG. 22. In that case, there may be a further late HSR ID update 242 that updates the HSR ID buffer as needed in response to the results of the late depth/stencil test/update 228.

Figure 25:
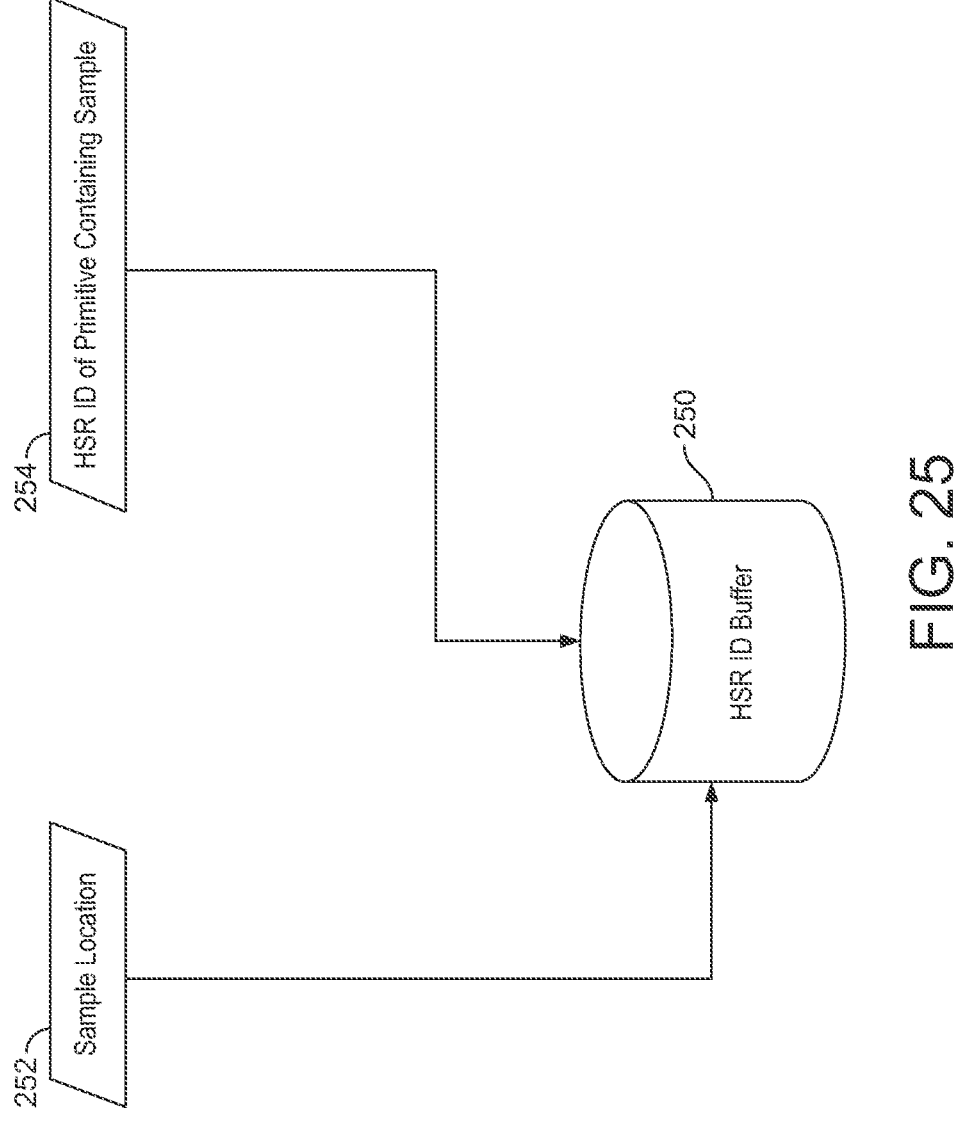
FIG. 25 shows schematically how such HSR ID buffer may be populated during the first, pre-pass operation.
Figure 26:
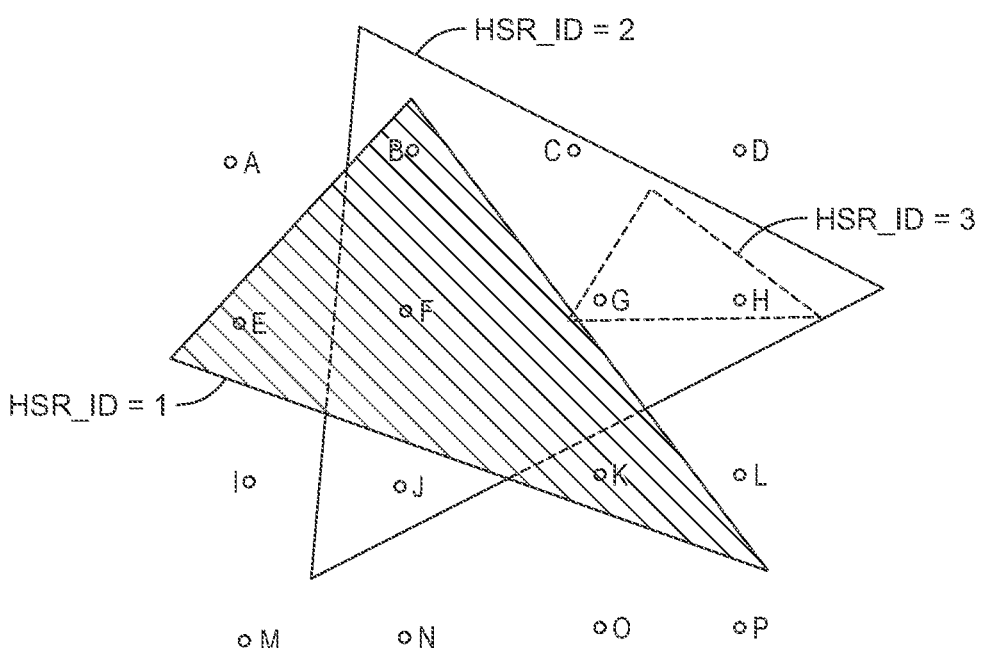
FIG. 26 shows schematically an example of populating such HSR ID buffer.

The updating of the HSR ID buffer is thus performed based on the depth/stencil testing. FIG. 25 shows schematically how such HSR ID buffer may be populated during the first, pre-pass operation. In particular, as shown in FIG. 25, when it is determined during the early depth/stencil test/ update 86 that a fragment for a primitive is visible at the sampling position or positions to which the fragment relates, the HSR ID buffer 250 is then updated at that point to record the associated HSR ID for the primitive to which the fragment relates. Whenever a fragment is determined to survive the early depth/stencil test/update 86, such that the fragment is determined to be visible at the respective sampling position or positions to which the fragment relates (at least based on the visibility information generated so far), the first, pre-pass operation writes to the HSR ID buffer accordingly, with the address of the write being determined by the sample location 252 and the value being written corresponding to the HSR ID of the primitive containing the sample in question 254. A worked example of populating the HSR ID buffer in this way is illustrated in FIG. 26.

In this example, there is shown three primitives that at least partially overlap with each other. It will be appreciated in typical case there will be many primitives that need to be rendered but this simplified example is used for ease of illustration. As will be described further below, each primitive is allocated a respective unique primitive identifier, i.e. a respective HSR ID. In this example, the frontmost primitive is drawn first, and is thus allocated the first HSR ID (i.e. its HSR ID=1). There is a larger primitive drawn behind that (with HSR ID=2) and another primitive (with HSR ID=3) that is completely behind the other two primitives (such that it is not visible in the final render output). There is also shown a corresponding set of sampling positions {A, B . . . P}, defined within the render output.

In this example, it can be seen that the top left sampling position (position A) is not covered by any of the three primitives. Thus, as shown in FIG. 26, a 'null' value ('zero') is recorded in the HSR ID buffer in the respective entry for sampling position A. For the next sampling position (sampling position B), it can be seen that this is covered by the first two primitives, however, it can be seen from FIG. 25 that the first primitive (with HSR ID=1) should be visible, as it is drawn in front of the other primitive. Thus, in this example, the fragment for the first primitive will survive the depth testing at sampling position B and thus cause the HSR ID buffer to be updated accordingly such that its HSR ID ('1') is stored in the respective entry for that sampling position. The corresponding fragment for that sampling position for the next primitive (with HSR ID=2) in this example fails the depth testing, and so does not cause the HSR ID buffer to be updated again. This is then repeated for all primitives and all sampling positions appropriately in order to determine the final HSR ID buffer. The determined HSR ID buffer is then used during the second, main pass operation in order to control the subsequent fragment processing.

Thus, during the first, pre-pass operation, primitives in the sequence of primitives are processed into their respective fragments, and the resulting fragments are then processed to determine the desired visibility information associated with the fragments (e.g., and in an embodiment, by depth (and optionally also stencil) testing the fragments against a corresponding depth (stencil) buffer to determine the fragment's visibility), with the HSR ID buffer being updated accordingly during the first, pre-pass operation. That is, as mentioned above, whenever a fragment for a primitive is determined to be visible for a respective sampling position within the render output based on the visibility information generated so far by the processing of earlier primitives in the sequence of primitives, a respective entry in the fragment visibility buffer for the sampling position or positions to which the fragment relates should be (and in this example is)

updated accordingly to record the primitive identifier for the primitive in question (i.e. the primitive that caused the update). This is then repeated for further primitives in the sequence of primitives. Thus, it will be appreciated that the entry for a given sampling position may (and will) subsequently be overwritten if a fragment for a later primitive is subsequently determined to be visible at that sampling position. The effect of this is therefore that at the end of the first, pre-pass operation the HSR ID buffer correspondingly reflects the full visibility information for the sequence of primitives, with the stored HSR IDs indicating, on a per-sampling position basis, which primitives should be further processed for which of the sampling positions.

Figure 27:
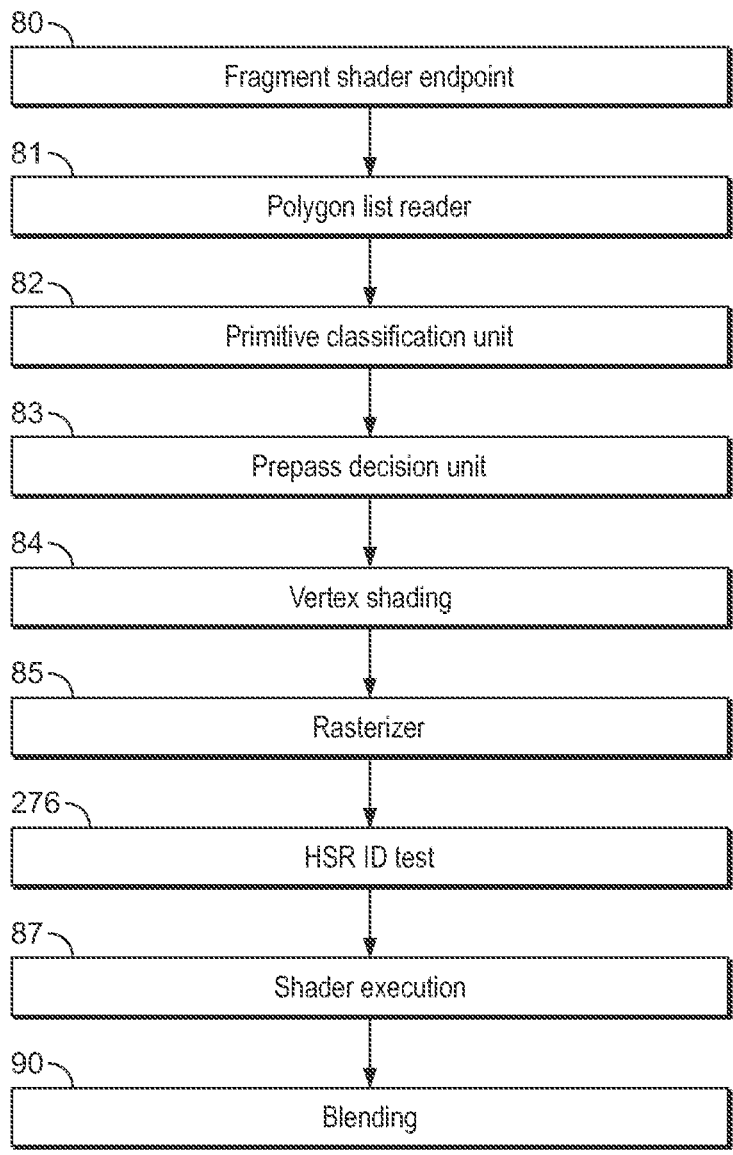
FIG. 27 shows schematically a sequence of processing operations for a corresponding main pass operation to be performed after the pre-pass operation shown in FIG. 24 including a visibility test against the HSR ID buffer.

The per-sampling position primitive identifiers can then be used as part of a subsequent fragment visibility testing operation during the second, main pass operation to identify which primitive should be further processed for a given sampling position, and hence allow fragments for other primitives to be culled accordingly for the second, main pass. FIG. 27 shows the sequence of processing operations for the corresponding main pass operation in this example that is to be performed after the pre-pass operation shown in FIG. 24.

As shown in FIG. 27, the second, main pass operation in this example comprises a pipelined sequence of processing operations including, in common with the first, pre-pass operation: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output.

The second, main pass operation in this example does not perform depth testing of the fragments (although further depth testing could be performed if desired) but instead performs a HSR ID test 276 that tests whether the HSR ID for the fragment being tested matches the HSR ID value stored in the HSR ID buffer 250 for the sampling position or positions to which the fragment relates. Thus, if the fragment has the same HSR ID value as that stored in the HSR ID buffer 250, the fragment survives the HSR ID test 276, and is therefore further processed by executing a fragment shader 87, and then performing blending 90, etc., to generate the final rendered output data. On the other hand, if the fragment's HSR ID does not match the value stored in the HSR ID buffer 250, such that the fragment fails the HSR ID test 276, the fragment can be (and is) culled at this point during the second, main pass, with the fragment shading 87, etc., being avoided. In this way, the fragment processing during the second, main pass operation can be controlled based on the depth buffer generated during the first, pre-pass operation such that rendered output data is only produced for fragments that are actually visible.

Figure 28:
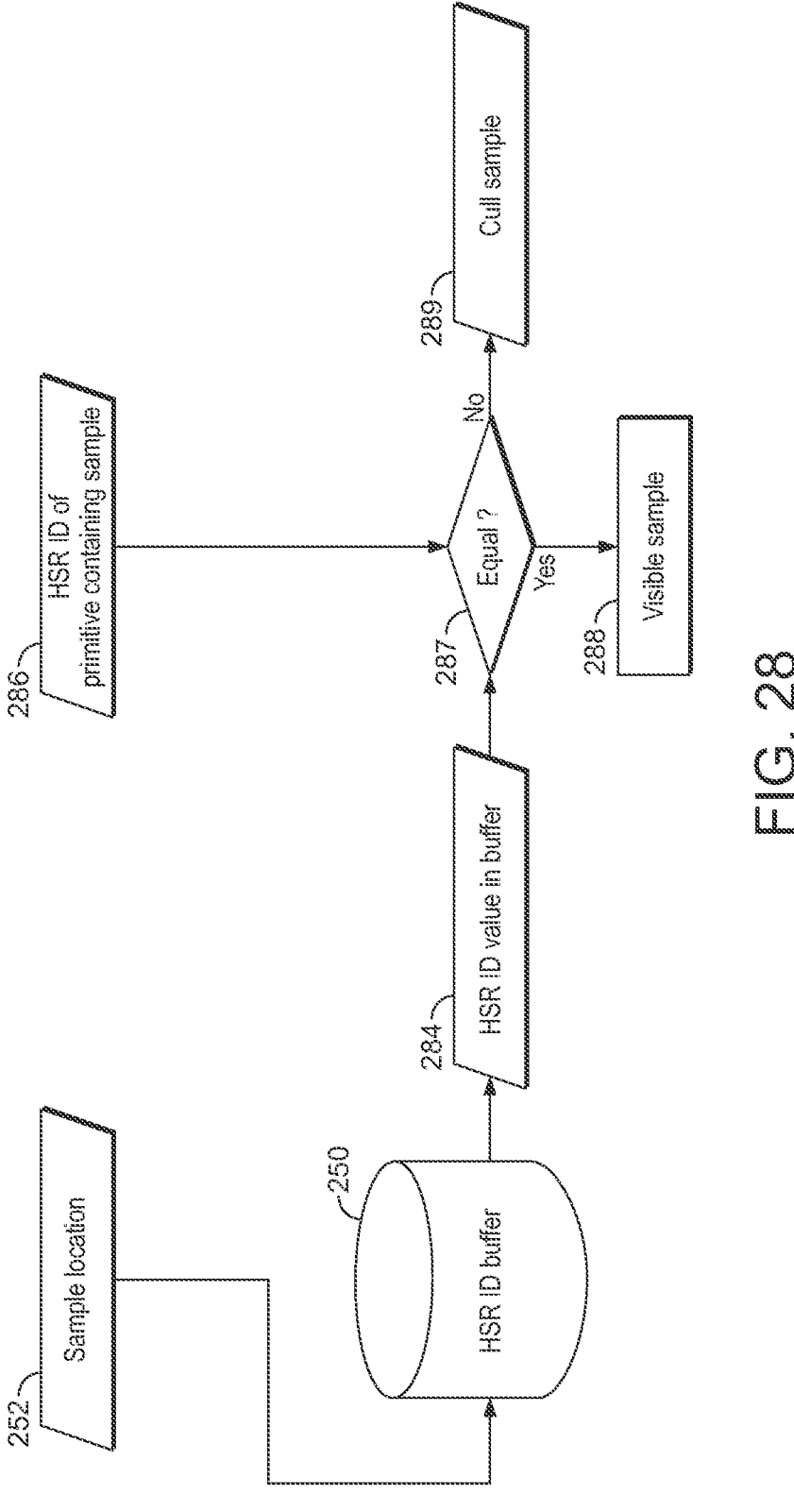
FIG. 28 shows schematically how such visibility testing against the HSR ID buffer is performed during the second, main pass operation.

FIG. 28 shows schematically how such visibility testing against the HSR ID buffer is performed during the second, main pass operation. Here, the address of the location to read from the HSR ID buffer 250 is determined by the sample location 252. The read HSR ID value stored in the buffer 284 is then compared to the HSR ID 286 of the primitive the sample being tested was rasterised from. If the values are equal (step 287—yes), the fragment is determined to be visible and is thus passed for further processing. On the other hand, if the values are not equal (do not match) (step 287—no), the sample is accordingly determined to be invisible. That is, for primitives that were processed during the first, pre-pass operation, and which could therefore have updated the HSR ID buffer in respect of a particular sampling position (but did not do so), this means that the primitive must have no visibility at that sampling position, and the fragments for the primitive relating to that sampling position can accordingly be culled on this basis (step 289).

Thus, in this example, the HSR ID test 276 uses an 'equals' test function. For instance, for any primitives that were processed during the first, pre-pass operation, and that could potentially therefore have updated the HSR ID buffer 250, if a fragment for such a primitive is visible in the final render output, the associated HSR ID for that primitive should be (and is) stored in the respective entries in the HSR ID buffer for the sampling position or positions to which the fragment relates. The HSR ID test 276 thus allows the graphics processor to cull any fragments for primitives that are not visible for the final render output when it is possible to do so, and to thereby provide sample-perfect hidden surface removal. The HSR ID values that are stored in the fragment visibility buffer 250 are thus usable during the subsequent visibility testing in the second, main pass operation to determine which primitives should be processed further for which sampling positions within the render output.

To facilitate the generation and use of the HSR ID buffer in this way, each primitive is therefore allocated a respective HSR ID that uniquely identifiers the primitive within its sequence of primitives (i.e. within the tile). This can be done during primitive classification as shown in FIG. 29.

Figure 29:
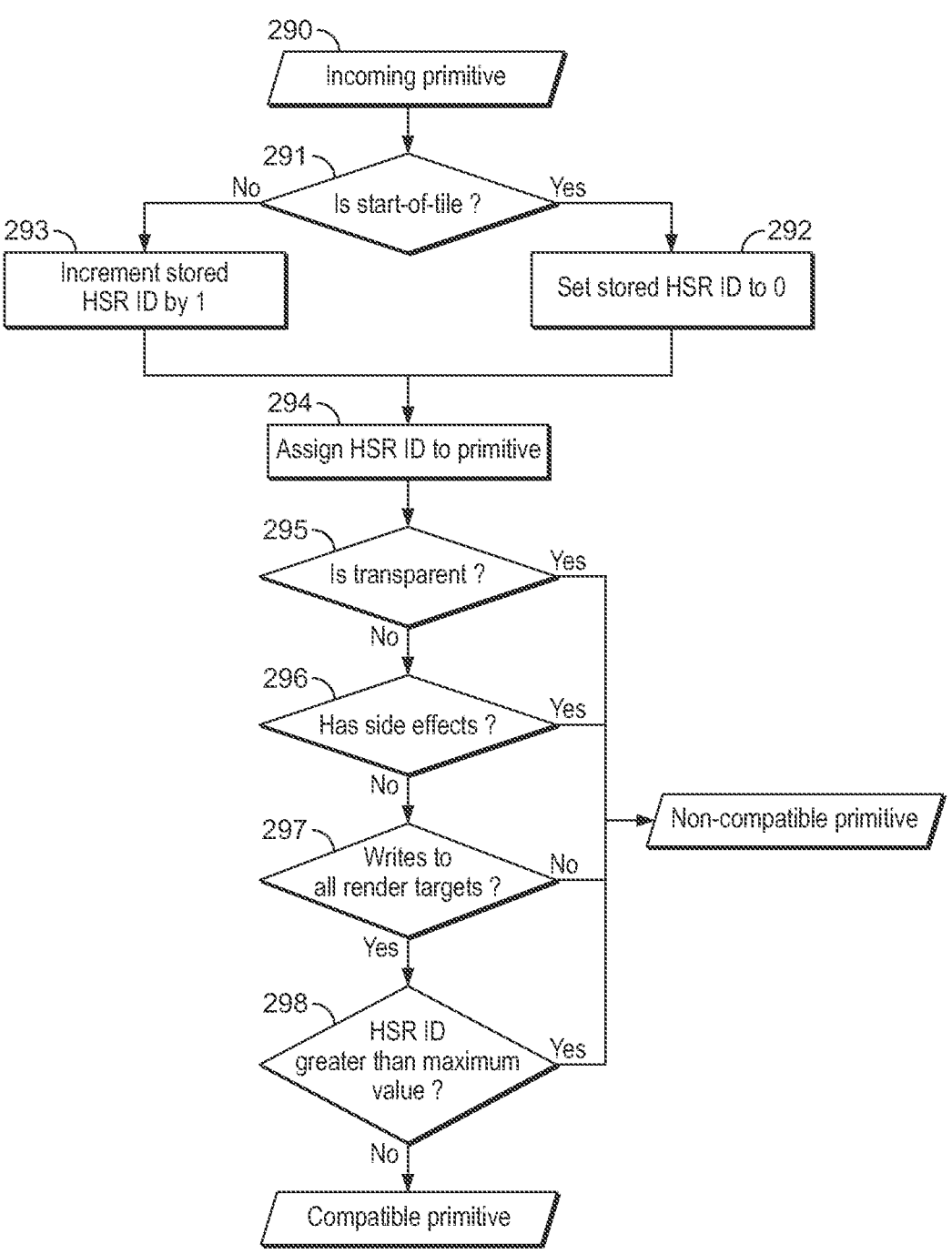
FIG. 29 shows schematically an example primitive classification process according to an embodiment using a HSR ID buffer.

FIG. 29 thus shows an example primitive classification process according to this fifth example in which the visibility information generated during the first, pre-pass operation comprises a dedicated HSR ID buffer. In this example the primitive classification may be performed at run-time. As shown in FIG. 29, for an incoming primitive 290 to the primitive classification, it is first checked whether the primitive is simply indicating the start of the tile (step 291) (in which case the HSR ID is set to 'zero' (step 291—yes)). For all subsequent primitives (step 291—no), the stored HSR ID is incremented by one, and then assigned to the primitive accordingly (step 294). Thus, each primitive in the sequence of primitives being processed is associated with a unique primitive identifier, with the primitive identifiers increasing monotonically within the sequence of primitives. In particular, in this example, the primitives may be indexed within the sequence of primitives starting from 'one' (such that the first primitive in the sequence may be identified as primitive 'one', the second primitive identified as primitive 'two', and so on). The value 'zero' is thus used to indicate as a null, or 'clear' value, to indicate that there is no primitive coverage at the sampling position in question.

The primitive classification in this example then continues as shown in FIG. 29. In particular, in this example, any primitives that are transparent (step 295), have side effects (step 296), or that do not write to all render targets (step 297) are treated as incompatible primitives. In this example, there is a further condition to be checked, namely whether or not the HSR ID is greater than the maximum possible HSR ID value. For example, if there are too many primitives to be processed, the system may effectively run out of HSR IDs that can be allocated. In that situation, any primitives that exceed the maximum possible HSR ID value are in this example simply treated as being incompatible with the pre-pass operation (step 298), and are therefore instead processed by the third, fallback operation as described above. Otherwise, if none of these conditions are met, the primitive is determined to be compatible with the pre-pass operation and is processed accordingly.

As described above, the primitive classification result is then used to drive the state machine for the graphics processor such that the pre-pass decision unit causes the graphics processor to initially process primitives by the first, pre-pass operation, and continue in this manner to the end of the tile so long as the primitives are compatible with being processed by the first, pre-pass operation, but is caused to transition to the third, fallback operation in the event that an incompatible primitive is encountered (as described above and shown in FIG. 7, for example).

Figure 30:
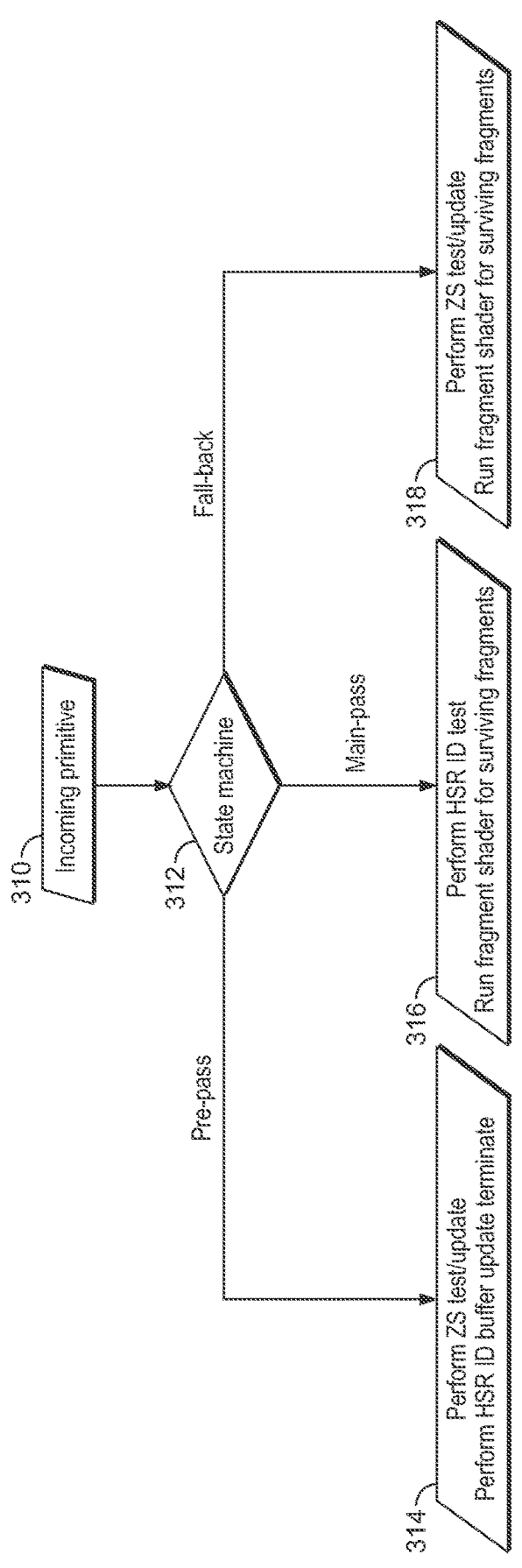
FIG. 30 shows schematically a state machine for a graphics processor operating according to this example using the HSR ID buffer.

FIG. 30 shows schematically a state machine 312 for a graphics processor operating according to this example using the HSR ID buffer showing, for an incoming primitive 310 to be processed, how the primitive 310 is processed differently according to the different possible states of the graphics processor in this example. Thus, when the graphics processor is configured in the pre-pass state 314, the pipeline stages shown in FIG. 24 are active, and the primitive is processed accordingly. Likewise, when the graphics processor is configured in the main pass state 316, the primitive is processed accordingly by the pipeline stages shown in FIG. 27. In this example, the graphics processor in the fallback state 318 may be configured as shown in FIG. 10 above, such that depth testing is performed as normal but no attempt is made to update the HSR ID buffer once the fallback mode is triggered (although in some cases the HSR ID update 241 may be left on during the fallback mode as well).

A benefit of this approach compared to the earlier examples is that there is no need to disambiguate primitives having the same depth (or stencil) values, since this can all be worked out during the first, pre-pass operation when determining the HSR ID buffer 250. This approach can also naturally handle stencilling, for example, since the stencil testing can be performed as normal during the first, pre-pass operation and the resulting visibility information recorded in the form of the HSR ID for the fragment that survives the depth/stencil testing. Thus, it can be seen from FIG. 29 that there are fewer conditions that trigger the fallback mode in this example compared to some of the earlier examples.

Example 6—HSR ID Buffer, ZS-Only Primitives

In example classification shown in FIG. 29, primitives that do not write to all render targets are however still treated as incompatible with the pre-pass operation (step 297). However, in some examples, primitives that do not write to all render targets may be compatible so long as they do not write to the final rendered output data, e.g. so long as they are only write depth/stencil values. This is illustrated in FIG. 31 and FIG. 32, for example.

Figure 31:
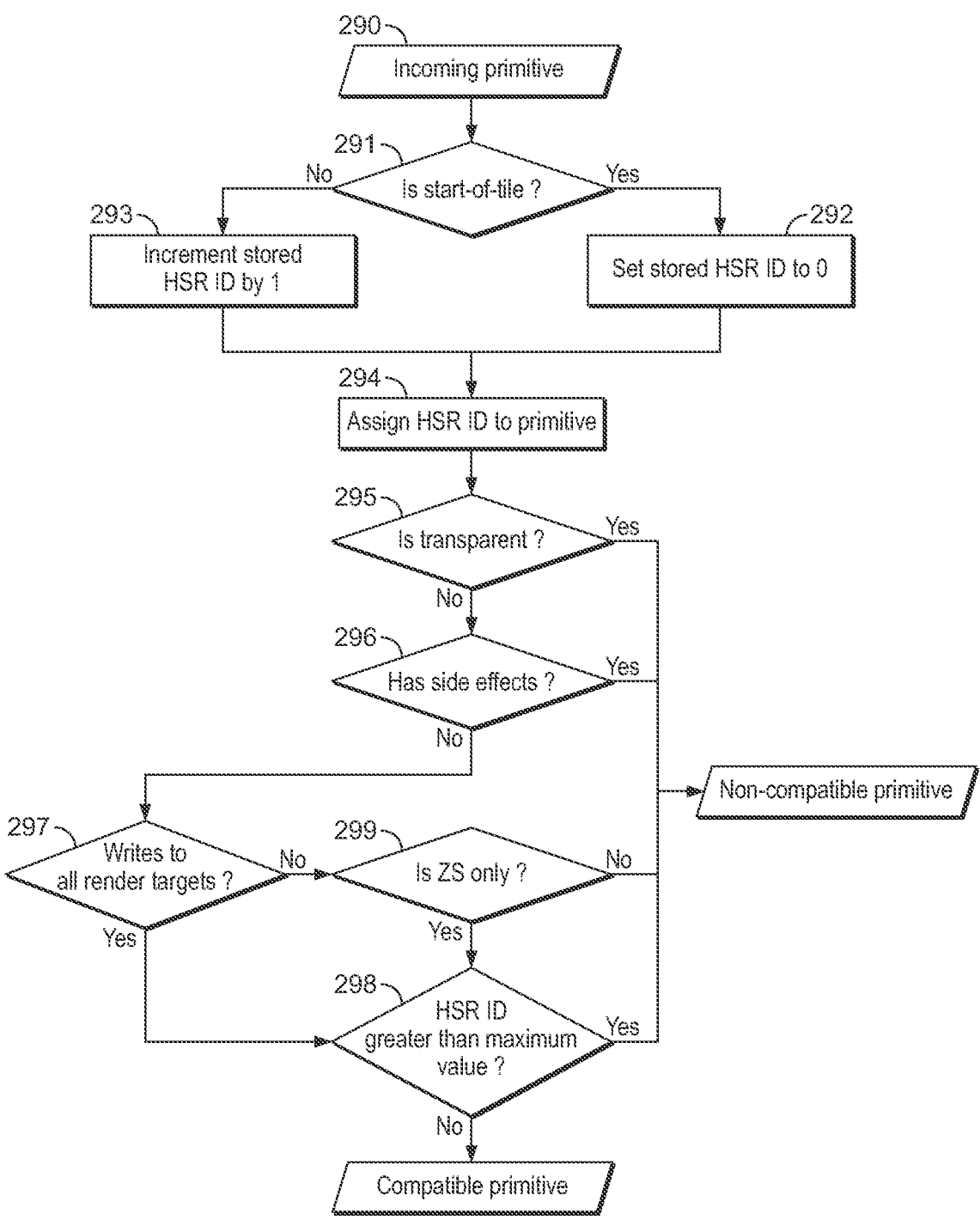
FIG. 31 shows schematically an example primitive classification process according to an example in which primitives that do not write to all render targets are made compatible with the pre-pass operation, so long as they only write depth/stencil values.

FIG. 31 shows a corresponding classification process for this example. The primitive classification process shown in FIG. 31 is generally similar to that shown in FIG. 29 except that for primitives that do not write to all render targets (step 297—no), it is then checked whether the primitive only writes depth/stencil values (step 299). If the primitive only writes depth/stencil values (step 299—yes), then so long as the HSR ID does not exceed the maximum possible HSR ID value (step 298—no), the primitive is determined to be compatible.

Figure 32:
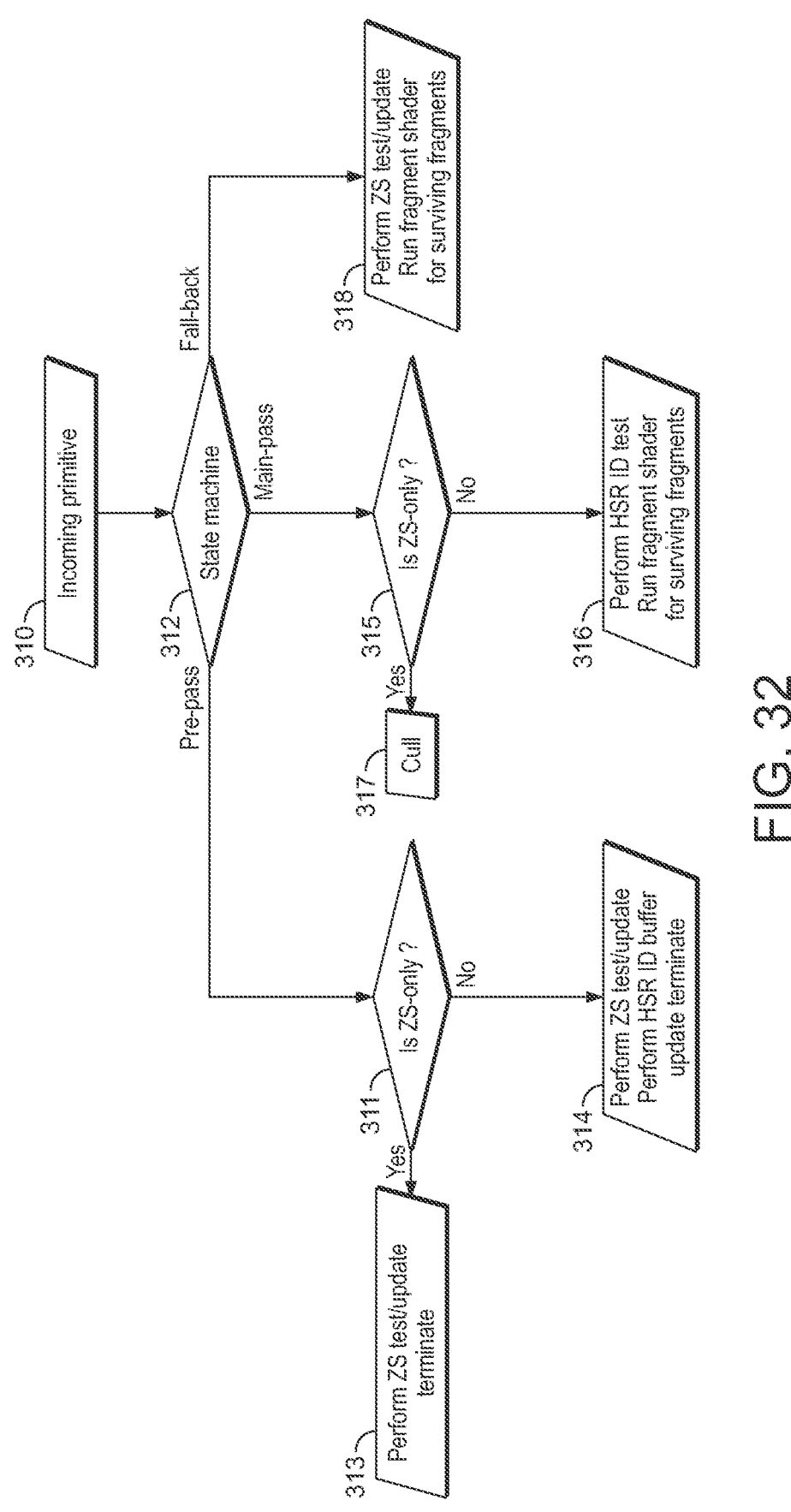
FIG. 32 shows the operation of the corresponding state machine for the example that is illustrated in FIG. 31.

FIG. 32 shows the corresponding pre-pass decision logic in this example. Again, this is generally the same as the state machine 312 shown in FIG. 30 except that it is also checked during the first, pre-pass operation whether the primitive only writes depth/stencil values. If the primitive only writes depth/stencil values (step 311—yes), the depth/stencil test/update is then performed but there is no need to update the HSR ID buffer (step 313). Otherwise, the first, pre-pass operation is performed as described above (step 314). This condition is also checked during the second, main pass operation in order to cull primitives that only write depth/stencil values (step 315). Thus, any primitives that only write depth/stencil values (step 315—yes), and hence do not need to be processed by the second, main pass to produce the final rendered output data, are culled at this point (step 317).

Example 7—HSR ID Buffer, Transparent Primitives

In the examples above, "transparent" primitives are determined to be incompatible with the pre-pass operation. This is because transparent primitives generally do not write depth values, and so cannot update the depth buffer, or therefore the HSR ID buffer. This means that the HSR ID equals testing if performed as described above would always cull any such transparent primitives that are not capable of updating the HSR ID buffer (since the HSR ID for the transparent primitive can never match the stored value in the HSR ID buffer), even if the correct behaviour based on the original depth testing is for the transparent primitive to be rendered.

For instance, as described above, at least for primitives that were capable of updating the HSR ID buffer during the first, pre-pass operation, the visibility testing during the second, main pass operation against the HSR ID buffer should (and does) comprise an 'equals' test. This works because if the primitive was already processed in the first, pre-pass operation such that it could in principle have updated the HSR ID buffer in respect of a particular sampling position, but it did not do so, this must mean that the primitive is not in fact visible at that sampling position. In other words, only primitives that were determined during the first, pre-pass operation to be visible at a particular sampling position will be recorded in the HSR ID buffer, and so only fragments whose HSR ID matches the value stored in the HSR ID buffer for the sampling position or positions to which the fragment relates should survive the HSR visibility testing. However, this does not work for transparent primitives that are not capable of updating the HSR ID buffer.

In the example described above therefore any transparent primitives are simply treated as being incompatible with the pre-pass operation. Another option would be to always pass transparent primitives and allow them to be dealt with appropriately by the fragment shader (or even by additional depth testing after the HSR ID test, if that were desired). In an embodiment, however, transparent primitives are also tested against the HSR ID buffer to try to cull them where it is possible to do so. To do this, the HSR ID test 276 that is performed during the second, main pass operation is modified accordingly for such transparent primitives such that a 'greater than' test function is used. That is, the HSR ID test 276 may either use an 'equals' test or a 'greater than' test, depending on the type of primitive (in particular whether or not the primitive could potentially have updated the HSR ID buffer in the first, pre-pass operation). In this case, there may be no need to process the transparent primitives in the first, pre-pass operation at all.

Figure 33:
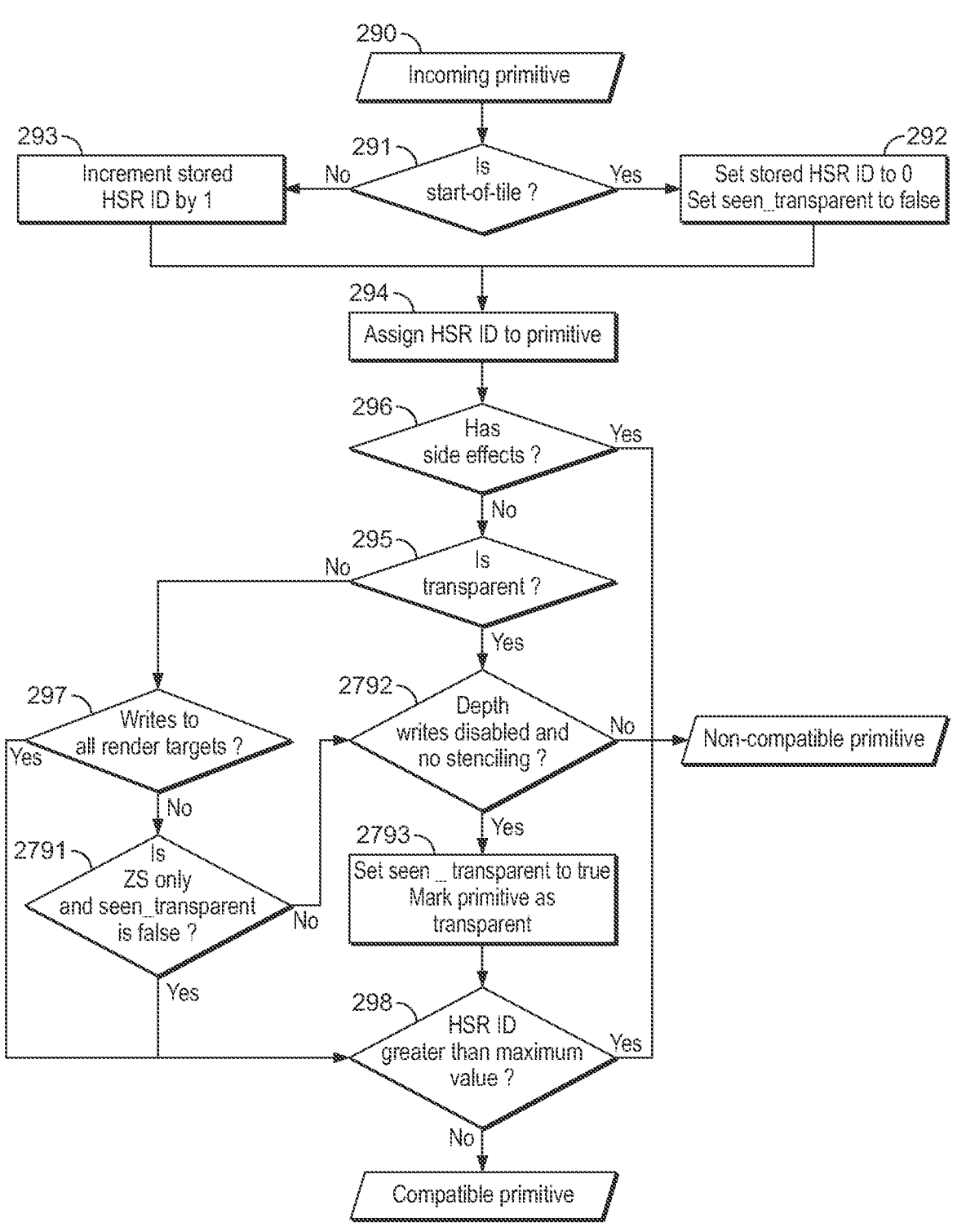
FIG. 33 shows schematically an example primitive classification process according to another example in which primitives that are marked as 'transparent' may be handled by processing the transparent primitives only by the second, main pass operation.

The following example illustrates how "transparent" primitives may be handled by the pre-pass operation. FIG. 33 shows a corresponding classification process for this example and FIG. 34 shows the corresponding pre-pass decision logic in this example.

As shown in FIG. 33, the primitive classification in this example generally proceeds as described above in relation to FIG. 31, except that in this case, if a primitive is determined to be transparent (step 295—yes), rather than this itself leading to the primitive being classified as incompatible, it is then checked whether depth writes are disabled and no stencilling is required for the primitive (step 2792). If this is not the case, as either depth writes are enabled or stencilling is required (step 2792—no), the primitive is then determined to be incompatible. Otherwise, so long as the HSR ID value is not greater than the maximum available HSR ID value (step 298—no), the primitive is compatible. In this even, the primitive is marked as transparent and a 'seen_transparent' flag is set to 'true' to indicate that a transparent primitive has been seen (step 2793) (note that this flag is initially set to false at the start of the tile (at step 292)).

The 'seen_transparent' flag is also used in the case that a primitive is not transparent (step 295—no), and the primitive does not write to all render targets (step 297—no). In that case, if the primitive writes only depth/stencil values and no transparent primitives have been seen so far (i.e. the 'seen_transparent' flag is set to false) (step 2791—yes), the primitive may still be compatible, assuming that there are no other conditions that would make it incompatible. If the primitive does not write only depth/stencil values or the 'seen_transparent' flag is set to true (step 2791—no), the classification then continues to determine whether depth writes are disabled and no stencilling is required for the primitive (step 2792) and the testing proceeds as above from that step.

Figure 34:
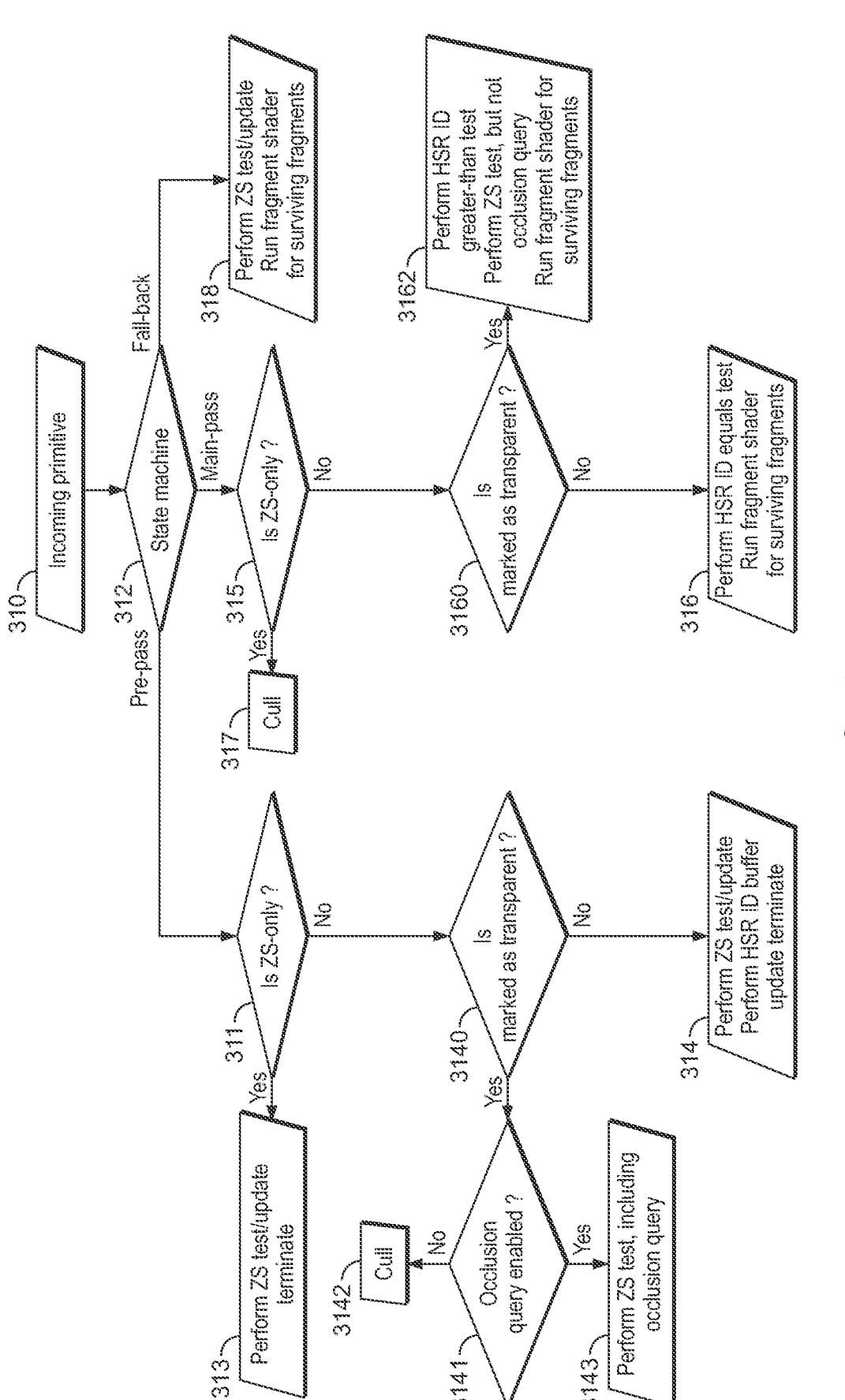
FIG. 34 shows the operation of the corresponding state machine for the example that is illustrated in FIG. 33.

FIG. 34 shows the corresponding pre-pass decision logic in this example. This basically corresponds to the state machine shown in FIG. 32 except that further decision logic is incorporated to handle primitives that are marked as transparent (at step 2793 in FIG. 33 above). In this example, the graphics processor in the fallback state 318 is again configured as shown in FIG. 10 above.

Thus, as shown in FIG. 31, when the graphics processor is configured in the pre-pass state, such that the pipeline stages shown in FIG. 24 are active, for primitives that do not only write depth/stencil values (step 311—no), it is further checked (at step 3140) whether primitives are marked as transparent. For primitives that are not marked as transparent (step 3140—no), the first, pre-pass operation is performed in the same manner described above, with the processing pipeline configured as shown in FIG. 24.

For transparent primitives, when the graphics processor is in the pre-pass state, if the primitive is transparent (step 3140—yes), the primitive may generally be culled unless an occlusion query is enabled that means that all primitives should be processed during the first, pre-pass operation. Thus, if occlusion queries are not enabled (step 3141—no), the transparent primitive is culled at this point (step 3142). Otherwise, if occlusion queries are enabled (step 3141—yes), the depth/stencil test should be performed including the occlusion query (step 3143).

Correspondingly, when the graphics processor is in the main pass state, if the primitive is transparent (step 3160—yes), the primitive should be passed to the graphics processing pipeline for further processing, but in this case the HSR ID test should be modified to comprise a 'greater than' test (step 3162). Thus, if the HSR ID for the transparent primitive is greater than the corresponding value stored in the HSR ID buffer 250, the transparent primitive survives the HSR ID test, and is further processed accordingly. On the other hand, if the HSR ID is not greater than the corresponding value stored in the HSR ID buffer 250, the greater than test is failed, and the transparent primitive can be culled on this basis (since the transparent primitive does not write a depth (or stencil) value (otherwise the transparent primitive would be determined to be incompatible with the pre-pass operation, as shown in FIG. 31) and so the correct behaviour is for the later opaque primitive to survive). (In this case further depth/stencil testing in an embodiment performed in main pass to cull transparent primitives that survive the 'greater than' test when it is possible to do so. However, occlusion queries should be disabled.) A fragment shader can then be run for any surviving fragments.

Accordingly, in this example, transparent primitives that do not write depth or stencil values and do not perform any stencilling operations are no longer necessarily treated as incompatible with the pre-pass operation but are instead in an embodiment processed only during the second, main pass operation as shown in FIG. 34.

Example 8—HSR ID Buffer, Primitives that Write to Less than all Render Targets

In the examples above, primitives that do not write to all render targets are determined to be incompatible with the pre-pass operation. For example, in addition to depth, stencil, etc., a primitive may write to multiple different render colour targets. In that case, in the examples presented so far, the primitives are simply treated as incompatible primitives, and processed by the third, fallback operation. However, in further examples the primitive classification can be further modified in order to handle such primitives, at least in some situations. The following example thus illustrates how primitives that write to less than all render targets may be handled by the pre-pass operation.

Figure 35:
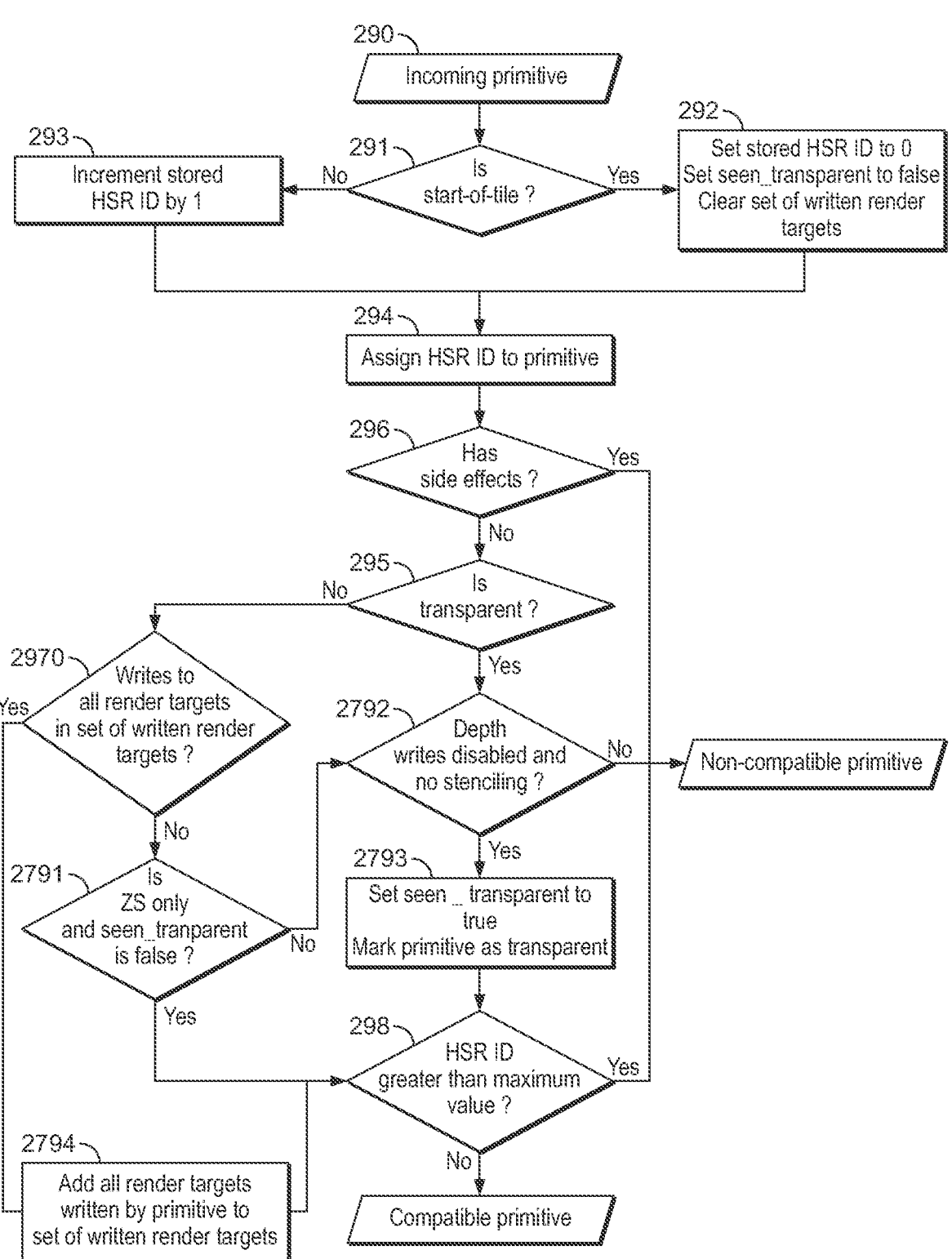
FIG. 35 shows schematically a corresponding classification process according to yet another example using the HSR ID buffer wherein the classification is performed to allow the pre-pass operation to handle some primitives that do not write to all render targets.

FIG. 35 shows a corresponding classification process according to another example using the HSR ID buffer wherein the classification is performed to allow the pre-pass operation to handle some primitives that do not write to all render targets (whereas in FIG. 29 above, any primitives that do not write to all render targets are automatically treated as incompatible). In this example, it is again assumed that any occlusion queries are performed during the depth/stencil testing stage.

As shown in FIG. 35, the primitive classification is generally the same as the primitive classification described above in relation to FIG. 33, except that instead of considering (at step 297) whether or not all render targets are written to, the primitive classification only requires that all render targets that have previously been written to are written to (step 2790). Thus, a set of render targets written render targets is maintained, and if the primitive writes to all render targets in the set of render targets written render targets (step 2790—yes), any (further) render targets written by the primitive are added to the set of written render targets (step 2974), and the primitive is then determined to be compatible (so long as its HSR ID does not exceed the maximum possible HSR ID (step 298)). This example can therefore support primitives that write only a subset of render targets. In this example the set of previously written render targets is thus cleared to zero at the start of the tile (at step 292) and then incremented as primitives are processed. It will be appreciated that in this example the primitive must therefore be performed at run-time.

Figure 36:
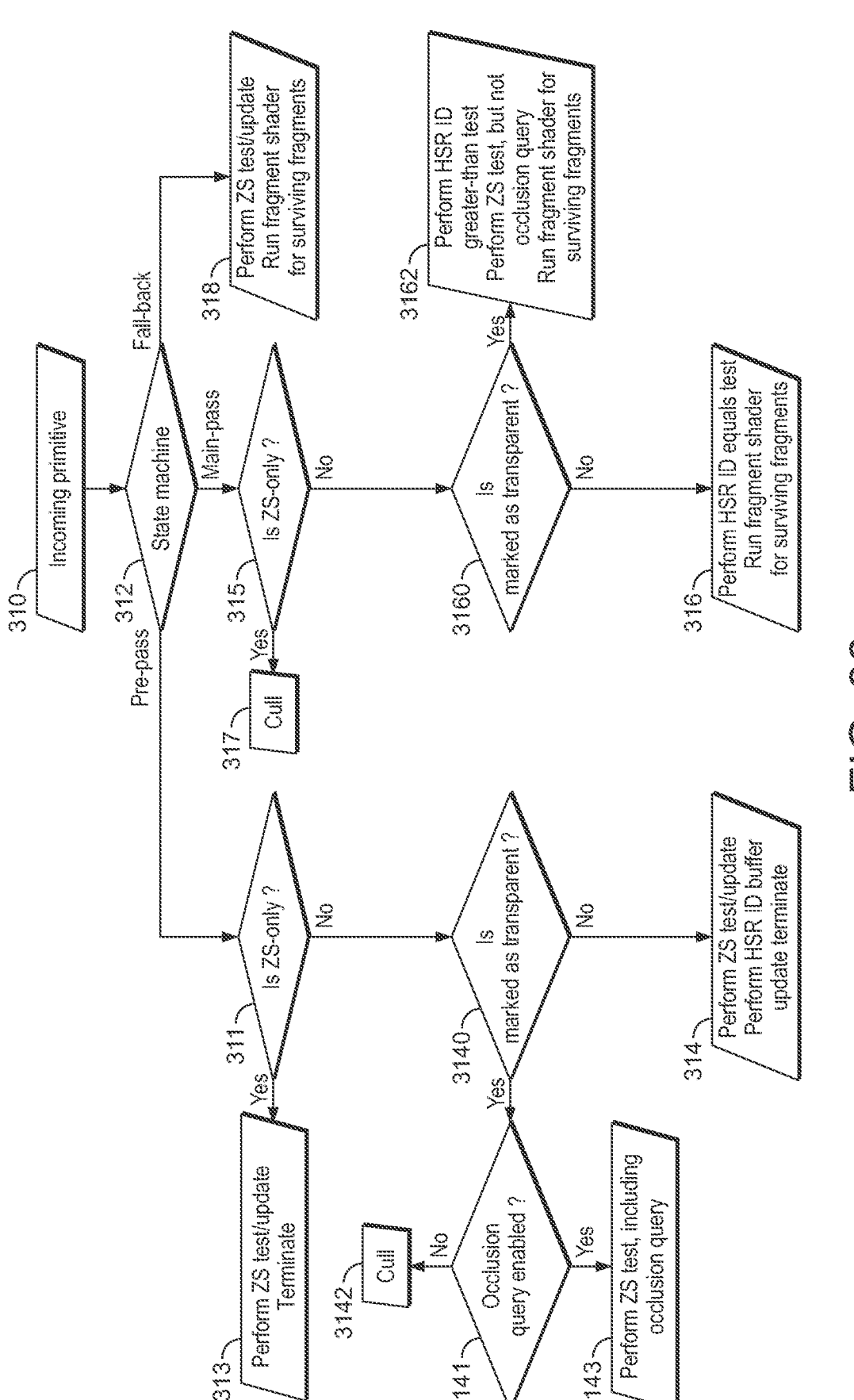
FIG. 36 shows the operation of the corresponding state machine for the example that is illustrated in FIG. 35.

FIG. 36 shows the corresponding pre-pass decision logic in this example. As shown in FIG. 36, the corresponding pre-pass decision logic in this example is the same as that shown in FIG. 34.

Example 9—HSR ID Buffer, Hierarchical HSR ID Testing

In the examples described above the HSR ID buffer stores a respective HSR ID for each sampling position within the render output. In some embodiments the HSR ID buffer however is also capable of (and contains respective entries for) storing HSR IDs for groups of plural sampling positions (with the groups of sampling positions corresponding to respective "patches" (regions) of the render output, and hence, correspondingly, "patches" of sampling positions).

In particular, the HSR ID buffer may (and does) store for respective patches of the render output a respective "minimum" HSR ID indicating the first primitive in the sequence of primitives that may subsequently need to be processed further for a sampling position encompassed (covered) by the patch and a corresponding "maximum" HSR ID indicating the final primitive of the primitives that were processed by the first, pre-pass operation that may need to be processed again during the second, main pass operation.

As will be explained further below, by arranging the HSR ID buffer in this "hierarchical" manner, such that respective HSR IDs are stored both at the level of the individual sampling positions within the render output and for higher level groups of sampling positions ("patches"), this can then then allow subsequent visibility testing to be performed at one or more different levels of subdivision of the render output, e.g., and in particular, by allowing groups of fragments to be tested at the patch level, and culled (when possible), in one go, e.g. thus avoiding having to test individual fragments when it is possible to determine already at the patch level that the fragments have no visible effect for their respective sampling positions. This can therefore facilitate speeding up the visibility testing and hence make the overall graphics processing operation more efficient.

For instance, in some examples the rasteriser 85 may use a "hierarchical" rasterisation arrangement in which primitives are iteratively tested against progressively smaller patches (regions) of the render output area (and thus, correspondingly, patches of fragments (and patches of sampling positions)). A primitive to be rasterised is thus in an embodiment first tested against a larger patch (e.g. a tile, in a tile-based rendering system) of the render output, to determine if the primitive covers (at least in part) any smaller patches of the render output encompassed by the larger patch. If the primitive does cover (at least in part) any smaller patches of the render output encompassed by the larger patch, the larger patch is then sub-divided into those smaller patches, and the process is then repeated for each smaller patch of the render output that was found to be at least partially covered by the primitive, until a minimum patch size is reached.

The HSR ID buffer may correspondingly also be arranged in such "hierarchical" manner to allow the primitive patches output by the rasteriser 85 to be tested against the respective per-patch entries (the "minimum" and "maximum" values for the respective patches) of the HSR ID buffer.

Figure 37:
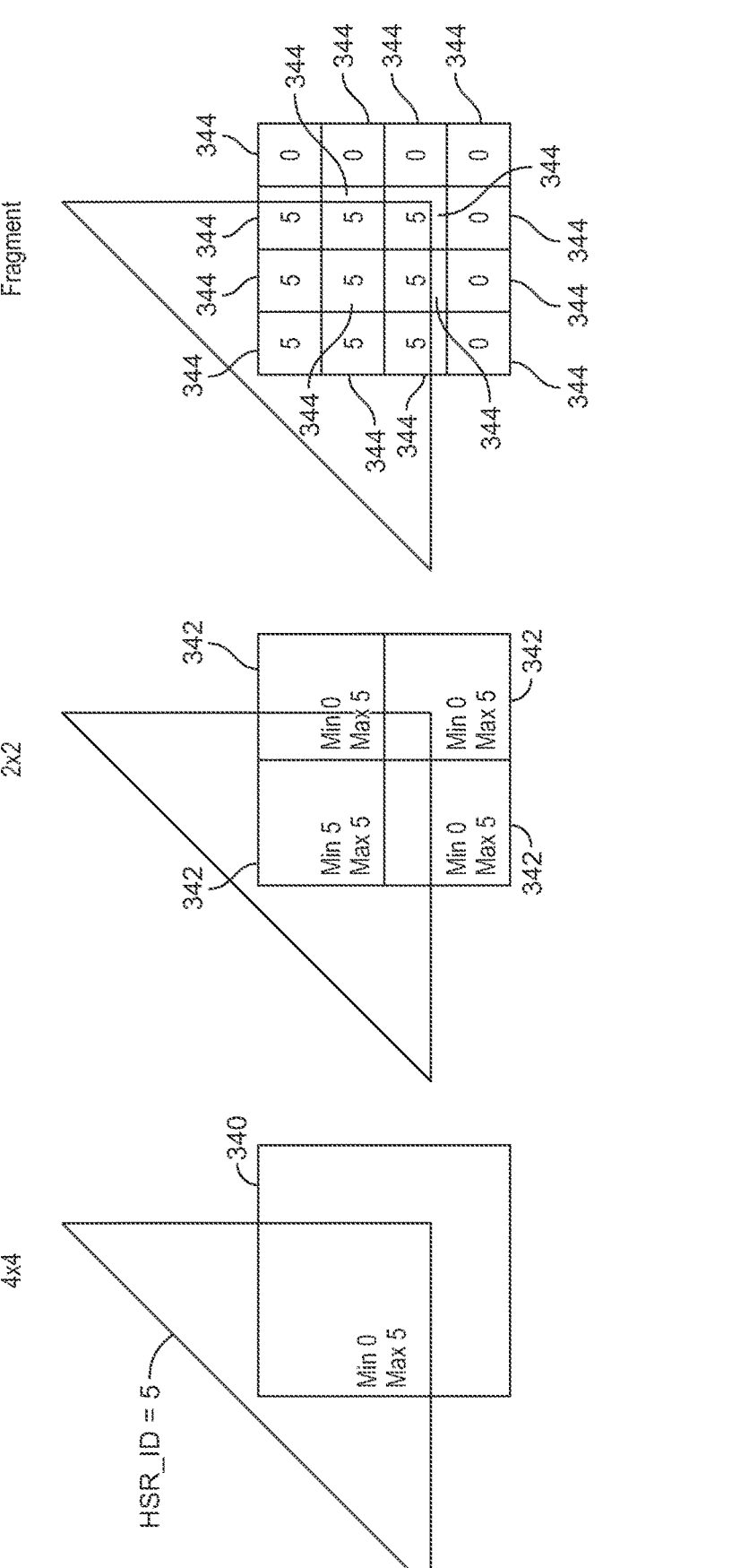
FIG. 37 shows schematically a "hierarchical" arrangement of such HSR ID buffer in which respective minimum and maximum primitive identifiers are stored for larger area "patches" of the render output.

FIG. 37 shows schematically a "hierarchical" arrangement of such HSR ID buffer in which respective minimum and maximum primitive identifiers are stored for larger area "patches" of the render output. In particular, FIG. 34 shows an arrangement in which the render output is subdivided into larger patches 340 which in this example correspond to patches of 4×4 fragments, and which larger patches 340 in turn are subdivided into smaller patches of 2×2 fragments 342. Although in this example only a single larger patch 340 is illustrated it will be appreciated that the entire render output will be similarly subdivided in this way into respective (non-overlapping) patches. It will also be appreciated that the patch sizes may be selected as desired and FIG. 34 is merely one example.

In the example shown in FIG. 37, there is a single visible primitive having HSR ID value of 5 which partially covers the larger patch 340. Therefore, it can be assumed that the earlier primitives with HSR ID values 1 to 4 are fully occluded by the visible primitive.

Figure 38:
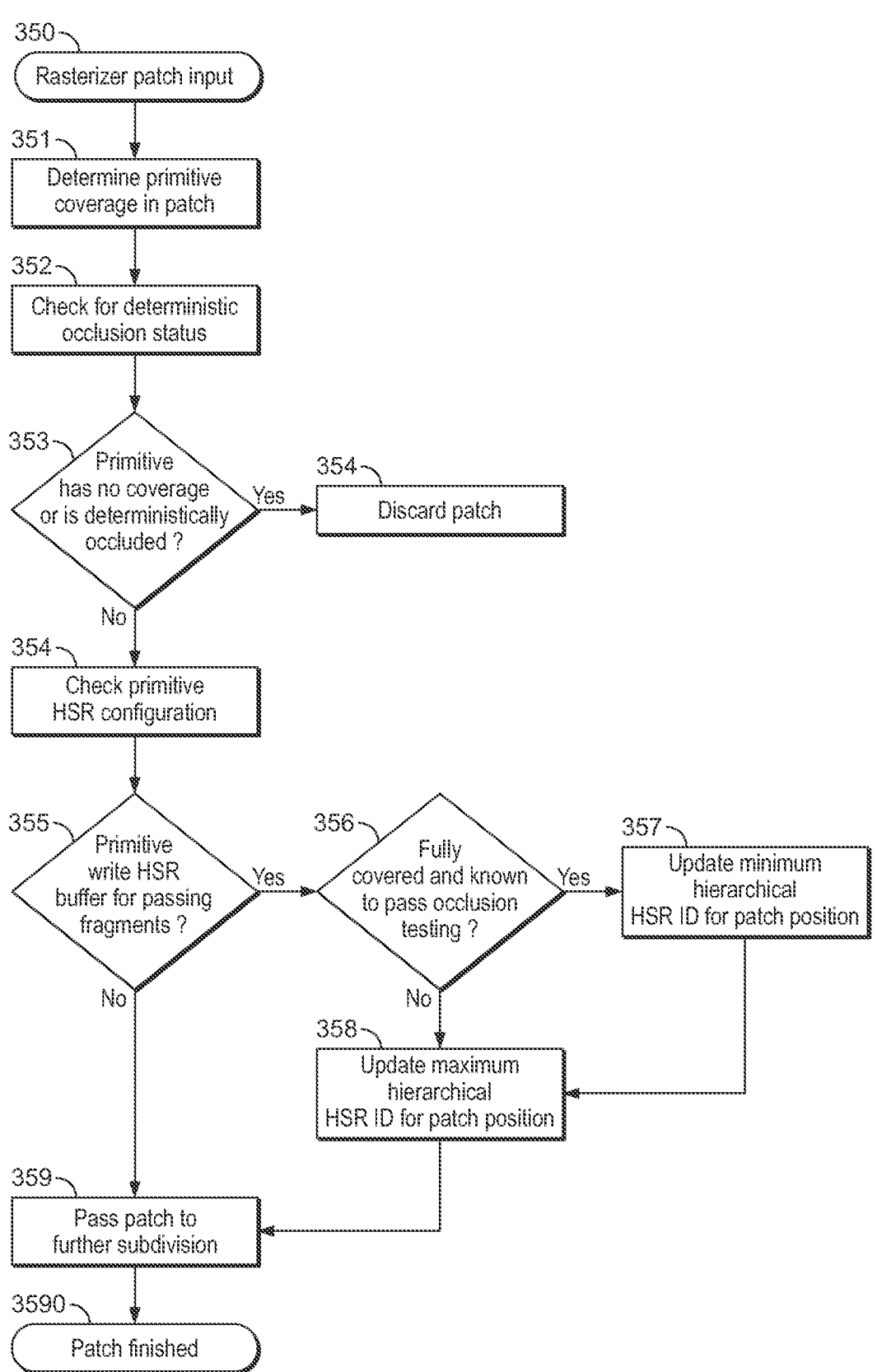
FIG. 38 shows schematically the generation of such hierarchical HSR ID buffer during the first, pre-pass operation.

FIG. 38 illustrates how the hierarchical HSR ID buffer can be generated during the early HSR ID update 241 in the first, pre-pass operation, which in this example is performed in a hierarchical manner, by first testing larger patches of the render output, and then testing progressively smaller patches of the render output, as necessary, down to the level of the individual fragments, in order to determine the HSR ID buffer.

As shown in FIG. 38, for an incoming primitive patch from the rasteriser (step 350), the primitive coverage in the patch is first determined (step 351). It is also determined whether or not the primitive patch is deterministically occluded (step 352). If the primitive has no coverage in the patch, or is deterministically occluded (step 353—yes), the primitive patch is then discarded (step 354), with no further testing. This then means that any further testing of the primitive against the individual sampling positions encompassed by the patch can be omitted as it has been determined already at the patch level that the primitive is not visible for any of those sampling positions.

On the other hand, if the primitive at least partially covers the patch, and is not deterministically occluded (step 353—no), testing of the patch continues. It is thus then checked whether or not the primitive is configured to write to the HSR ID buffer (step 354). This can be determined from the primitive classification, e.g. as described above. If the primitive is configured such that passing fragments do not update the HSR ID buffer (step 355—no), the HSR ID buffer should not be updated, and assuming there are further patches to be tested, the patch should instead be passed for further sub-division (step 359), and the testing of that patch is finished (step 3590).

For primitives that are configured such that passing fragments for the primitive should write to the HSR ID buffer (step 355—yes), the testing should continue to determine whether or not the HSR ID buffer should be updated for the patch in question. Accordingly, it is then determined whether the primitive fully covers the patch that is being tested and is visible at that patch. If the patch is fully covered and visible at the patch (step 356—yes), the minimum HSR ID for the patch position is updated accordingly to record the HSR ID associated with the primitive that is being tested (step 357). The maximum HSR ID for the patch position is also updated in either situation (step 356—yes or no) based on the primitive being potentially visible, in that it has been determined at this point that the primitive must partially cover the patch (step 353—yes) and it is known that any surviving fragments should write to the HSR ID buffer (step 355—yes). Thus, it cannot be excluded that the primitive might be visible within the patch, and the primitive should therefore be further processed (so the maximum HSR ID should be incremented accordingly).

The determined hierarchical HSR ID buffer including the per-patch minimum and maximum values is then used during the HSR ID test 276 in the second, main pass operation to try to cull primitives at the patch level, when it is possible to do so, thus avoiding having to always test the individual sampling positions. The testing against the hierarchical HSR ID buffer is shown in FIG. 36, for example.

Figure 39:
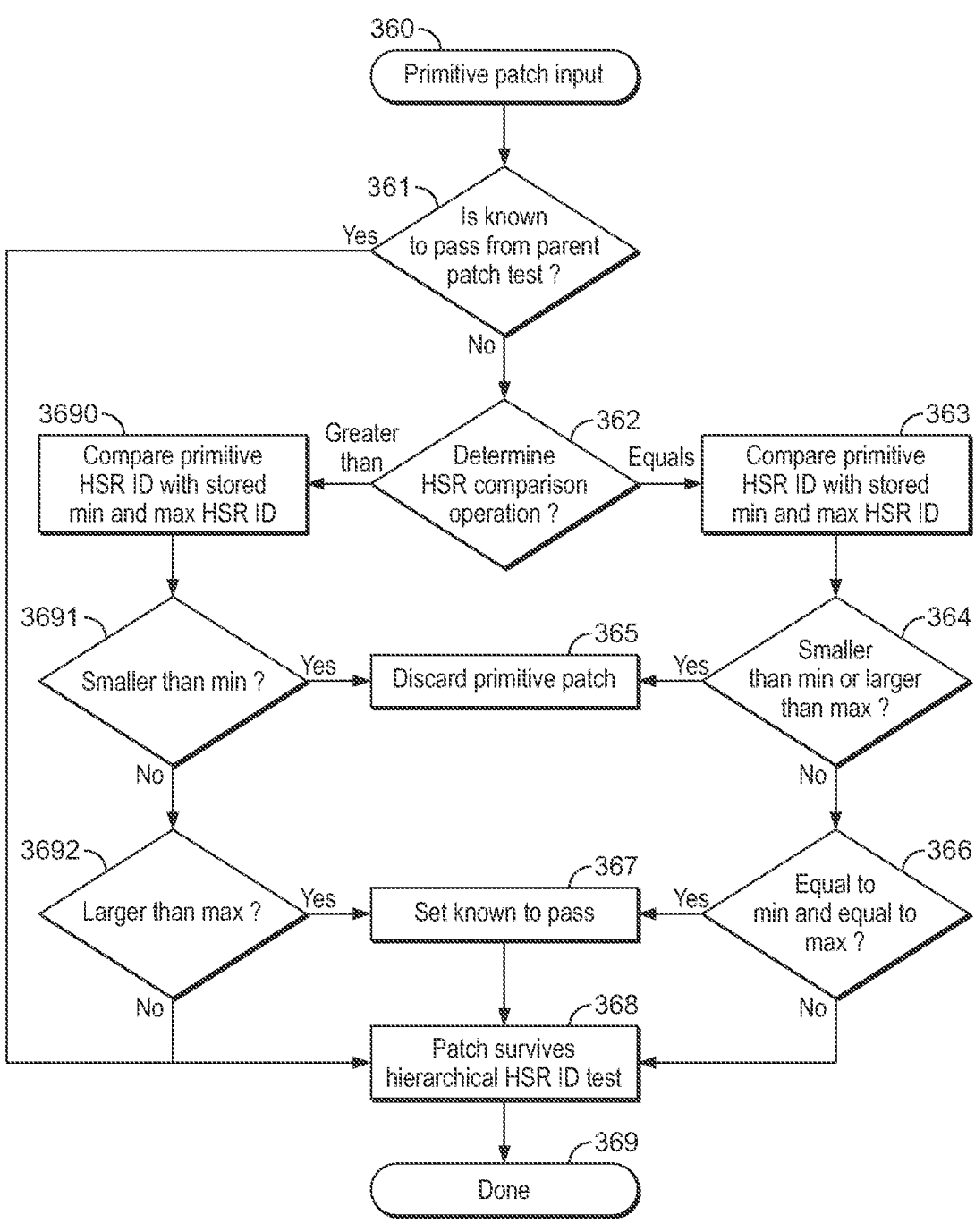
FIG. 39 shows the corresponding use of such hierarchical HSR ID buffer during the second, main pass operation.

As shown in FIG. 39, for an incoming primitive patch to be tested (step 360) against a respective patch of the render output, it is first checked whether or not the primitive patch is already known to pass based on it having already passed the testing in respect of a parent patch (step 361). Thus, if the primitive patch is set known to pass (step 361—yes), the patch is determined to survive the hierarchical HSR ID test without further explicit testing (step 368), and the testing of the patch is done (step 369). The testing can then proceed to the next smaller patch, as necessary.

Assuming that the primitive patch has not been set as known to pass (step 361—no), the testing then proceeds as follows. Firstly, it is determined what type of HSR ID test function should be used (step 362). For primitives that use an 'equals' test function, the primitive HSR ID associated with the primitive is then compared with the stored minimum and maximum HSR IDs for the patch (step 363). If the HSR ID associated with primitive patch being tested is smaller than the minimum HSR ID for the patch or greater than the maximum HSR ID for the patch (step 364—yes), this means the primitive patch can be culled (step 365), and no further subdivision or testing of the primitive is necessary.

If the HSR ID associated with the primitive patch lies between the stored minimum and maximum HSR IDs for the patch, the primitive patch should generally survive the hierarchical HSR ID testing at this level. However, there is a special case in which the stored minimum and maximum HSR IDs for the patch are the same. In that case, if the HSR ID associated with the primitive patch is equal to both the minimum and maximum HSR IDs for the patch (step 366—yes), it is known that the primitive must pass all further visibility testing for any sampling positions encompassed by the current patch, since it is only primitive that can survive. In this case, the primitive may therefore be set as known to pass (step 367). The primitive patch thus survives (step 368) and the testing of that patch is done (step 369). In this situation, because the primitive is set as known to pass, any smaller primitive patches also automatically pass the testing (step 361—yes).

Otherwise, if the stored minimum and maximum HSR IDs for the patch are not the same, so that the HSR ID associated with the primitive patch cannot be equal to both of them (step 366—no), the primitive is determined to survive the hierarchical HSR ID test at this level (step 368), and the testing at that level is done (step 369), but the primitive patch may still need to be tested further against smaller patches of the render output, assuming the minimum patch size has not yet been reached.

The above relates to the testing for primitives that use the 'equals' test (e.g. opaque primitives that could in principle have updated the HSR ID buffer during the pre-pass operation). As mentioned earlier, there may be other primitives that use a different 'greater than' test. This is particularly the case for transparent primitives that do not write depth or stencil values and which are in some examples processed only during the second, main pass operation.

For such primitives using the 'greater than' test, the HSR ID associated with the primitive patch is again compared with the stored minimum and maximum HSR IDs for the patch in question (step 3690). However, in this case, the patch can only be discarded (step 365) if the HSR ID associated with the primitive is lower than the stored minimum HSR ID for the patch (step 3691—yes). That is, since the test comprises a 'greater than' test, the primitives cannot be culled based on the maximum HSR ID. Conversely, if the HSR ID associated with the primitive patch is greater than the maximum HSR ID (step 3692—yes), this means that the primitive must always pass the greater than testing for all of the sampling positions encompassed by the patch. In that case, therefore, the primitive may be set as known to pass (step 367), such that the primitive is caused to pass the hierarchical testing at the current level (step 368) and is always set to automatically pass the testing for all sampling positions encompassed by the current patch.

Otherwise, if the HSR ID associated with the primitive patch lies between the stored minimum and maximum HSR ID values for the patch (step 3692—no), the primitive survives the testing against the current patch (step 368), but the primitive should be further subdivided and tested further against smaller patches of the render output, assuming the minimum patch size has not yet been reached. For instance, it may be possible that the HSR ID associated with the primitive patch is either smaller than the minimum value stored for a smaller patch of the render output, or greater than the maximum value, in which case the smaller primitive patch can be culled/passed at that level.

The effect of this is therefore that the minimum HSR ID stored for a patch indicates the first primitive that may need to be processed further for the patch in question. Thus, referring to the example shown in FIG. 37, for the larger patch 340, the shown primitive does not fully cover the larger patch 340 (step 356—no). Thus, the minimum HSR ID cannot be updated for the larger patch 340. The HSR ID buffer thus stores in respect of the larger patch 340 a minimum HSR ID value of 0 and a maximum HSR ID value of 5. This means that during the HSR ID testing 276 in the second, main pass operation, each of the primitives having HSR IDs 1 to 5 will survive the hierarchical HSR ID testing against the larger 4×4 patch 340.

The hierarchical HSR ID testing will accordingly then proceed to test each primitive against the set of smaller 2×2 patches 342. In this case, as shown in FIG. 37, the top left 2×2 patch is fully covered, and so the minimum HSR ID stored for that patch 342 will be updated accordingly during the first, pre-pass operation such that the minimum HSR ID stored for that patch is 5. Thus, when testing against the top left 2×2 patch 342, the primitive patch having associated HSR ID of 5 will be detected as known to pass, since its HSR ID matches both the minimum and maximum stored HSR ID values for that patch. In this case, the individual testing of the top left four fragments can be avoided since those fragments are all known to pass based on the hierarchical testing. Otherwise, in this example, it is not possible to cull/pass any other patches, and so the remaining fragments must be individually tested.

In the example described above the hierarchical HSR ID buffer is thus determined 'on the fly' as part of the HSR ID update 241 during the first, pre-pass operation. Thus, as described above, the minimum HSR ID stored for a patch is generally updated whenever a primitive that fully covers that patch is found to be visible, as described above in relation to FIG. 38.

In further examples, a finalisation ('baking') process may be performed at the end of the first, pre-pass operation that iterates over the determined hierarchical HSR ID buffer to try to refine the stored minimum and maximum HSR values for the different patches. For example, it may be the case that there is no single primitive that fully covers a patch, but the patch is fully covered by a group of primitives. In that case, it may be possible to identify a (narrower) range of primitives that should be processed further for the patch, and the minimum and maximum HSR ID values stored for the patch may thus be updated accordingly. This is illustrated in FIG. 40, for example.

Figure 40:
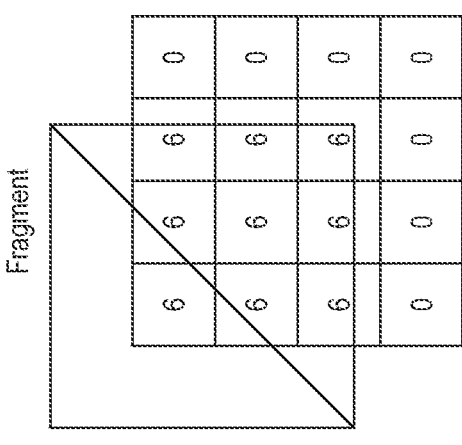
FIG. 40 shows schematically a finalisation ("baking") process for refining the hierarchical HSR ID buffer at the end of the first, pre-pass operation.
Figure 40:
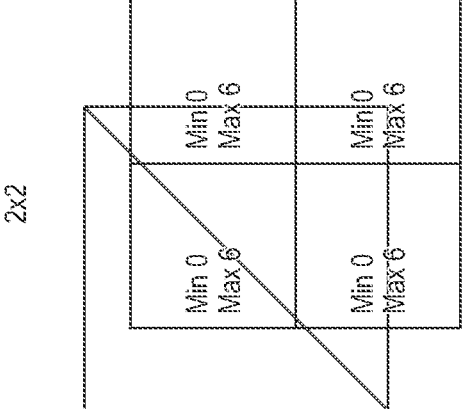
Figure 40:
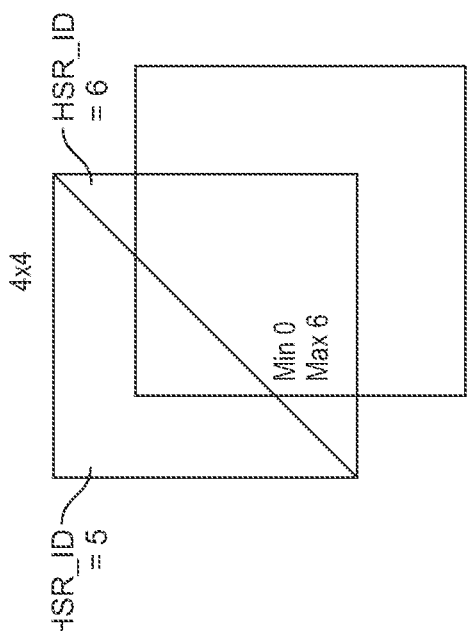
Figure 40:
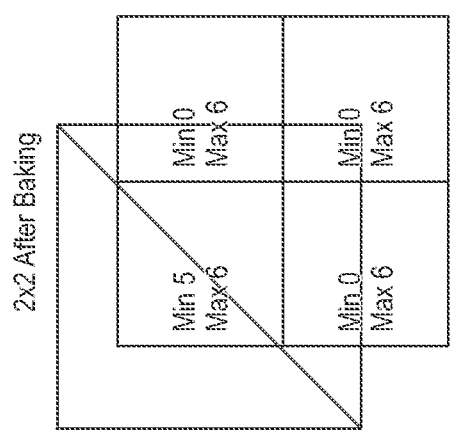

In the example shown in FIG. 40 there are now two visible primitives, having respective HSR ID values 5 and 6. As shown in FIG. 40, neither primitive fully covers the larger 4×4 patch. Likewise, neither primitive fully covers any of the smaller 2×2 patches. Thus, according to the scheme as shown in FIG. 35 above, the stored minimum HSR ID is not updated for any of the patches during the first, pre-pass operation. However, it can be seen from FIG. 40 that the top left 2×2 patch is in fact fully covered by the combination of the two primitives. Thus, by suitably iterating over the initially determined HSR ID buffer, the minimum HSR ID for that patch can be updated accordingly (such that the minimum HSR ID value is now 5). This therefore allows at least the primitives with HSR ID values 1 to 4 to be culled for that patch, without having to test those primitives against the individual sampling positions covered by that patch.

Figure 41:
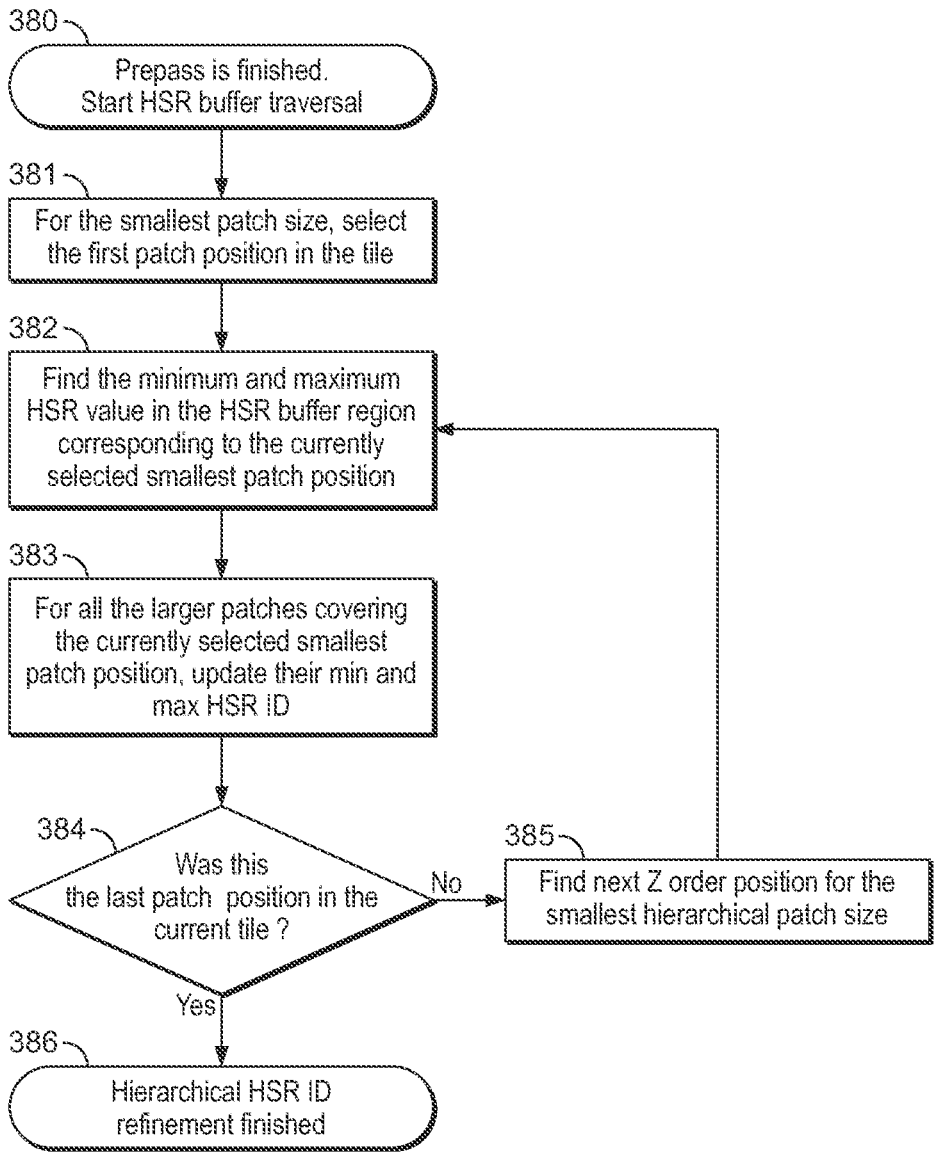
FIG. 41 shows further details of the finalisation ("baking") process.

The finalisation ('baking') process in this example is shown in FIG. 41. As shown in FIG. 41, once the pre-pass operations for a tile have finished, such that all primitives for the tile that are to be processed by the pre-pass have passed through the graphics processing pipeline shown in FIG. 24, to thereby determine an initial HSR ID buffer, the finalisation ('baking') process is initiated by starting a traversal over the initially determined HSR ID buffer (step 380).

In this example, the traversal starts at the smallest patch size, and selects the first patch position in the tile (step 381). The traversal then iterates over the sampling positions encompassed by the selected patch to find the actual minimum and maximum HSR ID values that are stored in the HSR ID buffer for the sampling positions encompassed by the selected patch (step 382). For all larger patches covering the currently selected patch position, the minimum and maximum HSR ID values are then updated accordingly (if it is possible to do so) (step 383). Assuming the current patch position is not the last position in the current tile (step 384—no), the next patch position is selected (step 385), and the process is repeated for that patch position. Once all of the patch positions have been processed in this way (step 384—yes), the hierarchical HSR ID buffer refinement is finished (step 386).

Figure 42:
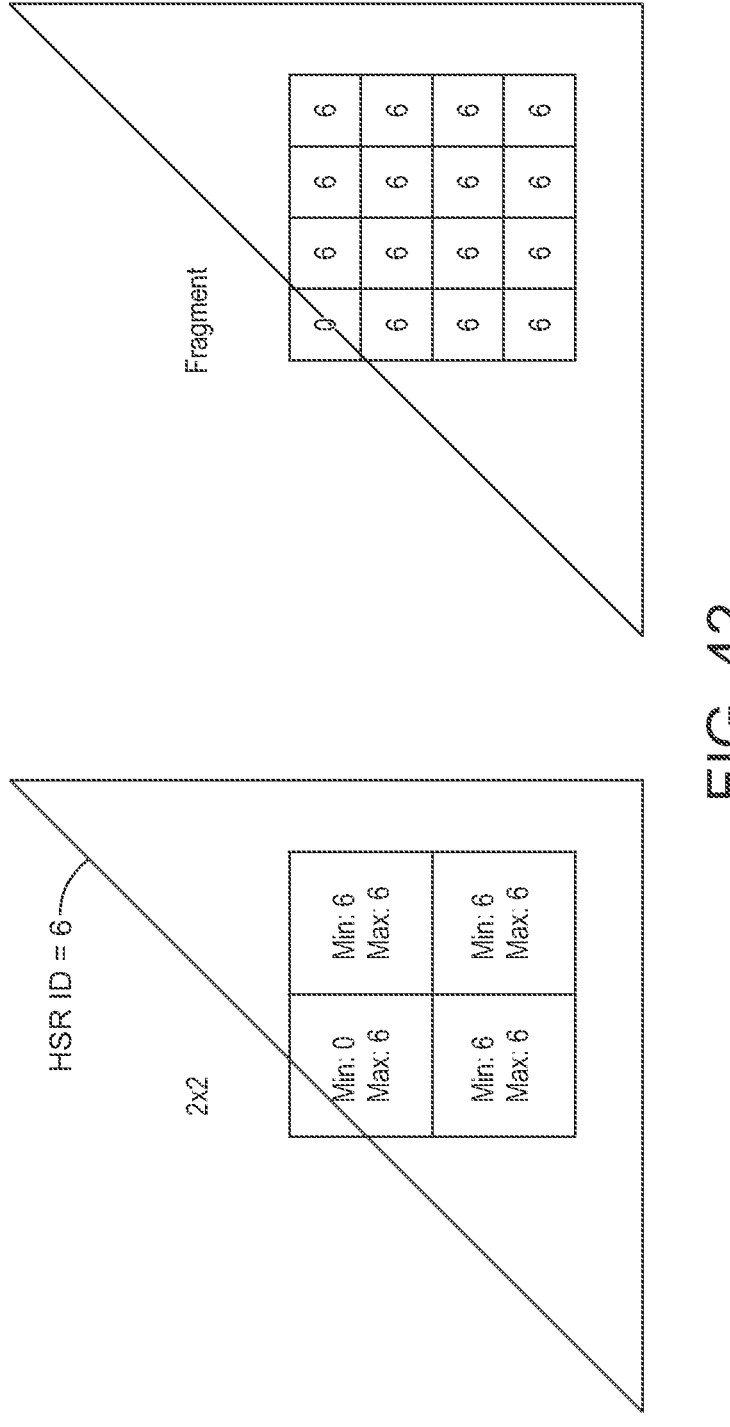
FIG. 42 illustrates how it may be determined during the first, pre-pass operation that no further refinement of the HSR ID buffer is possible.

In the example shown in FIG. 41, the finalisation ('baking') process thus iterates over all of the sampling positions in the render output. This can therefore take a significant time. In this respect, however, it will be appreciated that at least some of this iteration may be omitted if it can already be determined from the initially determined HSR ID buffer that no further refinement would be possible. An example of this is shown in FIG. 42. In this example, it can be seen that three of the 2×2 patches are fully covered by the same primitive, having HSR ID value of 6. As described above according to the 'on the fly' population of the HSR ID buffer as shown in FIG. 38, the HSR ID buffer will therefore store as the respective minimum and maximum HSR IDs for each of these patches the same value (i.e. '6'), with this indicating that the primitive with HSR ID of 6 is known to pass for all sampling positions encompassed by the 2×2 patch. In this case, it is clear that no further refinement of the minimum or maximum is possible for those patches.

Figure 43:
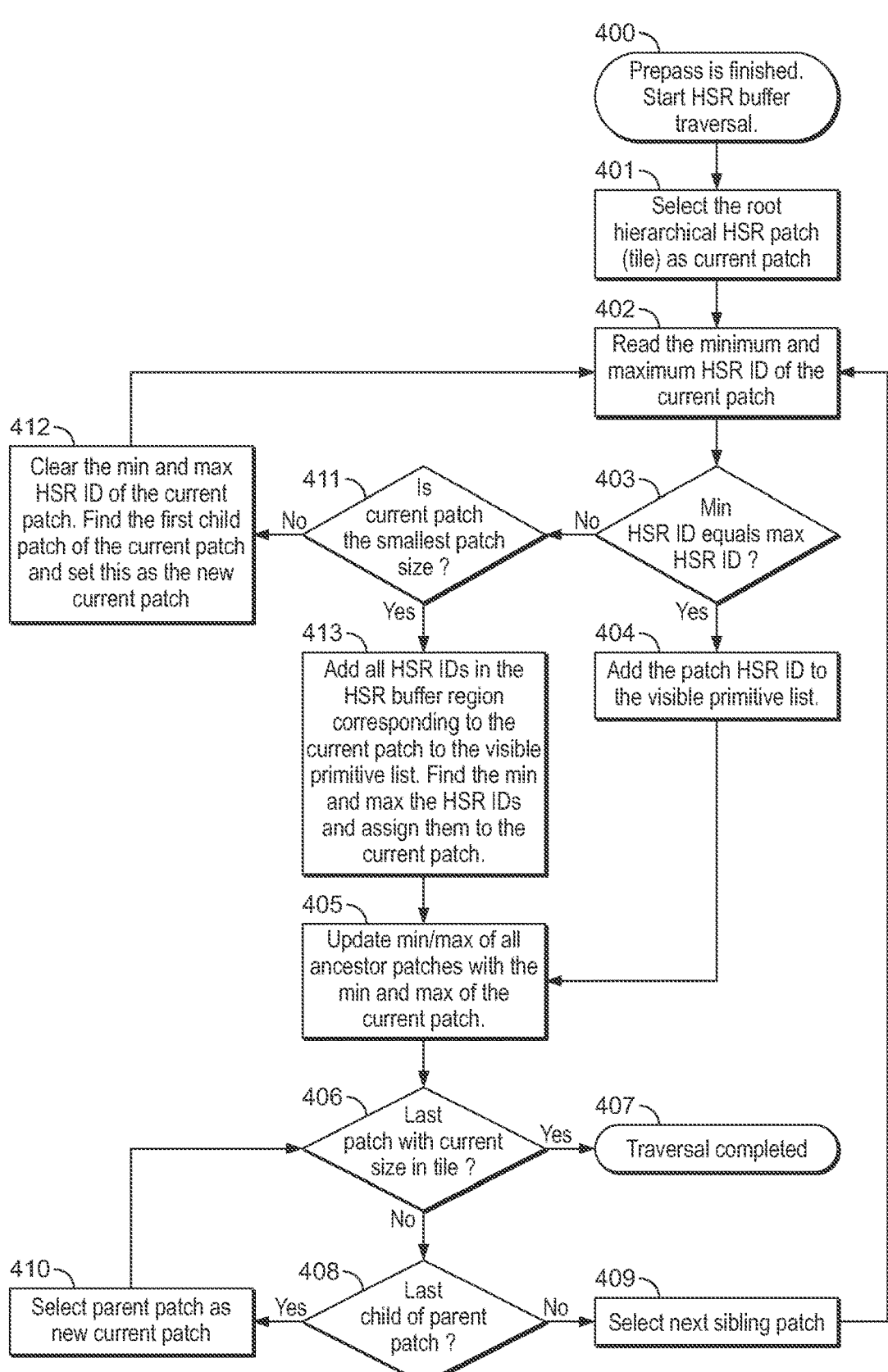
FIG. 43 shows schematically an improved finalisation ("baking") process for refining the hierarchical HSR ID buffer at the end of the first, pre-pass operation in which iteration is skipped for patches for which further refinement of the HSR ID buffer is possible.

FIG. 43 thus shows an improved finalisation ("baking") process according to a further example in which the traversal can be accelerated in such situations where it can already be determined that no refinement is possible. Again, this starts (step 400) once the pre-pass operations for a tile have finished, such that all primitives for the tile that are to be processed by the pre-pass have passed through the graphics processing pipeline shown in FIG. 24, to thereby determine an initial HSR ID buffer. In this example, the minimum and maximum HSR IDs for the current patch are read (step 402), and it is determined whether or not they are the same (i.e. whether the minimum HSR stored ID matches the maximum stored HSR ID). If the minimum and maximum HSR IDs for the current patch are the same (step 403—yes), the patch HSR ID is then added to a list of visible primitives (step 404). At this point, the minimum and maximum values for all higher level patches are updated (as necessary) with the minimum and maximum values for the current patch (step 405). If the current patch is the last patch at the current level of testing (step 406—yes), the traversal is then completed (step 407). Otherwise, if current patch is not the last child of a given parent patch, such that there are further 'sibling' patches to be tested (step 408—no), the next sibling patch is selected (step 409), and its minimum and maximum HSR ID values are then read accordingly (step 402), etc. If the current patch is the last child of its parent patch, the parent patch is selected as the new current patch (step 410), as shown in FIG. 43.

If it is determined that the minimum and maximum HSR IDs for the current patch are not the same (step 403—no), it is determined whether the current patch is the smallest patch size, and if not (step 411—no), the minimum and maximum HSR IDs of the current patch are cleared, and the first child patch of the current patch is selected as the new current patch for testing (step 412). This process thus traverses the hierarchical HSR ID buffer from the top down to find the smallest patch size, unless it is determined at a higher level that no further refinement is possible. Once the smallest patch size is reached (step 411—yes), the sampling positions encompassed by that patch are then iterated over (step 413), in a similar manner as described above in relation to FIG. 41, and the minimum and maximum values for all higher level patches are then updated accordingly (step 405). It is then checked whether there are further patches to be processed (step 406, etc.) until the traversal is complete (step 407).

The traversal thus starts by first selecting the root (i.e. largest) hierarchical HSR patch as the current patch (step 401). If the minimum and maximum HSR IDs for the root (largest) patch are the same (step 403—yes), the traversal is then completed at that point. Otherwise, the traversal continues by checking for progressively smaller patches whether or not the minimum and maximum HSR IDs are the same to check whether further refinement is possible. In this way, the iteration over the individual sampling positions (step 413) is only performed when there is some possible refinement that could be made. This can therefore speed up the finalisation of the HSR ID buffer.

In the examples above, during the first, pre-pass operation, in the event that a primitive is determined to cover one or more sampling positions within the render output, the HSR ID for the primitive is written to the HSR ID buffer in respect of the sampling position(s) for which the primitive is visible. Especially if a larger patch is found to cover many sampling positions this can therefore represent a significant write bandwidth. In order to clear the HSR ID buffer a number of "clear" bits are provided in registers that when set are able to indicate that N sampling positions represented by the clear bit are all zero. In a further example, these clear bits are re-purposed to simplify the updating of the HSR ID buffer, as will be explained in relation to FIG. 44, for example.

Figure 44:
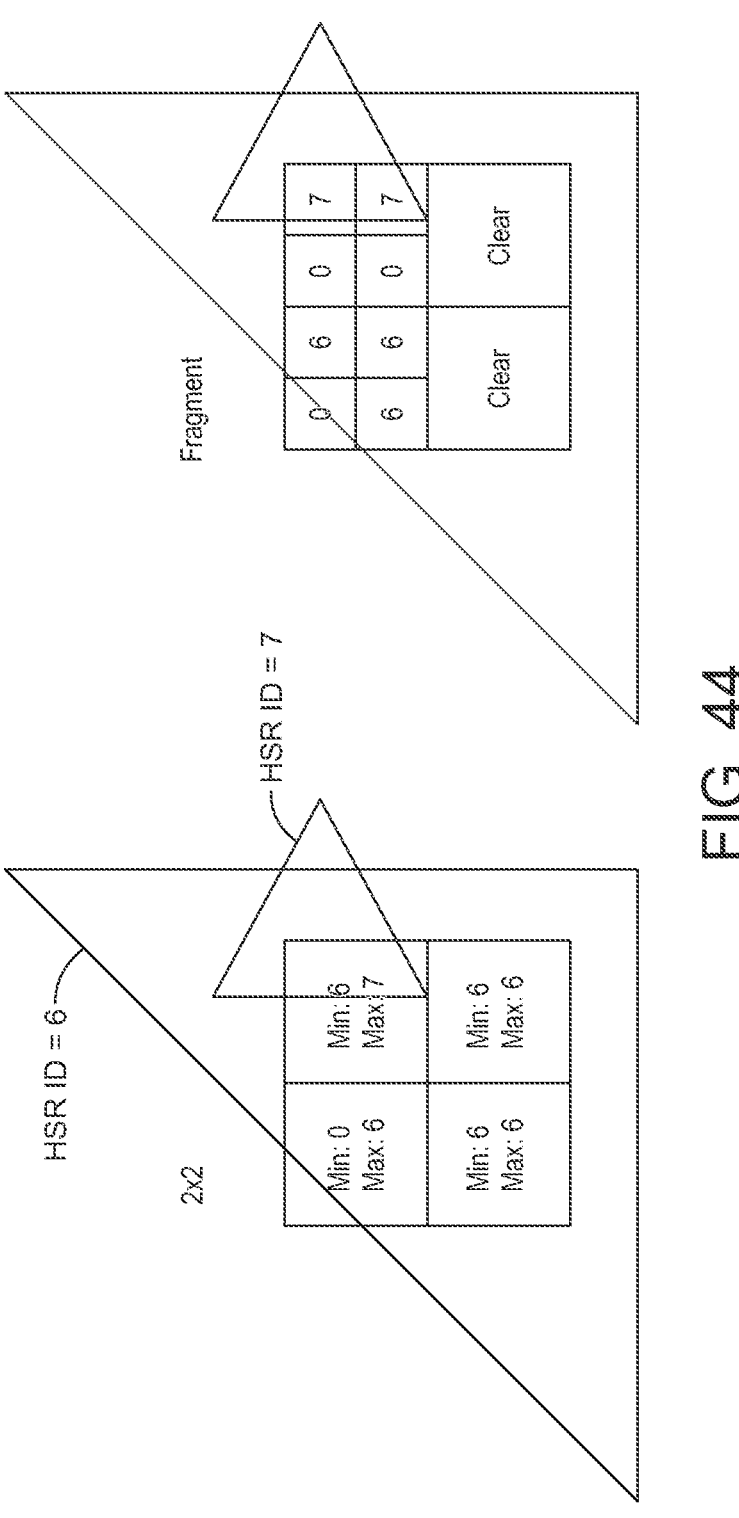
FIG. 44 illustrates how the updating of the HSR ID buffer may be simplified in some cases to save having to write the same HSR ID out repeatedly to many sampling positions encompassed by a patch.

FIG. 44 thus shows an example where there are two primitives, having respective HSR ID values of 6 and 7. In this example, the bottom two 2×2 patches are both fully covered by the primitive with HSR ID value 6. The top left 2×2 patch is partially covered by the primitive with HSR ID value 6. The top right 2z2 patch is fully covered by the primitive with HSR ID value 6 but is partially overwritten by the later primitive with HSR ID value 7. The result of the finalisation process discussed above is therefore that the minimum and maximum stored HSR IDs for each 2×2 patch are set as shown in FIG. 44. Thus, the minimum HSR ID for all of the top right and bottom two 2×2 patches is set to 6.

Figure 45:
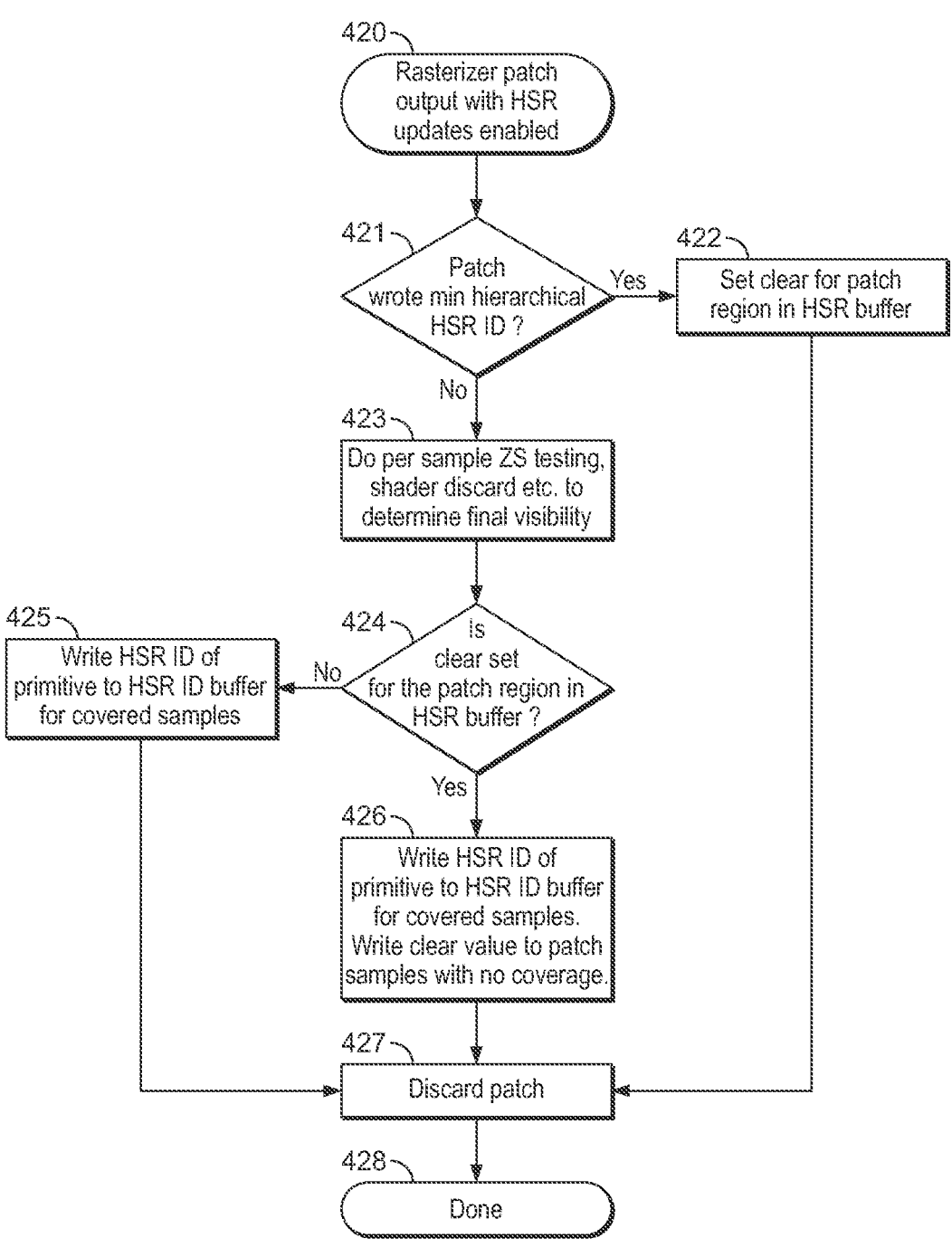
FIG. 45 shows schematically the updating of the HSR ID buffer during the first, pre-pass operation according to an example in which when a visible primitive is found to fully cover a patch of the render output, the sampling positions encompassed by the patch are cleared.
Figure 46:
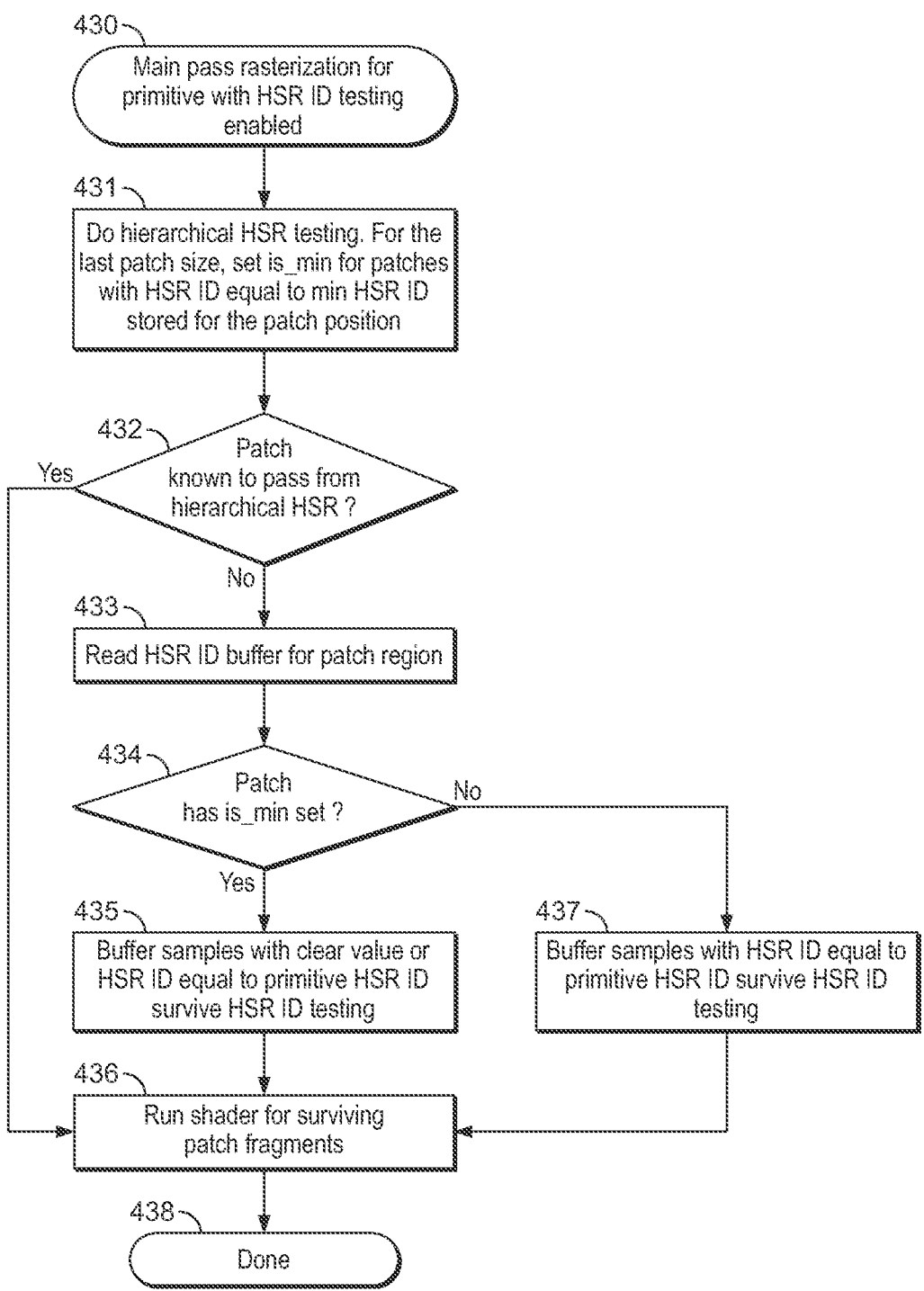
FIG. 46 shows schematically how the corresponding second, main pass operation can interpret any "clear" or zero values in order to ensure the correct rendering behaviour.

In this example, rather than writing the value 6 to each of the sampling positions encompassed by those patches, a "clear" value, i.e. 0 is instead used, as will be explained further below. This then saves having to explicitly write the same value out many times when it is possible to avoid doing so. FIG. 45 illustrates the operation of writing to the HSR ID buffer during the first, pre-pass operation and FIG. 46 illustrates how the "clear" values are used during the second, main pass operation to ensure the correct rendering behaviour.

As shown in FIG. 45, for an incoming primitive patch that is capable of updating the HSR ID buffer (step 420), it is first determined whether the primitive patch is derived from the primitive that wrote the minimum HSR ID value for the corresponding patch (step 421). If yes, a corresponding "clear" bit is set for the patch region in the HSR ID buffer (step 422) to indicate that all of the sampling positions covered by the patch can be cleared (at this point). The primitive patch can thus be discarded (step 427), and the updating of the HSR ID buffer for the primitive patch in respect of the sampling positions covered by the primitive patch is thus done (step 428). The next primitive can thus be processed accordingly.

If the primitive patch does not correspond to the primitive that wrote the minimum HSR ID value for the corresponding patch (step 421—no), the operation proceeds to perform the per-sampling position depth (and stencil) testing, as well as any fragment shader execution, etc., necessary to determine the final visibility for the sampling positions encompassed by the patch (step 423). If the "clear" flag has not been set for the patch region in the HSR buffer (step 424—no), the HSR ID of the primitive is then written to the HSR ID buffer for any covered sampling positions (step 425), as described above. On the other hand, if the "clear" flag has been set (step 424—yes), the HSR ID of the primitive is still written to the HSR ID buffer for any covered samples, and the "clear" value is written to any patch samples with no coverage. In either case, at that point, the primitive patch can be discarded (step 427), as the updating of the HSR ID for that primitive patch is done (step 428).

The effect of this is that for any sampling positions encompassed by a patch of the render output that are covered by the primitive associated with the stored minimum HSR ID for the patch in question, rather than storing the same HSR ID in respect of each of the individual sampling positions that are covered by that primitive, the sampling positions are instead cleared. Thus, referring back to FIG. 44, it can be seen that the sampling positions encompassed by the bottom two 2×2 patches, for which the primitive having HSR ID of 6 is visible, are all set to the clear value, without having to explicitly write that value to the HSR ID buffer. Likewise, for the top right 2×2 patch, the primitive having HSR ID of 6 is visible for the two left-most sampling positions, and so a 'zero' value is stored in the HSR ID buffer for those two sampling positions. The two right-most sampling positions are however overwritten by the primitive having HSR ID of 7, and so that value is stored for those sampling positions. This then reduces write bandwidth associated with updating the HSR ID buffer. However, it is then necessary to be able to correctly interpret any clear values during the second, main pass operation to ensure the correct rendering behaviour. This is illustrated in FIG. 46, for example.

FIG. 46 thus shows the corresponding HSR ID testing for an incoming primitive to be processed (step 430). Firstly, hierarchical HSR ID testing is performed, as described above. If the primitive is determined to match the stored minimum HSR ID value for the current patch that is being tested, the primitive is marked accordingly by setting an 'is_min' bit to indicate that the primitive is the primitive that caused the update to the minimum HSR ID value for the current patch (step 431). This 'is_min' bit when set can then be used to allow any fragments to automatically pass testing for any sampling positions for which the "clear" or zero value is set.

If the primitive patch being tested is known to pass all visibility testing from the hierarchical HSR ID testing (step 432—yes), the primitive patch as a whole is passed for further processing, and a fragment shader is executed accordingly for all of the fragments encompassed by the patch (step 436) to determine the rendered output data, and the second, main pass operation is then done for the sampling positions encompassed by the primitive patch being tested (step 438).

On the other hand assuming the primitive patch being tested is not known to pass all visibility testing from the hierarchical HSR ID testing (step 432—no), the testing of the primitive patch continues by reading the HSR ID buffer for the patch region (step 433) and checking whether or not the 'is_min' bit has been set for the primitive in question (step 434). If the 'is_min' bit has not been set (step 434—no), the testing of the fragments against the individual sampling positions is then performed as normal, e.g. such that for primitives that use the 'equals' test, the fragments survive the HSR ID testing when their associated HSR ID matches the value stored in the HSR ID buffer (step 437). Whereas, when the 'is_min' bit is set (step 434—yes), the testing is performed such that in addition to fragments surviving the testing when their associated HSR ID matches the value stored in the HSR ID buffer, the fragments are also caused to automatically pass the visibility testing for any sampling positions for which the "clear" or zero value is set.

The above examples relating to a hierarchical HSR ID buffer arrangement thus allow various optimisations of the HSR ID testing, and hence allow for improved overall graphics processing operation.

Culling Vertex (Varyings) Attribute Shading

As mentioned above, the rasterising and rendering processes use the vertex attributes associated with the vertices of the primitive that is being processed. To facilitate this operation at least some of the attributes of the vertices defined for the given graphics processing output are usually subjected to an initial so-called "vertex shading" (vertex processing) operation, before the primitives are, e.g. rasterised and rendered. This "vertex shading" operation operates to transform the attributes for a vertex into a desired form for the subsequent graphics processing operation(s). This may comprise, for example, transforming vertex position attributes from the model or user space that they are initially defined in, to the screen space that the output of the graphics processing is to be displayed in.

A graphics processing pipeline executed by a graphics processor will typically therefore include a vertex processing stage (a vertex shader) that executes vertex processing (shading) computations on initial vertex attribute values defined for the vertices so as to generate a desired set of output vertex attributes (i.e. appropriately "shaded" attributes) for use in the subsequent processing stages of the graphics processing pipeline.

The vertex shader execution typically produces (transformed) vertex positions and one or more outputs explicitly written by the vertex shader. Attributes communicated from the vertex shader to rasterisation and rendering other than position are usually referred to as "varyings". (Thus the non-position outputs from the vertex shader (and only the non-position outputs from the vertex shader) are "varyings".)) Once the vertex attributes have been shaded, the "shaded" attributes are then used when processing the vertices (and the primitives to which they relate) in the remainder of the graphics processing pipeline.

The primitives that are to be processed for the render output according to the present embodiments are (each) defined in terms of a set of vertices (e.g., and in an embodiment, chosen from a larger set of vertices to be used for the graphics processing output (e.g. frame for display)). Each vertex in the set of vertices will have and has associated with it a set of one or more vertex attributes (vertex attribute data (values)). These vertex attributes can be any suitable and desired attributes that may be associated with a vertex, such as one or more of, and in an embodiment all of: position (e.g. x, y, z, w coordinates/values for the vertex), colour (e.g. RGB values for the vertex), transparency (an alpha value for the vertex), etc. In an embodiment, each vertex has associated with it a position (position data) and one or more other, non-position attributes (data) (varyings), e.g. defining colour, light, normal, texture coordinates, etc, for the vertex in question. These vertex attributes are then used when rasterising and rendering the primitives.

As is often the case in graphics processing, the vertex data (the vertex attributes) may need to be processed (e.g. shaded) in order to transform the vertex attributes into a desired form for subsequent processing. Thus, according to the present embodiments, the graphics processor comprises a vertex processing circuit (e.g., and in an embodiment, in the form of a "vertex shader") that is configured to process (e.g. shade) vertex data in the form in which it is stored/obtained by the graphics processor (the 'raw' vertex data) to generate appropriately vertex shaded attribute data for vertices to be processed for primitives for a render output.

The processing (shading) of the vertex attributes can be performed at various stages within the overall graphics processing operation. For example, in the present embodiment, the graphics processor operates a tile-based rendering scheme as described above, in which, as shown in FIG. 4, a programmable vertex shader 427 is executed as part of the initial geometry processing stage in order to process (shade) at least the vertex position attributes to facilitate such sorting of the geometry. The initial upfront geometry processing could also shade the non-position (varyings) vertex attributes, and store all of the transformed vertex geometry (attributes) 425 together in memory 423 such that it can subsequently be obtained and used by the renderer 422 to perform the rendering operations.

In some examples, however, the processing of (at least some of) the, e.g., non-position (varyings), vertex attributes is deferred to the rendering stages of the graphics processing operation, i.e. to the point at which those vertex attributes are desired to be used. This can advantageously reduce bandwidth requirements, e.g., by saving having to write out all of the vertex shaded varyings data upfront, as at least some of the vertex attribute processing (shading) can instead be performed for an individual tile, rather than for the entire render output.

Figure 47:
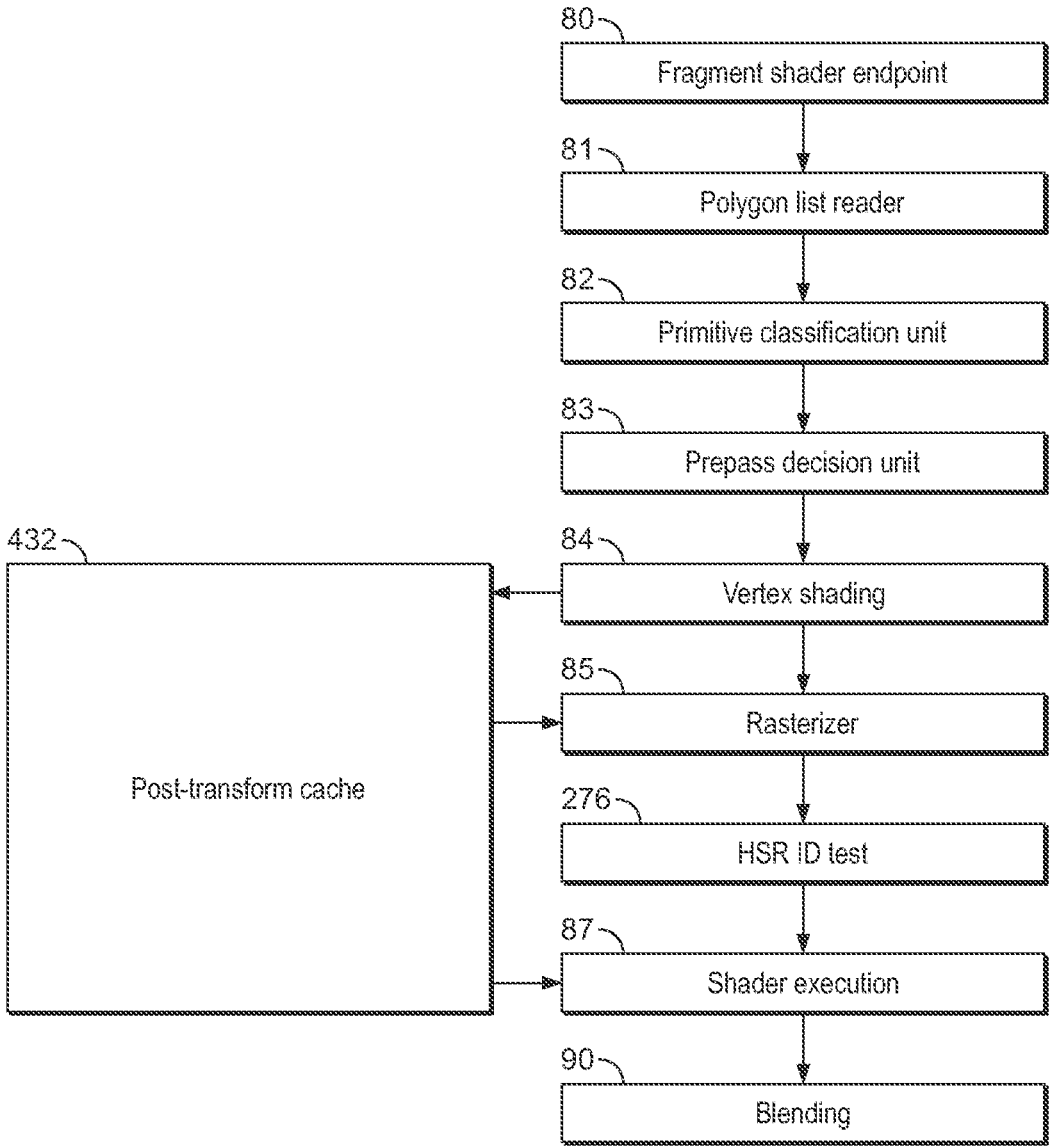
FIG. 47 shows schematically an arrangement in which at least some vertex attribute shading is deferred to the rendering stages of the graphics processor.

FIG. 47 shows a corresponding graphics processing pipeline according to such examples. As shown in FIG. 47, the vertex processing (shading) stage 84 in this example performs vertex shading. The vertex processing (shading) stage 84 in this example can thus trigger a vertex processing circuit (e.g. vertex shader) to process the vertex data for the set of vertices defining the primitive in question to generate vertex shaded attribute data for the primitive in the desired form for further processing of the primitive. As shown in FIG. 47, the vertex processing (shading) stage 84 is also coupled to the vertex cache (post-transform cache) 432. When the fragment shader endpoint 80 issues a primitive for rendering, this can therefore trigger a vertex processing (shading) operation to process the corresponding vertex data (vertex attributes) for the primitive in question. The transformed (vertex shaded) geometry data is then in an embodiment suitably stored, and read back into the graphics processor at the relevant graphics processing stages, i.e. by the rasteriser 85 and the fragment shader 87, in order to rasterise and render the primitive.

The graphics processing pipeline shown in FIG. 47 generally corresponds to the graphics processing pipeline shown in FIG. 27 above, in which the testing comprises the HSR ID test 276. However, it will be appreciated that deferred vertex shading may also be performed for any of the other examples described above, and is not limited to examples using the HSR ID buffer.

As described above, the fragment shader endpoint 80 is caused to issue the same primitives to the graphics processing pipeline twice, namely to perform the respective first, pre-pass operation for the primitive and to then perform the corresponding second, main pass operation for the primitive. This means that some of the processing for a primitive (and its corresponding fragments) is performed twice, i.e. as the same primitive may be subject to both the first, pre-pass operation and the second, main pass operation. For example, when the same primitive is subject to both the first, pre-pass operation and the second, main pass operation, it will typically (necessarily) be rasterised twice, since both passes involve processing primitives into their associated fragments. Similarly, because in the example shown in FIG. 47 at least some vertex attribute processing (shading) in the technology described herein is deferred to the rendering stages, this means that vertex attribute processing (shading) may be (and in some cases will be) triggered during the first, pre-pass operation and then triggered again during the second, main pass operation.

In an example therefore the graphics processor is caused to skip at least some varyings shading in the pre-pass if it can be determined that the varying is not in fact required by the first, pre-pass operation to determine the desired "visibility" information. For example, for primitives that would otherwise be compatible with the pre-pass operation, the following conditions can be used to prove that no varyings are used in the first, pre-pass operation: (i) the fragment shader does not modify coverage; (ii) the fragment shader does not emit depth, and (iii) alpha-to-coverage is not in use.

Figure 48:
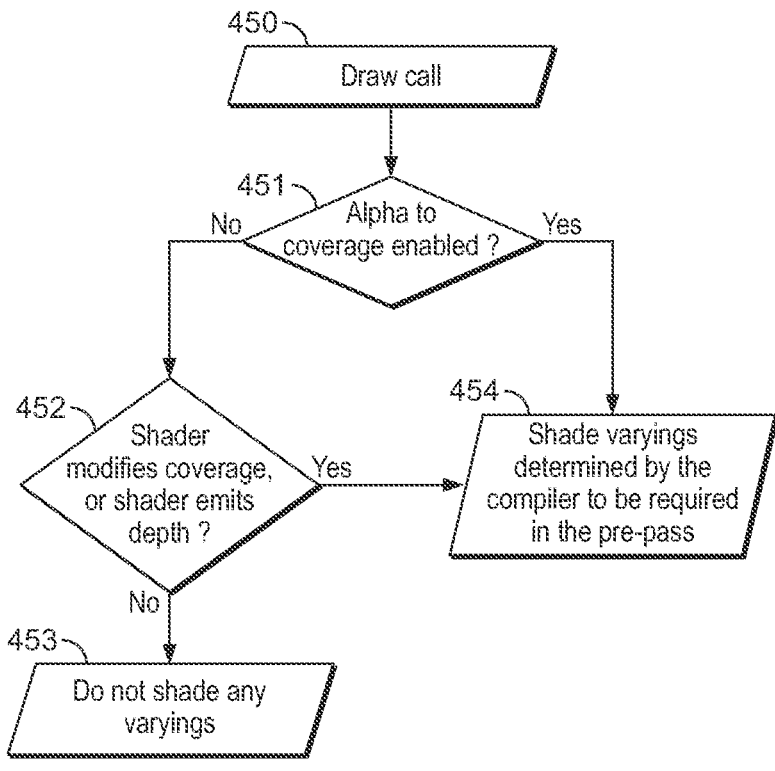
FIG. 48 shows schematically a driver operation that determines whether or not vertex attribute (varyings) shading is required during the first, pre-pass operation.

This can be determined by the driver 4 for the graphics processor 3, as shown in FIG. 48. FIG. 48 is thus a flow chart illustrating the driver operation to determine whether or not varyings are required for the first, pre-pass operation. Thus, for an incoming draw call (step 450), it is checked whether alpha-to-coverage is enabled (step 451) and also whether or not the shader modifies coverage or emits depth (step 452). If either of these conditions are satisfied, the pre-pass operation should therefore shade the varyings determined by the compiler to be required in the pre-pass operation (step 454). Otherwise, if none of these conditions are satisfied, varyings shading can be omitted in the first, pre-pass operation (step 453).

This can be flagged accordingly. For example, in some cases, if any of the varyings are required, the graphics processor may be caused to shade all of the varyings. That is, this may be indicated in a binary manner. However, the compiler is also able to determine which varyings are actually required. For example, when the first, pre-pass operation executes a fragment shader, the fragment shader program can be configured (ordered) such that fragments only run up to a certain point. The compiler can thus check whether there is any path through the fragment shader that will read a particular varying before that point. In that case, the indication of which varyings are required may be more complex and may indicate a set of one or more varyings that should be shaded during the first, pre-pass operation.

Figure 49:
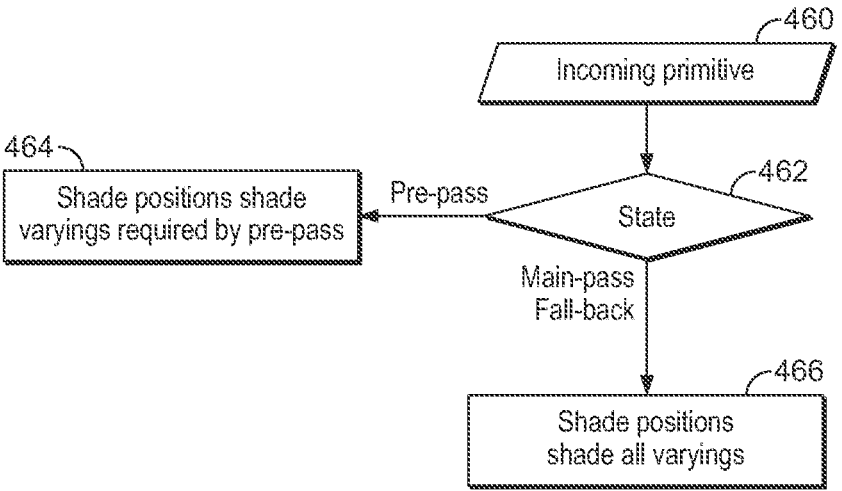
FIG. 49 shows schematically a state machine illustrating how the graphics processor may be controlled according to this example.

FIG. 49 is a state diagram showing how the operation of the graphics processor is controlled in the different states depending on whether or not the varyings are required. As shown in FIG. 49, for an incoming primitive (step 460), if the graphics processor state machine (462) is the pre-pass state, the vertex shader 84 is caused to shade all vertex position attributes but to shade only the vertex non-position (varyings) attributes that have been determined to be required for the first, pre-pass operation (step 464). When the graphics processor is in the main pass state, the vertex shader 84 is in this example caused to shade all of the vertex attributes including both the vertex position and non-position (varyings) attributes (step 466). (In the fallback state, again, all of the vertex attributes including both the vertex position and non-position (varyings) attributes will be shaded.)

Various examples are possible for allocating storage for vertex data in the vertex cache (post-transform cache) 432 when some of the vertex attribute shading is omitted during the first, pre-pass operation.

Figure 50:
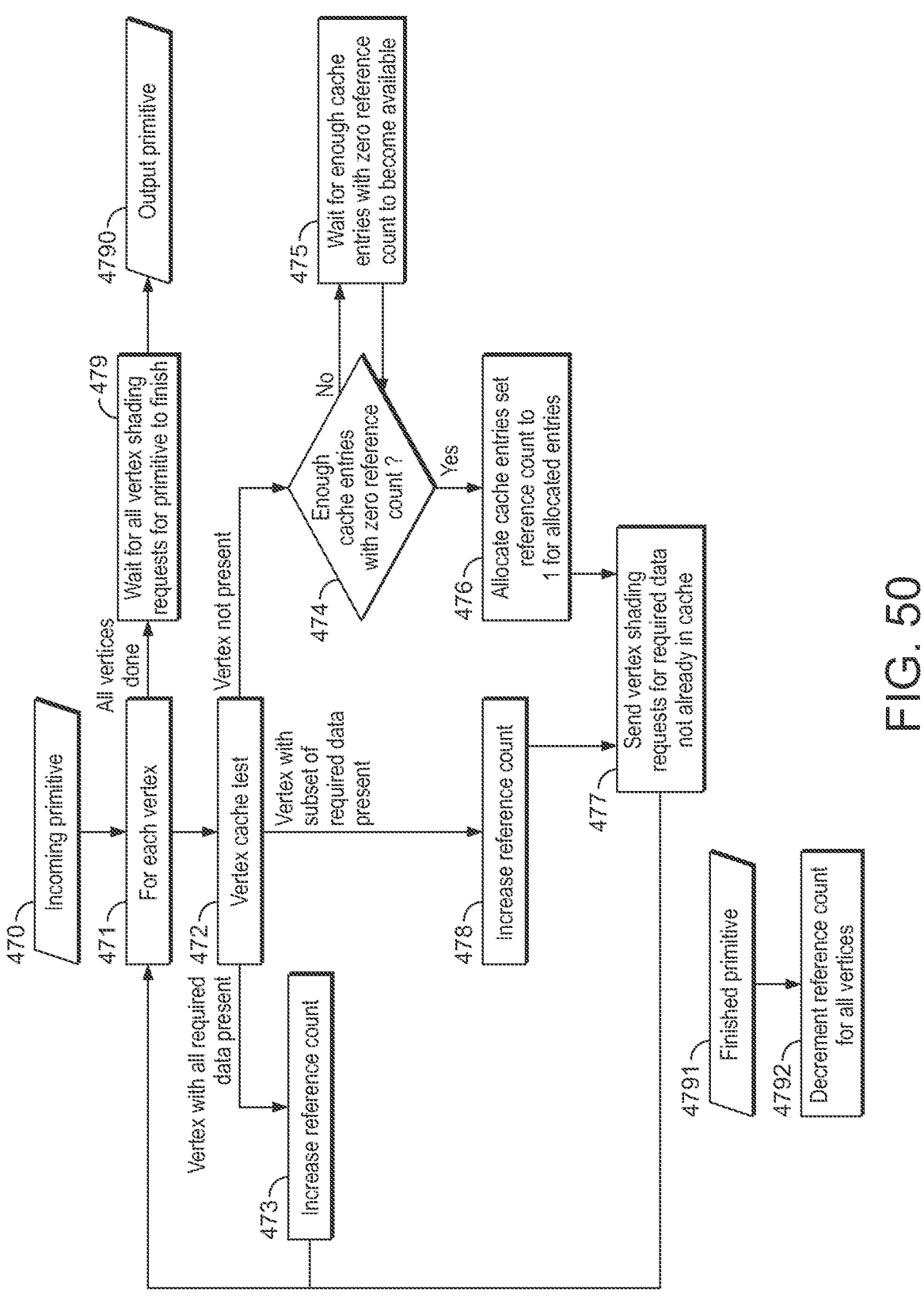
FIG. 50 shows schematically an example of how vertex data may be handled when vertex attribute (varyings) shading is omitted by the first, pre-pass operation.

A first example is illustrated in FIG. 50. In the example shown in FIG. 50, enough space is allocated in the vertex cache (post-transform cache) 432 during the first, pre-pass operation for the entire vertex, even if only the vertex position attributes are populated.

As shown in FIG. 50, for an incoming primitive (step 470), for each vertex (step 471), a vertex cache look up is performed to determine whether or not the vertex is already stored in the cache (step 472). If the vertex with all of the required vertex data is already stored in the cache, no further processing for that vertex is required, so the reference count is incremented accordingly (step 473), and the next vertex is processed. On the other hand, if the vertex is not yet present in the cache at all, so long as there is sufficient space for the entire vertex in the cache (step 474—yes), respective cache entries are allocated for storing the entire vertex, and the reference count is set to 1 for the allocated entries (step 476). If there is not sufficient space for the entire vertex in the cache (step 474—no), the vertex processing waits for enough cache entries to be available (step 475).

The desired vertex shading requests are then issued for the required vertex data (step 477). Thus, if the vertex varyings attributes are not required, the request at this point may simply be issued for the vertex position attributes. In this way, at the end of the first, pre-pass operation, the vertex will be stored in the cache with a subset of the required vertex data. Thus, during the corresponding second, main pass operation, when the vertex data is required for that vertex, the vertex cache test (step 472) will determine that the vertex is present, but only with a subset of the required data present in the vertex cache (i.e. the position attributes are stored but some or all varyings attributes are not stored). In that case, the reference count is increased (step 478), and vertex shading requests are then issued for the missing vertex data (step 477).

Once all vertices have been processed, the process then waits for all vertex shading requests to finish (step 479), before outputting the respective primitive (step 4790). Once the primitive is finished (step 4791), the reference count for all vertices is decremented accordingly (step 4792).

The approach shown in FIG. 50 thus allows the vertex packet to be re-used during the main pass. However, this requires a larger than necessary vertex cache allocation during the pre-pass operation, which can increase the frequency of allocation stalls.

Figure 51:
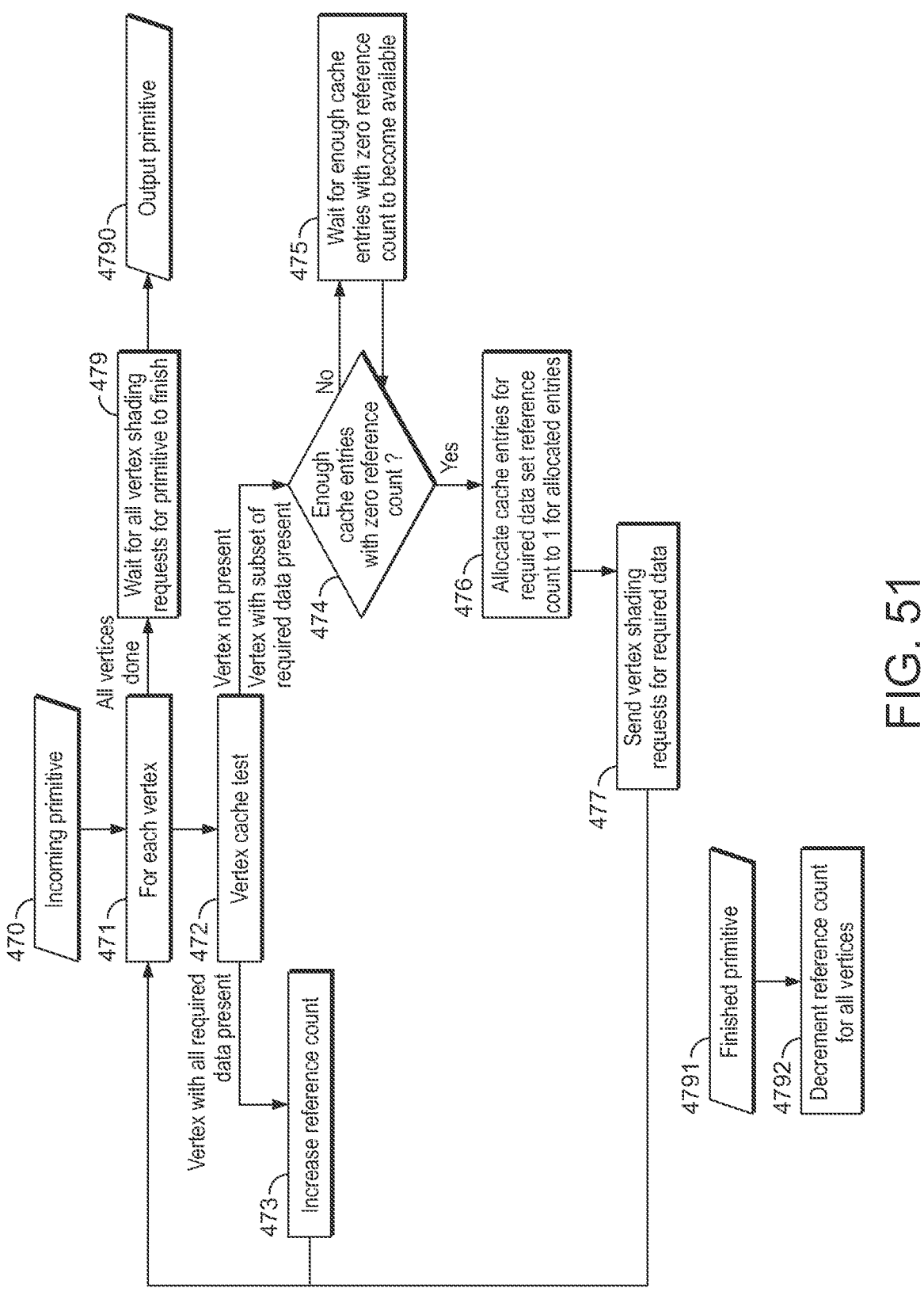
FIG. 51 shows schematically another example of how vertex data may be handled when vertex attribute (varyings) shading is omitted by the first, pre-pass operation.

Another approach is thus illustrated in FIG. 51 in which during the pre-pass operation, when the varyings are not required, there is only allocated enough space in the vertex cache for the vertex positions. The second, main pass when looking for a vertex does not then re-use the position data but instead makes a new allocation that can fit both the position and varyings attributes for the entire vertex. This keeps the vertex cache allocation small in the pre-pass but at the cost of having to shade the positions twice. The vertex processing in FIG. 51 is therefore similar to FIG. 50 except that in FIG. 51 there is no check whether the vertex is already present in the cache but with only a subset of the required data and instead in all cases when the required vertex data is not already present in the vertex cache, a new vertex cache allocation is made for the entire vertex (step 476).

Figure 52:
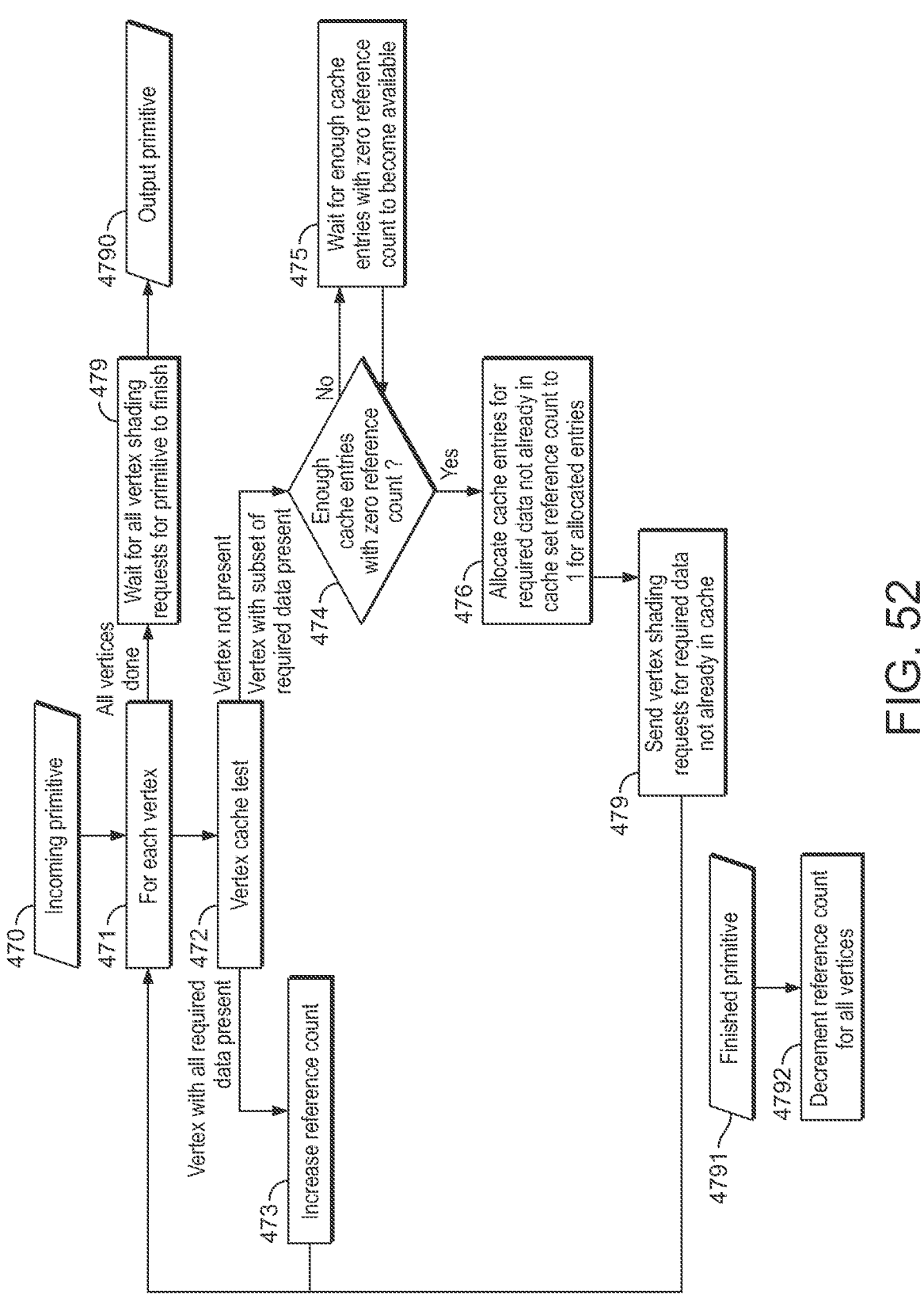
FIG. 52 shows schematically another example of how vertex data may be handled when vertex attribute (varyings) shading is omitted by the first, pre-pass operation.

FIG. 52 illustrates another approach similar to FIG. 51 but wherein the main pass attempts to re-use the position attributes from the first, pre-pass, and makes only a new allocation for the varyings attributes during the second, main pass. This also works but the positions and varyings may now end up in different allocations. Again, the vertex processing in this example is therefore similar to that described above except in this case, the vertex cache allocation in the second, main pass is made only for the required data that is not already present in the vertex cache (step 496). Correspondingly, vertex shading requests are only issued for required data that is not already present in the cache (step 497).

Various other arrangements would be possible for processing the vertex data as part of the pre-pass operations described herein.

Primitive Culling

The first, pre-pass operation may comprise any other suitable processing operations as desired. For example, in some embodiments, a "primitive culling" data structure is also generated during the first, pre-pass operation that can be used to identify entire primitives that do not need to be processed further, and which can therefore be culled relatively earlier in the second, main pass operation (e.g. prior to rasterisation and also prior to any vertex processing that is performed during the main pass operation). For example, for any primitives processed during the first, pre-pass operation for which it can be determined that none of the associated fragments needs to be processed further (e.g. since none of the fragments has any visible effect for their respective sampling positions within the final render output), the primitive in its entirety may be culled. In this way it is possible to avoid some or all processing of the primitive during the second, main pass.

This can then avoid primitive processing in the fragment frontend (e.g. the processing up to and including rasterisation). For example, the ability to cull (entire) primitives in this way may also be particularly beneficial in situations where at least some vertex attribute processing (e.g. varyings shading) is deferred to the rendering stage as in that case the use of the primitive culling data structure can (and in an embodiment does) also at least allow such vertex attribute processing to be avoided during the second, main pass for any primitives for which it can be determined using the primitive culling data structure that the primitive does not need to be processed further.

Figure 53:
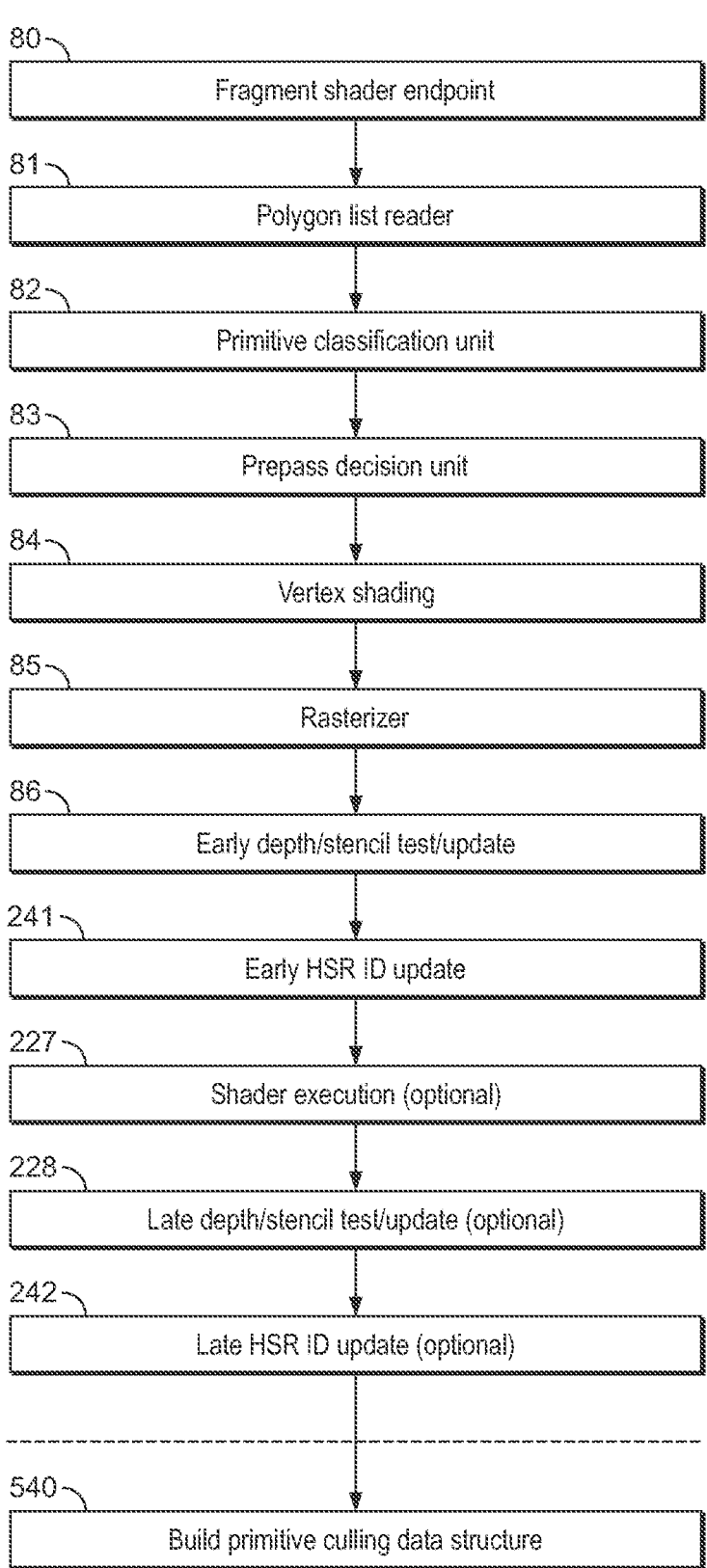
FIG. 53 illustrates an example in which a "primitive culling" data structure is built at the end of the first, pre-pass operation.

FIG. 53 shows a first example of building such "primitive culling" data structure based on the pre-pass operation that is illustrated in FIG. 24 above. In this example, the primitives are thus subject to the same graphics processing pipeline operations as described above in relation to FIG. 24, with the first, pre-pass operation accordingly generating a HSR ID buffer reflecting the visibility information for the sequence of primitives. In FIG. 53 however an additional final step of building a "primitive culling" data structure 540 is performed after the final determination of the HSR ID buffer. The step of building a "primitive culling" data structure 540 is thus executed at the end of the pre-pass operation, such that it is only performed once for every tile.

Figure 54:
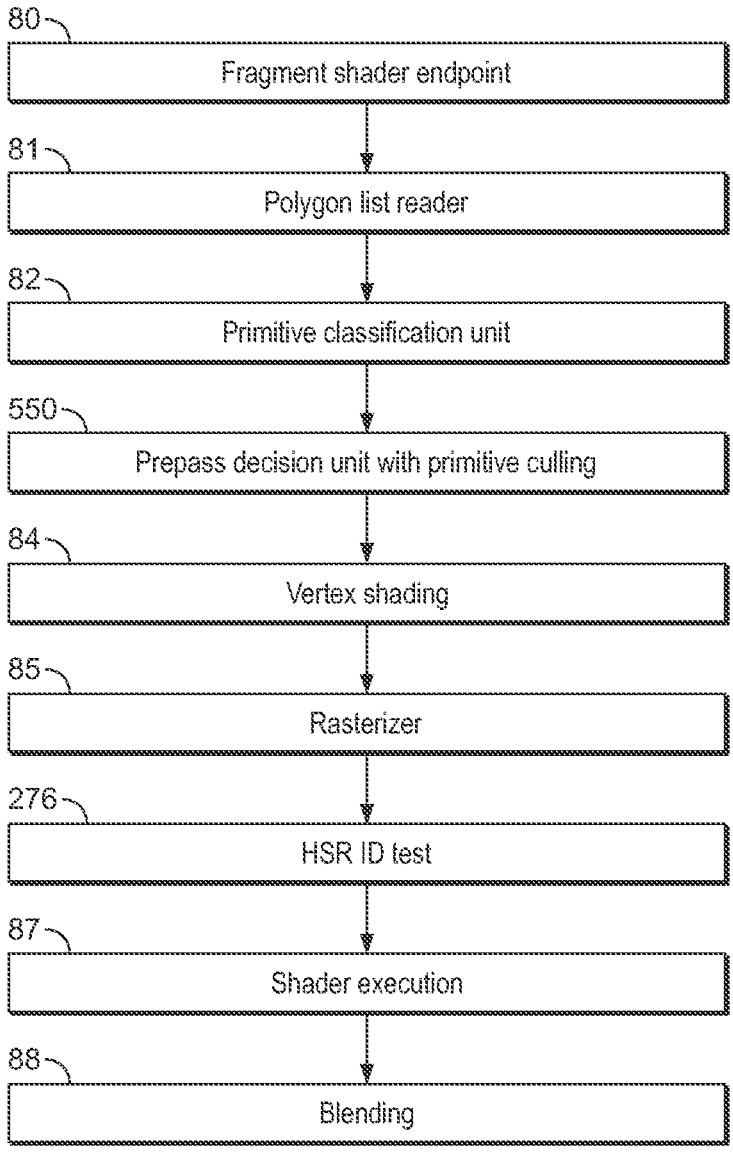
FIG. 54 shows schematically the corresponding second, main pass operation for the example shown in FIG. 53 using the generated "primitive culling" data structure.

FIG. 54 then shows the corresponding modified main pass operation according to this example in which the main pass operation proceeds as described above in relation to FIG. 27, except that the pre-pass decision stage 550 is also operable to cull entire primitives against the "primitive culling" data structure.

Figure 55:
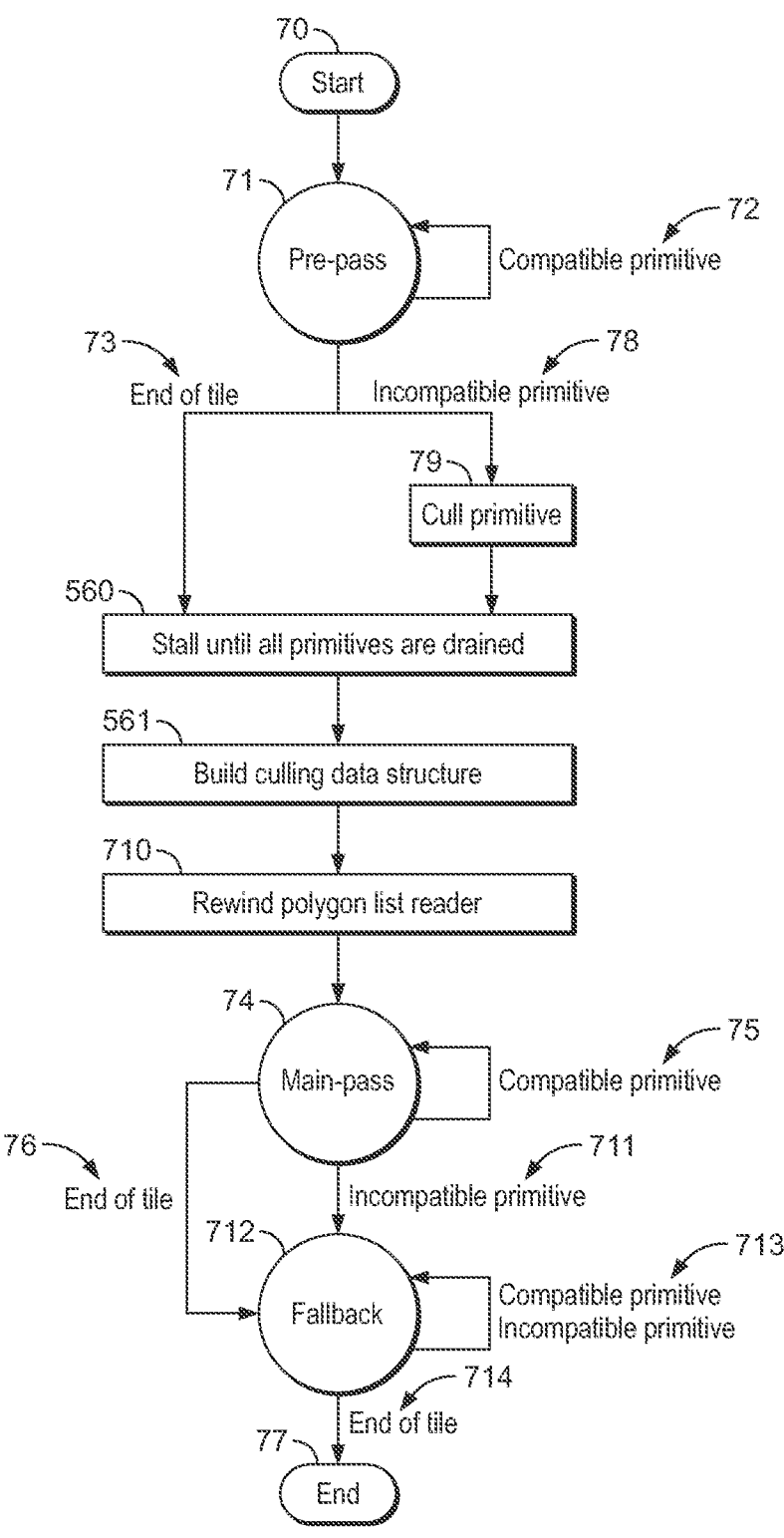
FIG. 55 shows schematically a state diagram for the graphics processor according to this example.

FIG. 55 is a state machine showing the operation of the graphics processor in this example. The state machine in this example is essentially the same as that described above in FIG. 7 except that after the first, pre-pass operation is finished, or is stopped in response to encountering an incompatible primitive, prior to rewinding the primitive list reader (step 710) ready for the subsequent main pass operation (step 74), the graphics processor must first stall until all primitives have completed the first, pre-pass operation (step 560), to allow the primitive culling data structure to be built (step 561) before the second, main pass operation is started.

Figure 56:
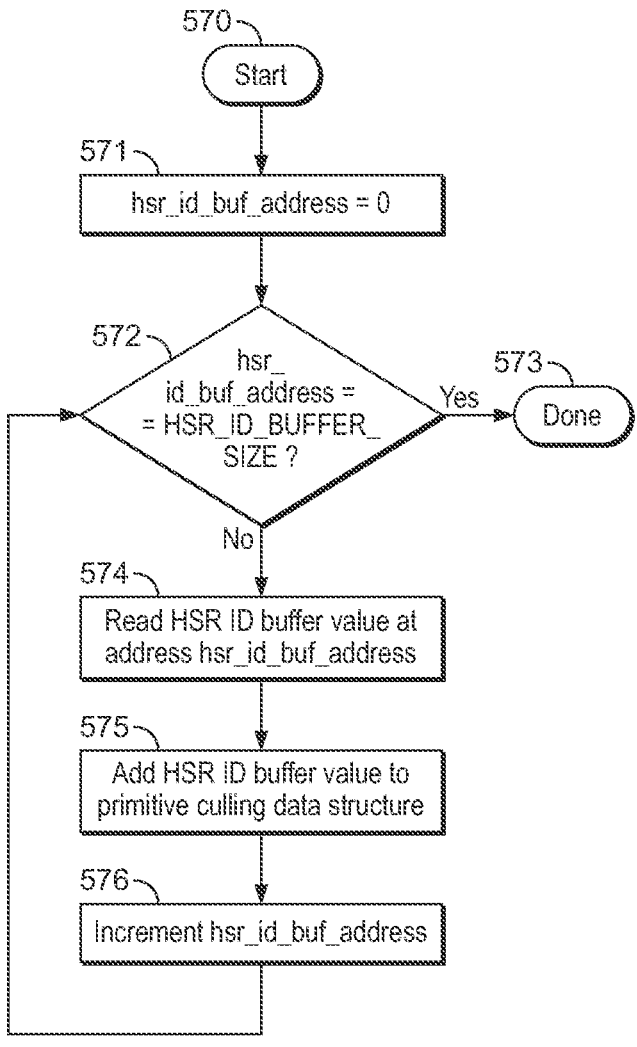
FIG. 56 shows in more detail the generation of the "primitive culling" data structure according to an example.

FIG. 56 is a flow chart illustrating how the primitive culling data structure may be built from the HSR ID buffer according to one example. As shown in FIG. 56, at the start of the process (step 570), the HSR ID buffer address is initialised to zero (step 571). The current HSR ID buffer address is then checked to see whether it matches the size of the HSR ID buffer (step 572). If the current HSR ID buffer address matches the size of the HSR ID buffer (step 572—yes), this means that all entries of the HSR ID buffer have been processed, and the process is therefore done (step 573). Otherwise, the primitive culling data structure is built by reading the HSR ID value that is stored at the current HSR ID buffer address (step 574), adding the HSR ID value accordingly to the primitive culling data structure (step 575), and then incrementing the HSR ID buffer address (step 576) to cause the processing to continue with the next HSR ID buffer address, and so on.

The result of this is thus to identify by their HSR ID values all primitives for which a HSR ID value is stored in the HSR ID buffer and add these to the primitive culling data structure. Any remaining primitives that are not added to the primitive culling data structure are therefore not visible at any sampling positions within the render output and can accordingly be culled in their entirety.

Figure 57:
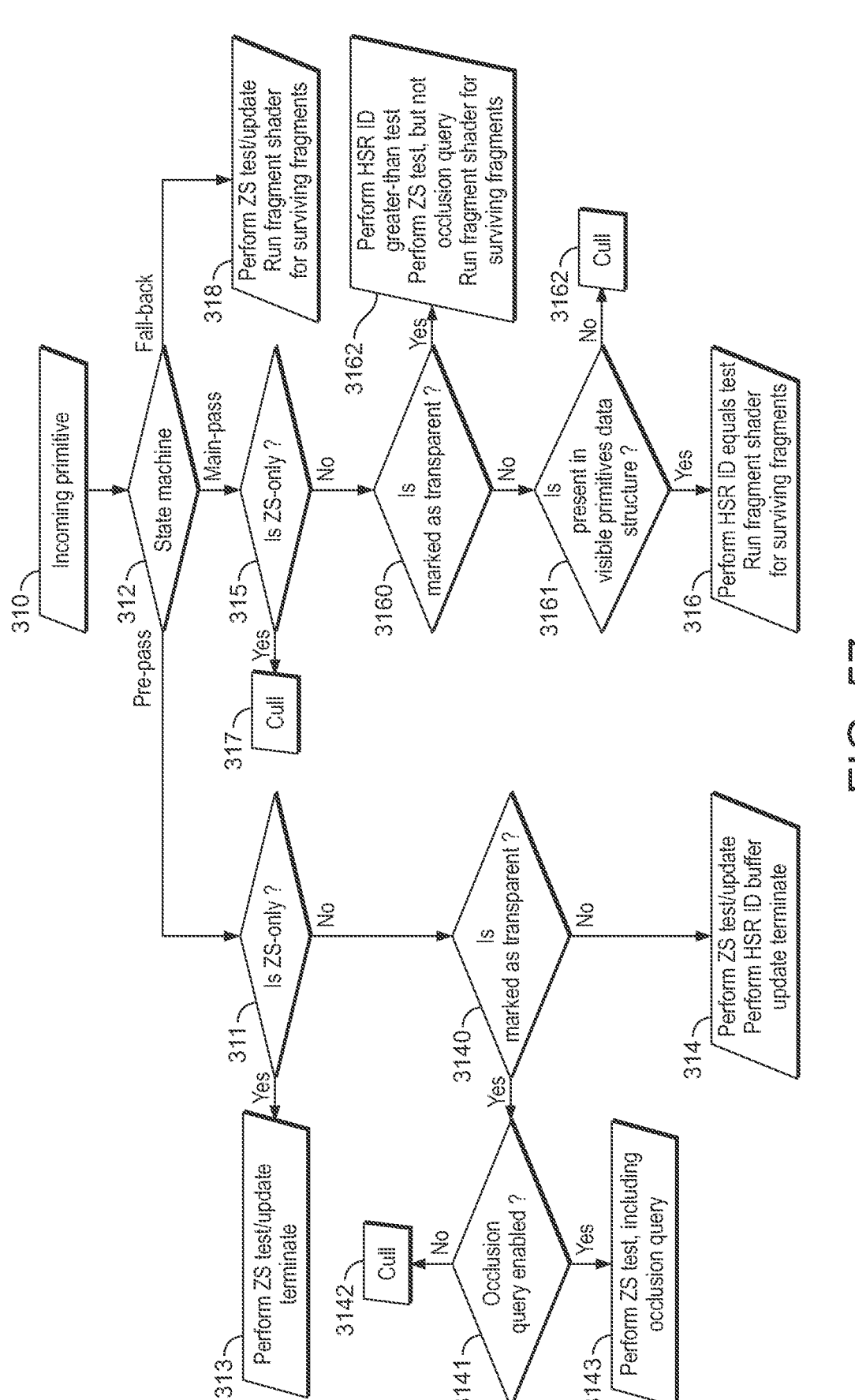
FIG. 57 shows schematically the operation of the corresponding state machine for the example that is illustrated in FIG. 56.

The "visible primitive culling data structure" in this way can then be used during the pre-pass decision stage 83 to cull entire primitives, as shown in FIG. 57. The decision logic in FIG. 57 is generally the same as that shown in FIG. 36 described above, however, during the second, main pass operation, for primitives that would otherwise be caused to be passed onwards, it is further checked (at step 580) whether or not the primitive is present in the visible primitive culling data structure. If the primitive is not present (step 3161—no), it can be culled (step 3162). Otherwise, the primitive is passed to the rasteriser 85, etc., and the second, main pass operation is performed as normal.

Figure 58:
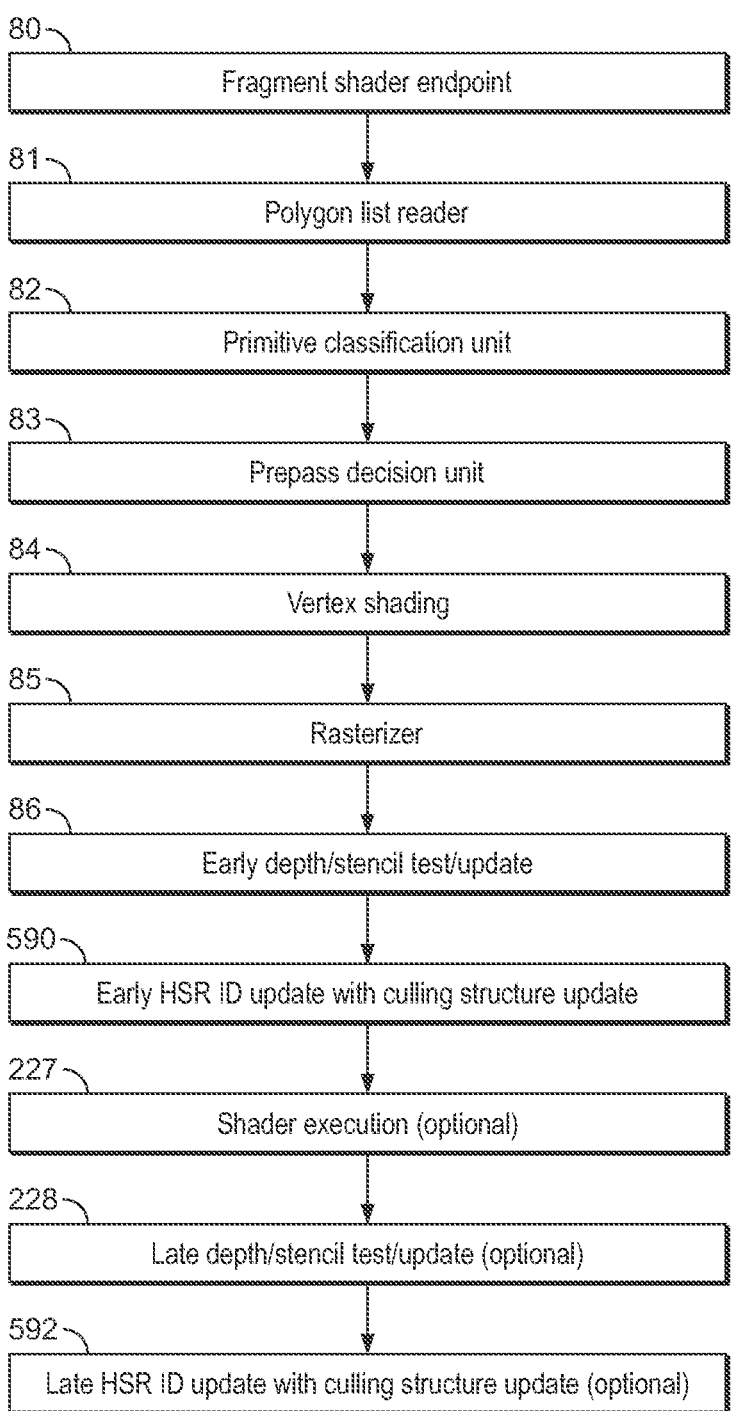
FIG. 58 shows schematically another example in which a "primitive culling" data structure is built during the first, pre-pass operation.

Various other examples are contemplated for building the primitive culling data structure. For example, FIG. 58 illustrates another example in which the primitive culling data structure is generated during the first, pre-pass operation 'on the fly' alongside updating the HSR ID buffer. Thus, the processing pipeline in this example is generally the same as that shown in FIG. 24 except that as shown in FIG. 58 the (early) HSR ID update 590 is modified to also update the primitive culling structure (and the (late) HSR ID update 592 when present is correspondingly also modified to perform a later update of the primitive culling structure).

Figure 59:
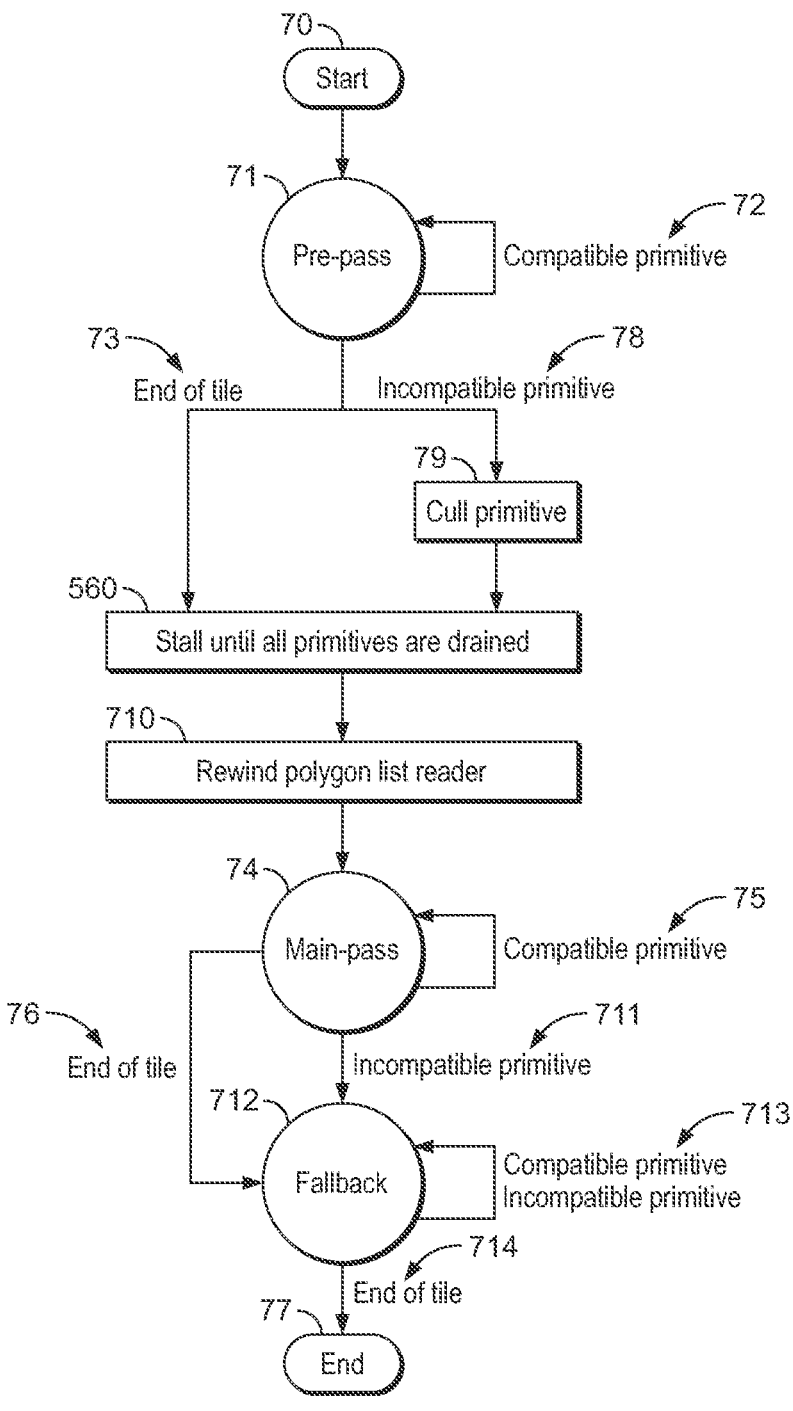
FIG. 59 shows schematically a state diagram for the graphics processor according to this example.

FIG. 59 shows the corresponding state diagram in this situation. Here, the second, main pass operation must still stall until all primitives are drained from the first, pre-pass operation (step 560), however, there is no additional step of building the primitive culling data structure (as compared to FIG. 55, for example), as this is instead done as part of the first, pre-pass operation. Various other arrangements would be possible in this regard.

Figure 60:
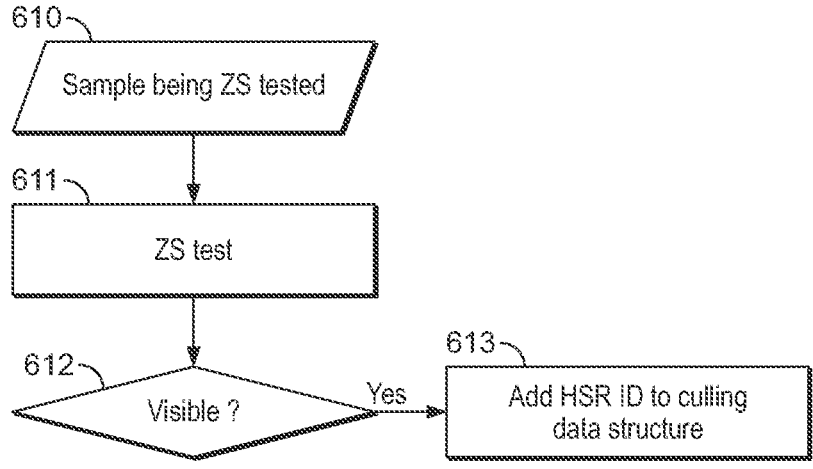
FIG. 60 shows schematically the generation of the "primitive culling" data structure according to another example.
Figure 61:
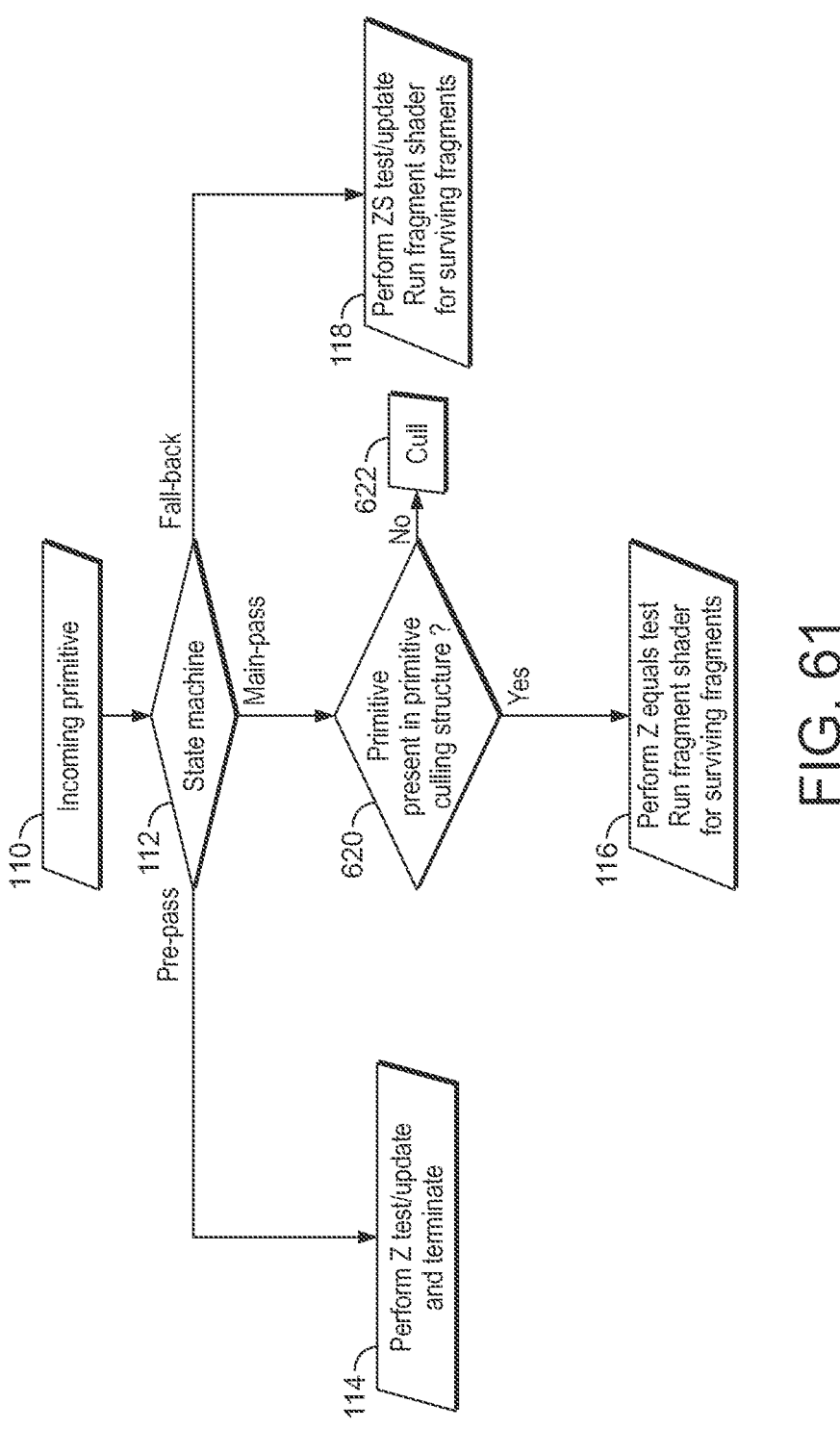
FIG. 61 shows schematically the operation of the corresponding state machine for the example that is illustrated in FIG. 60.

The primitive culling data structure can also be built directly from the depth (or stencil) testing without requiring a HSR ID buffer to be produced. An example of this is illustrated in FIG. 60. As shown in FIG. 60, for an incoming fragment for which depth/stencil testing is to be performed (step 610), the depth/stencil testing is performed (step 611), and if the fragment is determined to be visible (step 612), a respective HSR ID value identifying the primitive from which the fragment was derived is added to the primitive culling data structure (step 613). Note that in this example primitives are therefore still allocated HSR IDs during primitive classification, as described above, however, these are simply used to build the primitive culling data structure. FIG. 61 then shows a state machine illustrating, for an incoming primitive 110 to be processed, how the primitive 110 is processed differently according to the different possible states of the graphics processor in the example of FIG. 60. It will be appreciated that the state machine is identical to that shown in FIG. 11 except that when the graphics processor is configured in the main pass state, the pre-pass decision unit 83 is further configured to check whether or not the primitive 110 is present in the primitive culling data structure (step 620), and, if not, to cull the primitive accordingly in its entirety (step 622) at this point.

In the examples above it is described how primitives are added to the primitive culling data structure as and when they are determined to be visible. It may however be prohibitive to provide a primitive culling data structure that is capable of storing all possible primitives for an arbitrary sequence of primitives. In some examples therefore the primitive culling data structure is a fixed-size data structure.

In that case, if the number of visible primitives is greater than the fixed-size of the primitive culling data structure, the primitive culling may be lost at that point. Alternatively, various arrangements are considered for using the entries of the fixed-size data structure to indicate sets of multiple primitives that are visible.

Figure 62:
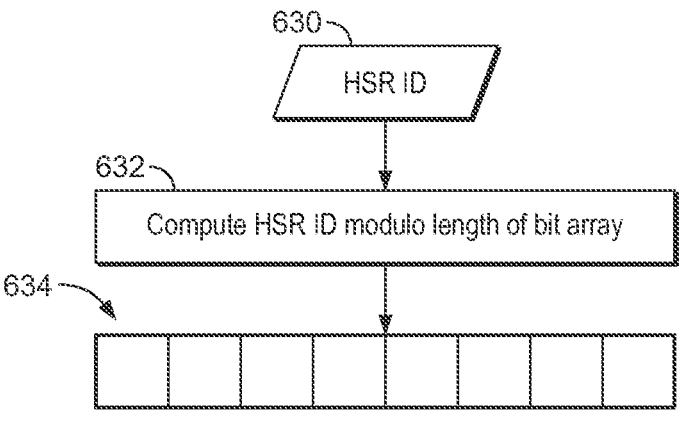
FIG. 62 shows schematically one example of populating a fixed-size "primitive culling" data structure.
Figure 63:
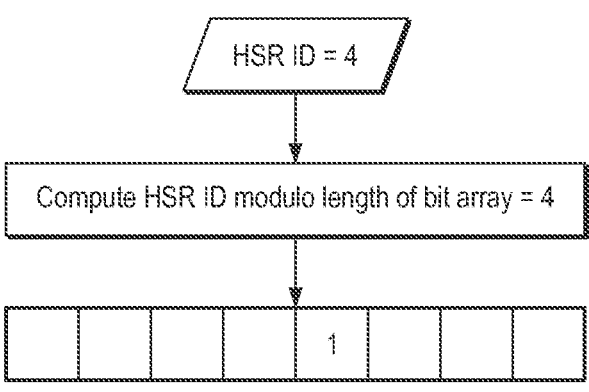
FIG. 63 and FIG. 64 provide worked examples to illustrate how fixed-size "primitive culling" data structure would be populated according to the example of FIG. 62.
Figure 64:
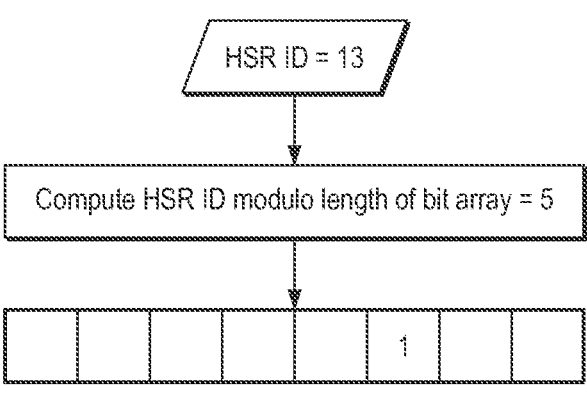

For instance, in FIG. 62, when a HSR ID value 630 is to be added to the primitive culling data structure 634, which in this example comprises an 8-bit value, the HSR ID value is computed modulo the length of the bit array, and the corresponding bit is then set accordingly if that primitive is visible. Thus, as shown in FIG. 63, for the HSR ID value 4, the computed length is 4, and so the fourth bit is set accordingly. Likewise, as shown in FIG. 64, for the HSR value 13, the computed length is 5, and so the fifth bit is set accordingly. This of course means that a bit may be set even when a primitive covered by that bit is not in fact visible. However, this is acceptable, as it simply means the primitive will be subsequently killed during the fragment level processing.

Figure 65:
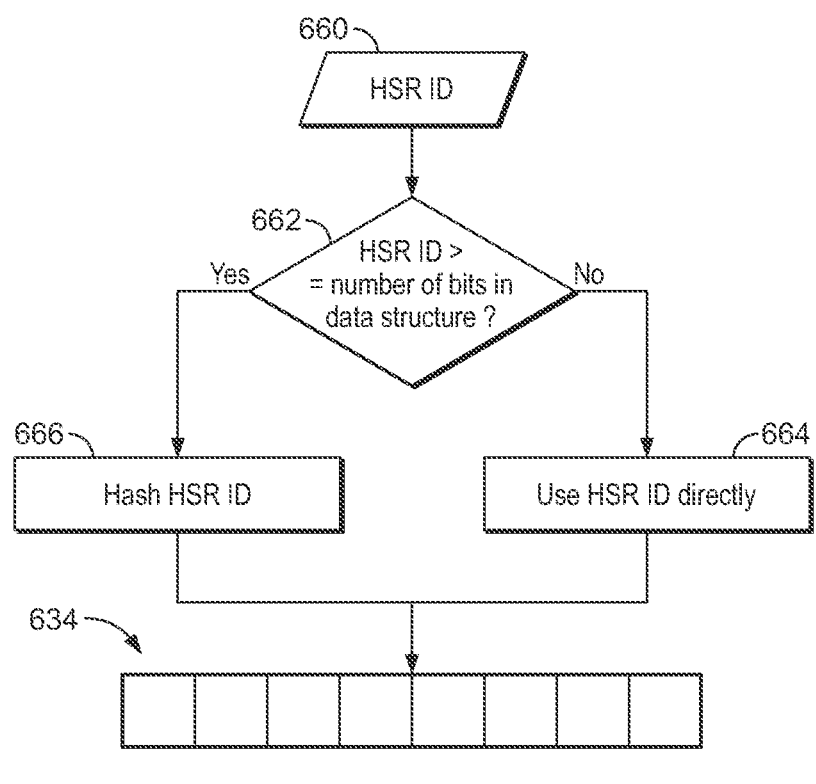
FIG. 65 shows schematically another example of populating a fixed-size "primitive culling" data structure.
Figure 66:
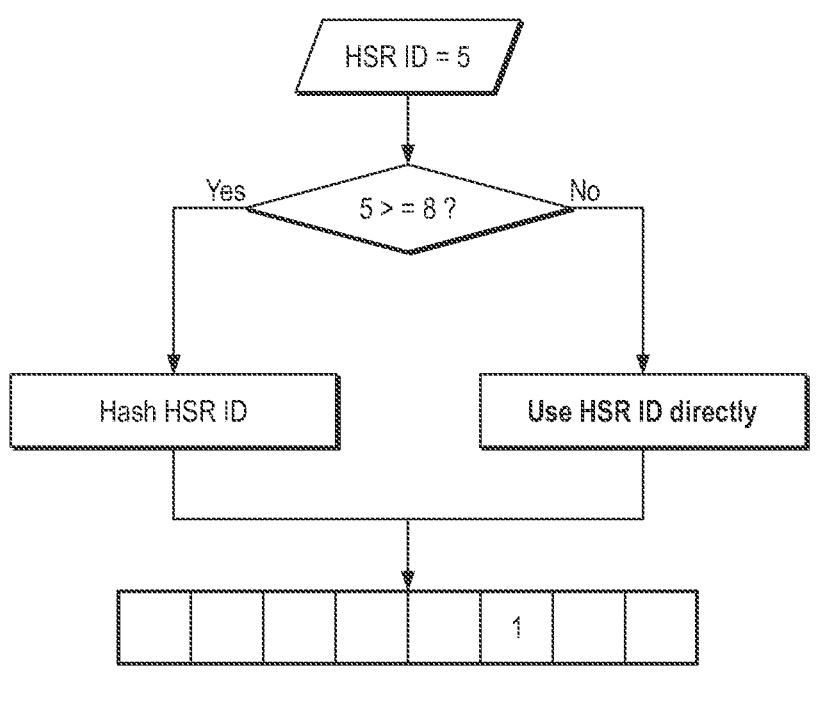
FIG. 66 and FIG. 67 provide worked examples to illustrate how fixed-size "primitive culling" data structure would be populated according to the example of FIG. 65.
Figure 67:
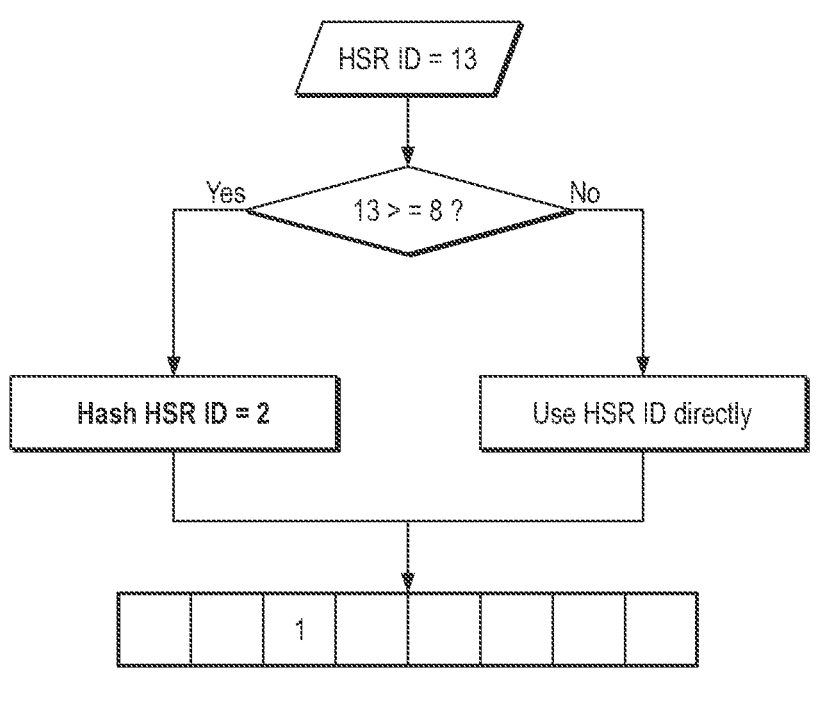

FIG. 65 shows another example, where in this case, when a HSR ID value 660 is to be added to the primitive culling data structure 634, it is checked whether the HSR ID value is greater than the number of bits available in the primitive culling data structure (step 662). If the HSR ID value is not greater than the number of bits available in the primitive culling data structure (step 662—no), the HSR ID value is used directly to set the corresponding bit. Thus, as shown in FIG. 66, for a HSR ID value of 5 (which is less than 8), the HSR ID value is used directly such that the fifth bit is set. On the other hand, for HSR ID values that are greater than the number of bits available in the primitive culling data structure (step 662—yes), a suitable hash function is computed using the HSR ID value to determine the respective bit that should be set. This is illustrated in FIG. 67.

Figure 68:
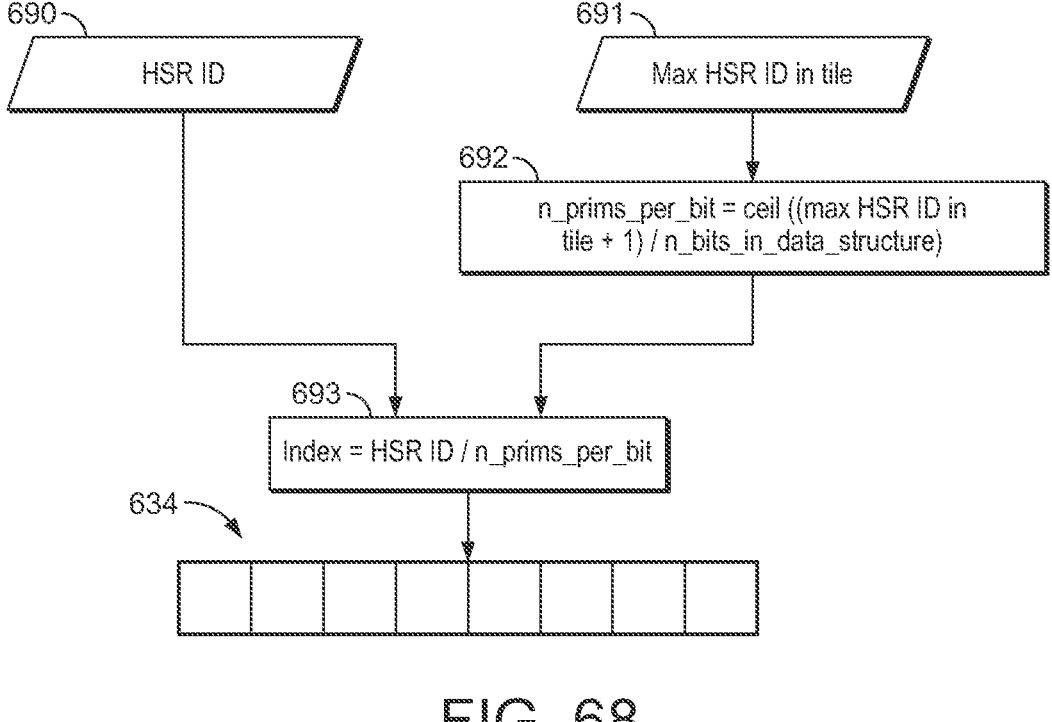
FIG. 68 shows schematically a yet further example of populating a fixed-size "primitive culling" data structure.
Figure 69:
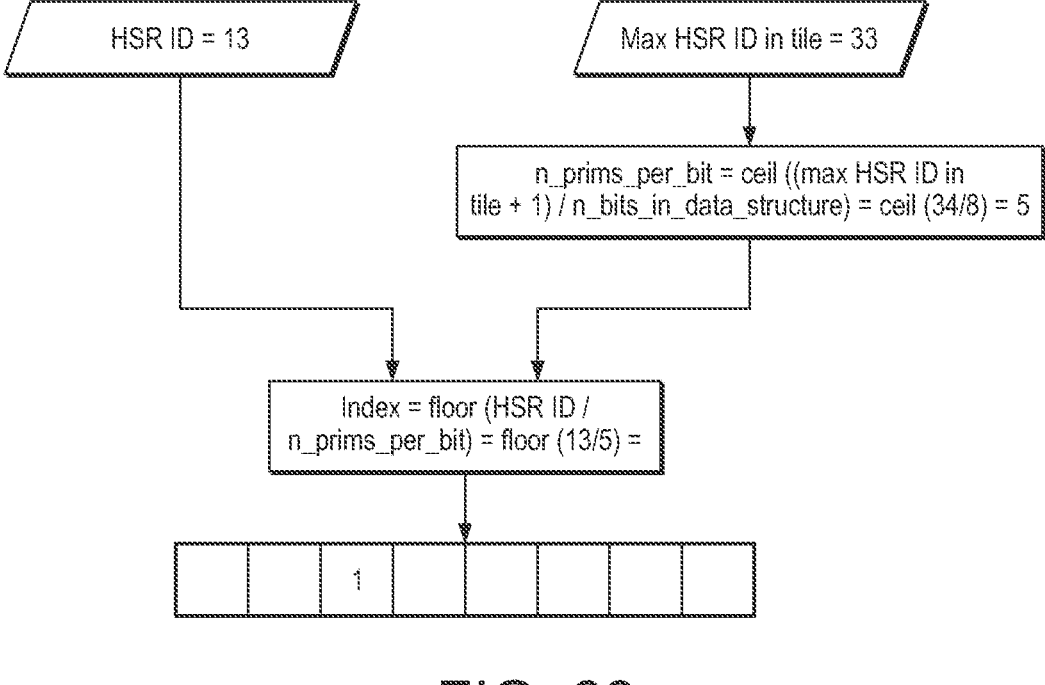
FIG. 69 provides a worked example to illustrate how fixed-size "primitive culling" data structure would be populated according to the example of FIG. 68.

FIG. 68 shows a further example, where in this case, when a HSR ID value 690 is to be added to the primitive culling data structure 634, the bit that should updated to reflect this is determined by working out the maximum HSR ID for the tile to which the primitive culling data structure relates (step 691), calculating the number of primitives that each bit of the primitive culling data structure should represent (step 692), and then calculating an index by dividing the HSR ID value 690 by the number of primitives represented by each bit of the primitive culling data structure. FIG. 69 shows a worked example of this.

Fragment Shader Endpoint Optimisation

As described above, the rendering of each tile may comprise first and second processing passes. In typical graphics processing arrangements there may be many tiles that need to be rendered. Each tile is in an embodiment processed in the same manner described above. In that case, the tiles could be rendered 'back-to-back' such that the pre-pass operation for a tile is only started after the main pass operation (or fallback operation, if required) for the previous tile has completed. This can generally work well. An example of this approach is shown in FIG. 70.

Figure 70:
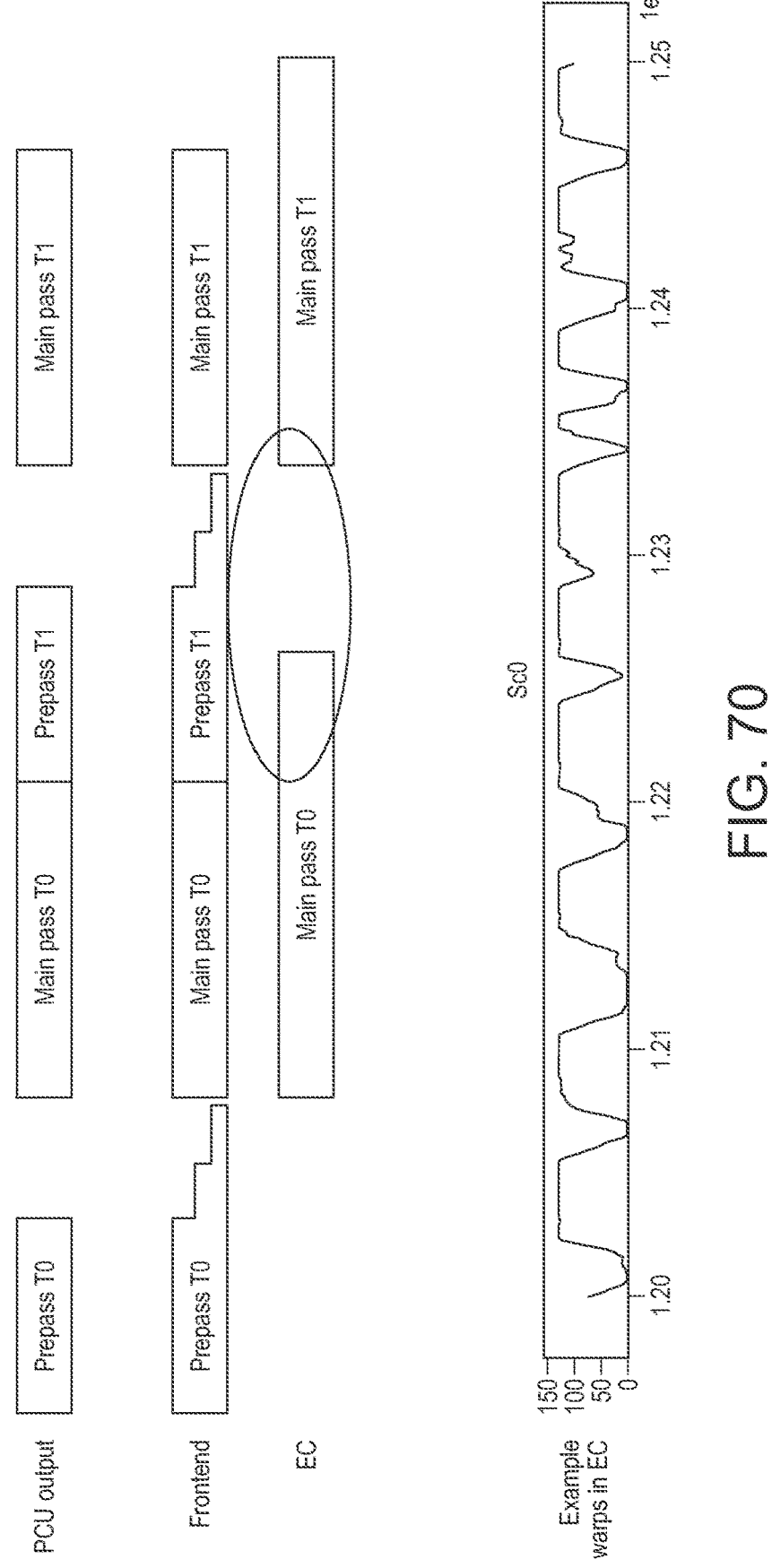
FIG. 70 shows schematically how respective processing tasks (passes) for different tiles may be issued to the graphics processing pipeline in a serial or 'back-to-back' manner.

As shown in FIG. 70, a first task for performing a first, pre-pass operation for a first tile is issued ('prepassT0') to the graphics processing pipeline. The primitives associated with that tile are then processed accordingly in the primitive list reader and correspondingly by the fragment frontend stages, as described above. In this example, there is no fragment shader executed during the first, pre-pass operation (although this could be done if desired). The corresponding main pass operation for the first tile ('mainpassT0') cannot be started until all of the primitives have completed the first, pre-pass operation. Thus, as shown in FIG. 70, the main pass operation for the first tile ('mainpassT0') waits for the corresponding pre-pass operation for the first tile ('prepassT0') to complete. The pre-pass operation for the second tile ('prepassT1') can be launched immediately after the previous main pass operation ('mainpassT0'). However, again, the corresponding main pass operation for the second tile ('mainpassT1') must wait for its pre-pass operation ('prepassT1') to complete. The effect of this, as shown in FIG. 70, is that there may be bubbles of inactivity especially in the execution core between adjacent main pass operations.

Various arrangements are therefore contemplated to attempt to improve speed of pre-pass operation.

Figure 71:
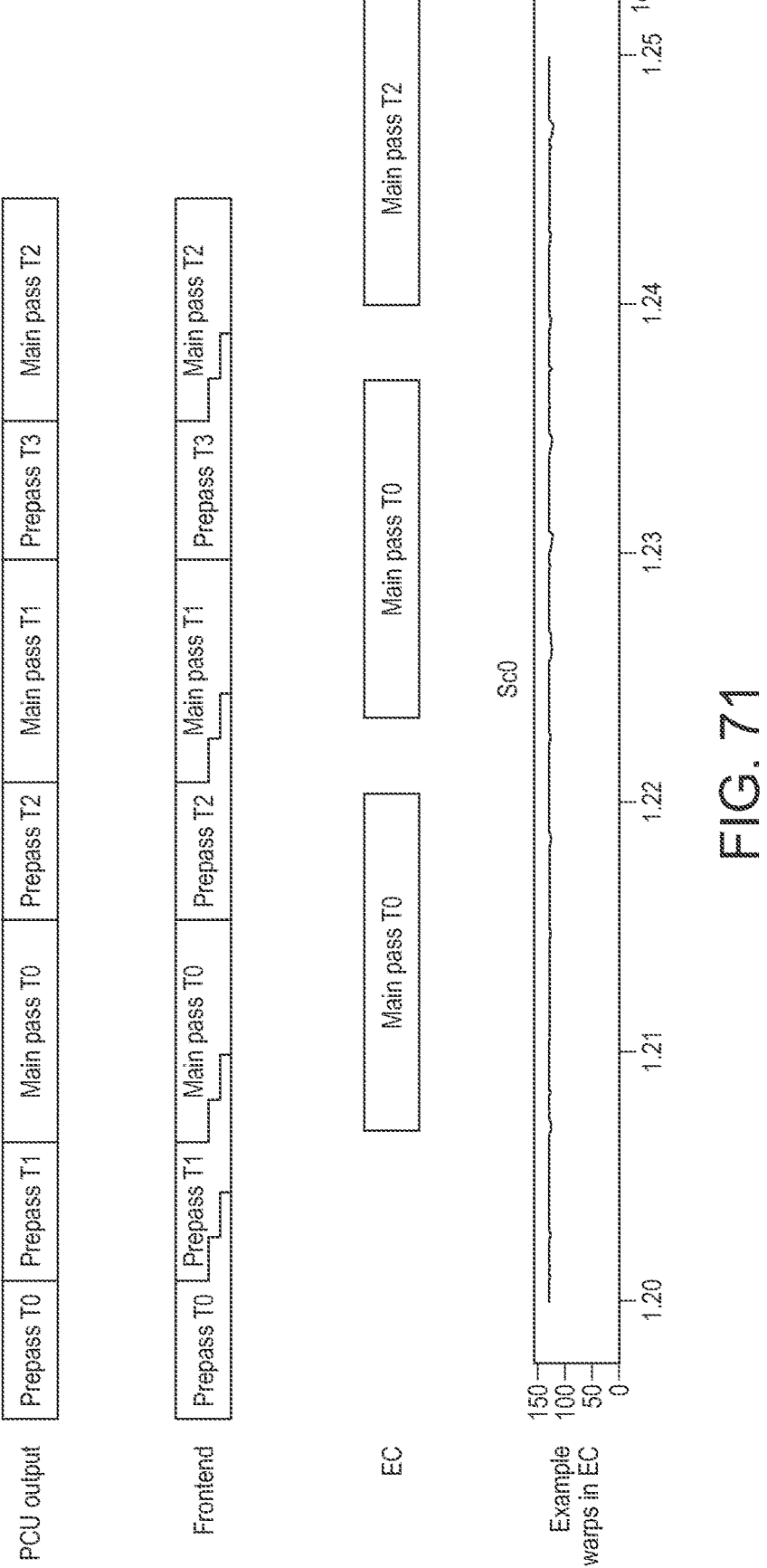
FIG. 71 shows schematically how respective processing tasks (passes) for different tiles may be interleaved in order to improve throughput of processing tasks (passes) for different tiles.

This can therefore work well to increase the speed of the overall rendering job. In other embodiments, the graphics processing pipeline may not be duplicated, but instead the fragment shader endpoint 80 attempts to interleave processing tasks for different tiles to provide a more continuous throughput. An example of this approach is shown in FIG. 71. In particular, as shown in FIG. 71, the fragment shader endpoint 80 may attempt to interleave processing tasks for respective processing passes for different tiles. To make this work, as shown in FIG. 71, the fragment shader endpoint 80 may initially schedule a set of two (or more) pre-pass operations, before attempting to interleave pre-pass and main pass operations for different tiles. This then means that the processing effectively works at least one pre-pass operation ahead which can reduce the bubbles described above. Thus, as shown in FIG. 71, the main pass operation for the first tile ('mainpassT0') can overlap in the fragment frontend with the pre-pass operation for the second tile ('prepassT1'). The main pass operation for the second tile ('mainpassT1') can thus be started relatively earlier since its corresponding pre-pass operation ('prepassT1' has already completed by the time the main pass operation for the second tile ('mainpassT1') is ready to be issued.

Figure 72:
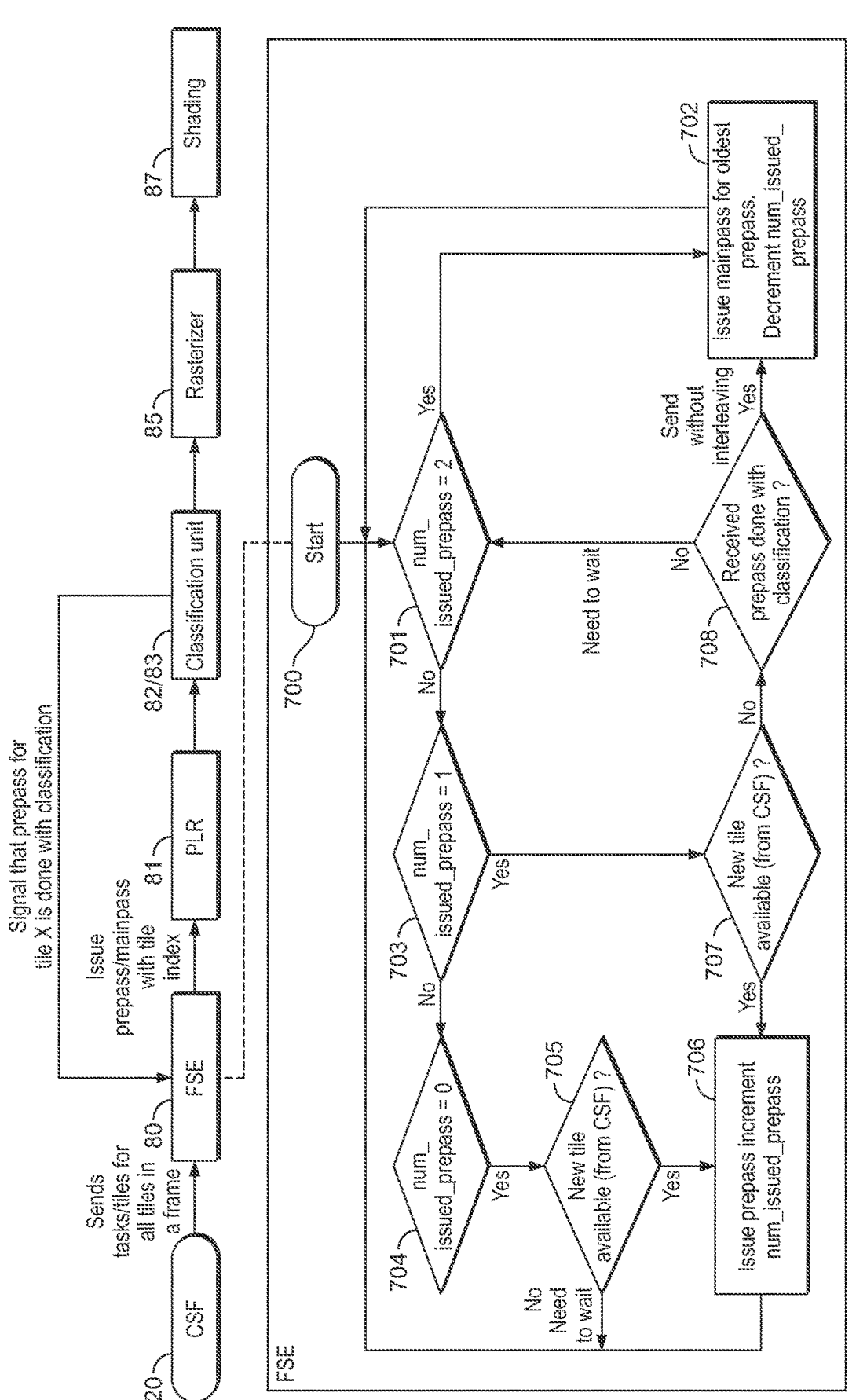
FIG. 72 schematically shows schematically a dynamic scheduling of tasks based on the interleaved operation shown in FIG. 71.

In some examples, the fragment shader endpoint 80 may always issue tasks according to the desired scheduling operation as shown in FIG. 71. In other examples however the fragment shader endpoint 80 may attempt to interleave tasks according to the desired scheduling operation as shown in FIG. 71 but is also able to perform a more dynamic control, e.g., and in particular, such that if the fragment shader endpoint 80 effectively runs out of the pre-pass operations, but there is a main pass operation ready to be performed, the desired scheduling operation can be interrupted accordingly to perform the main pass operation, e.g. rather than waiting for a command relating to the next pre-pass operation to be received from the command stream frontend 20. In that case, if the desired scheduling operation is interrupted the fragment shader endpoint 20 may be caused to then issue a set of two pre-passes back to back to restart the desired scheduling operation. FIG. 72 shows a corresponding work flow for a dynamic control of the scheduling such that the fragment shader endpoint 80 attempts to perform the interleaved operation as shown in FIG. 71 but is also able to interrupt the desired scheduling operation when it determines that is potentially more efficient to do so.

As shown in FIG. 72, and as described above in relation to FIG. 6, the processing tasks for performing the respective pre-pass and main pass operations for a given tile are generated by the fragment shader endpoint 80 in response to receiving a corresponding command from the command stream frontend 20. The command stream frontend 20 thus sends all tasks/tiles for all tiles in a frame to the fragment shader endpoint 80 which correspondingly breaks the tasks/ tiles into respective pre-pass and main pass operations that are then issued to the graphics processing pipeline including the primitive list reader (polygon list reader 81), the primitive classification 82/pre-pass decision unit 83, rasterisation 85, fragment shading 87, etc., as described above. Although FIG. 72 shows a simplified graphics processing pipeline it will be appreciated that the graphics processing pipeline in this example may generally correspond to any of the graphics processing pipelines in the examples described above.

In the example shown in FIG. 72, at the start of a rendering job requiring multiple different tiles to be rendered (step 700), the fragment shader endpoint 80 in an embodiment issues a set of two pre-pass operations back to back, as shown in FIG. 71. The control is then performed as follows using a respective counter 'num_issued_prepass' that tracks how many pre-pass operations have been issued. If the number of issued pre-pass operations is equal to two (step 701—yes), the main pass operation for the oldest pre-pass is issued (step 702), and the counter 'num_issued_prepass' is decremented accordingly. If the number of issued pre-pass operations is not equal to two (step 701—no), it is checked whether the number of issued pre-pass operations is equal to one (step 703). If there is not even a single pre-pass available (step 701—no), such that the number of pre-pass operations is zero (step 704—yes), the fragment shader endpoint 80 is configured to check whether a new tile/task is available from the command stream frontend 20 (step 705), and either issue a pre-pass operation, and increment the 'num_issued_pre-pass' counter accordingly (step 706), when there is a tile/task available (step 705—yes), or otherwise (step 705—no), wait until a new tile/task is available. The effect of this loop is thus that at the start of a job, or if the fragment shader runs out of pre-pass operations, a set of two pre-pass operations is in an embodiment launched back to back.

However, as described above, in some cases, it may be desirable to issue a main pass operation out of sequence, when one is available to be performed. Thus, if the number of issued pre-pass operations equals one (step 703—yes), at that point it is checked whether there is already a new tile available from the command stream frontend 20 (step 707). If a new tile is available (step 707—yes), the scheduling operation proceeds according to the desired scheduling operation that is shown in FIG. 71 by issuing a pre-pass operation (step 706). On the other hand, if there is no tile available, and hence no pre-pass operation ready to be issued (step 707—no), a decision is then made as to whether to wait for a new tile to become available, or whether to immediately issue an outstanding main pass operation. In the example shown in FIG. 72, this decision checks whether the current pre-pass operation is done with primitive classification (step 708). Thus, a signal is provided from the primitive classification 82/pre-pass decision 83 stage to the fragment shader endpoint 80 to indicate this. If the received pre-pass is already done with classification (step 708—yes), the main pass operation is issued (step 702). Otherwise (step 708— no), the fragment shader endpoint 80 is caused to wait. Various other arrangements would be possible in this regard. For example, the decision as to whether or not to wait could also be performed using a time-out mechanism, such that if no new tile is available within a certain time period, a main pass is issued at that point.

Restartable Pre-Pass

The present embodiments thus introduce a novel "pre-pass" operation which, as described above, facilitates improved hidden surface removal efficiency. As shown in FIG. 7, and described above, in order to ensure safe hardware execution, a "fallback" operation is also provided, such that the graphics processor is able to switch to such fallback operation, as necessary, in order to handle primitives that cannot safely be handled by the pre-pass operation. For example, in the embodiment shown in FIG. 7, after the first, pre-pass operation encounters an incompatible primitive, the processing switches to the fallback operation and continues in the fallback operation to the end of the tile. A new pre-pass operation can then be initiated for the next sequence of primitives (e.g. the next tile) to be rendered.

In this respect, it would also be possible however to re-start the pre-pass operation within a tile, e.g. in response to identifying a further compatible primitive (or sequence of compatible primitives). This is illustrated, for example, in FIG. 73.

Figure 73:
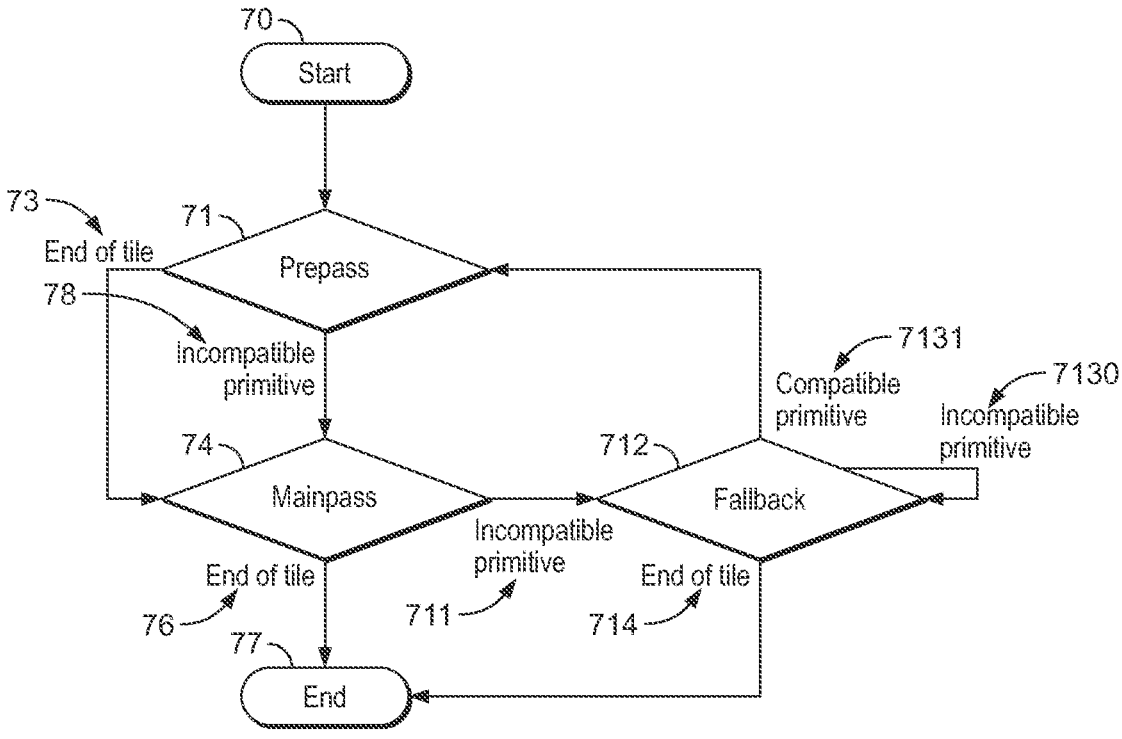
FIG. 73 schematically illustrates a rendering operation according to another embodiment in which the "pre-pass" operation can be re-started within a tile to provide continued hidden surface removal efficiency even after encountering an incompatible primitive.

FIG. 73 schematically illustrates a rendering operation according to another embodiment in which the novel "pre-pass" operation can be re-started within a tile. The processing operation thus generally proceeds as set out above in relation to FIG. 7. In this embodiment, however, after a switch to the fallback operation, the graphics processor is able to switch back from the fallback operation to the pre-pass operation in the event that a further compatible primitive is encountered. For example, consider the following sequence of primitives;

primitive 1, compatible
  #primitive 2, compatible
  #primitive 3, incompatible
  #primitive 4, compatible
  #primitive 5, compatible
  #primitive 6, incompatible If the sequence of primitives were processed according to the embodiment shown in FIG. 7, after reaching the first incompatible primitive ('#primitive3'), the graphics processor would switch to the fallback operation, and then continue to process all of the remaining primitives in the fallback operation, despite the fact that the next primitive ('#primitive4') is in fact compatible with being processed by the first, pre-pass operation. This means that some hidden surface removal efficiency may be lost. For instance, the example above is very simple, and in general a sequence of primitives may contain many primitives. In that case, there may be relatively longer sequences of compatible primitives after the first incompatible primitive, for which it may be desirable to switch back to the first, pre-pass operation, in order to allow for improved hidden surface removal efficiency.

According to the embodiment shown in FIG. 73 therefore, after the first incompatible primitive has been processed by the third, fallback operation, the graphics processor is caused to switch back to the first, pre-pass operation for the next compatible primitive ('#primitive4'). The operation sequence in this embodiment is then:

run pre-pass for primitive 1
  #run pre-pass for primitive 2
  #primitive 3 encountered
  #rewind to primitive 1
  #run main pass for primitive 1
  #run main pass for primitive 2
  #primitive 3 encountered
  #run fallback for primitive 3
  #primitive 4 encountered
  #switch to pre-pass operation, record primitive 4 as re-
    start point
  #resume pre-pass for primitive 4
  #run pre-pass for primitive 5
  #primitive 6 encountered run fallback for primitive 6
end of tile

Thus, the processing begins in the first, pre-pass operation, as described above, and when the first incompatible primitive ('#primitive3') is encountered, the first, pre-pass operation is stopped, with the primitive list reader rewinding to the start of the sequence of primitives, and then performing a corresponding main pass operation to complete the rendering of the primitives processed so far ('#primitive1' and '#primitive2'). When the second, main pass encounter the first incompatible primitive ('#primitive3'), the second, main pass is then stopped, and the fallback operation run to process the incompatible primitive. Up to that point, the processing is therefore the same as in the FIG. 7 embodiment. The processing then continues in the fallback operation at least for any further incompatible primitives in the sequence (step 7130).

However, rather than simply continuing in the fallback operation to the end of the tile, in response to the graphics processor identifying whilst in the fallback operation that there is a further compatible primitive (e.g. '#primitive4'), the graphics processor is able to switch back to the first, pre-pass operation and re-start the pre-pass operation from the position of the further compatible primitive (step 7131).

That is, in the example shown in FIG. 73, after the graphics processor is caused to switch to the fallback operation (in response to the pre-pass operation encountering an incompatible primitive), the graphics processor is further able to switch back from the third, fallback operation to the first, pre-pass operation in response to determining that there is a further compatible primitive within the sequence of primitives. The technology described herein thus allows the first, pre-pass operation to be restated within a sequence of primitives following a switch to the third, fallback operation when it is possible to do so.

In order to facilitate the switching of the graphics processor between these operations, e.g. and avoiding potentially introducing artefacts when the first, pre-pass operation is stopped and a transition is made to the third, fallback operation (or vice versa), the graphics processor should, and in an embodiment does, store suitable state or information to allow the processing of the sequence of primitives to continue accordingly beyond such switching events, e.g., and in an embodiment, in a more seamless manner that is able to use processing results from the previous mode of operation when continuing processing in the new mode of operation.

For example, and as will be explained further below, the visibility information that is generated by the first, pre-pass operation (and which is used to control the processing of fragments in the second, main pass operation) is in an embodiment generated based on the depth values for fragments for primitives that are processed during the first, pre-pass operation. The first, pre-pass operation may thus, and in an embodiment does, involve updating a depth buffer for the sequence of primitives. In the normal operation according to the technology described herein, the depth buffer, or other visibility information based on the depth values that is generated during the first, pre-pass operation, is then used during the second, main pass to control the fragment processing. When the first, pre-pass operation is stopped for a sequence of primitives, and the graphics processor is subsequently switched to the third, fallback operation for continued processing of the sequence of primitives, the third, fallback operation in an embodiment also performs depth testing (e.g. in the normal manner).

The depth buffer resulting from the aborted first, pre-pass operation is in an embodiment therefore carried through this transition so that the content of the depth buffer (reflecting the depth buffer for the primitives processed so far, i.e. up to the position of the incompatible primitive) is also available for use by the third, fallback operation. The third, fallback operation in an embodiment then continues to update the depth buffer based on depth testing primitives by the third, fallback operation, and in the event that a switch back to the first, pre-pass operation is subsequently performed, the content of the depth buffer at the point at which the third, fallback operation was stopped is in an embodiment then made available for use (and then used) during the resumed first, pre-pass operation when generating visibility information for the subsequent primitives that are to be processed by the resumed first, pre-pass operation, e.g., and in an embodiment, to allow continued improved hidden surface removal when the first, pre-pass operation is restated.

Thus, when the graphics processor transitions from the first, pre-pass mode of operation to the third, fallback operation, the depth buffer for the sequence of primitives is in an embodiment retained and the current content of the depth buffer generated by the processing so far (up to the point of the incompatible primitive that triggered the transition) of primitives by the first, pre-pass operation is then used for depth testing primitive (fragments) during the third, fallback operation.

Correspondingly, when the graphics processor switches back to the first, pre-pass operation from the third, fallback operation, the content of the depth buffer is in an embodiment again retained and used by the first, pre-pass operation to continue to generate visibility information for the sequence (or sub-sequence) of primitives that are to be processed by the resumed first, pre-pass operation.

It is in an embodiment also tracked during such transitions between the first, pre-pass and third, fallback operation which primitives in the sequence of primitives have been processed to completion so far so as to potentially generate rendered output data (that is, which primitives have been processed to completion either by performing both the first, pre-pass and second, main pass operations, or by performing the third, fallback operation). By tracking which primitives have been processed to completion so far, this then in an embodiment allows the graphics processor to re-start processing of a sequence of primitives from the desired primitive (such that the processing can effectively fast-forward through the sequence of primitives and resume from an arbitrary primitive). This may therefore facilitate the switching of the graphics processor between operation modes within a single sequence of primitives, e.g., and in an embodiment, by avoiding having to repeat substantial processing of primitives that have been processed.

For example, when the first, pre-pass operation is restarted, such that there is a switch from the third, fallback operation back to the first, pre-pass operation, by tracking which primitives have been processed so far, so long as the depth buffer (and any other desired information for restarting the pre-pass operation) is available, the resumed first, pre-pass operation can then (and in an embodiment does) skip substantial processing of any primitives that have been already been processed, so that the first, pre-pass operation effectively resumes processing from the position of the further compatible primitive that triggered the restarting of the first, pre-pass operation.

This can be done in various suitable ways as desired. For example, in an embodiment, primitives may be annotated with suitable state indicating whether they have been previously processed in either way. In that case, the primitives could still be processed during the resumed pre-pass operation, but are in an embodiment effectively culled relatively earlier in the first, pre-pass operation on this basis, e.g., and in an embodiment, at the start of the resumed pre-pass operation, so that no substantial repeated processing of the primitives occurs during the resumed pre-pass operation. This may be relatively simpler to implement as it does not require any changes to how the primitives are obtained for processing (e.g. all of the primitives can be obtained for processing in the normal manner according to their specified rendering order, e.g. from the respective primitive lists, but primitives that have been processed already can then be culled during the first, pre-pass operation to avoid substantial repeat processing of such primitives). This approach may therefore facilitate more efficient hardware implementation. Various other arrangements would however be possible. For example, in other embodiments, the graphics processor when transitioning between operating modes may be configured to write out sufficient information to allow the processing to restart from the desired primitive in the sequence of primitives, which information can then be used accordingly when re-starting the first, pre-pass operation to start from the desired primitive.

The control of the switching from the third, fallback operation to the first, pre-pass operation may be performed in any suitable and desired manner but in an embodiment is also based on a primitive classification, e.g., and in an embodiment, based on the same primitive classification as described above in relation to the triggering of the third, fallback operation. Thus, the third, fallback mode of operation in an embodiment also comprises a step of (checking) primitive classification. However, in some embodiments, the switching back from the third, fallback mode of operation is performed more conservatively, and additional logic may therefore be provided to facilitate this. Various arrangements would be possible in this regard as will be explained below.

For example, in order to ensure safe rendering operation, the graphics processor should (and in an embodiment does) switch to the third, fallback mode whenever an incompatible primitive is encountered. Thus, the first incompatible primitive in the sequence of primitives will in an embodiment trigger stopping the first, pre-pass operation and subsequently processing the incompatible primitive by the third, fallback operation in the manner described above.

In some embodiments the graphics processor may correspondingly attempt to switch back from the third, fallback mode of operation to the first, pre-pass operation whenever a further primitive that is compatible with the first, pre-pass operation is encountered. That is, the decision to switch back to the first, pre-pass operation to process a further compatible primitive may be performed on a per-primitive basis, similarly to the decision to stop the first, pre-pass operation in response to an incompatible primitive. In that case, the graphics processor may continue processing primitives in the third, fallback operation only until the next compatible primitive is encountered, at which point the graphics processor switches back to the first, pre-pass operation. This can work well especially in typical situations where incompatible primitives are relatively rarer, such that switching on a per-primitive basis can provide improvements, at least on average.

It will be appreciated even from the simple example above that where a sequence of primitives includes a mixture of compatible and incompatible primitives this may cause the graphics processor to repeatedly switch state. At some point the additional time and energy used to switch state may outweigh any benefits of the improved hidden surface removal. Thus, in embodiments, rather than switching back to pre-pass operation as soon as the next compatible primitive (so '#primitive 4' in the example above) is encountered, the graphics processor may check one or more other conditions before triggering the switching out of the fallback operation.

These other conditions may be set as desired and various suitable heuristics may be applied in this respect. For instance, in the example above, there is a sequence of two further compatible primitives ('#primitive4' and '#primitive5'). If it can be identified in advance that there is a sequence of more than one further compatible primitives, this might therefore make switching more desirable. Thus, a look-ahead could be performed to check the sequence of primitives for contiguous sequences of more than one compatible primitive and a decision as to whether to switch (back) made on this basis. Another possible heuristic would be to wait until a set number of further compatible primitives has been reached before triggering the switch. This can work well as it is often the case that adjacent primitives are expected to have similar primitive properties (such that they can be processed in the same way).

Figure 74:
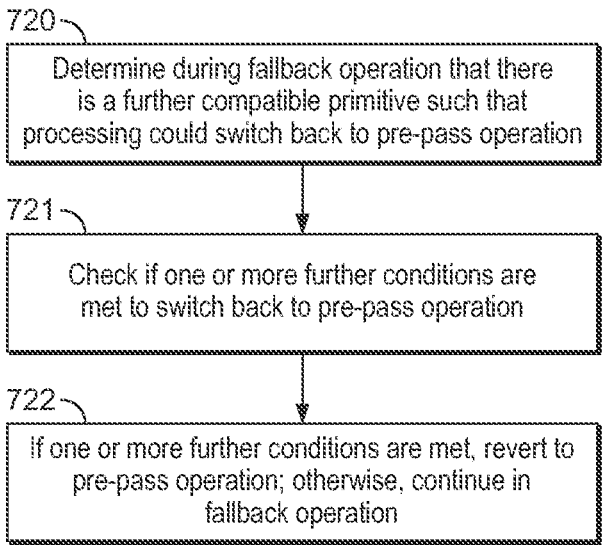
FIG. 74 is a flow chart illustrating further details of how the "pre-pass" operation can be re-started within a tile according to embodiments.

FIG. 74 illustrates this. Thus, during the third, fallback operation, when it is determined that there is a further compatible primitive (step 720), it is then checked whether one or more other conditions are met to cause the graphics processor to revert to the pre-pass operation. The further processing (step 722) is then performed accordingly. Thus, if the one or more conditions are met (step 721—yes), the graphics processor accordingly reverts to the pre-pass operation. Otherwise, if the one or more conditions are not met (step 721—no), the graphics processor continues in the fallback operation (at least for now).

Various arrangements would be possible in this regard.

It will be appreciated from the various embodiments and examples presented above that subject to the requirements of the technology described herein the pre-pass (and main pass) operation may be configured in various suitable ways as desired. It will also be appreciated that various other modifications may be made to the pre-pass (and main pass) operations, and that, for example, any of the examples and embodiments described above may advantageously be combined. In general the first, pre-pass and second main pass operations may thus comprise any other suitable processing operations as desired.

It is assumed that in the present embodiments, the graphics processor is operable to perform, and supports, so-called Variable Rate Shading (VRS).

Variable rate shading (VRS) is a technique that allows different shading rates to be used to render a render output, i.e. such that a single colour (set of colour value data) can be sampled (rendered) for one of plural possible different sized areas in a render output. For example, a single colour may be sampled (from a single fragment) for an area of the render output corresponding to only a single output pixel, or a single colour (from a single fragment) may be sampled for an area of the render output corresponding to each pixel in a block of plural output pixels.

Sampling (rendering) a single colour and applying it to plural sampling positions will reduce the processing effort required for those sampling positions, as compared to sampling an individual colour for each sampling position, but will usually come at the expense of reduced image quality.

In Variable Rate Shading (VRS), there will typically be a set of plural possible shading rates that a graphics processor supports and is able to use. That is, there will typically be a set of plural possible different sized render output areas that a single colour (set of colour value data) can be sampled for (from a single fragment). The smallest possible of these render output areas may be referred to as a "fine pixel", and the other, larger render output areas may be referred to as "coarse pixels". Likewise, a (single) fragment which is sampled for the smallest render output area may be referred to as a "fine fragment" and a (single) fragment which is sampled for other, larger, render output areas may be referred to as a "coarse fragment".

Each "fine pixel" will typically be (each "fine fragment" will typically be rendered for) an area of the render output the same size and location as a pixel of the output display device. However, it is also possible for each "fine pixel" ("fine fragment") to effectively correspond to less than one pixel of the output display device, for example where downsampling is to be applied.

The area of each possible "coarse pixel" typically corresponds to (each "coarse fragment" will typically be rendered for an area of the render output which corresponds to) a block of plural "fine pixels" (such that each "coarse fragment" is rendered for an area that same size as the area rendered for a block of plural "fine fragments"). The different possible shading rates are then referred to in terms of the number of fine pixels (fine fragments) that the shading rate corresponds to. For example, a 1×1 shading rate will signify the finest possible shading mode in which a single colour should be sampled for a single fine pixel (a single fine fragment), whereas a 2×2 shading rate will signify that a single colour should be sampled for an area corresponding to a block of 2×2 fine pixels (2×2 fine fragments). A graphics processor may typically support 1×1, 1×2, 2×1, 2×2, 2×4, 4×2 and 4×4 shading rates, for example.

Figure 75:
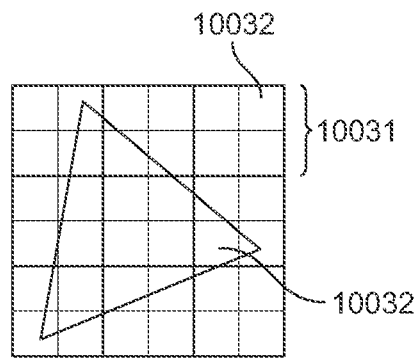
FIGS. 75, 76A and 76B illustrate variable rate shading (VRS)

FIG. 75 illustrates a comparison of an exemplary primitive 10030 being rendered using 1×1 and 2×2 shading rates. FIG. 75 shows the location of the exemplary primitive 10030 to be rendered relative to a 6×6 block of fine pixels 10032. Each small square represents one of the fine pixels of the "variable rate shading" (VRS) process.

In the case of a 1×1 shading rate, the rendering process samples (renders) a single colour (set of colour value data) for each fine pixel that a primitive covers (and a corresponding "fine fragment" is rendered to produce each "fine pixel"). In this case, the primitive 10030 is visible in (covers) 23 out of the 36 illustrated fine pixels 10032, and so the rendering process will sample a total of 23 colours (sets of colour value data) (a total of 23 "fine fragments" will be rendered).

Each larger square 10031 in FIG. 75 represents one coarse pixel that is used in the 2×2 shading rate process. Each coarse pixel encompasses a block of 2×2 fine pixels 10032. In this case, the rendering process samples (renders) a single colour (set of colour value data) for each such coarse pixel 10031 that a primitive covers (and a single "coarse fragment" is rendered to produce each "coarse pixel"). In this case, the primitive 10030 covers 8 out of the 9 illustrated coarse pixels, and so the rendering process will sample only 8 colours (sets of colour values) (a total of 8 "coarse fragments" will be rendered).

Thus, it will be appreciated that a coarser shading rate is associated with a lower density of rendered colours (fewer fragments being rendered) as compared to a finer shading rate. Moreover, it will be appreciated that rendering the primitive 10030 using a coarser shading rate will reduce processing requirements, as compared to rendering the primitive 10030 using a finer shading rate. However, this will typically come at the expense of reduced image quality.

Variable Rate Shading (VRS) allows an application to select a shading rate, which means that groups of fine pixels (1×1, 1×2, 2×1, 2×2, 2×4, 4×2 or 4×4) are shaded once (as a single "coarse fragment") and the colour value is broadcast to all covered pixels in the "coarse pixel". This saves computational effort at the cost of some visual degradation. It is possible to only support the 1×1, 1×2, 2×1 and 2×2 shading rates. 4×2, 2×4 and 4×4 shading rates may be optional.

Figure 76A:
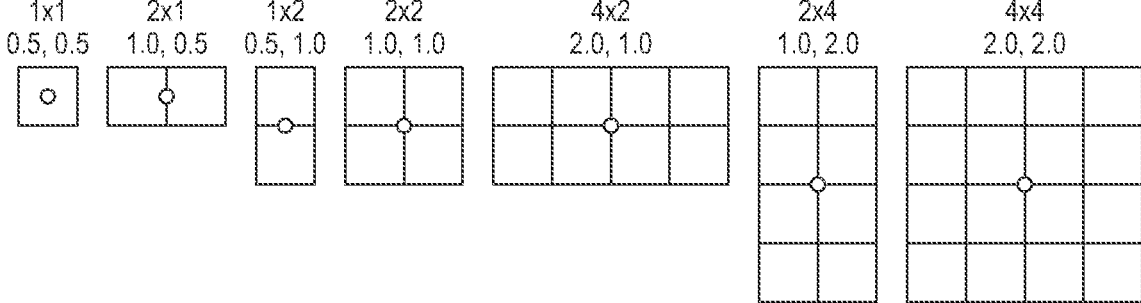

An effect of variable rate shading (VRS) is that fragments (and their corresponding execution threads) can have a variable screen space footprint. In VRS, shading can be done at a coarser granularity, which means that a single fragment (and execution thread) can be issued for several covered output pixels (where the output of this thread is broadcast to all covered sampling positions, i.e. to multiple pixels in the output render target). FIG. 76A shows various possible fragment sizes (and the corresponding position where the colour sample for the fragment is taken) when using different variable shading rates.

Moreover, in VRS, the shading rate can be varied per-drawcall, per-screen space location and per-primitive. The shading rate can also or instead be varied based on one or more other properties. This means that it is possible for primitives at the same location to have different shading rates. Thus, with VRS, on a particular fragment position, there may be fragments with different screen space footprints.

Figure 76B:
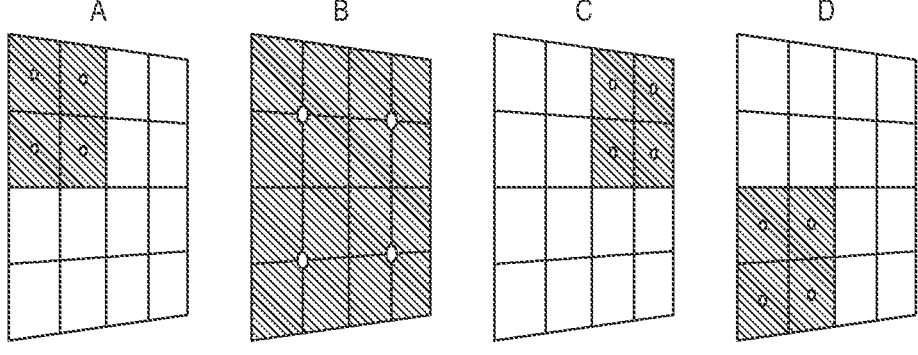

This is illustrated by FIG. 76B. FIG. 76B shows a sequence of fragment quads for processing in respect of a 2×2 patch of fragment quad positions. In particular, FIG. 76B shows a first quad of "fine fragments" (A) for a first primitive, followed by a quad of 2×2 "coarse fragments" (B) for a second, overlapping primitive, then a second quad of "fine fragments" (C) for a third primitive, and a third quad of "fine fragments" (D), e.g. also for the third primitive. In FIG. 76B, the first quad of "fine fragments" (A) is the oldest. The quad of 2×2 "coarse fragments" (B) depends on the first quad of "fine fragments" (A) since it has overlapping coverage. The second quad of "fine fragments" (C) depends on the quad of 2×2 "coarse fragments" (B) since it has overlapping coverage. The third quad of "fine fragments" (D) does not depend on the second quad of "fine fragments" (C), but it does depend on the quad of 2×2 "coarse fragments" (B).

As discussed above, the technology described herein and the present embodiments relate in particular to situations where mechanisms for ensuring that fragments from respective primitives to be rendered for a tile of a render output perform particular processing operations in the desired order are being used (i.e. a mechanism for enforcing processing order dependencies between fragments to be processed for a tile is being used). Such processing order dependencies may arise, for example, because it is necessary to process the fragments from respective different primitives in a particular primitive order (which will usually be the order in which the primitives are issued for processing), and may relate, for example, and in particular, to processing operations that access the colour and depth buffers in the tile buffer for a tile that is being rendered (such as for updates (writes) to the colour and/or depth buffers for a tile, and/or for reads of the colour buffer, for example).

In the present embodiment, such processing order dependencies are determined and enforced (where appropriate) by maintaining for each of plural sub regions of a tile being rendered, a respective list indicative of fragments to be rendered for the tile sub region in question. Each entry in a list represents a group of one or more fragments to be processed and has associated with it coverage information indicating the coverage within the tile sub region of the group of fragments that the list entry relates to, and eligibility information indicating whether the group of fragments that the list entry relates to is currently eligible to perform a particular processing operation or operations or not. This coverage and eligibility information is used to identify potential processing order dependencies between fragments to be processed for a sub region of a tile, and to, where appropriate, control the fragment processing such that any desired processing order dependencies are enforced.

As will be discussed in more detail below, in the present embodiments the tile sub region lists list respective (sets of) execution threads to be executed for processing (for fragment shading) the corresponding fragments that they relate to, with the coverage information for each entry in the list indicating the coverage within the tile sub region of the set of execution threads that the list entry relates to, and the eligibility information indicating whether the set of execution threads that the list entry relates to is currently eligible to perform a particular processing operation or operations or not. The coverage and eligibility information is then used to control the execution of the execution threads corresponding to the fragments to be processed for the tile sub region, such that any desired processing order dependencies are enforced.

Figure 77A:
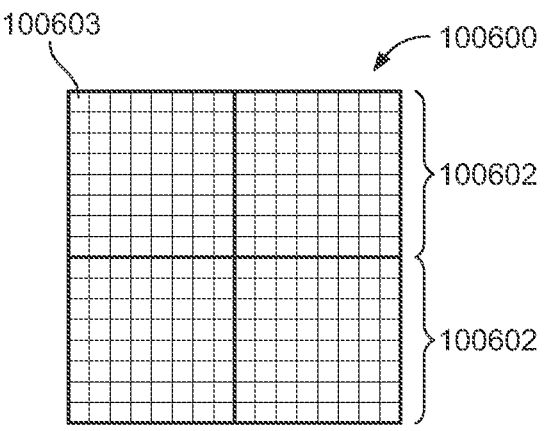
FIGS. 77A and 77B show schematically tiles of a render output divided into respective sub regions in an embodiment of the technology described herein.

FIG. 77A shows an exemplary render output 100600, such as a frame to be displayed, that is divided into a 2×2 array of tiles 100602 for rendering purposes. Although four tiles are shown in FIG. 77A, other suitable numbers of tiles could be used.

Figure 77B:
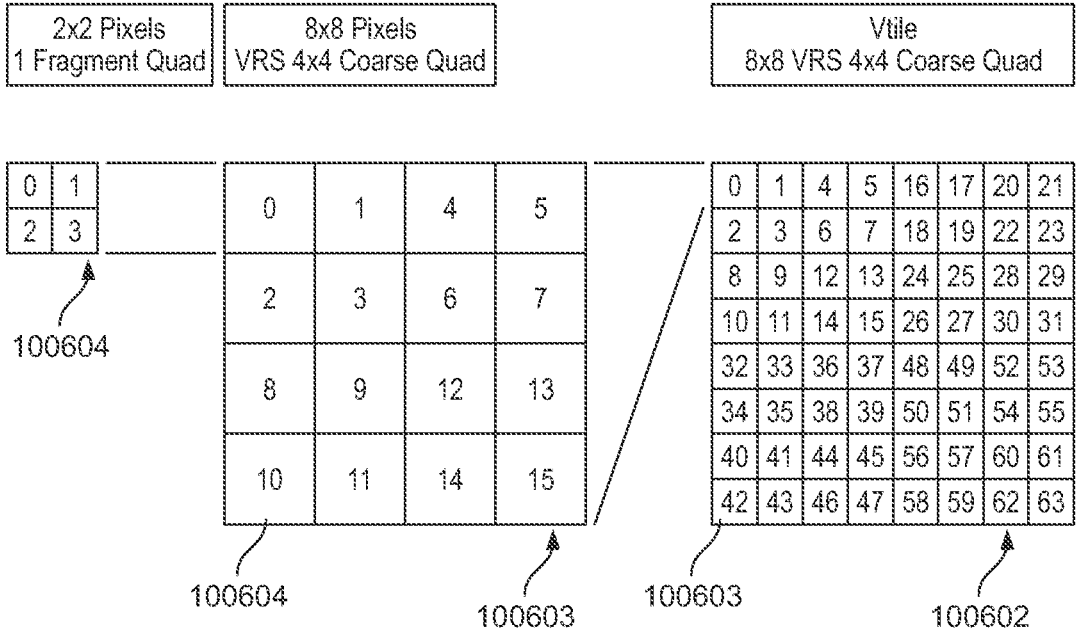

As shown in FIGS. 77A and 77B, each tile 100602 in the render output 100600 is divided into an 8×8 array of sub regions 100603 for fragment dependency tracking and management purposes. Each of the plurality of sub regions 100603 that a tile is divided into corresponds to a respective set of sampling positions for the tile.

In the present embodiments, it is assumed that each tile is a square of 64×64 VRS fine fragments (i.e. a square of 64×64 fine fragment positions). Each tile sub-region 100603 correspondingly is a square of 8×8 VRS fine fragments (i.e. 8×8 fine fragment positions).

FIG. 77B illustrates that each tile sub region 100603 correspondingly corresponds to and has a size of 4×4 fine fragment 2×2 quads 100604. As noted above, VRS may be used, with a maximum coarse fragment size of 4×4 fine fragments, in which case a tile sub-region 100603 equally corresponds to and has a size of a single 4×4 coarse fragment quad. Other arrangements would, of course, be possible.

As also shown in FIG. 77B, each sub region 100603 that a tile 100602 is divided into is given an index between 0 to 63 identifying the position of the sub region within the tile. The sub region position indices are used, as will be discussed further below, to identify the sub region fragment lists to be used for fragments/execution threads based on the positions of the fragments/threads within the tile.

It should also be noted here that although in FIGS. 77A and 77B each tile 100602 is shown as being divided into sixty four sub regions 100603 for the purposes of fragment dependency tracking and management, it would, of course, be possible to divide the tiles into any desired number of sub regions for this purpose.

Equally the size of the tile sub regions may be selected as desired (e.g. in dependence upon the overall tile size, and/or the rates of variable rate shading that are supported by the graphics processor and graphics processing system in question).

In the present embodiments, the lists of fragments to be processed for the respective sub regions of a tile are maintained as singly linked lists, with each entry in the list representing a group of fragments to be processed for the tile sub regions. In the present embodiments, each entry in a tile sub region fragment list represents at least a 2×2 group (quad) of fragments to be processed for the tile sub region in question. The fragments in the 2×2 group (quad) of fragments may be "fine fragments" or "coarse fragments" as discussed above. (As will be discussed further below, a 2×2 fragment quad is the minimum "group of fragments" that a list entry can represent in the present embodiments, but it can be possible to merge different fragment quads into the same list entry, such that a list entry may represent more than one fragment quad.)

Figure 78:
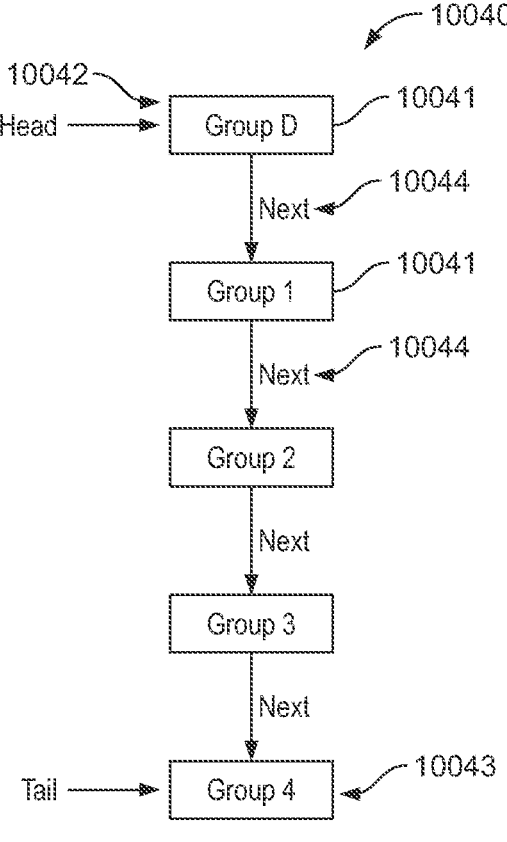
FIG. 78 shows an exemplary list of fragments to be processed for a tile sub region in an embodiment of the technology described herein.

FIG. 78 shows an exemplary singly linked list 10040 for a tile sub region, comprising plural list entries 10041, each list entry 10041 representing a group of fragments to be processed for the tile sub region. The singly linked list 10040 has a first list entry forming the head 10042 of the list, and an end list entry forming a tail 10043 of the list. Each list entry 10041 has associated with it a pointer 10044 which points to the next entry in the list (in the direction from head to tail of the list) (to thereby form the singly linked list).

(Alternatively, if a doubly-linked list is used, then each list entry would have both a pointer to the next entry in the list and a pointer to the previous entry in the list.)

In the present embodiments, new list entries (corresponding to new fragment groups to be processed for a tile sub region) are added to the tail 10043 of the list. As such, the entries towards the head 10042 of the list will represent "older" fragments to be processed (fragments from primitives earlier in the primitive processing order), whilst the entries towards the tail 10043 of the list will represent "newer" fragments to be processed (fragments from primitives that are later in the desired primitive processing order).

FIG. 78 shows an exemplary list containing five list entries 10041, but as will be appreciated by those skilled in the art, the list for a tile sub region may contain as many entries as are required for that sub region (e.g. depending upon the number of different fragment groups (currently) to be processed for the sub region in question).

In the present embodiment, each entry 10041 in the list for a tile sub region, as well as containing a pointer 10044 to the next entry in the list (in the direction from the head to the tail of the list), also includes other information relating to the entry.

In particular, each list entry 10041 also has associated with it (includes) the identity of (an identifier for) the group of fragments that the list entry relates to. As will be discussed further below, in the present embodiments the identifier (identity) that is used for a list entry in this regard comprises an identifier (ID) for the particular quad of execution threads that are being used to perform the fragment shading for the fragments of the group of fragments that the list entry relates to. Other forms of identifier that can allow the particular fragments that a list entry relates to be identified could, of course, be used, if desired.

Each entry 10041 in the list 10040 also comprises information indicating which part of the tile sub region the group of fragments that the entry represents applies to (covers).

In the present embodiments, this coverage information comprises a coverage mask that represents the area of the tile sub region that the list relates to, and that is set appropriately to indicate which part of the sub region the group of fragments that the list entry relates to covers. In the present embodiments, the coverage masks for the list entries indicate the fragment coverage for the list entries at a resolution of 2×2 (fine) fragment quads. Thus each (fine) fragment quad position in the tile sub region in question has a corresponding bit in the coverage mask that can be set to indicate whether the group of fragments for a list entry covers that (fine) fragment quad position or not.

Figure 79:
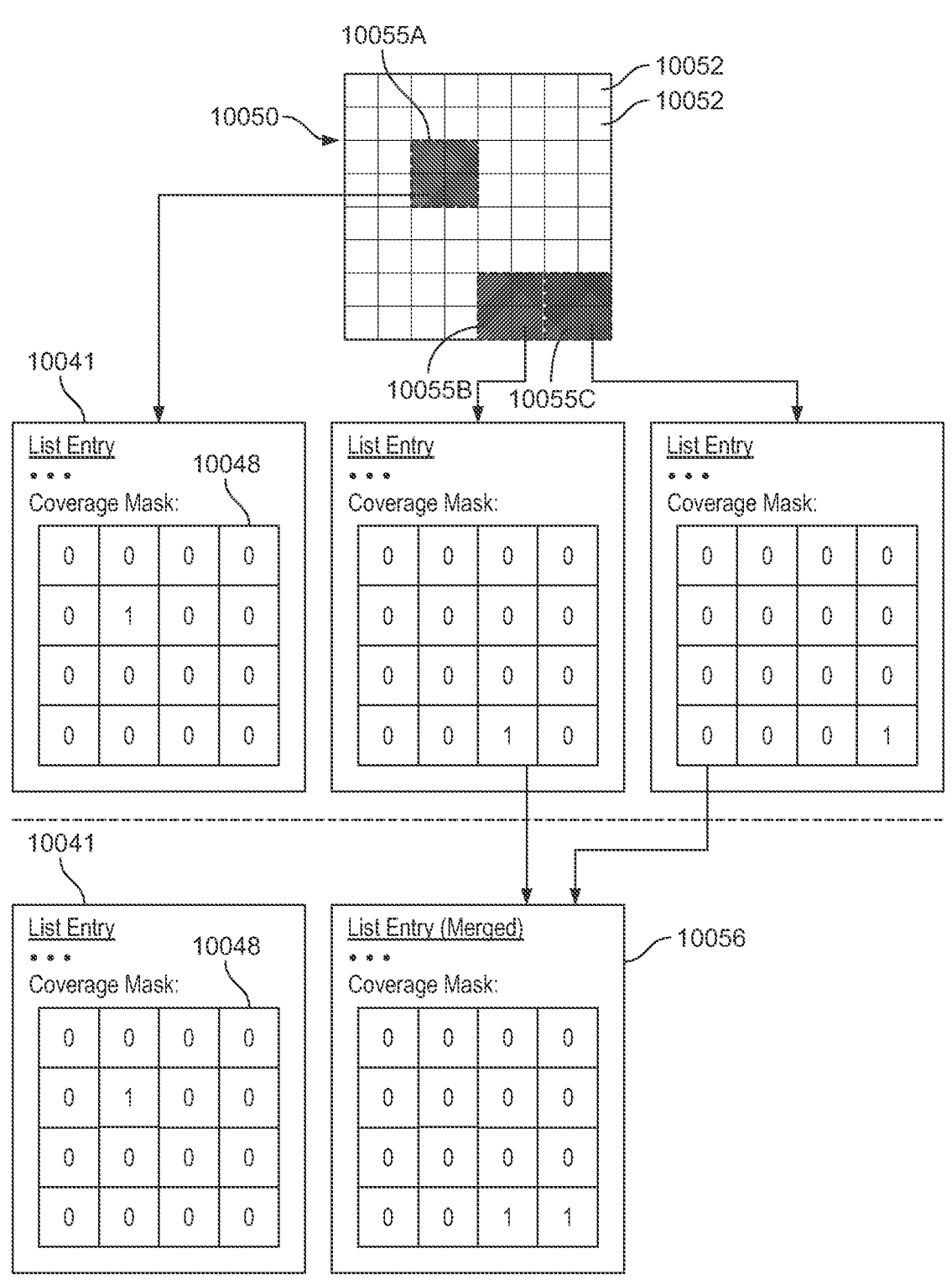
FIG. 79 shows exemplary coverage masks for fragment list entries in an embodiment of the technology described herein.

FIG. 79 illustrates this. FIG. 79 shows an exemplary tile sub region 10050 comprising 8×8 (fine) fragment positions 10052. An exemplary set of (fine) fragment quads 10055A, 10055B, 10055C to be processed for the tile sub-region 10050 are also shown.

As shown in FIG. 7, each list entry 10041 will have a corresponding coverage mask 10048, which contains one position (entry) for each 2×2 (fine) fragment quad within the tile sub region 10051. FIG. 79 shows the corresponding coverage masks for respective fragment quads 10055A, 10055B and 10055C.

FIG. 79 also shows the coverage mask 10056 in the case where the fragment groups 10055B and 10055C are merged into a single list entry (this will be discussed in more detail below).

Other arrangements for the coverage information/masks would, of course, be possible.

In addition to the coverage information indicating which part of the tile sub region the fragments represented by a list entry apply to, each list entry 10041 also includes information indicating whether particular processing operations are eligible to be performed for the fragments represented by a list entry.

In the present embodiments, such processing operation eligibility information is provided separately for fragment processing operations that are to write to the colour buffer and processing operations that are to access the depth buffer. In this regard, accessing the depth buffer may include reading from and/or writing to the depth buffer.

Eligibility information is also provided for fragment processing operations which are (only) to read the colour buffer (without involving writing to the colour buffer). The Applicant has recognised in this regard that using separate eligibility information for colour buffer read-only operations can help to avoid falsely enforcing dependencies for colour buffer read operations (e.g. as may occur where a group of entries need to perform colour buffer writes in a particular order, but can perform colour buffer reads in any desired order).

In particular, a separate flag is provided for each of colour buffer write accesses, depth buffer accesses, and colour buffer read-only operations, which can be set to indicate whether the list entry is currently eligible (permitted) to perform the relevant processing operation or not.

In addition to an indication of whether a list entry is eligible (is permitted) to perform particular processing operations (in the present embodiments colour buffer reads and writes and depth buffer accesses), each list entry also has associated with it information indicating whether the list entry in question is applicable to (should be taken into consideration for) processing operations for which eligibility information is provided. In the present embodiments, each list entry also has associated with it a "should be considered for" indication, separately for colour buffer accesses and depth buffer accesses (which indications can correspondingly be set to indicate whether the group of fragments that the list entry relates is applicable to colour buffer accesses and/or to depth buffer accesses, as appropriate).

In an embodiment, no additional "should be considered for" indication is provided for colour buffer read operations specifically. In this regard, only a (general) "should be considered for" colour buffer accesses indication is provided. When an entry "should be considered for" colour buffer accesses, read operations may be performed when the eligibility information for colour buffer read operations indicates that colour buffer read operations are "eligible" to be performed (regardless of whether the (general) colour buffer write access eligibility information indicates that colour buffer write accesses are eligible to be performed).

(Alternatively, a separate 'should be considered for' indication in respect of colour buffer reads could be provided for a (each) list entry (and could instead be used when setting the eligibility information in respect of colour buffer read (only) operations).)

In the present embodiments each of the eligibility and "should be considered for" indications are in the form of a flag that can be set to indicate when the group of fragments for the list entry in question is eligible (permitted) to perform the fragment processing operation(s) in question, and when the group of fragments to which the list entry relates should be considered for (is applicable to) the fragment processing (operation) in question.

As will be discussed further below, the processing operation eligibility flags for a list entry are set based on any processing order dependencies that need to be enforced between fragment groups of different list entries.

The processing operation "should be considered for" indications are set when the fragment group that the list entry relates to is to, and still needs to, perform the processing operation(s) in question. (Thus, as will be discussed further below, the processing operation "should be considered for" flags will be set to indicate that the group of fragments that a list entry relates is not applicable to the processing operation in question not only once the group of fragments has completed the processing operation in question (in the case where the group of fragments is to perform the processing operation in question), but also in the case where the processing operation is not to be performed for the group of fragments that the list entry relates to at all (in the first place), or where it becomes no longer necessary to perform the processing operation in question for the group of fragments (e.g. in response to those fragments being culled or their corresponding execution threads being otherwise terminated).)

Each fragment list entry may also have an indication of a group (classification) to which the fragments represented by the entry belong. This group (classification) is in an embodiment used when setting the eligibility information relating to colour buffer read-only operations. As noted above, the Applicant has recognised that groups of fragments may be able to perform colour buffer read operations in any order (despite having to perform colour buffer write operations in a particular order). As discussed herein, the group (classification) indicated in the fragment list entry can be used to identify such groups of fragments, and enforce dependencies accordingly.

In embodiments, the group (classification) for the fragment(s) corresponds to a Raster Order group (a Raster Order State), and the indication in the list entry comprises a Raster Order group ID (a Raster Order State ID, "ROS ID").

Each fragment list entry also has associated with it a "can be deleted" flag (a "retire" flag), that can be set to indicate that the list entry can be deleted (can be removed from the list in question). This deletion flag is set for a list entry when there are no longer any processing operations for which eligibility indications are provided still to be performed for the group of fragments that the list entry relates to.

Figure 89:
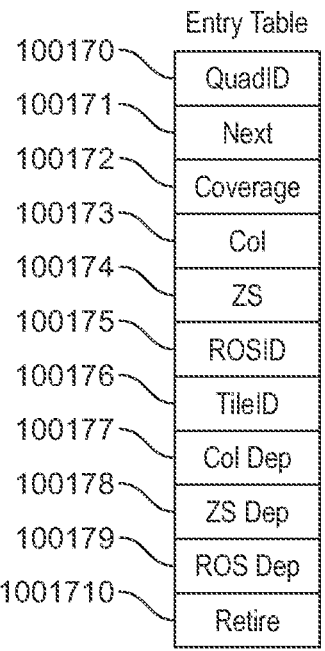
FIG. 89 shows an exemplary tile sub region fragment list entry in an embodiment of the technology described herein.

FIG. 89 shows an exemplary tile sub region fragment list entry. As shown in FIG. 89, the entry in a fragment list for a tile sub region includes, as discussed above, an identifier 100170 for the group of fragments (the thread quad) that the entry relates to), a pointer 100171 to the next entry in the list, a coverage mask 100172 for the entry, an indication 100173 of whether the entry is applicable to (should be considered in relation to) colour processing, an indication 100174 of whether the entry is applicable to (should be considered in relation to) depth processing, an indication 100175 of the classification (ROS ID) for the entry, an indication 100177 of whether the entry is eligible to write access the colour buffer (has a colour write dependency), an indication 100178 to indicate whether the entry is eligible to access the depth buffer (has a depth buffer dependency), an indication 100179 of whether the entry is eligible to read the colour buffer (whether a dependency arises as a result of the ROS ID), and an indicator 1001710 to indicate if the entry can be deleted.

The entry may also include the identifier 100176 of the tile to which the group of fragments/threads belong (this will be discussed in more detail below).

Some of this information, such as the ROSID and tile ID could instead be stored on a thread group (warp) basis rather than for individual list entries, if desired.

As will be appreciated from the above, a separate list of fragments to be processed is maintained for each sub region that a tile is divided into. Accordingly, the graphics processor in the present embodiments maintains an appropriate set of plural tile sub region fragment lists, one for each tile sub-region (for which a fragment is to be processed).

In order to facilitate the maintaining and managing of the lists for the tile sub regions (and in particular the updating of the lists as new fragment groups fall to be processed for a tile sub region and as fragment groups complete processing), suitable "management" information (metadata) is also maintained for each of the tile sub region lists, which list "management" information is, in the present embodiments, indexed and identified by means of an appropriate "position", corresponding to the sub region of the tile that the list relates to.

As will be discussed further below, this then allows the relevant tile sub region fragment list for a group of fragments (and the "management" information for that list, to thereby allow the list itself to be accessed) to be identified using an appropriate position for a group of fragments, for example when a new group of fragments needs to be added to a list or when the list entry for a group of fragments needs to be checked and/or updated (for example).

In the present embodiments, the list management data comprises appropriate data that can allow the list itself to be accessed, and thus in the present embodiment the list management information comprises a head pointer pointing to the memory location of the head of the list in question, and a tail pointer indicating the memory location of the current tail of the list. (The head pointer could instead be stored in the next pointer field for the tail entry of a list, if desired.)

In the present embodiments, the list management data also comprises a flag to indicate whether the list is "active" (i.e. there is at least one entry in the list) or not, the identity of the tile (the tile ID) of the newest entry in the list (which can then be used to identify when an entry on to a list is for a different tile), the classification group ID (ROS ID) of the newest entry in the list (which can then be used to identify when a new entry being added to a list is changing the group (ROS ID) classification), and a flag to indicate when there has been a ROS ID change on the linked list.

Figure 90:
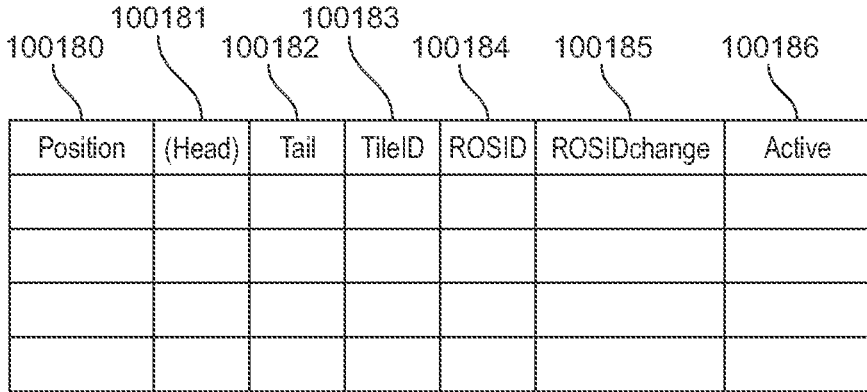
FIG. 90 shows an exemplary record of tile sub region fragment lists in an embodiment of the technology described herein.

FIG. 90 shows the table of sub region list management information in the present embodiments. As shown in FIG. 90, each sub region list is indexed by its position 100180 (the position 100180 indicative of the (relative) position of the relevant sub-region in the tile, e.g. such as the index 0 to 63 illustrated in FIG. 77B). Each sub-region list also has stored for it a head pointer 100181 and a tail pointer 100182 (with the head being the oldest entry in the list and the tail being the most recent (newest) entry in the list), an active flag 100186 to indicate that the list is active (i.e. that there is at least one entry in the linked list), the tile ID 100183 of the newest entry in the list (the entry at the tail of the list), the raster order sync ID 100184 of the oldest entry in the list (the entry at the head of the list) and a ROS ID change flag 100185.

As well as a set of list management data to allow the relevant sub region tile list to be accessed when required, in the present embodiments a list (record) of tile sub region fragment lists that need to be processed (scanned) to determine whether they need updating is maintained, that lists the sub region fragment lists that currently require checking to see if they need updating or not. (As will be discussed further below, in the present embodiments the fragment lists for the tile sub regions are updated using a background scan which checks and updates the lists. The list of sub region fragment lists that need checking is used to identify which lists need checking (scanning) to see if they need updating, and to control the corresponding list scanning operation.)

Other arrangements would be possible for this, such as each list having an associated "needs scan" flag or similar, that can be set to indicate whether the list currently requires checking and updating or not.

The list of tile sub region fragment lists that currently need to be checked (scanned) is again in the present embodiments indexed by means of an appropriate "position", corresponding to the sub region of the tile that the list relates to. This then again allows the relevant tile sub region fragment list management information (and thus the list itself) to be identified and accessed from the information in the record of lists that need checking. It also facilitates identifying whether a sub region fragment list is already listed as needing checking when there is an event relating to a fragment for a list that would trigger the need for a scan, as the appropriate position for the group of fragments in question can then be used to check whether the relevant tile sub region list is already listed in the list of tile sub region lists that need to be checked (scanned).

As discussed above, the present embodiments relate in particular to using the tile sub region fragment lists to set and enforce any desired fragment processing order dependencies. Thus, the tile sub region fragment lists and the information in them are in particular used in the present embodiments to control the operation of the rendering unit 434.

As discussed above, in the present embodiments, the rendering unit 434 is in the form of a programmable fragment shader that will execute fragment shader programs to perform fragment shading of fragments issued by the rasteriser 433. Thus fragments issued by the rasteriser 433 will be processed as respective execution threads by the fragment shader 434.

The fragment shader 434 accordingly comprises an appropriate processing core (shader core) which includes, inter alia, processing circuits for generating execution threads for executing fragment shading programs for performing fragment shading for respective fragments issued by the rasteriser, together with an appropriate execution engine or engines that execute the fragment shading programs for respective execution threads to thereby perform the desired fragment shading operations.

Figure 80:
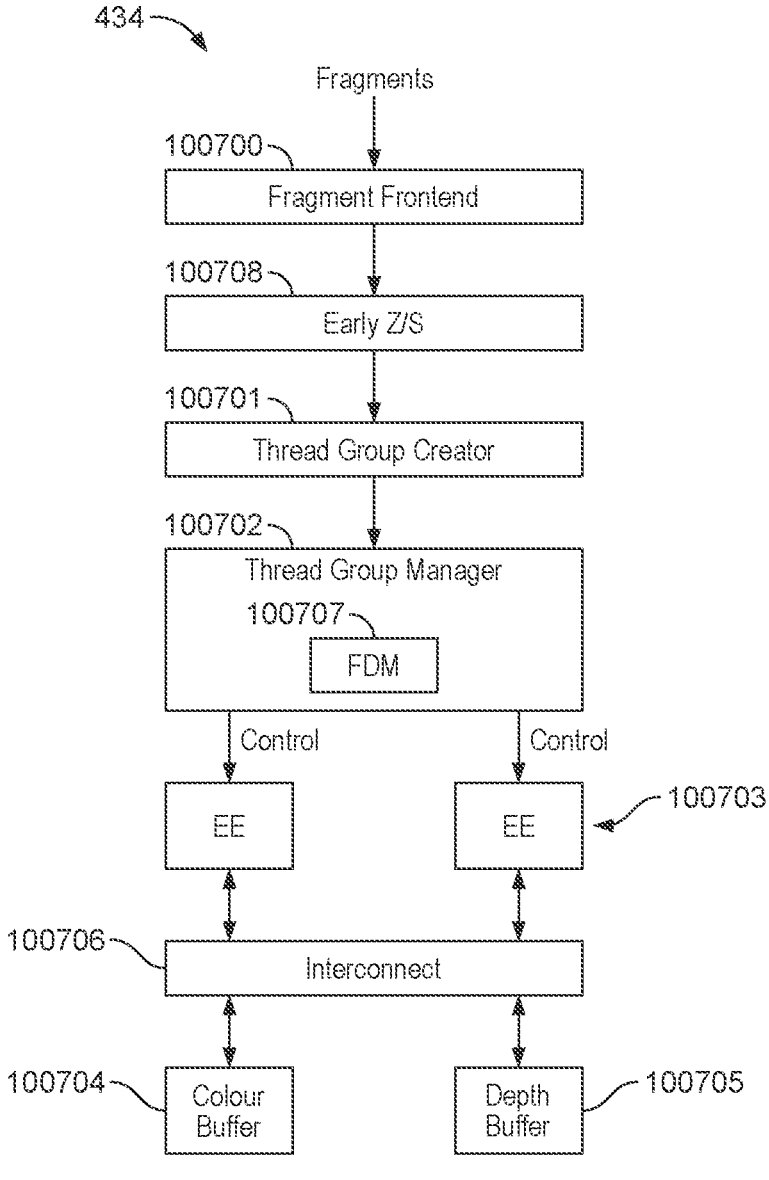
FIG. 80 illustrates schematically a shader core of a graphics processor in an embodiment of the technology described herein.

FIG. 80 shows schematically the layout of the fragment shader core (the fragment shader) 434 in the present embodiments.

As shown in FIG. 80, the fragment shader includes a fragment frontend 100700 that receives fragments from the rasteriser 433. The fragments then undergo an early depth and stencil test 100708.

The early depth and stencil test stage (block) 100708 controls a thread group (warp) creator (spawner) 100701 to correspondingly generate (spawn) groups (warps) of execution threads for execution corresponding to the fragments that pass the early depth and stencil test.

There is then a thread group (warp) manager 100702 that is operable, inter alia, to issue thread groups (warps) created by the thread group creator 100701 to a respective execution engine 100703 for execution.

As shown in FIG. 80, the execution engines 100703 have appropriate access to a colour buffer 100704 and depth buffer 100705 (which will be part of the tile buffer 435) via an appropriate interconnect/message fabric 100706 to thereby be able to read values from and write values to those buffers when executing a fragment shader program for a fragment. (Although not shown in FIG. 80 for the sake of readability, the early depth and stencil testing stage 100708 also has access to the depth buffer).

In the present embodiments, an execution thread is created and executed for each fragment generated by the rasteriser that survives the early depth and stencil tests.

In the present embodiments, groups of execution threads are issued to the execution engines 100703 for execution together, with the threads in one group of execution threads ("warp") each then executing the shader program in question in lockstep, e.g. one instruction at a time. Grouping execution thread into groups in this manner can improve the execution efficiency of the execution engine 100703, because it is possible to share instruction fetch and scheduling resources between all the threads in the group.

The execution engines 100703 execute shader programs for execution threads issued to them, to generate appropriate render output data, including colour (red, green and blue, RGB) and transparency (alpha, a) data, for the fragment that an execution thread corresponds to. The shader program is provided by the application 2 and may be complied for execution by the driver 4.

In the present embodiments, the fragments are organised into 2×2 blocks of fragments (fragment "quads"). Each fragment "quad" is processed by four corresponding execution threads within a same thread group "warp". A thread group "warp" in an embodiment comprises sixteen threads, which may accordingly correspond to four thread "quads" to be processed. Thus, groups of four thread "quads" are processed in the fragment shader 434 as respective thread groups ("warps"), with each thread group ("warp") including a total of sixteen threads corresponding to sixteen fragments (four 2×2 "quads" of fragments). The sixteen threads in a thread group ("warp") then execute the fragment shader program in lockstep, e.g. one instruction at a time. Other groupings of threads would of course be possible.

Typically, each thread (and its corresponding fragment) will correspond to, and calculate render output data for, a fixed set of one or more sampling positions in the render output. However, in the present embodiments, the number of sampling positions (e.g. pixels) that a thread (and its corresponding fragment) corresponds to depends on the (variable) shading rate that is used.

To facilitate this, the thread group creator 100701 operates to generate thread groups ("warps") based on a shading rate.

For example, when a 1×1 shading rate is to be used, fragments and corresponding execution threads which will each execute the shader program to generate render output data for one or more sampling positions in the render output corresponding to a respective single fine pixel are generated. When a 1×2 shading rate is used, however, fragments and corresponding execution threads that will each execute the shader program to generate render output data for sampling positions in the render output corresponding to a respective 1×2 coarse pixel are generated. Other shading rates will be handled in a corresponding manner.

Thus, the execution engines 100703 can execute execution threads that represent fine VRS fragments and, where a coarser shading rate is being used, execution threads that represent VRS coarse fragments. Correspondingly, the thread group manager 100702 issues threads appropriately to the execution engines 100703 for execution. The thread group manager 100702 also stores information indicating the shading rates associated with threads and thread groups ("warps") issued to an execution engine 100703.

The execution engines 100703 execute the execution threads within thread groups ("warps") appropriately so as to perform the appropriate shading operations and generate the appropriate render output data for each execution thread, i.e. including colour (red, green and blue, RGB) and transparency (alpha, a) data.

Output data generated by an execution engine 100703 is then written appropriately to the colour buffer 100704 and/or depth buffer 100705.

The shading rate information may be used to control this writing out of data. For example, in the case of a 1×1 shading rate, a single set of output data values will be written to one or more sampling positions in the colour or depth buffer corresponding to a (only) single fine fragment. In the case of a coarser shading rate, a single set of output data values will be written to sampling positions in the colour or depth buffer corresponding to a block of plural fine fragments. For example, in the case of a 1×2 shading rate, a single set of output data values will be written to sampling positions corresponding to a block of 1×2 fine fragments. Other shading rates will be handled in a corresponding manner.

It will be appreciated that FIG. 80 shows the shader core 434 schematically, including the main elements of the core that are relevant to the operation in the manner of the present embodiments. There will, of course, be further elements, connections, etc., of the shader core 434 that are not shown in FIG. 80.

As shown in FIG. 80, the thread group manager 100702 also includes a fragment dependency manager 100707 which, as will be discussed in more detail below, manages and maintains the tile sub region fragment lists of the present embodiments, and causes the processing of threads and thread groups by the execution engines 100703 to be controlled based on those lists.

Thus, in the present embodiments, the managing and maintaining of the tile sub region fragment lists, and the use of those lists to control fragment processing operations (to enforce any desired fragment processing order dependencies) is performed by a fragment dependency manager (circuit) 100707 that is part of the thread group (warp) manager 100702 of the (fragment) shader core 434. In particular, the fragment dependency manager 100707 causes the execution of execution threads for performing fragment shading processes by the execution engines 100703 to be controlled based on the tile sub region fragment lists, in order to enforce the desired fragment processing order dependencies, and in particular to ensure that fragment quads that will generate output data for the same set of one or more sampling positions are processed by an execution engine 100703 in the correct, desired order.

Figure 81:
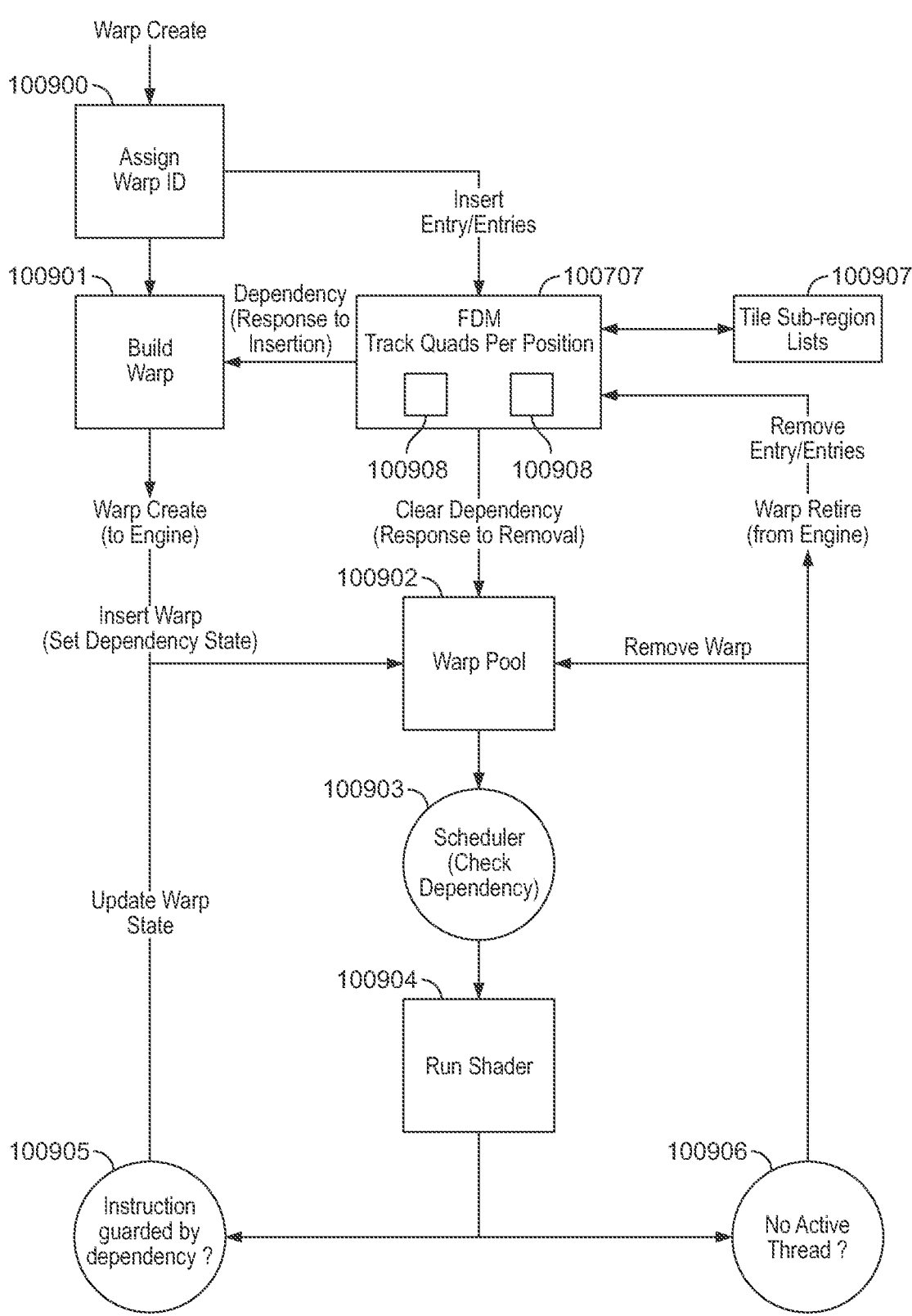
FIG. 81 shows the operation of the thread group manager and fragment dependency manager of a shader core in an embodiment of the technology described herein in more detail.

FIG. 81 shows the operation of the thread group manager 100702 and fragment dependency manager 100707 in more detail.

As shown in FIG. 81, when the thread group manager 100702 is to create a new thread group (warp), the new thread group is assigned 100900 a warp ID and the warp is built 100901.

The new thread group with its warp ID is also input to the fragment dependency manager 100707, which will then operate to add an entry or entries to the corresponding tile sub region fragment list 100907 held by the FDM 100707 for the fragment (thread) quad(s) in the thread group (this will be discussed in more detail below).

The FDM 100707 will also determine whether the thread quads in the thread group (warp) have any processing operation dependencies (in the present embodiment colour write, colour read only, or depth dependencies) and based on that determine a "dependency count" for the thread group (warp) for each of the respective processing operations that fragment processing order dependencies are being tracked for.

In the present embodiments, each thread group (warp) that is generated for processing fragments has a corresponding dependency state associated with it, indicating whether it has any dependency for the particular processing operations for which processing operation eligibility information is provided. Thus in the present embodiments, each thread group (warp) that falls to be processed has three associated dependency state indications, indicating whether it has a dependency for colour writes, colour reads and depth buffer accesses, respectively.

For each such dependency which is tracked, a thread group (warp) also has a corresponding dependency count set for it, which is a count of the number of thread quads within the overall thread group (warp) that have the dependency in question. Thus, in the present embodiments where thread groups (warps) comprise four thread quads, the dependency count for a given dependency state can be from zero (no dependency) to four (each thread quad within the thread group (warp) is dependent on another thread quad).

The dependency counts for a thread group (warp) are indicated to the thread group (warp) creation process 100901 by the FDM 100707 when it adds relevant entries to the sub tile lists to allow the corresponding dependency state and counts to be set for a thread group (warp). The FDM 100707 also signals appropriate updates to thread group dependency states and counts as it updates the tile sub region lists as fragments and threads are processed.

Once a thread group (warp) has been built, and its corresponding dependency state and counts set, it is added to a pool of thread groups (warps) 100902 waiting to be issued to an execution engine for execution.

A scheduler 100903 is configured and operable to issue thread groups (warps) from the warp pool 100902 to an execution engine for execution 100904. The scheduler 100903 is operable to check the dependency state and counts of thread groups in the pool 100902 to determine whether they have any dependencies that mean that they are not currently eligible to be (permitted to be) processed, and to only issue thread groups from the pool 100902 when they are eligible to be processed.

In particular, the scheduler 100903 will check whether a respective thread group has a dependency for a processing operation in question based on the corresponding dependency state for the thread group (warp), and if so, only issue the thread group from the pool 100902 for performing that processing operation when the corresponding dependency count for the thread group (warp) for that dependency is zero (thereby indicating that none of the active thread quads within the thread group (warp) have a dependency for the processing operation in question).

Once a thread group (warp) has been issued from the pool 100902 by the scheduler 100903, it will then be processed 100904 by the appropriate execution engine.

As shown in FIG. 81, when during execution of a thread group, a shader program instruction that is guarded by a dependency is encountered 100905, the shader program execution for the thread group is stalled, and the thread group is returned to the pool 100902 so that the scheduler can check whether the dependency has been met (as discussed above). The thread group state is also appropriately updated.

In particular, the scheduler will check whether the dependency state for the thread group (warp) indicates that the thread group has a dependency for the shader program instruction in question, and if so what the thread group's (warp's) current dependency count for that dependency is. If the dependency count is greater than zero, then the warp will be stalled and retained in the pool until its dependency count for the guarded instruction operation has fallen to zero.

(On the other hand, if the dependency state for the thread group (warp) indicates that the thread group does not have a dependency for the guarded instruction, or the dependency count for the thread group (warp) is zero, then the thread group is free to execute the guarded instruction, and so can be appropriately reissued for execution to continue execution of the shader program when desired.)

An instruction can be indicated as "guarded" for a dependency in any suitable and desired manner. This is in an embodiment done by adding appropriate flags within the shader program execution to indicate that an instruction is guarded. For example, the compiler could identify instructions that perform colour buffer reads or writes, and depth buffer accesses, and indicate the presence of such instructions in a shader program to be executed appropriately, so that those instructions will be interpreted as being "guarded", to thereby trigger the corresponding dependency state and count checks for thread groups before they execute those instructions.

Other arrangements would, of course, be possible.

If no instruction guarded by a dependency is encountered during execution of the shader program, then the thread group can be executed to completion and the relevant execution threads retired.

Threads in a respective thread group may also otherwise be terminated, for example because they (the fragments that they relate to) have been culled (discarded) from further processing (for example for hidden surface removal purposes).

Thus, threads can become no longer active within a thread group either because they have completed the fragment shader program execution, or because they have otherwise been culled (discarded) from further processing. As shown in FIG. 81, once there are no remaining active threads in a thread group, then a thread group can be, and is, retired 100906.

In this regard, in embodiments, it is possible for some, but not all, threads in a thread group (warp) to be permitted to complete their processing or be otherwise terminated, without retiring the entire thread group (warp) (otherwise referred to herein as a "partial retire" of the thread group (warp)). For example, individual quads within a thread group (warp) may be retired independency of each other. The tile sub-region list entries can be updated accordingly, e.g. by removing entries and updating dependencies indicated in entries as appropriate, in the manner disclosed herein. Such "partial retires" can assist with freeing up processing dependencies, and may allow other threads (e.g. in another thread group (warp)) to proceed.

When a thread group is retired, it is, as shown in FIG. 81, removed from the thread group pool 100902. The fragment dependency manager 100707 is also informed of the thread group retirement, so that it can remove the thread group from the entry or entries for the relevant tile sub region fragment list.

As shown in FIG. 81, the fragment dependency manager 100707 will also appropriately clear dependencies of thread groups in the pool 100902 as thread groups undergo processing (and, e.g., are retired and removed from tile sub region fragment lists).

In particular, the fragment dependency manager 100707 will, as will be discussed in more detail below, update the tile sub region fragment list as thread groups undergo processing.

For example, the fragment dependency manager 100707 may update the tile sub-region fragment list as threads complete various processing operations that are being tracked using the tile sub-region fragment list entries (e.g. relating to depth processing, colour writes, and colour reads). The completion of processing operations may be signalled to the fragment dependency manager 100707 by the appropriate processing circuit (unit) that has performed the processing operation, e.g. with depth updates being performed by and signalled to the fragment dependency manager by the relevant depth testing circuit (unit).

Likewise, the processing circuit performing colour writes could signal completion of colour write for a fragment/thread to the fragment dependency manager. However, since colour writes tend to be the last operation required to be performed for a group of fragments/threads (and so, once colour write has been performed for a group of fragments/threads, the threads will generally have completed all of their processing and will be retired), once colour write has been completed the fragment dependency manager 100707 could (instead) simply be informed that the group of fragments/threads is to be retired.

As will be discussed in more detail below, the fragment dependency manager 100707 will also update the processing operation eligibility information for entries in the list as thread groups undergo processing.

When the FDM 100707 determines that a given entry in a sub tile list no longer has a processing operation dependency (is now eligible to perform a particular processing operation) it will, as shown in FIG. 81, signal that appropriately, such that the dependency count of the corresponding thread group (warp) in the warp pool 100902 can be and will be updated accordingly.

As discussed above, this will in particular comprise decrementing a dependency count for a thread group (warp) as respective thread quads within the thread group (warp) become eligible to perform a processing operation in question, such that it can, in time, be identified when the thread group (warp) no longer has any dependency for the processing operation in question, and can therefore be released from the warp pool 100902 for performing that processing operation.

As shown in FIG. 81, the fragment dependency manager 100707 operates to insert appropriate entries into tile sub region fragment lists for thread groups that are created, and to remove entries from the tile sub region fragment lists for thread groups that are retired, and to, correspondingly and otherwise, determine and update any changes to the fragment list entries, e.g. in relation to processing order dependencies, as appropriate (and to correspondingly trigger any corresponding changes need to the dependency states and counts of thread groups (warps) being executed/awaiting execution).

The managing and maintaining of the tile sub region fragment lists, and the setting and updating of the entries in the lists, by the fragment dependency manager 100707 in the present embodiments, will now be described in more detail with reference to FIGS. 82 to 88.

As discussed above, when a new thread group (warp) is created for processing fragments generated by the rasteriser, the fragment dependency manager 100707 adds appropriate entries (one for each quad in the warp) to the appropriate tile sub region fragment list.

Figure 82:
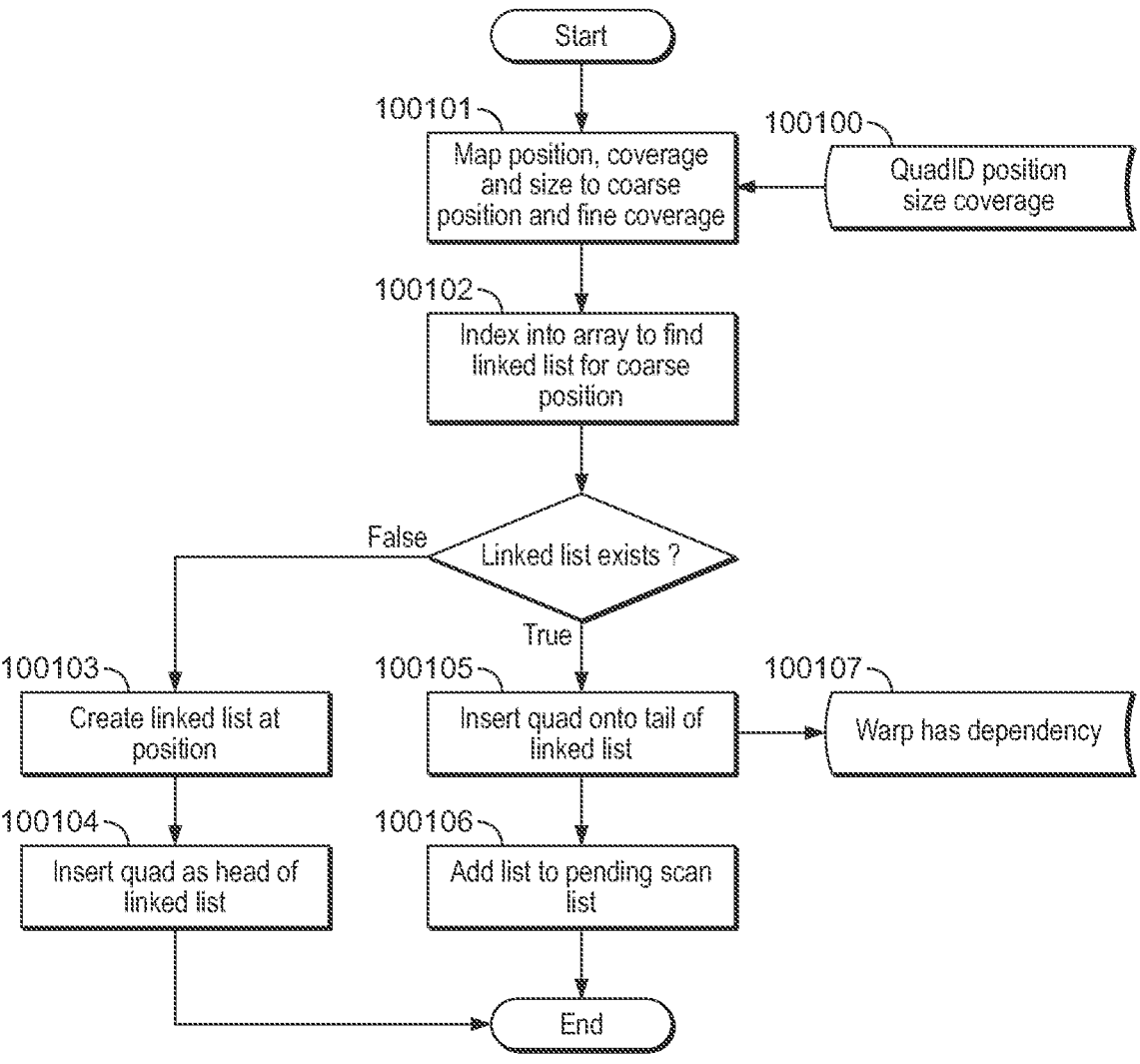
FIG. 82 shows the operation of a fragment dependency manager of a shader core in an embodiment of the technology described herein when adding a new entry to a tile sub region fragment list.

FIG. 82 shows the operation when a new fragment quad needs including in an appropriate tile sub region fragment list.

As shown in FIG. 82, the input 100100 to the process when adding a quad as a new entry in an appropriate tile sub region fragment list comprises an identifier for the quad (quad ID), which in the present case comprises the identity (the warp ID) of the thread group (warp) that the thread quad belongs to, together with, where appropriate, a "quad" "offset" to indicate which quad of the thread group (warp) the quad is (an offset for the quad within the thread group (warp)). Thus for the case where there are multiple quads within a thread group (warp), the quad ID is (warp ID, quad offset). The quad position, the VRS rate (quad size) and the quad coverage (in terms of the sampling positions that are covered) are also provided.

As shown in FIG. 82, the quad position, together with the size (the VRS rate) and coverage of the quad are used to determine a "coarse" position (within the tile) for the quad that can then be used to identify the tile sub region that the quad falls within (e.g. wherein the coarse position corresponds to a position at a granularity ("coarseness") corresponding to the size of a tile sub-region) and also to determine a "fine" coverage mask (the coverage information) for the quad (as discussed above) (step 100101).

The determined "coarse" position for the quad is then used to identify the tile sub region fragment list that the quad should be added to (step 100102) (as discussed above, this will be determined by using the "coarse" position for the quad to index into the list (array) of tile sub region fragment list management information, to retrieve the appropriate data for retrieving the sub region fragment list in question).

As shown in FIG. 82, in the case where there is not currently a fragment list for the tile sub region that the new quad falls within, then a new list is created for that tile sub region (step 100103), with the new quad being set as the head of the list (step 100104).

As part of this process, the appropriate list management information, such as head and tail pointers, for the new sub region list will be generated and stored in association with (indexed by) the relevant "coarse" position in the array of tile sub region fragment list management data, so that the new list can be appropriately identified and accessed.

The list entry that is added will, as discussed, include an appropriate identifier for the quad that it relates to, together with a coverage mask indicating the coverage of the quad within the tile sub region in question. The coverage mask is, as discussed above, derived based on the indicated coverage for the fragments in the quad, the quad position within the tile (and particularly within the tile sub-region), and the size of the tile area (and correspondingly of the tile sub-region area) that the quad covers (which may be based on the variable rate shading rate that is being used, for example).

The appropriate processing operation eligibility indications, processing operation "should be considered for" indications, and ROS ID for the quad are also set for the list entry.

In this case, as the quad is being inserted as the head of the sub tile fragment list (i.e. a new fragment sub tile fragment list is being created), then the eligibility information is set to indicate that all the desired processing operations are eligible (are permitted) to be performed for the quad/fragment group in question (as there cannot be any dependency on an earlier quad/group of fragments in the tile sub-region in question).

The fragment processing operation "should be considered for" indications are also set accordingly. In the case where the quad is to execute (the fragment group is to undergo) the relevant processing operation, then the "should be considered for" indication for the processing operation in question is set to indicate that the fragment group should be considered for (tracked for) the processing operation in question.

On the other hand, in the case where the quad/fragment group is not intended to undergo the relevant processing operation at all, then the "should be considered for" indication for that processing operation is set to indicate that the quad/fragment group in question does not need to be considered (tracked) for the processing operation in question.

The ROS ID (classification) for the list entry is also set, based on the ROS ID (classification) of the fragments represented by the list entry. This ROS ID (classification) may have been determined for the fragments prior to creating the list entry, e.g. during rasterization.

On the other hand, where a sub region fragment list already exists for the tile sub region that the new quad falls within, then the new quad is added to the end (tail) of the linked list for the tile sub region in question (step 100105). (The current tail of the list is identified from the tail pointer for the list.)

Figures 83, 84:
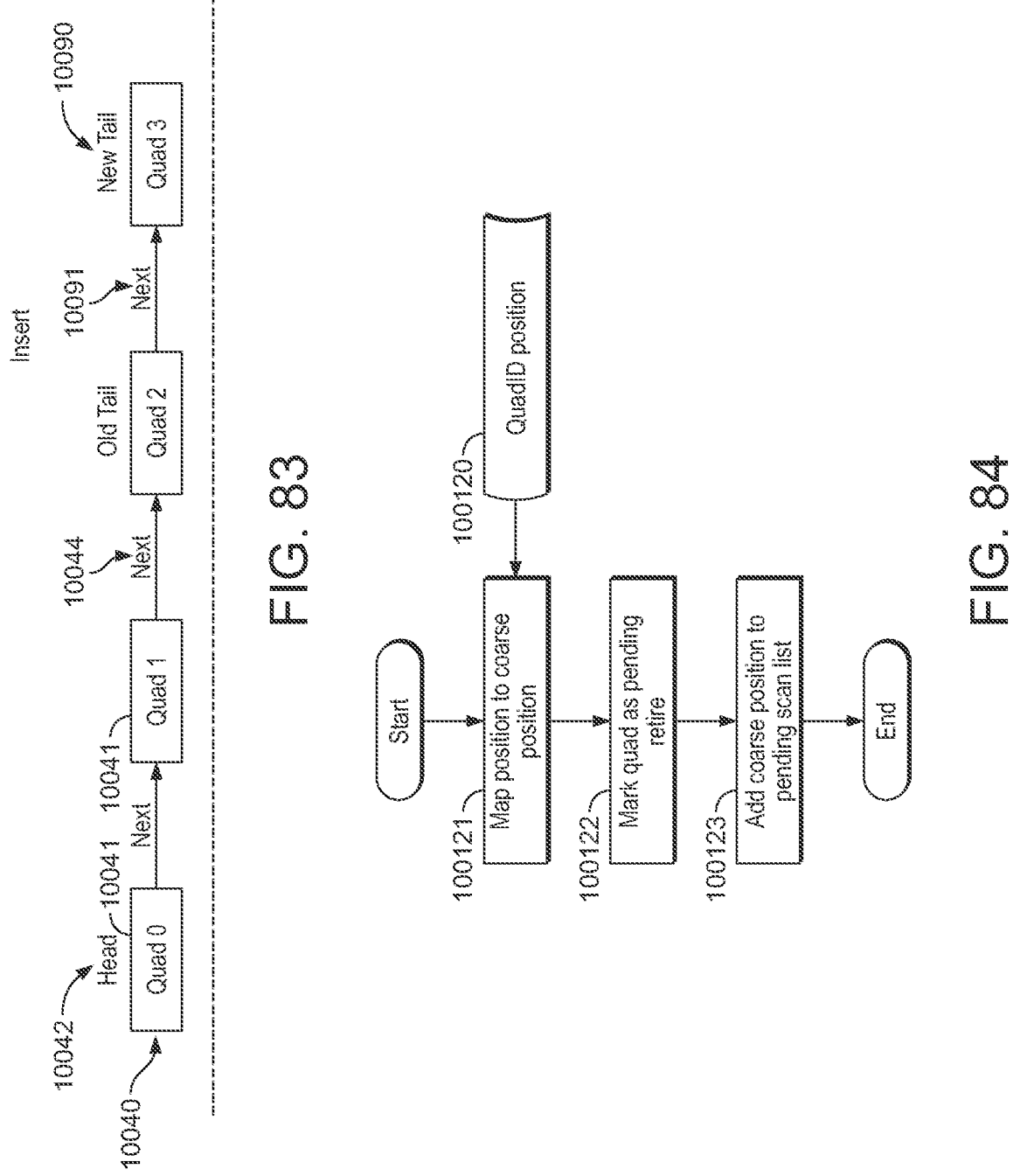
FIG. 83 illustrates the adding of a new entry to a tile sub region fragment list in an embodiment of the technology described herein.
FIG. 84 shows the operation of the fragment dependency manager of a shader core in an embodiment of the technology described herein when a tile sub region list entry falls to be deleted.

FIG. 83 shows the adding of a new quad to a sub region list. As shown in FIG. 83, an entry 10090 for the new fragment quad is added to the tail of the list, with the next pointer 10091 for the old tail entry being set to point to the new tail entry. The list tail pointer is also updated to point to the new tail of the list.

As discussed above, the list entry for the new quad will include an identifier for the quad, and a coverage mask indicating the coverage of the quad within the tile sub region in question.

The appropriate processing operation eligibility indications and processing operation completion indications for the quad are also set for the list entry.

In this case, as there will be earlier entries in the already existing list for the tile sub region in question, the eligibility information for the new entry is set to indicate that the new entry has a dependency on earlier entries in the list for the processing operations for which the eligibility information is maintained, such that the new quad is indicated as not being eligible (permitted) to perform the processing operations in question (as at this stage the quad is first added to the tile sub region list) it has not yet been determined whether the new quad actually does have any processing order dependencies on earlier entries in the list in question, and so as a precaution the new quad is indicated as not being eligible to perform the processing operations that are being tracked).

Correspondingly, as shown in FIG. 82, the fragment dependency manager 100707 signals 100107 to the thread group (warp) creation process (as discussed with reference to FIG. 81) that the thread group (warp) that the thread quad for the new entry belongs to has the relevant dependencies, so that the dependency state and dependency count associated with the thread group (warp) can be set accordingly.

It should be noted in this regard that when an entry is added to an existing list, it is not immediately checked whether the entry actually has any dependencies on earlier entries in the list, but rather the entry is simply set to indicate that it does have dependencies (even though they may in fact be false dependencies) on earlier entries in the list, and the eligibility information will then later be updated appropriately (and if necessary) once it has been actually (properly) determined whether the new entry does have any dependencies on earlier entries in the list.

The fragment processing operation "should be considered for" indications are also set accordingly. In the case where the quad is to execute (the fragment group is to undergo) the relevant processing operation, then the "should be considered for" indication for the processing operation in question is set to indicate that the fragment group should be considered for (tracked for) the processing operation in question.

On the other hand, in the case where the quad/fragment group is not intended to undergo the relevant processing operation at all, then the "should be considered for" indication for such that processing operation is set to indicate that the quad/fragment group in question does not need to be considered (tracked) for the processing operation in question.

In this case, the tile sub region list that the new fragment group (thread quad) has been added to is also indicated as needing to be scanned for an update (step 100106). As discussed above, in the present embodiment this is done by maintaining a list (an array) of sub region fragment lists needing to be scanned, and checking whether the sub region list that the quad/fragment group has been added to is already in the list of sub region lists to be scanned, and if not, adding it to the list of sub region lists to be scanned.

FIG. 84 shows the operation when a thread quad (for a group of fragments) is retired (as discussed above), and accordingly can be removed from a sub region fragment list.

In this case, as shown in FIG. 84, the identity and the position of the "retired" quad are provided 100120 (to the fragment dependency manager), with the quad position then being used to identify the tile sub region that the quad belongs to and thereby access the corresponding fragment dependency list for that sub region (step 100121).

The fragment dependency manager then identifies the relevant quad in the sub region list (using the quad ID), and marks the quad to be retired (deleted) (step 100122). The relevant sub region list is also added to the list of sub region lists that need to be scanned (as discussed above) (step 100123).

In this regard, whilst a list entry may be marked for deletion in response to a quad being retired (or otherwise completing its processing operations which are being tracked by that list entry), the list entry is not deleted at this stage but the list is instead added to the list of sub-regions lists that need to be scanned. The entry can then be deleted from the list during the (separate) scanning operation (process). This can facilitate re-mapping of pointers for the remaining entries in the list, and can allow processing dependencies that may change as a result of deletion of the list entry to be accounted for.

As discussed above, in order to update the fragment lists for sub regions of a tile, a record of the sub region fragment lists that need scanning is maintained, and sub region lists are added to the list of sub region lists to be scanned when there are any changes to a list, such as the addition or removal of entries in the list, or a change of state for an entry in the list, that could result in an update to the list being required.

The fragment dependency manager is thus configured to scan any lists that are included in the list of sub region fragment lists that need to be scanned. In the present embodiments, the fragment dependency manager 100707 works through the "to be scanned" list in a round robin fashion, so as to thereby scan any sub region fragment lists that need scanning in turn. Other arrangements would, of course, be possible.

As shown in FIG. 81, in order to perform the tile sub region fragment list scanning operations, the fragment dependency manager 100707 includes one or more scanners (scanning circuits) 100908, that are each respectively operable to scan a tile sub region fragment list. Having multiple scanners will allow the lists to be scanned more quickly. The Applicant has found that two scanners (such that two lists can be scanned simultaneously) is a suitable number of scanners for allowing the tile sub region fragment lists to be kept up to date while ensuring sufficient throughput of fragments and execution threads.

Figure 85:
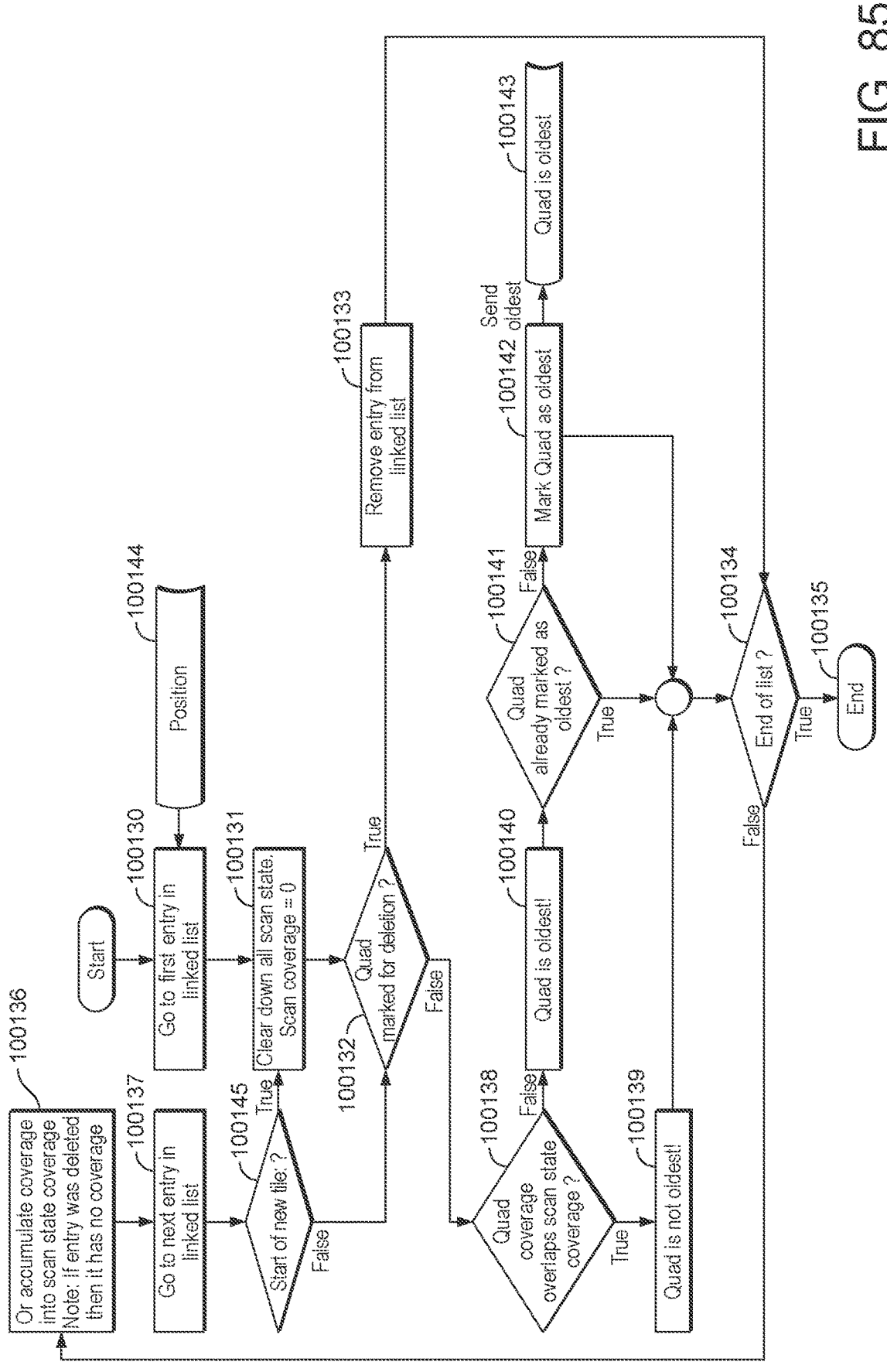
FIG. 85 shows the scanning operation of the fragment dependency manager of a shader core in an embodiment of the technology described herein to update the entries in a tile sub region fragment list.

FIG. 85 shows the scanning operation when a sub region fragment list is being scanned.

The scanning process shown in FIG. 85 could be performed separately in respect of each of the different processing operation(s) for which an eligibility indication can be provided. Thus in the present embodiments, where separate eligibility indications are provided for colour buffer write accesses, ZS buffer accesses, and colour buffer read-only operations, the (scanner of) fragment dependency manager could scan a list that is being scanned three times, once in respect of the colour buffer read eligibility information, once again in respect of the colour buffer write access eligibility indication and once again in respect of the ZS buffer access eligibility indication.

Alternatively (and in an embodiment), the scanner/scanning process scans (traverses) a given tile sub-region list once, but during that (single) scan, accumulates (and maintains) multiple separate accumulated coverage masks, for each of colour reads, colour buffer write accesses and depth buffer accesses, and sets the eligibility indications for colour buffer reads, colour buffer write accesses and ZS buffer accesses based on the respective separate accumulated coverage masks accordingly.

When performing the scanning process, the scanner works its way along the linked list from head to tail, and, in effect, determines which entries in the list are the first entries that are due to perform the processing operation in question for the part of the tile sub region that the group of fragments that the entry relates to applies to, and sets the relevant process operation eligibility indications for the entries in the list accordingly.

As shown in FIG. 85, when performing a scan of a tile sub region fragment list, for example in respect of colour buffer updates, the fragment dependency manager scanner will identify the list to be scanned from the appropriate position 100144 input to the scanner.

The scanner will then fetch the first entry in the list (using the head pointer for the list) (step 100130) and will clear any existing scan state and set any accumulated scan coverage to zero (step 100131).

The scanner will check whether the entry in question is marked for deletion (step 100132) (as may be indicated by the indicator 1001710 for the entry in question, as illustrated in FIG. 89). If the entry is marked for deletion, the scanner will remove the entry from the list for the tile sub region in question (step 100133) (this operation will be discussed in more detail below), and then determine if the scan has reached the end of the list 100134. If the scan has reached the end of the list, then the scan is finished (step 100135).

On the other hand, if the end of the list has not been reached, then the indicated coverage in the tile sub region for the entry that was just checked is accumulated with the existing coverage state for the scan (step 100136) (again, this will be discussed in more detail below), and the scan moves to the next entry in the list (step 100137).

If an entry is deleted from the list, then it is assumed that its coverage is zero and so there will be no accumulation of coverage for the deleted entry into the accumulated scan coverage. Similarly, if an entry is indicated as not to be considered for (as not applicable to) a processing operation for which the scan is being performed, then it is assumed that its coverage is zero and so there will be no accumulation of coverage for the entry into the accumulated scan coverage (for the processing operation in question).

It is then checked whether the next entry in the list belongs to a new tile (step 100145), e.g. by comparing the Tile ID for that entry with the Tile ID of the entry previously considered by the scanner (the scanner stores the Tile ID of the previously considered entry for this purpose). If the entry belongs to a new tile, the scanner will clear any existing scan state and set any accumulated scan coverage to zero (step 100131). If the entry does not belong to a new tile, then any existing scan state and any accumulated scan coverage will be maintained.

It is then again checked whether the next entry in the list is marked for deletion (step 100132) (and if so the entry is deleted without accumulating any coverage for the entry and the scan moves on to the next entry in the list (if any) (steps 100133, 100134, 100136 and 100137)).

In the case where an entry is not marked for deletion, then as shown in FIG. 85, it is then determined whether the entry is to be considered for (tracked for) the relevant processing operation for which the scan is being performed, e.g. by checking the 'should be considered for' flag 100173 for the colour processing to determine whether the entry is applicable to colour processing (or in the case that the depth processing is being considered, checking the indication 100174 for depth processing 'should be considered for').

In an embodiment, when considering colour read-only operations, the (general) colour processing 'should be considered for' indication 100173 is checked (rather than having a separate colour read 'should be considered for' indication, although this could be provided instead if desired).

If the entry is not to be considered for (is not applicable to) the relevant processing operation for which the scan is being performed, then the scan simply moves on to the next entry in the list (if any) without accumulating any coverage for the entry that is not to be considered for the processing operation in question.

If the entry is to be considered for the processing operation in respect of which the scan is being performed, then the scanning process compares the coverage in the tile sub region indicated for the entry being considered with the currently accumulated scan coverage (for the processing operation in question) (step 100138) to determine whether the entry currently being considered overlaps with the accumulated scan coverage (this effectively determines whether the entry currently being considered overlaps with the coverage of any preceding entry in the list that is (still) to perform the processing operation in question).

In the case where the entry being considered does overlap with the (appropriate) accumulated scan coverage, thereby indicating that there is an earlier entry in the list that is to perform the processing operation in question for the part of the tile sub region that the entry covers, it is determined accordingly that the entry has a processing dependency for the operation in question on the earlier entry (step 100139) and therefore should not perform the processing operation until that earlier entry has performed the processing operation. Accordingly, the processing operation eligibility indication for the entry being considered is set to indicate (is left as indicating) that the entry is not currently permitted (is not currently eligible) to perform the processing operation in question.

On the other hand, if there is no overlap between the coverage in the tile sub region for the group of fragments (quad) for the current list entry being considered with the accumulated coverage of the earlier list entries, then it can be determined that the current list entry being considered is the first (an or the oldest) list entry in the list that is to perform the fragment processing operation in question for that part of the tile sub region (step 100140). This being the case, the entry can be marked as being permitted to (eligible to) perform the processing operation in question.

In this case it is therefore checked whether the entry (quad) is already marked as being eligible (permitted) to perform the processing operation (step 100141), and if the list entry is not so marked, then the relevant eligibility indication for the list entry is updated to indicate that the entry is eligible to (permitted to) perform the processing operation in question (step 100142).

In this latter case (i.e. where the list entry is updated to indicate the entry is eligible to (is permitted to) perform the processing operation in question, then as shown in FIG. 85, the FDM 100707 also sends an appropriate signal 100143 to allow the dependency count for the thread group (warp) in question to be updated (and in particular to be decremented), as the thread quad or quads in question no longer has a dependency for the processing operation in question.

In either case, it will then be determined whether the end of the list has been reached, and if not, the coverage of the latest list entry will be appropriately accumulated into the current scan coverage (step 100136), and then the next entry in the list considered (step 100137), and so on.

As discussed above, this scanning process will be repeated for each different processing operation eligibility indication that can be set for the list entries. Thus in the present embodiments, the scan process illustrated in FIG. 85 will be performed once to set the colour buffer read-only eligibility indications for the entries of a list that is being scanned, and then performed a second time to set the colour buffer write access eligibility indications for the entries of a list that is being scanned, and then performed a third time to set the depth buffer access eligibility indications for the entries in the list that is being scanned (or in any other desired order).

In the present embodiments, the scanners (scanning process) is configured to operate as a background scanning operation whilst the fragment processing (thread execution) is being performed, with the scanner, as shown in FIG. 85, when performing a scan of a list, walking the entries in the list from the head to the tail of the list, and, if necessary, updating the information associated with an entry or deleting the entry, as appropriate, in turn. The scanner may, for example, be configured to walk the lists at a rate of one entry per cycle.

In order to facilitate the scanning operation, the scanner maintains an appropriate set of scanning and management information (metadata) for a list that is being scanned. This data (scanning management information) comprises in particular the appropriate accumulated coverage mask or masks for the processing operation(s) in question (as discussed above). The scanner (scanning process) also keeps track of the entry that is currently being/to be scanned, and the previous entry in the list to that entry. This then allows the scanner to keep track of where it has reached in the scan of the list, and also to keep the list intact when an entry in the list is deleted.

The scanner/scanning process may also track other list information, if desired, such as the identity of the tile that the last scanned entry belonged to, and/or the ROS ID of the last scanned entry.

It will be appreciated in this regard, that the scanning operation effectively identifies whether a list entry is an or the "oldest" entry in the list for a particular processing operation for a particular part of the tile sub region, and if so, sets that list entry as being eligible to perform the processing operation in question. This, in combination with the fact that newer fragments to be processed are always added to the end of the list for a tile sub region, then has the effect of ensuring that the relevant processing operations (in the present embodiments the colour buffer updates and depth buffer updates) will be performed in the desired and correct order for the fragments (execution threads) in question. This will then ensure that fragment/thread quads that will generate output data for the same set of one or more sampling positions in a tile are processed by the execution engines 100703 in the correct, desired order.

Figure 86:
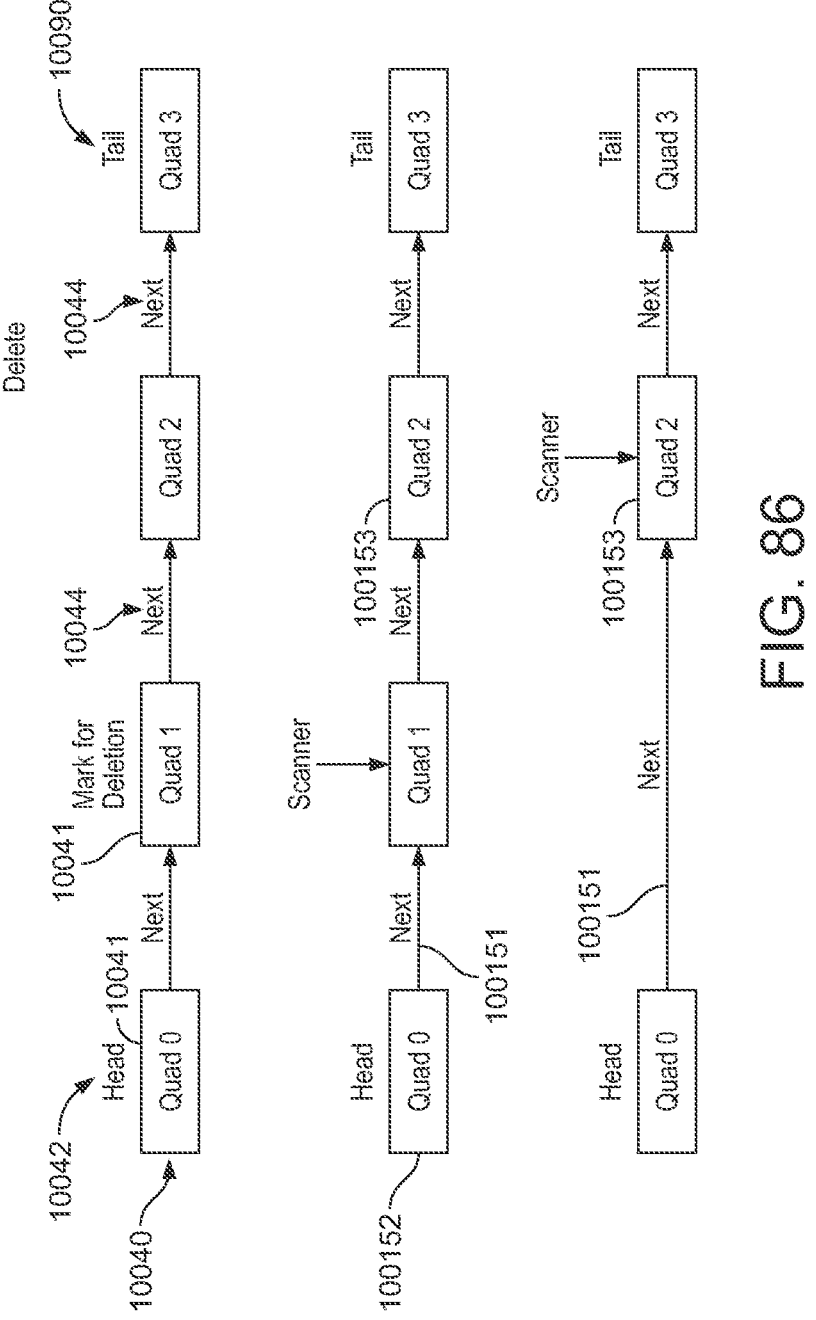
FIG. 86 shows the removal of an entry from a tile sub region fragment list in an embodiment of the technology described herein.

FIG. 86 illustrates in more detail removing (deleting) an entry from a tile sub region list (as in step 100133 in FIG. 85). It should be noted here that, in comparison to adding entries to a list (where entries are always added to the tail of the list), when entries are no longer needed, they can be removed regardless of their position in the list (and an entry at any position in a list can fall to be deleted).

In the example shown in FIG. 86, it is assumed that the second entry 100150 (Quad 1) in the list is marked for deletion. As discussed above, during the background scan, the scanner will identify the entry as being marked for deletion and remove the entry.

The scanner will also signal to the list maintaining circuit/process to update the next pointer 100151 of the previous entry 100152 to point to its new next entry 100153 in the list (to the same next entry as the removed entry had pointed to).

If the removed entry was the head or tail of the list, then the head pointer or tail pointer for the list, as appropriate, will also be updated to point to the new head or tail of the list.

FIG. 86 shows an example of removing an entry from a singly-linked list, performed as part of a scanning operation. However, if a doubly-linked list is instead used, then it may be possible for an entry to be deleted (e.g. immediately) in response to that entry no longer being required (e.g. in response to the fragments/threads represented by that entry competing their desired processing or being retired), rather than as part of a scanning operation. In that case, the previous entry (as pointed to by 'previous' pointer of the entry being deleted) can be updated to point to the next entry in the list (as pointed to by the 'next' pointer of the entry being deleted). This may reduce the processing burden of the scanner, which would no longer need to remove that entry from the list.

Figure 87:
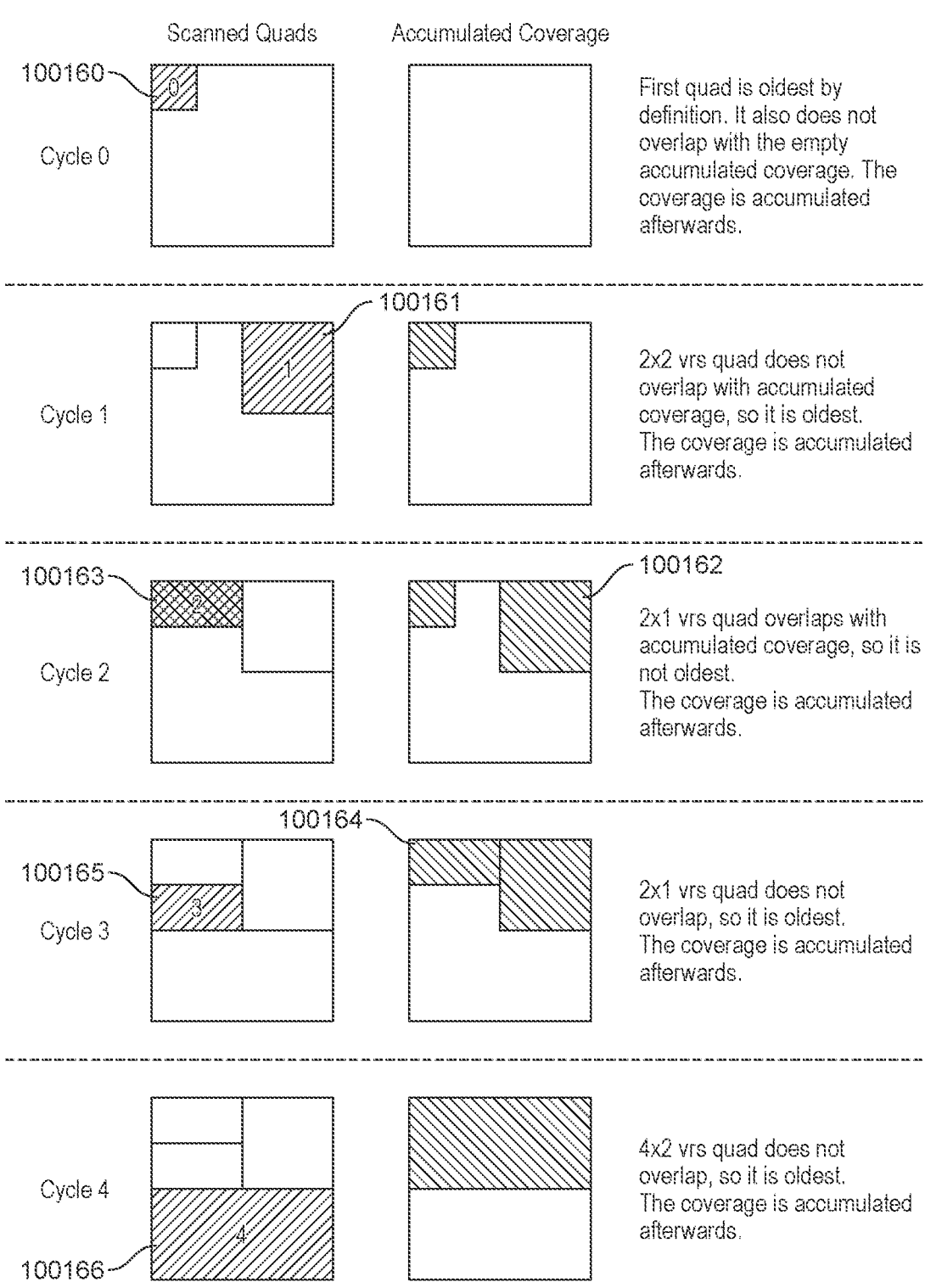
FIG. 87 shows the accumulation of coverage masks for tile sub region fragment list entries in an embodiment of the technology described herein.

FIG. 87 shows an example of the accumulation of coverage masks for list entries during a scan of a list (step 100136 in FIG. 85).

The accumulation of coverage masks described with regards to FIG. 87, in the present embodiments, will be done separately for colour buffer write accesses, and depth buffer accesses. (The accumulation of coverage masks is done slightly differently for colour buffer read-only operations, as will be discussed later with regards to FIG. 88).

As shown in FIG. 87, in a first cycle (Cycle 0), the scanner considers the first entry 100160 in the list which represents a first group of fragments (quad 0). The group fragments represented by the first entry in the list is necessarily the oldest entry in the list and so its eligibility indication will be set to indicate that the entry is eligible to perform the processing operation in question. The accumulated coverage mask is then updated to include the coverage of the group fragments (quad 0) for the entry.

The scanner then considers the next entry 100161 in the list, which in this case is assumed to be a 2×2 VRS quad (quad 1). Since the coverage of this group of fragments (quad) does not overlap with the accumulated coverage (from entry 100160), the list entry 100161 is 'oldest' for the processing in question for the part of the tile sub-region to which it relates, and so the list entry is also set to indicate that that processing is 'eligible' to be performed. The accumulated coverage mask 100162 is then updated to include the coverage of the (new) group of fragments.

The scanner then considers the next entry 100163 in the list, which in this case is assumed to be a 2×1 VRS quad (quad 2). Since the coverage of this group of fragments overlaps with the accumulated coverage 100162, the list entry 100163 is not 'oldest' for the processing in question for the part of the tile sub-region to which it relates, and so the list entry is set to indicate that that processing is 'not eligible' to be performed. The accumulated coverage mask 100164 is then updated to include the coverage of the (new) group of fragments.

Similar processing is performed by the scanner for the next entries 100165, 100166 in the list. In each case, the coverage for the group of fragments represented by the entry being considered is compared to the accumulated coverage map, and the entry is updated to indicate that processing in question is 'eligible' to be performed if no overlap exists with the accumulated coverage map (and conversely 'not eligible' if an overlap exists with the accumulated coverage map). The accumulated coverage map is also updated accordingly.

As discussed above, in the present embodiments, the depth or colour accumulated coverage map is only updated to include coverage for an entry if that processing is actually desired to be (is yet to be) performed for the fragments represented by the entry (as indicated by the indications 100173, 100174 discussed with regards to FIG. 89). In this regard, if depth or colour processing has already been performed for an entry (or is otherwise not desired to be performed for the list entry), it will not cause dependency issues for later entries in the list, and so the coverage for the entry does not need to be incorporated into the depth or colour, as appropriate, accumulated coverage mask.

For example, each list entry might typically go through 3 stages:

1. Wanting to write zs buffer (depth processing desired), wanting to write colour buffer (colour processing desired);
2. Wanting to write colour buffer (colour processing desired) (no longer desiring z processing) (colour is usually the last write);
3. Finished accessing buffers (neither of colour and depth processing desired).

For entries in stage 1, the scan coverage accumulation will happen for colour and depth.

For entries in stage 2, the scanner will only accumulate colour coverage

For entries in stage 3, the scanner will not accumulate any coverage (such entries are essentially marked as 'retired' (for deletion) and will be removed from the linked list).

The use of separate depth and colour accumulated coverage masks allows desired depth and colour processing to be tracked independently.

Figure 88:
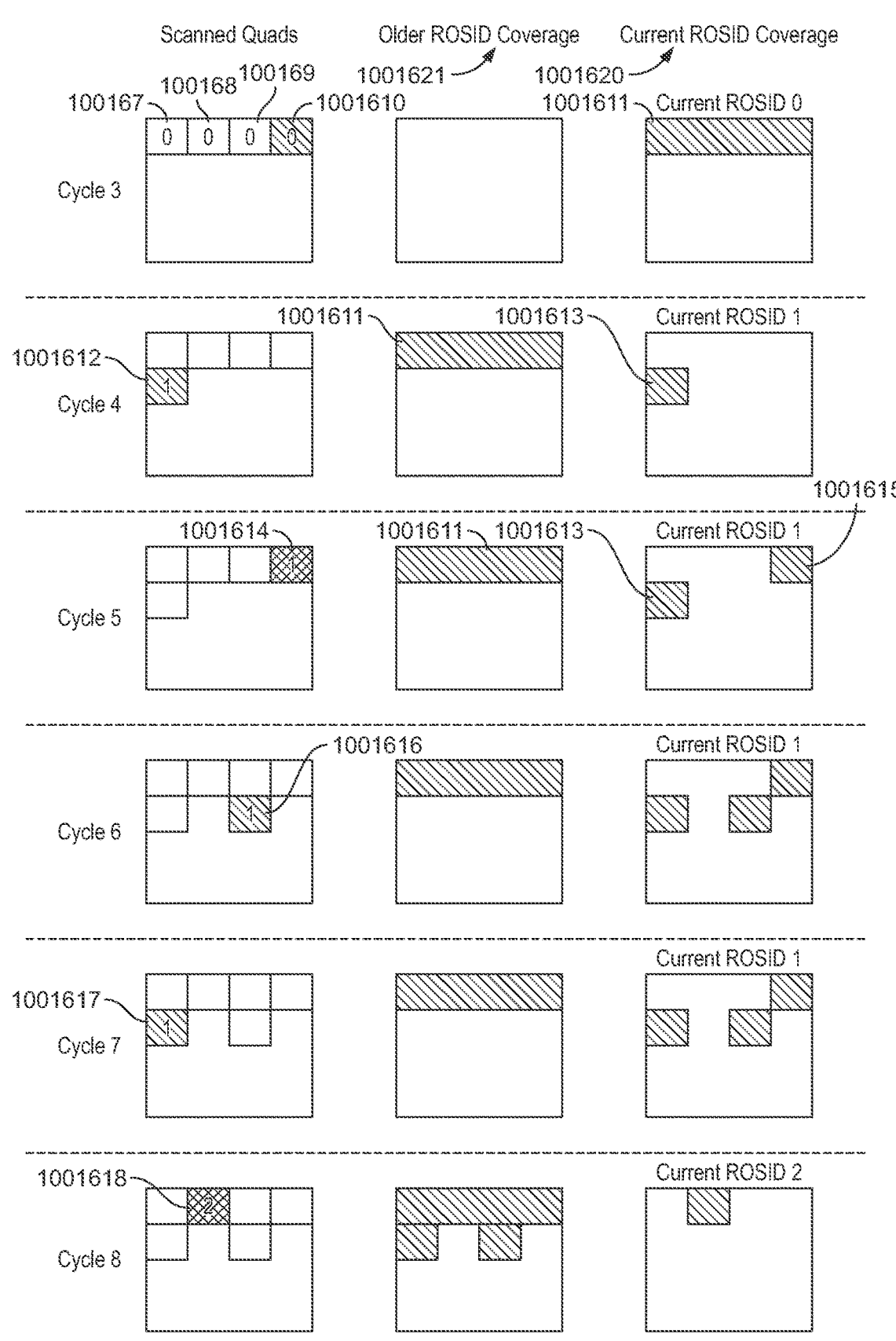
FIG. 88 shows the accumulation of coverage masks for tile sub region fragment list entries in an embodiment of the technology described herein.

FIG. 88 shows an example of the accumulation of coverage masks for updating colour read-only operation eligibility information during a scan of a list.

As noted above, to assist with managing the dependencies of colour read operations, each list entry indicates a group classification (the ROS ID) for the fragments represented by the list entry. Fragments falling within the same classification group (having the same ROS ID) are allowed to perform colour read operations in any fragment order (regardless of whether or not those fragments relate to overlapping parts of the tile sub-region, and regardless of whether other colour processing, e.g. write, dependencies may exist among those fragments). However, fragments falling within different classification groups (having different ROS IDs) will be processed according to their classification group (ROS ID) order when they relate to overlapping parts of a tile sub-region.

Therefore, when setting the colour read-only operation eligibility information, the coverage of an entry representing one or more fragments with a (current) ROS ID is compared against an accumulated coverage for any earlier entries having different (earlier) ROS IDs. If the entry in question (with the current ROS ID) overlaps the accumulated coverage for the earlier ROS ID(s), then the eligibility indication for colour read operations will be set to "not eligible" for that entry (and the entry in question is thus considered not to be an "oldest" entry for the processing in question for the part of the tile sub-region to which the entry relates).

Conversely, if the entry in question does not overlap the accumulated coverage for earlier ROS IDs, then the entry in question will be marked as "eligible" to perform colour read operations (and is thus considered to be an "oldest" entry for the processing in question for the part of the tile sub-region to which the entry relates).

In order to facilitate this operation, when performing scanning for updating colour read-only eligibility information, a first accumulated coverage for accumulating the coverage of earlier entries having a different (earlier) ROS ID is (therefore) maintained. A second accumulated coverage is also maintained for accumulating the coverage for earlier entries having the 'current' ROS ID. Then, when a new ROS ID is encountered, the 'current' ROS ID accumulated coverage is added to 'earlier' ROS ID accumulated coverage. This allows the 'earlier' ROS ID coverage to be tracked and updated. This is shown in FIG. 88.

As shown in FIG. 88, in the first four cycles (up to Cycle 3), the scanner considers in turn entries 100167, 100168, 100169, and 1001610 in the list for the tile-subregion, which each represent a group of fragments. Each of these entries have the same ROS ID (which is 0), and so their coverage 1001611 is accumulated into the "current" ROS ID accumulated coverage 1001620 (which is currently accumulating coverage for ROS ID 0 entries). The colour read-only eligibility indication (the ROS dependency 100179 shown in FIG. 89) for each of these entries is set to indicate that these entries are eligible to perform colour reads (that no dependency arises as a result of ROS IDs), since the entries do not overlap with any "older" ROS ID coverage 1001621, which is currently empty).

The scanner then considers the next entry 1001612 in the list, which has a ROS ID of 1. Due to this new ROS ID, the previous "current" ROS ID accumulated coverage 1001611 is added to (OR'd into) the "older" ROS ID accumulated coverage 1001621 (such that the "older" ROS ID accumulated coverage now shows the coverage for ROS ID 0). The "current" ROS ID accumulated coverage is then updated so as to accumulate the coverage 1001613 for the ROS ID 1 entry 1001612 (only). Since the coverage of the entry 1001612 does not overlap the "older" ROS ID accumulated coverage 1001611, the colour read-only eligibility indication for the entry 1001612 is set to "eligible" (the ROS dependency information for the entry 1001612 is set to indicate that no ROS dependency exists).

The scanner then considers the next entry 1001614 in the list, which has ROS ID of 1. The coverage 1001615 for the new entry is therefore accumulated into the "current" ROS ID coverage which is being maintained for ROS ID 1. The coverage of the entry 1001614 overlaps with the accumulated coverage for the "older" ROS ID 1001611, and so the colour read-only eligibility indication for the entry 1001614 is set to "not eligible" (the ROS dependency for entry 1001614 is set to indicate that a ROS dependency exists).

The scanner then considers the next entry 1001616 in the list, which has ROS ID of 1. The coverage for entry 1001616 is therefore accumulated into the "current" ROS ID accumulated coverage which is being maintained for ROS ID 1. The coverage of the entry 1001616 does not overlap with the accumulated coverage for the "older" ROS ID, and so the colour read-only eligibility indication for the entry 1001616 is set to "eligible" (the ROS dependency for entry 1001616 is set to indicate that a ROS dependency does not exist).

The scanner then considers the next entry 1001617 in the list, which has ROS ID of 1. The coverage for entry 1001617 is therefore accumulated into the "current" ROS ID accumulated coverage which is being maintained for ROS ID 1. The coverage of the entry 1001617 does not overlap with the accumulated coverage for the "older" ROS ID, and so the colour read-only eligibility indication for the entry 1001617 is set to "eligible" (the ROS dependency for entry 1001617 is set to indicate that a ROS dependency does not exist). The fact that an earlier entry having the same ROS ID and position (i.e. the coverage of entry 1001617 overlaps the "current" ROS ID accumulated coverage) does not cause any colour read processing dependency (ROS dependency) to arise.

The scanner then considers the next entry 1001618 in the list, which has ROS ID of 2. Due to this new ROS ID being encountered by the scanner, the previous "current" ROS ID accumulated coverage is added to (OR'd into) the "older" ROS ID accumulated coverage (such that the "older" ROS ID accumulated coverage now includes the coverage for ROS IDs 0 and 1). The "current" ROS ID accumulated coverage is then updated so as to accumulate the coverage for ROS ID 2 entries (only). Since the coverage of the entry 1001618 overlaps with the "older" ROS ID accumulated coverage, the colour read-only eligibility indication for the entry 1001618 is set to "not eligible" (the entry 1001618 is set to indicate that a ROS dependency exists).

Similarly to the discussion above, in the present embodiments, accumulated coverage maps for colour read-only operations (the "current" ROS ID and "older" ROS ID accumulated coverage maps) are only updated to include coverage for an entry if colour processing is actually desired to be (is yet to be) performed for the fragments represented by the entry.

In an embodiment, whether colour processing is desired to be performed is indicated in the (general) colour processing 'should be considered for' indication (indication 100173 discussed with regards to FIG. 89). Alternatively, if desired, a separate 'should be considered for' indication could be provided specifically for colour buffer read-only operations.

FIGS. 91 to 95 show an example sequence of groups of fragments/threads ("quads") being added to a tile sub region fragment list, with the corresponding states of the list entries and the list management information, and the information that is output by the fragment dependency manager, as the entries are added to the list.

Figure 91:
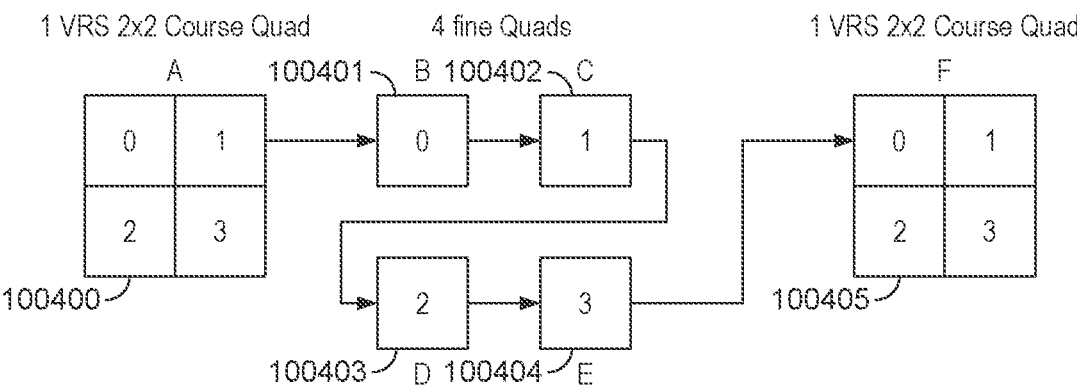
FIGS. 91 to 95 show the adding of an exemplary sequence of fragments to be processed to a tile sub region fragment list in an embodiment of the technology described herein.

As shown in FIG. 91, in this example it is assumed that there is a first group of fragments for a first primitive corresponding to a single VRS 2×2 coarse quad 100400 "A" covering the "fine quad" positions "0, 1, 2 and 3" in the tile sub region in question, followed by a sequence of four fine quads 100401 "B", 100402 "C", 100403 "D", and 100404 "E", for a second, overlapping primitive, covering the fine quad positions 0, 1, 2 and 3, respectively, followed by a further VRS 2×2 coarse quad 100405 "F" for a third primitive that covers all of the positions 0, 1, 2 and 3.

Figure 92:
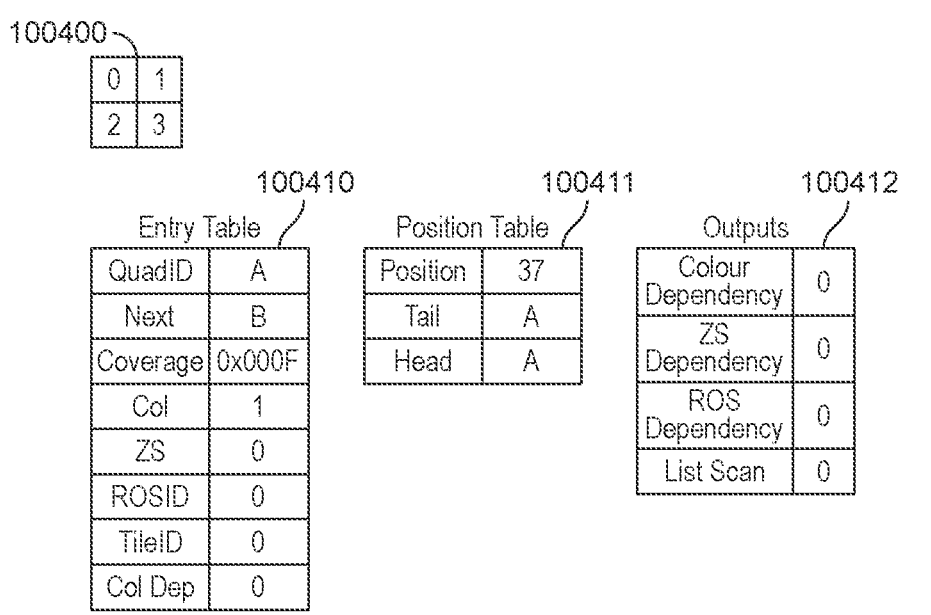

FIG. 92 shows the list entry and list information (metadata) that are generated for the first VRS 2×2 coarse quad 100400 A.

As shown in FIG. 92, the list entry 100410 for this 2×2 coarse quad 100400 (which will be the first entry in the list) includes the relevant identifier "A" for the quad. The next pointer for the entry is set to point, as shown in FIG. 92, to itself (as there are no other entries in the list at this stage). The coverage mask is set to show that all four positions 0, 1, 2 and 3 are covered.

In the present case, it is assumed that the quad 100400 only wishes to perform colour updates, so the "should be considered for colour" flag ("Col") (but not the should be considered for depth flag ("ZS"), for example) is set to 1. Also, as this is the first entry in the list, it cannot have any dependency for its colour write update on any other entry in the list and so it is set to indicate that it has no such dependency (that it is eligible to perform colour updates) by setting the "Col Dep" indicator to 0 (no dependency).

With reference to FIG. 92, the sub-region list management table (position table) 100411 is updated to set the tail and head pointers for the relevant sub region position "37" (e.g.) to point to this first entry.

The fragment dependency manager also outputs 100412 an indication of the dependencies that the entry has (which in this case is none) (for the purpose of setting the corresponding thread group (warp) dependency state and counts, as discussed above), and whether the tile sub region list needs scanning to see if it needs updating (which it does not).

Figure 93:
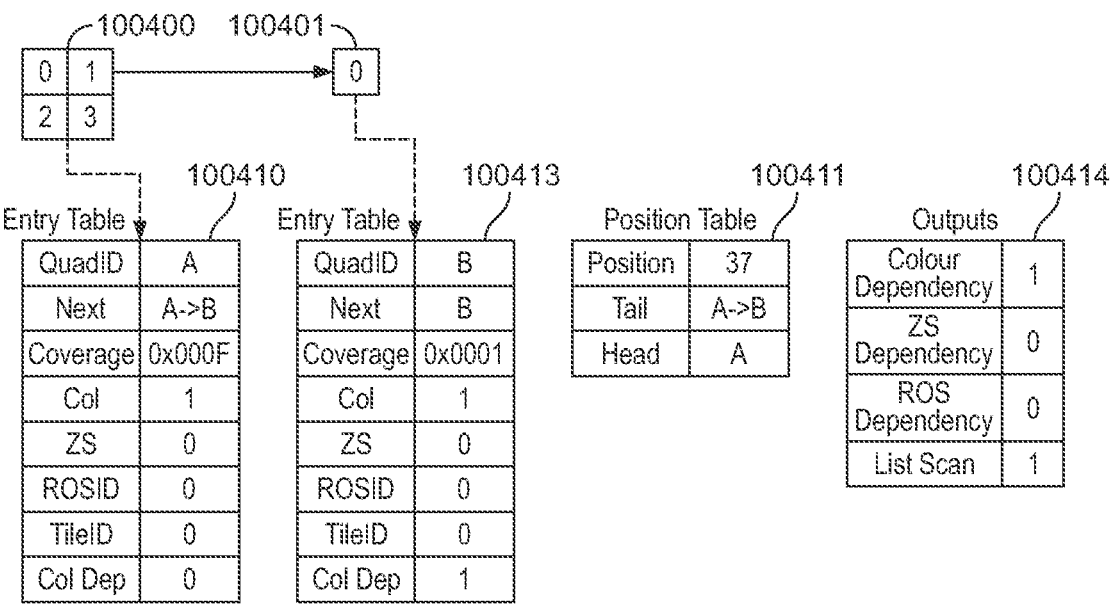

FIG. 93 shows the addition of the first fine quad 100401 "B" (having position "O") to the list. In this case, as shown in FIG. 93, a new entry 100413 for that quad (having the identity "B") is added, with the next pointer for the entry set to point to itself, the coverage mask appropriately set (but covering position "0" only) and again it being indicated (and assumed) in this case that the quad only wishes to perform a colour update. In this case, as there is the earlier entry 100410 (for the quad 100400 "A") in the list, the entry 100413 for the quad 100401 is set to indicate that that quad has a colour dependency (as shown in FIG. 93).

The fragment dependency manager also accordingly outputs 100414 for the quad 100401 an indication that it has a colour dependency (for the purpose of setting the corresponding thread group (warp) dependency state and counts, as discussed above), and also that the tile sub region list has been updated and so should be scanned.

As shown in FIG. 93, the next pointer in the entry 100410 for the quad 100400 "A", and the tail pointer for the list information 100411 are also correspondingly updated to point to the entry for the new quad "B".

Figure 94:
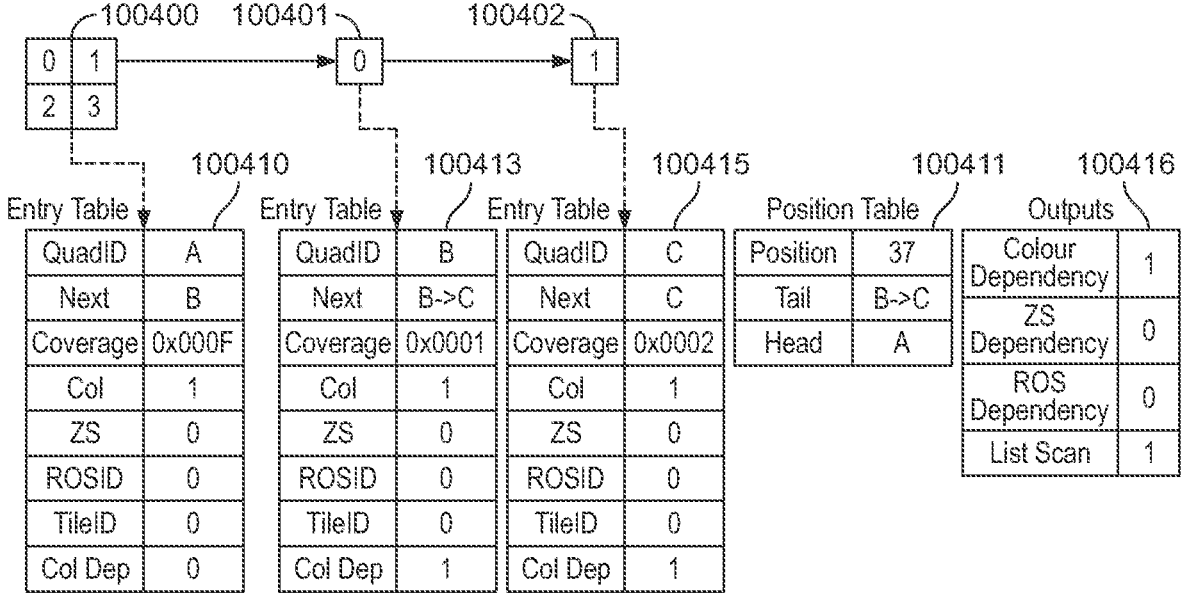

FIG. 94 shows the addition of the second fine quad 100402 "C" (having position "1") to the list. In this case, as shown in FIG. 94, a new entry 100415 for that quad (having the identity "C") is added, with the next pointer for the entry set to point to itself, the coverage mask appropriately set (but covering position "1" only) and again it being indicated (and assumed) in this case that the quad only wishes to perform a colour update. In this case, as again there are earlier entries in the list, the entry 100415 for the quad 100402 is set to indicate that that quad has a colour dependency.

The fragment dependency manager also accordingly outputs 100416 for the quad 100402 an indication that it has a colour dependency, and also that the tile sub region list has been updated and so should be scanned.

As shown in FIG. 94, the next pointer in the entries 100413 for the quad 100401 "B" and the tail pointer for the list information 100411 are also correspondingly updated to point to the entry for the new quad 100402 "C".

The further fine quads 100403 and 100404, "D" and "E", having the positions "2" and "3" will correspondingly be added to the list.

Figure 95:
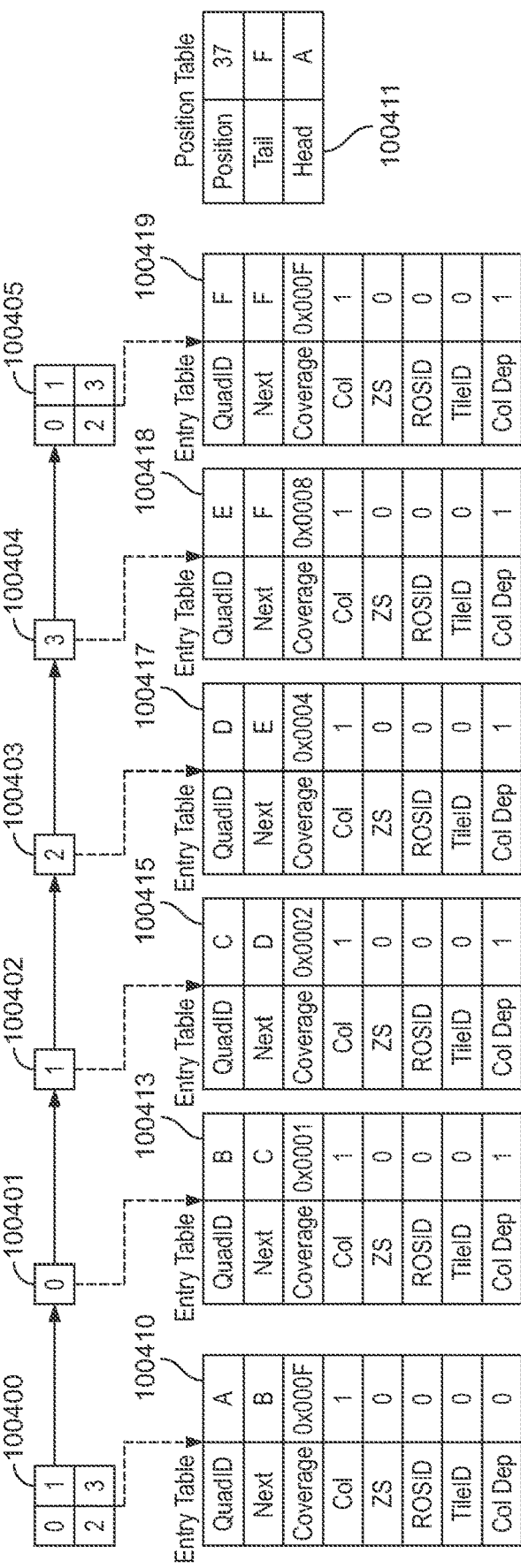

FIG. 95 shows the state of the list after the final, larger, VRS 2×2 coarse quad 100405 "F" (covering all four positions 0, 1, 2 and 3) has been is added to the list.

The information associated with the data entries in an embodiment corresponds to that described with regards to FIG. 89. However, for the sake of readability, the "ZS Dep", "ROS Dep" and "Retire" indications are not shown in FIGS. 92 to 95.

In the example of FIGS. 92 to 95, since the fragment/execution threads quads "A", "B", "C", "D", "E" and "F" do not wish to perform depth processing (as indicated by the ZS indication being set to 0), for each of these entries, no depth processing eligibility information is set.

In the example of FIGS. 92 to 95, the entry at the head of the list is indicated by the "head" pointer in the list information 100411. Alternatively, the "next" pointer of the entry at the tail of the list could be used to point to (indicate) the entry which is at the head of the list.

Figure 97:
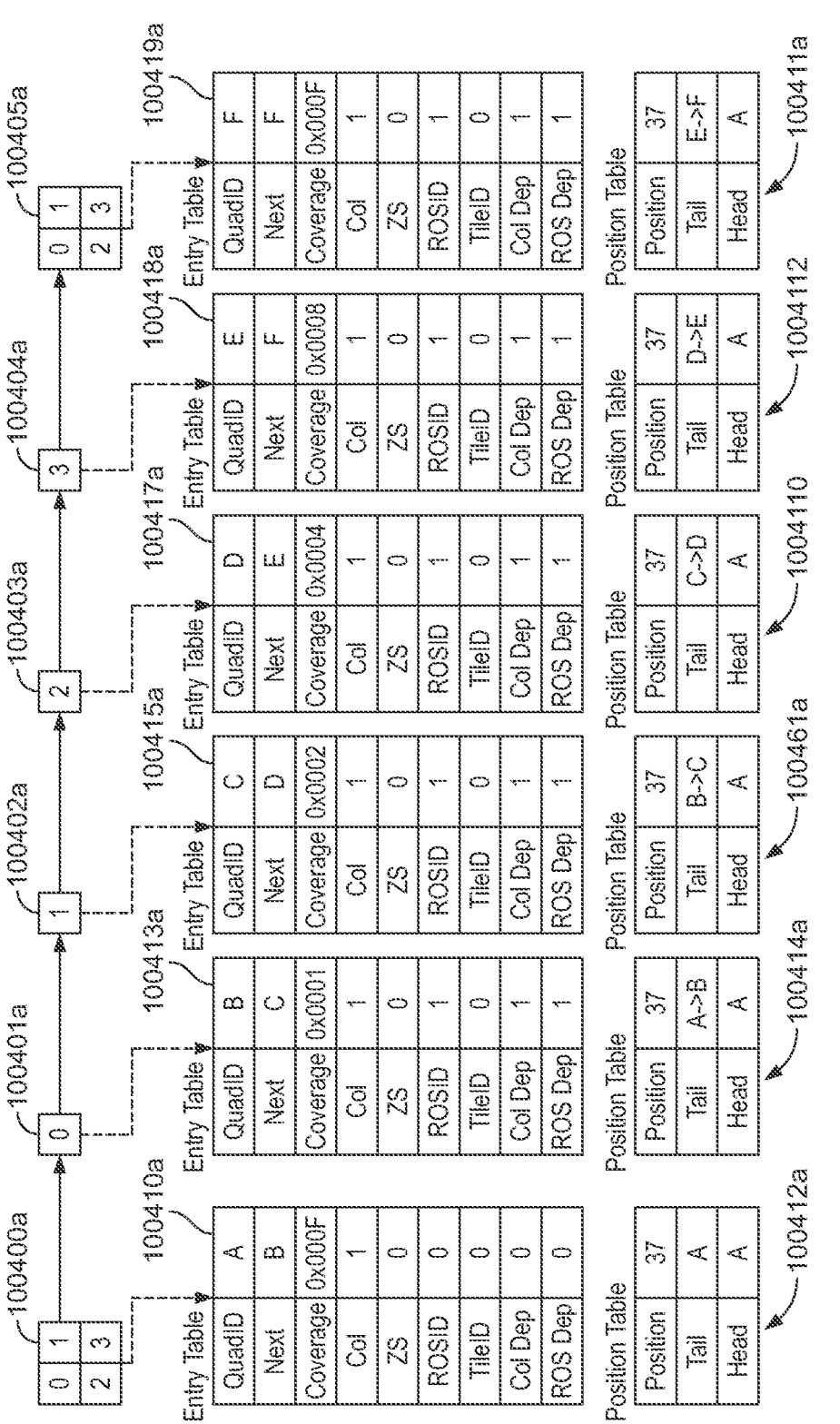
FIG. 97 shows the adding of an exemplary sequence of fragments to be processed to a tile sub-region fragment list in an embodiment of the technology described herein in which a Raster Order State is provided for the list entries.

FIG. 97, similarly to FIG. 95 shows a state of a list as entries for various quads 100400a ("A"), 100401a ("B"), 100402a ("C"), 100403a ("D"), 100404a ("E"), 100405a ("F") are added to the list. The next pointer ("next"), coverage indication ("coverage"), colour 'should be considered for' indication ("Col"), Z 'should be considered for' indication ("ZS"), and colour eligibility information ("Col Dep.") for each of the entries is set in a similar manner as discussed with regards to FIG. 95. Similarly to the discussion with regards to FIG. 95, when each next entry is added, the metadata for the list ("position table") 100412a, 100414a, 100416a, 1004110, 1004112, 100411a, is updated to point to the new tail of the list.

Additionally, FIG. 97 shows setting the colour read-only eligibility information (ROS Dep) as entries are added to the list. In particular, for the first entry in the list 100410b the colour read-only eligibility information is set to be "eligible" (i.e. the ROS dependency information is set to indicate that no dependency exists), whereas for all subsequent entries in the list 100413a, 100415a, 100417a, 100418a, 100419a, the colour read eligibility information is set to be "not eligible" (the ROS dependency information is set to indicate that a dependency (potentially) exists).

Alternatively (or additionally), the ROS dependency information for a new entry added to the list may be set to indicate that no ROS dependency exists when the ROSID change flag (e.g. flag 100185 described with respect to FIG. 90) for the list indicates that no change in ROSID exists within the list (all list entries relate to the same ROSID). Conversely, the ROS dependency information for a new entry may be set to indicate that a ROS dependency (potentially) exists when the ROSID change flag for the list indicates that a change in ROSID exists within the list (i.e. if entries in the list relate to plural different ROS IDs). The ROSID change flag may be updated, e.g. when entries are added to the list, e.g. being set to indicate that a ROSID change exists in response to a new entry being added having a ROSID which is different from the ROSID of the entry at the head of the list (as indicated by the ROSID indication 100184 for the list described with respect to FIG. 90)

Figure 96:
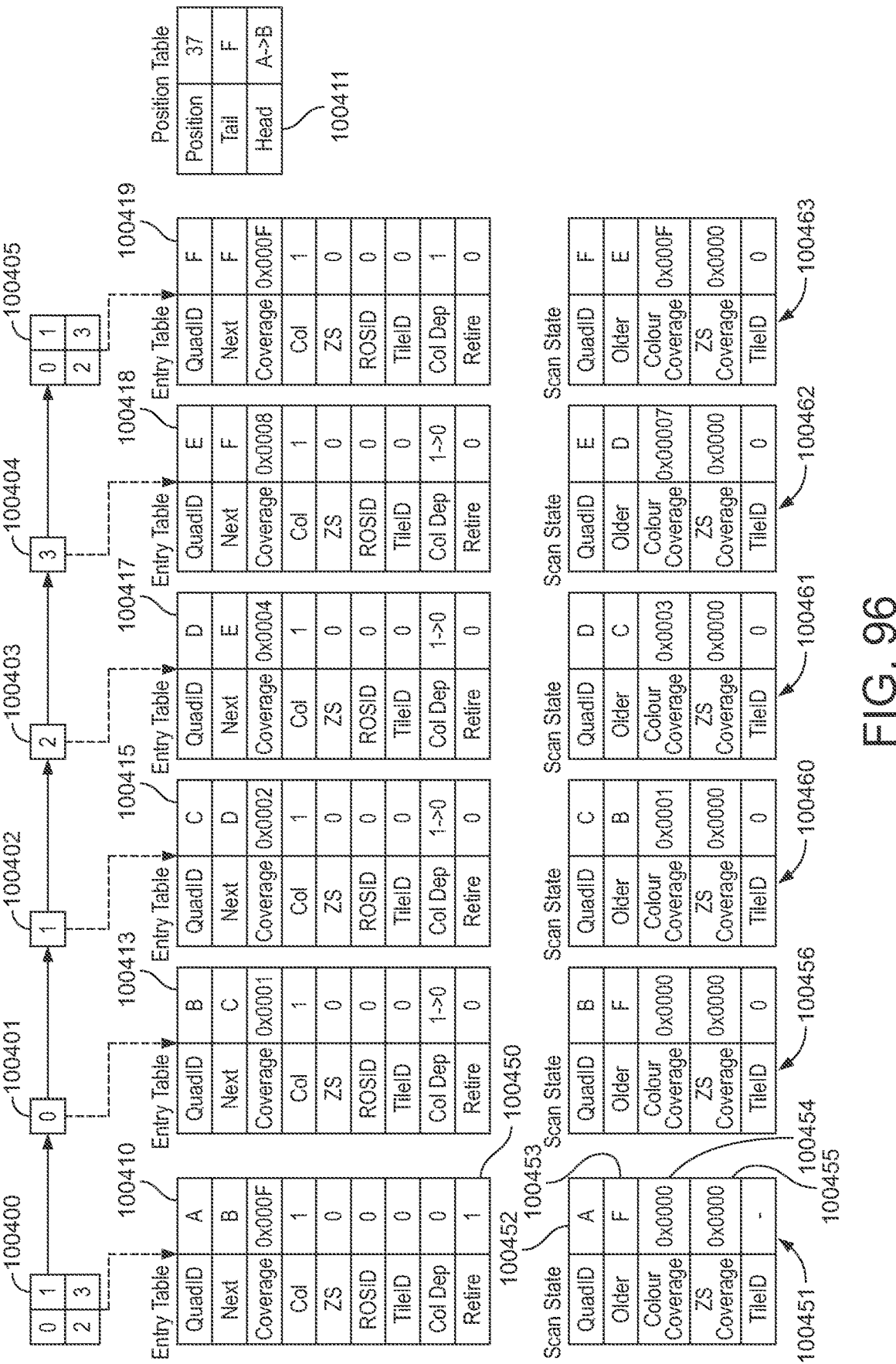
FIG. 96 illustrates the removal of an entry from a tile sub region fragment list in an embodiment of the technology described herein.

FIG. 96 shows the operation of a scan of the sub region list shown in FIG. 95 when the first coarse VRS quad 100400 "A" has finished its processing and so is marked 100450 in its entry as to retire. The marking in the entry 100410 for the quad 100400 to retire will, as discussed above, trigger a scan of the sub region list in question.

FIG. 96 shows the list entries and corresponding scan state that is maintained by the scanner as each entry in the list is scanned.

As shown in FIG. 96, at the start of the first scan cycle, when the entry 100410 for the quad 100400 will be scanned, the corresponding scan state 100451 before that entry 100410 has been scanned indicates that the entry for the first quad 100400 "A" is the entry that is to be/being scanned and that the previous entry 100453 in the list that was scanned (which in this case will be the tail of the list (from the previous scan)) was the entry for quad 100405 "F". The scan state 100451 also include the accumulated colour coverage 100454 and depth coverage 100455 for the scan. As the scan is currently at the first entry in the list, as shown in FIG. 96 there is no accumulated coverage at this stage of the scan for colour or depth before the first entry 100410 is scanned.

The scan of the entry 100410 for the first quad 100400 A will identify that that entry can be deleted (as indicated by the Retire flag being set to 1), and so the scanner will operate to delete that entry from the tile sub-region list.

As shown in FIG. 96, the list management information 100411 is also updated to show that the head of the list is now the entry for the second quad 100401 "B" as the entry for the first quad 100400 "A" has been deleted from the list.

The scanner will then move on to the next entry 100413 for the second quad 100401 "B".

As shown in FIG. 96, the scan state 100452 when beginning the scan for the entry for the second quad 100401 "B" indicates that it is the entry 100413 for quad "B" that is to be/being scanned, and that the previous entry is the tail quad 100405 F (as the head quad 100400 "B" that was the entry prior to the entry 100413 for the second quad 100401 "B" has been deleted, and so the preceding entry in the list is now the tail of the list). The scan state 100452 also indicates that there is no accumulated coverage yet for colour or depth (as the first entry 100410 in the list for the first quad 100400 "A" has been deleted, and so there is no coverage for either colour or depth for the list yet). The scan state 100456 also indicates the Tile ID of the previously considered list entry which is "0".

In this case, the entry 100413 for the second quad 100401 "B" does not indicate that that entry is to be deleted, and so, as the entry 100413 for the second quad 100401 "B" indicates that that quad is to be considered for colour processing, the scan will compare the indicated coverage in the entry 100413 for the quad 100401 "B" with the accumulated scan coverage for colour in the scan state 100456.

This comparison will determine that the second quad 100401 "B" does not overlap with the accumulated colour coverage (as the accumulated colour coverage is zero at this point in the scan), and so does not overlap with any preceding entry in the list, and so, as shown in FIG. 96, the scan will change the colour dependency eligibility setting for the quad 100401 "B" in its list entry 100413 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 100401 "B", to thereby decrement the colour update dependency count for the thread group (warp) in question.

The scan will also accumulate the coverage for the second quad 100401 "B" into its accumulated colour coverage (as the quad "B" is to perform colour updates). However, as the quad "B" is not indicated as applicable to depth updates, the coverage for the quad "B" will not be added to the accumulated depth coverage (that will remain as "zero" coverage for depth). The Tile ID of the second quad 100401 "B" is "0", which is the same as the Tile ID currently stored in the scan state 100456, and so the Tile ID stored in the scan state remains "0".

The scanner will then move on to the next entry 100415 for the third quad 100402 "C".

As shown in FIG. 96, the scan state 100460 when beginning the scan for the entry for the third quad 100402 "C" indicates that it is the entry 100415 for quad "C" that is to be/being scanned, and that the previous list entry is the preceding quad 100401 "B". The scan state 100460 also indicates the coverage of quad "B" as the accumulated coverage for colour (and zero accumulated coverage for depth).

As the entry 100415 for the third quad 100402 "C" does not indicate that that entry is to be deleted, and as the entry 100415 for the third quad 100402 "C" indicates that that quad is to undergo colour processing, the scan will compare the indicated coverage in the entry 100415 for the quad 100402 "C" with the accumulated scan coverage for colour in the scan state 100460.

This comparison will determine that the third quad 100402 "C" does not overlap with the accumulated scan colour coverage (as the accumulated colour coverage is just the coverage of the second quad 100401 "B" at this point in the scan), and so does not overlap with any preceding entry in the list, and so, as shown in FIG. 96, the scan will change the colour dependency eligibility setting for the quad 100402 "C" in its list entry 100415 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 100402 "C".

The scan will also accumulate the coverage for the third quad 100402 "C" into its accumulated colour coverage (as the quad "C" is to perform colour updates). However, as the quad "C" is not indicated as performing depth updates, the coverage for the quad "C" will not be added to the accumulated depth coverage (that will remain as "zero" coverage for depth).

The scanner will then move on to the next entry 100417 for the fourth quad 100403 "D".

As shown in FIG. 96, the scan state 100461 when beginning the scan for the entry for the fourth quad 100403 "D" indicates that it is the entry 100417 for quad "D" that is to be/being scanned, and that the previous list entry is the preceding quad 100402 "C". The scan state 100461 also indicates the coverage of quads "B" and "C", 100401, 100402 as the accumulated coverage for colour (and zero accumulated coverage for depth).

As the entry 100417 for the fourth quad 100403 "D" does not indicate that that entry is to be deleted, and as the entry 100417 for the fourth quad 100403 "D" indicates that that quad is to undergo colour processing, the scan will compare the indicated coverage in the entry 100417 for the quad 100403 "D" with the accumulated scan coverage for colour in the scan state 100461.

This comparison will determine that the fourth quad 100403 "D" does not overlap with the accumulated scan colour coverage (as the accumulated colour coverage is the coverage of the second quad 100401 "B" and the third quad 100402 "C" at this point in the scan), and so does not overlap with any preceding entry in the list, and so, as shown in FIG. 96, the scan will change the colour dependency eligibility setting for the quad 100403 "D" in its list entry 100417 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 100403 "D".

The scan will also accumulate the coverage for the fourth quad 100403 "D" into its accumulated colour coverage (as the quad "D" is to perform colour updates). However, as the quad "D" is not indicated as performing depth updates, the coverage for the quad "D" will not be added to the accumulated depth coverage (that will remain as "zero" coverage for depth).

The scanner will then move on to the next entry 100418 for the fifth quad 100404 "E".

As shown in FIG. 96, the scan state 100462 when beginning the scan for the entry for the fifth quad 100404 "E" indicates that it is the entry 100418 for quad "E" that is to be/being scanned, and that the previous list entry is the preceding quad 100403 "D". The scan state 100462 also indicates the coverage of quads "B", "C" and "D", 100401, 100402, 100403 as the accumulated coverage for colour (and zero accumulated coverage for depth).

As the entry 100418 for the fifth quad 100404 "E" does not indicate that that entry is to be deleted, and as the entry 100418 for the fifth quad 100404 "E" indicates that that quad is to undergo colour processing, the scan will compare the indicated coverage in the entry 100418 for the quad 100404 "E" with the accumulated scan coverage for colour in the scan state 100462.

This comparison will determine that the fifth quad 100404 "E" does not overlap with the accumulated scan colour coverage (as the accumulated colour coverage is the coverage of the second quad 100401 "B", the third quad 100402 "C" and the fourth quad 100403 "D" at this point in the scan), and so does not overlap with any preceding entry in the list, and so, as shown in FIG. 96, the scan will change the colour dependency eligibility setting for the quad 100404 "E" in its list entry 100418 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 100404 E.

The scan will also accumulate the coverage for the fifth quad 100404 "E" into its accumulated colour coverage (as the quad "E" is to perform colour updates). However, as the quad "E" is not indicated as performing depth updates, the coverage for the quad "E" will not be added to the accumulated depth coverage (that will remain as "zero" coverage for depth).

The scanner will then move on to the next entry 100419 for the sixth quad 100405 "F".

As shown in FIG. 96, the scan state 100463 when beginning the scan for the entry for the sixth quad 100405 "F" indicates that it is the entry 100419 for quad "F" that is to be/being scanned, and that the previous list entry is the preceding quad 100404 "E". The scan state 100463 also indicates the coverage of quads "B", "C", "D", and "E", 100401, 100402, 100403, 100404, as the accumulated coverage for colour (and zero accumulated coverage for depth).

As the entry 100419 for the sixth quad 100405 "F" does not indicate that that entry is to be deleted, and as the entry 100419 for the sixth quad 100405 "F" indicates that that quad is to undergo colour processing, the scan will compare the indicated coverage in the entry 100419 for the quad 100405 "F" with the accumulated scan coverage for colour in the scan state 100463.

This comparison will determine that the sixth quad 100405 "F" does overlap with the accumulated scan colour coverage, and so does overlap with a preceding entry in the list. Thus, in this case, as shown in FIG. 96, the scan does not change the colour dependency eligibility setting for the quad 100405 "F" in its list entry 100419, but rather leaves that entry as indicating that the quad 100405 "F" has a dependency for colour updates on an earlier entry in the list (i.e. is not eligible (permitted) to perform colour updates) (and does not send an is "eligible (permitted) to perform colour updates" (an "is oldest") signal for the quad 100405 "F").

This completes this scan of the list.

Whilst depth (ZS) processing eligibility information is not discussed with respect to FIG. 96, it would be set in a similar manner as the colour eligibility information (by accumulating coverage for those entries indicated as 'should be considered for' for depth processing, and setting the eligibility indication for entries to be considered for depth processing to indicate that depth processing is eligible to be performed if the coverage of the entry in question does not overlap with the accumulated coverage for depth processing). For instance, in the example shown in FIG. 96, none of the entries are applicable to depth processing, and so no coverage will be accumulated into the depth accumulated coverage, and none of the entries will be marked as 'eligible' to perform depth processing.

Figure 98:
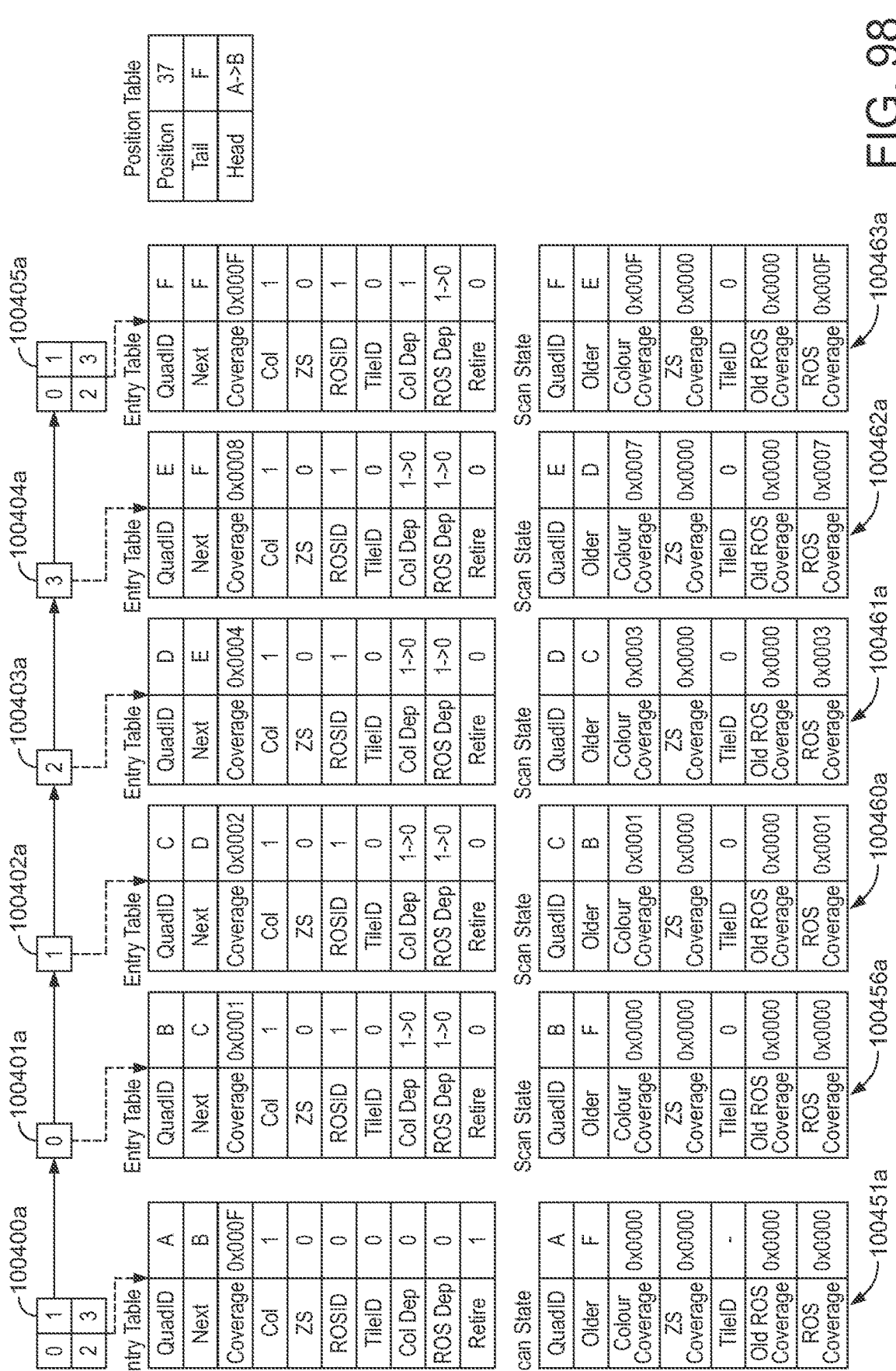
FIG. 98 illustrates the removal of an entry from a tile sub region fragment list in an embodiment of the technology described herein where a Raster Order State is provided for the list entries.

FIG. 98 is another example of a scanning process, showing in particular the updating of ROS dependency information for the list entries.

In the example shown in FIG. 98, similarly to FIG. 96, the lists entries representing quads 100400*b* ("A"), 100401*b* ("B"), 100402*b* ("C"), 100403*b* ("D"), 100404*b* ("E"), 100405*b* ("F") are considered in turn and the colour processing eligibility information ("Col. Dep") and depth processing eligibility information ("Z Dep") (not shown) are updated.

Regarding colour read-only processing eligibility information ("ROS dep"), when considering the first entry in the list (in respect of quad 100400*a* ("A"), since the list entry is marked for deletion 100450*a*, the coverage for the list entry is not accumulated into the current ROS accumulated coverage maintained by the scanner 100451*a* (which accordingly remains empty (0x0000) as shown at 100456*a*). The old ROS accumulated coverage also remains empty.

Similarly to FIG. 96, since the first list entry is marked for deletion, it is deleted from the list by the scanner, and the position table 100411*a* for the list is updated to show the new head of the list (which is quad "B").

When considering the next entry 100413*a* in the list (in respect of quad 100401*a* ("B")), the ROS ID of this list entry is 1, and does not overlap with the old ROS coverage maintained by the scanner 100456*a* (which is empty), and so the scanner determines that the entry is eligible to perform colour read operations (no ROS dependency exists), and updates the list entry 100413*a* accordingly (to indicate that no ROS dependency exists). The scan state is then updated 100460*a* to accumulate the coverage of list entry 100413*a* into the current ROS accumulated coverage (which is tracking coverage for ROS ID 1), such that the current ROS coverage is 0x0001.

When considering the next entry 100415*a* in the list (in respect of quad 100402*a* ("C")), the ROS ID of this list entry is 1, and does not overlap with the old ROS coverage maintained by the scanner 100460*a*, and so the scanner determines that entry is eligible to perform colour read operations (no ROS dependency exists) and updates the list entry 100415*a* accordingly (to indicate that no ROS dependency exists). The scan state is then updated 100461*a* to accumulate the coverage of list entry 100415*a* into the current ROS accumulated coverage (which is tracking coverage for ROS ID 1), such that the current ROS coverage is 0x0003.

Similarly, list entries 100417*a* and 100418*a* have the same ROS ID of 1 and do not overlap the old accumulated ROS coverage, and so the scanner determines that these entries are eligible to perform colour read operations (no ROS dependency exists for these list entries), and the scan state is updated to accumulate the coverage of these list entries into the current ROS accumulated coverage.

When considering the final entry 100419*a* in the list (in respect of quad 100405*a* ("F")), the ROS ID of this list entry is 1. This entry does not overlap with the old ROS accumulated coverage maintained by the scanner 100463*a*, and so the scanner determines that the entry is eligible to perform colour read operations (no ROS dependency exists), and updates the list entry 100415*a* accordingly (to indicate that no ROS dependency exists). The fact that the entry overlaps with the current ROS accumulated coverage indicated in scan state 100463*a* does not affect the eligibility to perform colour read operations (and indeed, the coverage of the entry is only compared against the old ROS accumulated coverage, and not the current ROS accumulated coverage for the purpose of determining eligibility).

In an alternative scenario, if the final entry 100419*a* in the list had a ROS ID of 2 instead, in view of a new ROS ID being encountered by the scanner, the current ROS accumulated coverage maintained by the scanner 100463*a* (which is currently fully covered, being 0X000F) would be added to (OR'd into) the old ROS accumulated coverage so that the old ROS accumulated coverage would become 0x000F. Then, since the list entry would overlap with the old ROS accumulated coverage, and so a ROS dependency would exist, the list entry 100419*a* would be updated to indicate that a ROS dependency exists.

A number of additions, alterations and modifications to the above described embodiments would be possible, if desired.

For example, although the above embodiments have simply described adding a new group of fragments (a new thread quad) as a new entry at the end of an existing tile sub region list (or starting a new tile sub region list for the new entry), the Applicant has recognised that in certain circumstances it may be possible to merge a new group of fragments (a new thread quad) into an existing entry in a list, and that doing so would reduce the number of entries in a list (thereby, potentially, leading to improved efficiency in the handling and using of the lists).

Thus in an embodiment, when a new group of fragments/corresponding execution threads falls to be added to an existing sub region list, it is first determined whether the new group of fragments/threads can be added to (merged into) the existing tail entry of the list.

This is in an embodiment based on whether the new set of execution threads (for the new group of fragments) belong to the same thread group (warp) as the execution threads represented by the existing entry at the tail of the list. If so, then the new group of fragments/execution threads can be, and is in an embodiment, merged into the existing list entry (but if not, then a new list entry is created for the new group of fragments/execution threads).

The Applicant has recognised in this regard that fragment groups/execution threads which are to be processed within a same thread group (warp), should not (will not) not overlap one another and so will not be dependent on one another, and can therefore be tracked using (merged into) the same list entry.

When merging into an existing entry, the coverage mask for the existing entry is updated to additionally represent the coverage of the new group of fragments/threads that has been merged into the existing entry (as discussed with regards to FIG. 79 for example).

For the merged entry, the information indicating whether the entry should be considered for depth and colour processing operations is also updated to reflect whether the processing operation in question is to be considered for the new fragment group/threads.

When merging into a non head merged entry, the information indicating whether processing is eligible to be performed for particular processing operations (e.g. depth and colour processing operations) may already be set to indicate that a (potential) dependency issue exists (as discussed above) and so, in that case, when adding (merging) a new group of fragments/threads into the list entry, the information indicating whether processing is eligible to be performed for particular processing operations will remain indicating that a dependency potentially exists (and the list will retain its indication of needing scanning).

Alternatively, if the non-head merged entry does not already indicate that a (potential) dependency issue exists, then when adding (merging) a new group of fragments/threads into the list entry, since a dependency may potentially arise due to the newly represented (merged) group of fragments/threads, the information indicating whether processing is eligible to be performed for depth and colour processing is set to indicate that a (potential) dependency issue exists. As discussed above, this is in an embodiment done without actually determining whether a dependency actually exists. The list is also indicated as needing a background scan.

However, similarly to the above discussion, if the new fragments/threads are to be merged into a head of the list, then no dependency issue will exist, and so the eligibility information may be set accordingly (to indicate or remain indicating that no dependency exists).

To help identify whether or not an entry contains (represents) multiple (merged) fragment groups/threads, an indication of the "merged" fragment groups/thread (quads) may also or instead be maintained for the "merged" list entry. This indication may comprise a mask (e.g. a bitmap) identifying the threads (quads) within a thread group (warp) which are represented by (merged into) the list entry (wherein each thread, or in an embodiment each quad, is represented by a different data element (bit) in the mask (bitmap), which is accordingly set (e.g. to 1) when that thread (quad) is represented by the list entry).

When a fragment quad represented by a list entry has finished its processing (or is otherwise no longer required to perform processing) and is to be retired, in the case that the list entry represents (can represent) a single fragment quad only, the list entry will be marked for deletion (indicated as being able to be deleted) (e.g. by setting the indication 1001710 shown in FIG. 89 appropriately).

Alternatively, in the case that a list entry represents (can represent) plural fragment quads, then in an embodiment the list entry is marked for deletion (e.g. by setting indication 1001710) only when all fragments/thread indicated as being represented by the merged entry have completed their processing.

Similarly although the present embodiments has been described above with particular reference to the processing in respect of a single tile of a render output being generated, it will be appreciated that the operation in the manner of the present embodiments will be repeated for each tile of a render output that is being generated (where appropriate).

In this case, a set of tile sub region fragment lists could be maintained separately for each tile that is to be generated (and in one embodiment that is what is done).

However, in other embodiments, it would be possible simply to have single set of tile sub region fragment lists, with the fragments/execution threads for different tiles simply being added to the existing sub region lists as and when new tiles are started and new fragments/execution threads fall to be processed for new tiles.

In this case, a single set of tile sub region fragment lists will be used to track and manage dependencies for plural successive tiles to be rendered, for example. This may be particularly useful where, for example, the graphics processor is operable to begin processing for a (new) tile to be rendered before rendering is complete for a previous tile. Accordingly, in this case each list can contain list entries relating to a same sub-region (area) of one or more different (e.g. successive) tiles.

In this case, as shown in FIG. 89 for example, each entry in a tile sub region fragment list in an embodiment also identifies 100176 the tile that the group of fragments/execution threads in question belong to. This can then be, and is in an embodiment, used to determine whether a new entry, for example, belongs to the same tile as a preceding entry in a tile sub region fragment list, and whether and when the tile "changes" when walking (traversing) a list.

In this case therefore when a new group of fragments/corresponding execution threads falls to be added to an existing sub region list, it will first be determined whether the new group of fragments belongs to the same tile as the existing tail entry of the list. If so, then the new group of fragments/execution threads can be simply added in the manner discussed above (with the appropriate tile identifier included in the entry).

On the other hand if it is determined that the new group of fragments/threads to be added to the list relates to a new (different) tile (compared to the existing tail entry of the list), then the new list entry which is added will be treated as if it is a "first" entry in the list (since it is, in effect, the first entry for its tile). In particular, the information for the new list entry (for the new tile) will be set as discussed above when starting a new list.

Thus, in particular, since a new entry for the new tile will not depend on any previous entries in the list (since processing of different tiles is not dependent on one another), the information indicating whether processing is eligible to be performed for the new entry will be set to 'eligible'. Adding a new entry for a new tile will also not require a background scan to be pushed for the list.

Correspondingly, when a tile sub region list of this form is being scanned, the scanner will additionally keep track of which tile respective entries in a list that it is scanning relate to, and in particular determine whether the entry that is currently being considered (scanned) relates to the same tile as the previous entry or not.

In particular, if the next entry in the list is for a different tile, then the accumulated coverage mask for the scan will be cleared and the new coverage mask started for the new tile. (On the other hand, if the next entry relates to the same tile as the previous tile, then the accumulated coverage masks will be retained for use when considering that next entry.)

Other variations, additions and modifications would also or instead be possible, if desired.

For example, in addition to the information associated with the list entries and with the list discussed above, additional information may be stored and used for the purposes of the dependency tracking and managing the dependency lists.

For example, the total number of entries in a list may be tracked (e.g. using a counter which is incremented each time a new entry is added to a list and decremented when an entry is removed from the list).

Additionally, a total number of fragment groups which have outstanding (desired) processing (which is not yet completed) and for which the processing is not yet eligible to be performed (dependency not cleared) may be tracked (e.g. using a counter). A separate counter may be maintained for outstanding depth processing and for outstanding colour processing.

The above describes the "normal" operation when tracking and enforcing fragment processing order dependencies in the present embodiments. In the present embodiments, the above described tracking and enforcing of fragment processing order dependencies is used when operating in the "fall back" mode discussed above. It may also, and is in an embodiment also, used when operating in the pre pass mode discussed above (for the pre pass operation), when fragment shading is done in the pre pass (e.g. to determine final visibility), albeit in that case for tracking depth buffer update processing order dependencies only (in the case where the pre pass operation does not perform any colour shading).

In the present embodiments, and in accordance with the technology described herein, the above described fragment processing order dependency tracking and enforcing is modified when being used in the second, main pass operation described above.

In particular, as discussed above, in the present embodiments certain fragment processing order dependencies, even if they would normally be identified as existing according to the above fragment processing order dependency tracking and enforcing operation, are not enforced in the second, main pass operation in the case where a fragment undergoes and passes a particular form of visibility test that uses the determined visibility information from the first, pre pass operation in the second, main pass operation.

In particular, the Applicants have recognised that it can be the case that where a fragment processing order dependency would normally be indicated for primitives, it can in certain circumstances be determined that such a processing order dependency does not in fact exist (and so therefore does not need to be enforced), based on whether a fragment passes a particular form of visibility test so as to be processed further in the second, main pass operation.

Figure 99:
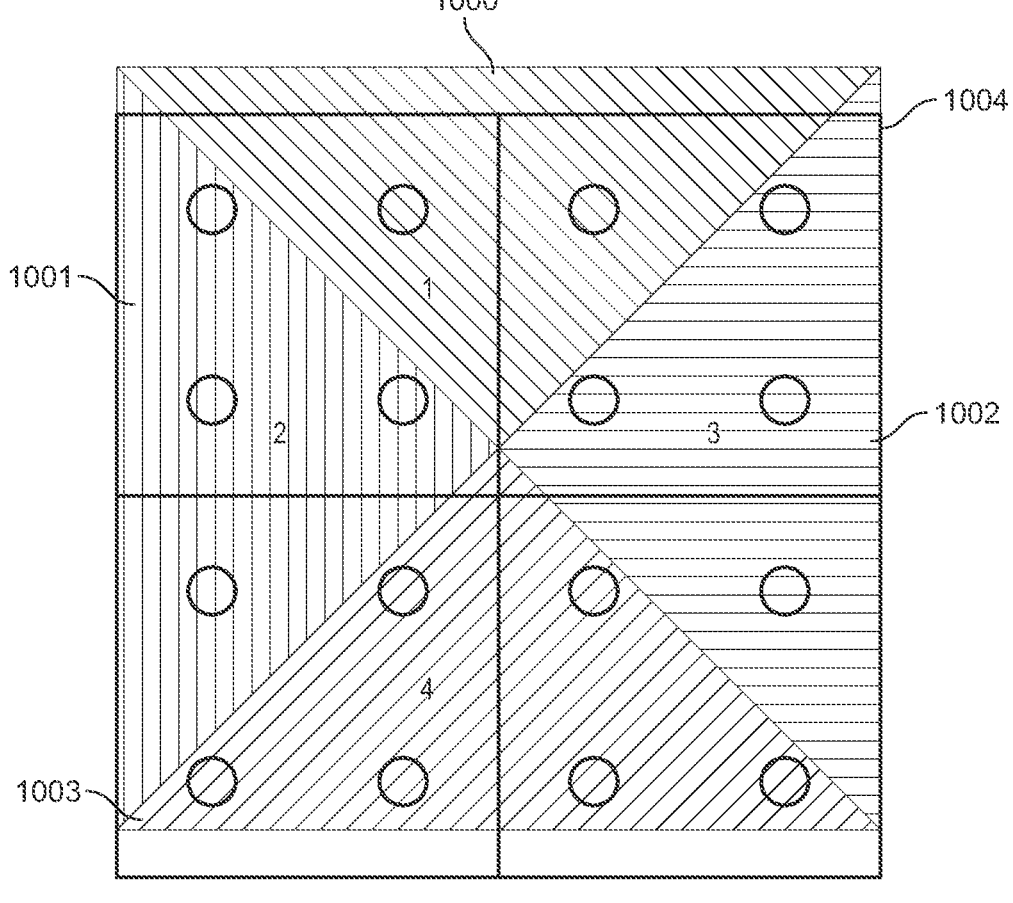
FIG. 99 illustrates the possibility of false processing order dependencies arising.

FIG. 99 illustrates this, and shows four primitives 1000, 1001, 1002 and 1003 all appearing in the same fragment quad 1004, but in fact not actually overlapping in their sampling position coverage within that fragment quad.

In the operation of the fragment processing order dependency tracking and enforcing described above, these four primitives would in the normal course be indicated as having processing order dependencies with respect to each other, as they all appear in the same fragment quad, and, as discussed above, the fragment processing order dependencies are tracked at a resolution of fragment quads. However, as can be seen from FIG. 99, although appearing in the same quad, the primitives in this case in fact do not actually overlap with each other.

Thus, in the case where all the four primitives are opaque primitives, such that following the pre pass operation, it can be determined that a given primitive is the only opaque primitive appearing at the sampling position(s) in question in the fragment quad 1004, it will in fact be the case that there is no actual processing order dependency between those primitives within the fragment quad 1004, such that there would in fact be no need to actually enforce a processing order dependency between the primitives for the purposes of the fragment shading (colour updates) for the primitives for the fragment quad and sampling positions in question in the second, main pass.

In this case therefore, any processing order dependency that would be indicated between the primitives 1000, 1001, 1002 and 1003 for the fragment quad 1004 can in fact be ignored (does not need to be enforced).

The present embodiments identify this situation where an apparent fragment processing order dependency does not need to be enforced between respective primitives based on the particular visibility test that the primitives undergo in the second, main pass operation.

In the present embodiments, it is assumed that the visibility information that is generated in the pre pass operation that is used to determine whether fragments for primitives are to be processed further in the second, main pass operation is in the form of a set of primitive identifiers (an HSR ID buffer) as discussed above with reference to FIGS. 24 47, for example.

In this case, where the visibility information comprises an HSR ID buffer, then in the case where a primitive undergoes and passes an "EQUALS" visibility test against the HSR ID buffer in the second, main pass (e.g. as shown in FIG. 28) (i.e. where the identifier of the primitive has to match the primitive identifier in the visibility information (in the HSR ID buffer) to pass the visibility test), then it can be known that the primitive that passes that EQUALS test is the only primitive that undergoes the EQUALS test that will pass that test for the sampling position in question, such that it cannot have any processing order dependency on any other primitives that undergo the EQUALS test for the sampling position in question. In this case therefore, any processing order dependency for the sampling position in question does not need to be enforced for the primitive that passes the EQUALS test.

(Although in the present embodiments the visibility test that is passed in the second, main pass operation that allows a fragment processing order dependency to not be enforced is an EQUALS test, it will be appreciated that for other forms of visibility testing and visibility information, other forms of visibility test may mean that a fragment processing order dependency does not need to be enforced. In general, it may be identified that there is a particular form of visibility test which means that a processing order dependency should not exist, and then when a fragment passes that form of visibility test in the second, main pass operation, the fragment processing order dependency does not need to be enforced.)

In the present embodiments, the possibility to not enforce a fragment processing order dependency and the not enforcing of the processing order dependency is achieved as follows.

Firstly, when performing the primitive classification before the main pass to identify whether and what visibility test a primitive should undergo (and in particular whether a primitive is compatible with the pre pass and main pass operations or not), as discussed above with reference to FIGS. 29 and 31, for example, that primitive classification is also used to set, as appropriate, "not enforce dependency" indicators (flags) for primitives as they are classified.

In this regard, each primitive has an associated "not enforce" dependency indication (e.g. flag) that can be set for the primitive to indicate that a processing order dependency does not need to be enforced for the primitive. The "not enforce" dependency indicators (flags) may be stored, for example, as part of the state information, such as a primitive data word (PDW), for a (and each) primitive.

In the present embodiments, the "not enforce" dependency indications are used in respect of and to control the setting of the dependencies for thread quads and thread groups for performing colour shading (colour buffer updates). They are not used for any setting of the depth buffer update dependencies. (In the case of depth dependencies, those dependencies should be and are in an embodiment implicitly ignored, since any primitive that will undergo (and pass) the EQUALS test in the main pass will have already completed the depth test (and updates) during the pre pass, and so can be marked as "depth completed early" when preparing the primitive dependency lists, such that they will not be marked for depth processing order dependencies either.)

The "not enforce" colour dependency indications are set (or not) for primitives as part of the primitive classification process based on, as discussed above, the particular form of visibility test that primitives are determined to undergo as part of the primitive classification, and, in the present embodiments, based on whether a primitive is determined as to undergo an EQUALS test (against the HSR ID buffer) or not. Thus in the present embodiments, when a primitive is determined to undergo an EQUALS test in the second, main pass operation, the associated "not enforce" dependency indication (e.g. flag) is set for the primitive to indicate that any colour update processing order dependency does not need to be enforced for the primitive.

(The "not enforce" colour dependency indications for primitives should be set in this way by the appropriate primitive classification process. Where a primitive classification process is performed in advance of the second, main pass (and after the first, pre pass), then the appropriate "not enforce" dependency indicators should be set accordingly as part of that primitive classification process. In an embodiment, the primitive classification process determines which visibility test a primitive (and its fragments) should undergo. In this case, where there is a primitive classification process before the pre pass, in an embodiment all primitives are set to, e.g., a no_test indication, but with the primitive classification before the second, main pass, then setting the appropriate visibility test (e.g. as one of no_test, EQUALS or GREATER THAN).)

Then, when performing the second, main pass operation for primitives, the appropriate sub tile fragment processing order dependency lists (as discussed above) will be prepared in the manner discussed above for fragments that are to be processed during the second, main pass, but the "not enforce" dependency indicators associated with primitives will be used in the second, main pass, to control (and modify) the setting of the colour shading processing operation eligibility information (indications) for fragments and entries in the sub tile fragment dependency lists, such that a colour processing dependency will not be enforced for fragments for primitives for which the "not enforce" colour dependency indication is set (to indicate that a colour processing dependency does not need to be enforced for the primitive in question).

In particular, when the fragment dependency manager 100707 (FIG. 81) is adding a thread group and a thread quad as an entry or entries to a corresponding tile sub region fragment list 100907, the FDM 100707 is configured to and will when setting whether the thread quads in the thread group (warp) have any processing operation dependencies, also check the "not enforce" colour dependency indication for a thread quad (that will be determined from the "not enforce" indication for the primitive that the thread quad relates to), to determine whether any colour dependency for the thread quad needs to be enforced or not.

Thus, when a list entry is being added to a fragment dependency list (at step 100105 in FIG. 82), when setting the appropriate processing operation eligibility indications for the list entry, the "not enforce" colour dependency indication will be checked for the primitive that the quad relates to, with the colour processing operation eligibility indication 100173 being set for the quad accordingly.

In particular, when the "not enforce" colour dependency indication is set for a primitive to indicate that a colour dependency should not be enforced for the primitive, the colour processing operation eligibility indication 100173 for any quad for that primitive is set to indicate that the quad is eligible to perform the colour processing operation in question.

It should be noted in this regard that where a primitive has an associated "not enforce" colour dependency indication set (i.e. such that a colour processing order dependency should not be enforced for quads for that primitive), then when a quad for the primitive is added as an entry to an existing fragment processing order dependency list, rather than simply setting the entry to indicate that it does have the relevant colour dependency (to then be potentially updated later on to show that there is no dependency), the entry can be, and is in an embodiment, immediately set to show that it has no colour dependency based on the "not enforce" colour dependency indication.

Conversely, any quad from a primitive for which the "not enforce" colour dependency indication is not set, will have its colour processing operation eligibility indication 100173 set in the manner discussed above, e.g. and in an embodiment set to indicate that the quad does have the relevant colour dependency when the quad is added as an entry to an existing fragment processing order dependency list (to then be potentially updated later on to show that there is no dependency (if that is the case) when the list is "scanned" to update it).

Then, when the colour processing order dependency falls to be checked by the scheduler 100903 for a quad, no colour processing order dependency will be indicated and thus enforced for a quad that undergoes the particular visibility test (that is classified and flagged as not requiring any colour update dependency to be enforced), by virtue of the setting of the processing operation eligibility information for colour updates based on the "not enforce" colour dependency flag indications for primitives and quads. In this way, the enforcing of false colour processing order dependencies can be reduced and avoided.

It should be noted here that even where a primitive and its thread quads are indicated as to not have colour processing dependencies enforced, the primitives and the quads (fragments) for those primitives are still added to the tile sub region dependency lists, with their other processing operation dependencies (e.g. depth processing dependencies), and their processing operation "should be considered for" indications (including for the colour buffer updates), still being set and updated in the (normal) manner discussed above. This is because there may be subsequent primitives (e.g. that undergo a different form of visibility test in the main pass operation) that could still have a processing order dependency on the primitive/quad(s) in question.

Thus primitives and quads are still added to the appropriate tile sub region lists, even in the case where colour dependencies are not to be enforced for primitives and quads, such that any processing order dependencies that subsequent primitives/quads may have with respect to the primitive and quads in question can still be tracked and, as necessary, enforced.

Thus, other than setting (as an entry is added to a list) the colour processing order dependency indication (the colour processing operation eligibility information) for a list entry based on whether the "not enforce" colour dependency indication is set for a primitive, the operation of maintaining the tile sub region fragment processing order dependency lists, and the use of those lists to control the processing of fragments and execution threads when performing rendering in the second, main pass, will be as described above for the "normal" operation in that regard.

Although, as discussed above, a fragment processing order dependency is not enforced (where it is appropriate to do that) in the present embodiments by setting the processing operation eligibility information for quads in the tile sub region lists appropriately, other mechanisms for not enforcing fragment processing order dependencies could be used instead, if desired. For example, the scheduler 100903 (FIG. 81) could (instead) be configured to ignore any indicated (colour) processing order dependency in a list entry for any quads for which the corresponding primitive has its "not enforce" colour processing dependency indication set to indicate that any colour processing order dependencies for that primitive do not need to be enforced.

Other arrangements could be used and possible where different forms of fragment processing order dependency records and information are used.

As will be appreciated from the above, the technology described herein, in its embodiments at least, allows the enforcing of false fragment processing order dependencies to be reduced or avoided in the case where fragment processing order dependencies are tracked and enforced when performing fragment processing in the second, main pass operation of the technology described herein. This is achieved, in the embodiments of the technology described herein at least, based on the particular form of visibility test that a fragment undergoes in the second, main pass operation, and in particular by not enforcing processing order dependencies in respect of and as between fragments that undergo a particular form of visibility test so as to be determined as to be processed further in the second, main pass operation.

The invention claimed is:

1. A method of operating a graphics processor, the method comprising:

for a sequence of primitives to be rendered for a render output:

performing a main pass operation in which the processing of fragments for at least some of the primitives in the sequence of primitives is controlled based on visibility information for the sequence of primitives, wherein:

controlling the processing of fragments for primitives when performing the main pass operation based on the visibility information for the sequence of primitives, comprises:

as part of the main pass operation, subjecting a fragment for a primitive to a visibility test that uses the visibility information to determine whether the fragment for the primitive should be processed further in the main pass operation, the visibility test being such that when the visibility information indicates that the fragment should be processed further for the render output, the fragment is processed during the main pass operation by rendering the fragment to determine rendered output data for sampling positions associated with the fragment, whereas when the visibility information indicates that the fragment should not be processed further for the render output, some or all of the processing for the fragment during the main pass is omitted;

the method further comprising:

during the main pass operation maintaining for each of plural sub-regions of the render output, each sub-region relating to plural sampling positions of the render output, a record indicative of processing order dependencies between fragments that are to be processed for the sub-region of the render output in the main pass operation; and controlling the processing of fragments to be processed for a sub-region of the render output in the main pass operation based on the record indicative of processing order dependencies between fragments to be processed for the sub-region of the render output;

wherein:

the controlling the processing of fragments to be processed for a sub-region of the render output in the main pass operation based on the record indicative of processing order dependencies between fragments to be processed for the sub-region of the render output comprises:

when a fragment to be processed for a primitive is, in the main pass operation, subjected to and passes a particular form of visibility test so as to be determined as needing to be processed further in the main pass operation, not enforcing a processing order dependency that would be indicated for the fragment in a record indicative of processing order dependencies for a sub-region of the render output to which the fragment relates.

2. The method of claim 1, comprising:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for the primitives in the sequence of primitives are processed to determine "visibility" information for the sequence of primitives, the visibility information being usable to determine whether or not fragments for a primitive in the sequence of primitives should subsequently be processed further for the render output; and thereafter performing the main pass operation in which the further processing of fragments for at least some of the primitives that were processed during the first, pre-pass operation is controlled based on the determined visibility information for the sequence of primitives, wherein:

controlling the further processing of fragments for primitives that were processed during the first, pre-pass operation when performing the main pass operation based on the determined visibility information for the sequence of primitives, comprises:

as part of the main pass operation, subjecting a fragment for a primitive that was processed during the first, pre-pass operation to a visibility test that uses the visibility information determined during the first, pre-pass operation, to determine whether the fragment for the primitive should be processed further in the main pass operation, the visibility test being such that when the visibility information indicates that the fragment should be processed further for the render output, the fragment is processed again during the main pass operation by rendering the fragment to determine rendered output data for sampling positions associated with the fragment, whereas when the visibility information indicates that the fragment should not be processed further for the render output the test, some or all of the processing for the fragment during the main pass is omitted.

3. The method of claim 1, wherein the determined visibility information comprises a set of primitive identifying information, the set of primitive identifying information storing for respective sampling positions within the render output respective primitive identifiers, where the primitive identifier stored for a respective sampling position indicates the primitive in the sequence of primitives that should subsequently be processed further for the sampling position.

4. The method of claim 1, wherein a record indicative of processing order dependencies between fragments that are to be processed for a sub-region of a render output comprises a list indicative of fragments that are to be processed for the sub-region of the render output for generating the render output, with each entry in the list representing a group of one or more fragments, and having associated with it:

information indicating which part of the sub-region the one or more fragments that the entry represents apply to; and information indicating whether one or more processing operations are eligible to be performed for the one or more fragments that the entry represents.

5. The method of claim 1, wherein the particular form of visibility test that permits a processing order dependency to not be enforced comprises an EQUALS test, in which a value for a fragment is compared to a value in the visibility information for a sampling position or positions to which the fragment relates, with a fragment passing the visibility test only when the value for the fragment is equal to the value in the visibility information that the fragment is being tested against.

6. The method of claim 1, wherein there is a plurality of different visibility tests that can be performed in the main pass, and, as part of the main pass operation, a fragment for a primitive is subjected to one of the set of plural different visibility tests; and the controlling of the processing of fragments to be processed for a sub-region of the render output in the main pass operation based on the records indicative of processing order dependencies between fragments to be processed for sub-regions of the render output during the main pass operation comprises:

when a fragment to be processed for a primitive is, in the main pass operation, subjected to and passes a particular one of the set of plural different visibility tests so as to be determined as needing to be processed further in the main pass operation, not enforcing a processing order dependency that would be indicated for the fragment in a record indicative of processing order dependencies for a sub-region of the render output to which the fragment relates;

but when a fragment to be processed for a primitive is, in the main pass operation subjected to and passes a one of the set of plural different visibility tests that is not the particular one of the set of plural visibility tests so as to be determined as needing to be processed further in the main pass operation, enforcing any processing order dependencies indicated for the fragment in a record indicative of processing order dependencies for a sub-region of the render output to which the fragment relates.

7. The method of claim 1, comprising not enforcing a colour buffer processing order dependency that could be indicated for a fragment in a record indicative of processing order dependencies for a sub-region of the render output to which a fragment relates when a fragment passes the particular visibility test.

8. The method of claim 1, wherein the not enforcing of a processing order dependency indicated for a fragment in a record indicative of processing order dependencies for a sub-region of the render output to which the fragment relates in the main pass operation when a fragment is subjected to and passes a particular visibility test so as to be determined as needing to be processed further in the main pass operation, comprises ignoring a processing order dependency indicated for the fragment in the record indicative of processing order dependencies for a sub-region of the render output to which the fragment relates.

9. The method of claim 1, wherein the not enforcing of a processing order dependency indicated for a fragment in a record indicative of processing order dependencies for a sub-region of the render output to which the fragment relates in the main pass operation when a fragment is subjected to and passes a particular visibility test so as to be determined as needing to be processed further in the main pass operation, comprises setting the record indicative of processing order dependencies for the sub-region of the render output to which the fragment relates to indicate that the fragment does not have the processing order dependency that is not to be enforced.

10. The method of claim 1, wherein primitives in the sequence of primitives are associated with respective information indicative of whether or not a processing order dependency should be enforced for the primitive in the main pass, and wherein the main pass operation comprises checking the information to determine whether a processing order dependency should not be enforced for a primitive in the main pass.

11. A graphics processor configured to generate a render output, the graphics processor comprising:
   a rasterising circuit that is operable to rasterise primitives into respective sets of one or more fragments; and
   a rendering circuit that is operable to process the resulting fragments to generate rendered output data;
   wherein the graphics processor is configured to:
   for a sequence of primitives to be rendered for a render output:
   perform a main pass operation in which a visibility testing circuit controls the further processing of fragments for at least some of the primitives in the sequence of primitives based on visibility information for the sequence of primitives, wherein:
   the visibility testing circuit is configured to control the further processing of fragments for primitives when performing the main pass operation based on the visibility information for the sequence of primitives, by:
      subjecting a fragment for a primitive to a visibility test that uses the visibility information, to determine whether the fragment for the primitive should be processed further in the main pass operation,
      the visibility test being such that when the visibility information indicates that the fragment should be processed further for the render output, the fragment is processed during the main pass operation by rendering the fragment to determine rendered output data for sampling positions associated with the fragment, whereas when the visibility information indicates that the fragment should not be processed further for the render output, some or all of the processing for the fragment during the main pass is omitted;
   the graphics processor further comprising:
   a fragment dependency record managing circuit configured to, during the main pass operation, maintain for each of plural sub-regions of the render output, each sub-region relating to plural sampling positions of the render output, a record indicative of processing order dependencies between fragments that are to be processed for the sub-region of the render output in the main pass operation; and
   a fragment processing control circuit configured to control the processing of fragments to be processed for a sub-region of the render output in the main pass operation based on a record indicative of processing order dependencies between fragments to be processed for the sub-region of the render output;

wherein:
   the fragment processing control circuit is configured to control the processing of fragments to be processed for a sub-region of the render output in the main pass operation based on a record indicative of processing order dependencies between fragments to be processed for the sub-region of the render output by:
      when a fragment to be processed for a primitive is, in the main pass operation, subjected to and passes a particular form of visibility test so as to be determined as needing to be processed further in the main pass operation, not enforcing a processing order dependency that would be indicated for the fragment in a record indicative of processing order dependencies for a sub-region of the render output to which the fragment relates.

12. The graphics processor of claim 11, wherein the graphics processor is configured to:
   for a sequence of primitives to be rendered for a render output:
   perform a first, pre-pass operation in which primitives in the sequence of primitives to be rendered are processed by:
      the rasterising circuit rasterising the primitives into respective sets of one or more fragments, each fragment associated with a respective set of one or more sampling positions within the render output; and
      a fragment visibility determining circuit processing, as part of the first, pre-pass operation, fragments for primitives in the sequence of primitives to determine "visibility" information for the sequence of primitives, the visibility information being usable to determine whether or not fragments for a primitive in the sequence of primitives should subsequently be processed further for the render output; and
   thereafter perform the main pass operation in which a visibility testing circuit controls the further processing of fragments for at least some of the primitives that were processed during the first, pre-pass operation based on the determined visibility information for the sequence of primitives, wherein:
   the visibility testing circuit is configured to control the further processing of fragments for primitives that were processed during the first, pre-pass operation when performing the main pass operation based on the determined visibility information for the sequence of primitives, by:
      subjecting a fragment for a primitive that was processed during the first, pre-pass operation to a visibility test that uses the visibility information determined during the first, pre-pass operation, to determine whether the fragment for the primitive should be processed further in the main pass operation,
      the visibility test being such that when the visibility information indicates that the fragment should be processed further for the render output, the fragment is processed again during the main pass operation by rendering the fragment to determine rendered output data for sampling positions associated with the fragment, whereas when the visibility information indicates that the fragment should not be processed further for the render output the test is not passed and some or all of the processing for the fragment during the main pass is omitted.

13. The graphics processor of claim 11, wherein the determined visibility information comprises a set of primitive identifying information, the set of primitive identifying information storing for respective sampling positions within the render output respective primitive identifiers, where the primitive identifier stored for a respective sampling position indicates the primitive in the sequence of primitives that should subsequently be processed further for the sampling position.

14. The graphics processor of claim 11, wherein a record indicative of processing order dependencies between fragments that are to be processed for a sub-region of a render output comprises a list indicative of fragments that are to be processed for the sub-region of the render output for generating the render output, with each entry in the list representing a group of one or more fragments, and having associated with it:

information indicating which part of the sub-region the one or more fragments that the entry represents apply to; and information indicating whether one or more processing operations are eligible to be performed for the one or more fragments that the entry represents.

15. The graphics processor of claim 11, wherein the particular form of visibility test that permits a processing order dependency to not be enforced comprises an EQUALS test, in which a value for a fragment is compared to a value in the visibility information for a sampling position or positions to which the fragment relates, with a fragment passing the visibility test only when the value for the fragment is equal to the value in the visibility information that the fragment is being tested against.

16. The graphics processor of claim 11, wherein there is a plurality of different visibility tests that can be performed in the main pass, and, as part of the main pass operation, a fragment is subjected to one of the set of plural different visibility tests; and the fragment processing control circuit is configured to control the processing of fragments to be processed for a sub-region of the render output in the main pass operation based on the records indicative of processing order dependencies between fragments to be processed for sub-regions of the render output during the main pass operation by:

when a fragment to be processed for a primitive is, in the main pass operation, subjected to and passes a particular one of the set of plural different visibility tests so as to be determined as needing to be processed further in the main pass operation, not enforcing a processing order dependency that would be indicated for the fragment in a record indicative of processing order dependencies for a sub-region of the render output to which the fragment relates;

but when a fragment to be processed for a primitive is, in the main pass operation subjected to and passes a one of the set of plural different visibility tests that is not the particular one of the set of plural visibility tests so as to be determined as needing to be processed further in the main pass operation, enforcing any processing order dependencies indicated for the fragment in a record indicative of processing order dependencies for a sub-region of the render output to which the fragment relates.

17. The graphics processor of claim 11, wherein the fragment processing control circuit is configured to not enforce a colour buffer processing order dependency that could be indicated for a fragment in a record indicative of processing order dependencies for a sub-region of the render output to which a fragment relates when a fragment passes the particular visibility test.

18. The graphics processor of claim 11, wherein the not enforcing of a processing order dependency indicated for a fragment in a record indicative of processing order dependencies for a sub-region of the render output to which the fragment relates in the main pass operation when a fragment is subjected to and passes a particular visibility test so as to be determined as needing to be processed further in the main pass operation, comprises (i) ignoring a processing order dependency indicated for the fragment in the record indicative of processing order dependencies for a sub-region of the render output to which the fragment relates, and/or (ii) setting a record indicative of processing order dependencies for a sub-region of the render output to which the fragment relates to indicate that the fragment does not have the processing order dependency that is not to be enforced.

19. The graphics processor of claim 11, wherein primitives in the sequence of primitives are associated with respective information indicative of whether or not a processing order dependency should be enforced for the primitive in the main pass, and wherein the graphics processor is configured to, in the main pass operation, check the information to determine whether a processing order dependency should be enforced for a primitive in the main pass.

20. A non-transitory computer readable medium storing computer software code for performing, when the computer software code is run on one or more data processors, a method of operating a graphics processor, the method comprising:

for a sequence of primitives to be rendered for a render output:

performing a main pass operation in which the processing of fragments for at least some of the primitives in the sequence of primitives is controlled based on visibility information for the sequence of primitives, wherein:

controlling the processing of fragments for primitives when performing the main pass operation based on the visibility information for the sequence of primitives, comprises:

as part of the main pass operation, subjecting a fragment for a primitive to a visibility test that uses the visibility information to determine whether the fragment for the primitive should be processed further in the main pass operation, the visibility test being such that when the visibility information indicates that the fragment should be processed further for the render output, the fragment is processed during the main pass operation by rendering the fragment to determine rendered output data for sampling positions associated with the fragment, whereas when the visibility information indicates that the fragment should not be processed further for the render output, some or all of the processing for the fragment during the main pass is omitted;

the method further comprising:

during the main pass operation maintaining for each of plural sub-regions of the render output, each sub-region relating to plural sampling positions of the render output, a record indicative of processing order dependencies between fragments that are to be processed for the sub-region of the render output in the main pass operation; and controlling the processing of fragments to be processed for a sub-region of the render output in the main pass operation based on the record indicative of processing order dependencies between fragments to be processed for the sub-region of the render output;

wherein:

the controlling the processing of fragments to be processed for a sub-region of the render output in the main pass operation based on the record indicative of processing order dependencies between fragments to be processed for the sub-region of the render output comprises:

when a fragment to be processed for a primitive is, in the main pass operation, subjected to and passes a particular form of visibility test so as to be determined as needing to be processed further in the main pass operation, not enforcing a processing order dependency that would be indicated for the fragment in a record indicative of processing order dependencies for a sub-region of the render output to which the fragment relates.

\* \* \* \* \*